US012621499B2

(12) United States Patent
Li et al.

(10) Patent No.: US 12,621,499 B2
(45) Date of Patent: May 5, 2026

(54) UNIFIED NEURAL NETWORK IN-LOOP FILTER SIGNALING

(71) Applicants: Lemon Inc., Grand Cayman (KY); Beijing Bytedance Network Technology Co., Ltd., Beijing (CN); Bytedance Inc., Los Angeles, CA (US); Bytedance (HK) Limited, Hong Kong (CN)

(72) Inventors: Yue Li, San Diego, CA (US); Li Zhang, San Diego, CA (US); Kai Zhang, San Diego, CA (US); Junru Li, Beijing (CN); Meng Wang, Beijing (CN); Siwei Ma, Beijing (CN); Shiqi Wang, Hong Kong (CN)

(73) Assignees: Lemon Inc., Grand Cayman (KY); Beijing Bytedance Network Technology Co., Ltd., Beijing (CN); Bytedance Inc., Los Angeles, CA (US); Bytedance (HK) Limited, Hong Kong (CN)

( * ) Notice: Subject to any disclaimer, the term of this patent is extended or adjusted under 35 U.S.C. 154(b) by 0 days.

(21) Appl. No.: 18/624,889

(22) Filed: Apr. 2, 2024

(65) Prior Publication Data

US 2024/0276020 A1    Aug. 15, 2024

Related U.S. Application Data

(63) Continuation of application No. 17/720,125, filed on Apr. 13, 2022, now Pat. No. 11,949,918.

(Continued)

(51) Int. Cl.
*H04N 19/82*     (2014.01)
*H04N 19/117*    (2014.01)
*H04N 19/70*     (2014.01)

(52) U.S. Cl.
CPC ........... *H04N 19/82* (2014.11); *H04N 19/117* (2014.11); *H04N 19/70* (2014.11)

(58) Field of Classification Search
None
See application file for complete search history.

(56) References Cited

U.S. PATENT DOCUMENTS 11,218,695 B2    1/2022  Park
11,949,918 B2    4/2024  Li
(Continued)

FOREIGN PATENT DOCUMENTS

CN    103891293 A    6/2014
CN    107197260 A    9/2017
(Continued)

OTHER PUBLICATIONS

Bross, et al., "Versatile Video Coding (Draft 10)," Document: JVET-S2001-vH, Joint Video Experts Team (JVET) of ITU-T SG 16 WP 3 and ISO/IEC JTC 1/SC 29/WG 11, 19th Meeting: by teleconference, Jun. 22-Jul. 1, 2020, 548 pages.
(Continued)

*Primary Examiner* — Christopher Braniff
(74) *Attorney, Agent, or Firm* — Conley Rose, P.C.

(57) ABSTRACT

A method implemented by a video coding apparatus includes applying a neural network (NN) filter to an unfiltered sample of a video unit to generate a filtered sample. The NN filter is applied based on a syntax element of the video unit. The method also includes converting between a video media file and a bitstream based on the filtered sample that was generated.

19 Claims, 22 Drawing Sheets

500

Related U.S. Application Data

(60) Provisional application No. 63/176,871, filed on Apr. 19, 2021.

(56) References Cited

U.S. PATENT DOCUMENTS

| | | | |
|---|---|---|---|
| 11,979,591 | B2 | 5/2024 | Li et al. |
| 2020/0154145 | A1 | 5/2020 | Du |
| 2020/0327702 | A1 | 10/2020 | Wang |
| 2020/0382793 | A1 | 12/2020 | Gao |
| 2021/0021820 | A1 | 1/2021 | Ikai |
| 2021/0044811 | A1 | 2/2021 | Hodgkinson |
| 2022/0038721 | A1 | 2/2022 | Li |
| 2022/0101095 | A1 | 3/2022 | Li |
| 2022/0103864 | A1 | 3/2022 | Wang |
| 2022/0295116 | A1 | 9/2022 | Ma |

FOREIGN PATENT DOCUMENTS

| | | | | |
|---|---|---|---|---|
| CN | 108184129 | A | 6/2018 | |
| CN | 110971915 | A | 4/2020 | |
| CN | 111052740 | A | 4/2020 | |
| CN | 111064958 | A | 4/2020 | |
| CN | 111133756 | A | 5/2020 | |
| CN | 111194555 | A | 5/2020 | |
| CN | 111541894 | A | 8/2020 | |
| CN | 111866522 | A | 10/2020 | |
| CN | 112422993 | A | 2/2021 | |
| WO | 2019182159 | A1 | 9/2019 | |
| WO | 2020177072 | A1 | 9/2020 | |
| WO | 2021051369 | A1 | 3/2021 | |
| WO | WO-2021211966 | A1 * | 10/2021 | ............. G06N 3/045 |

OTHER PUBLICATIONS

Bossen, Ed., et al., "VTM Software Manual," Document: JVET-Software Manual, Joint Video Experts Team (JVET) of ITU-T SG16 WP3 and ISO/IEC JTC1/SC29/WG11, Aug. 13, 2020, 46 pages.

Lim, et al, "CE2: Subsampled Laplacian calculation (Test 6.1, 6.2, 6.3, and 6.4)," Document JVET-L0147, Joint Video Experts Team (JVET) of ITU-T SG 16 WP 3 and ISO/IEC JTC 1/SC 29/WG 11, 12th Meeting: Macao, CN, Oct. 3-12, 2018, 8 pages.

Taquet, et al., "CE5: Results of tests CE5-3.1 to CE5-3.4 on Non-Linear Adaptive Loop Filter," Document JVET-N0242, Joint Video Experts Team (JVET) of ITU-T SG 16 WP 3 and ISO/IEC JTC 1/SC 29/WG 11, 14th Meeting: Geneva, CH, Mar. 19-27, 2019, 10 pages.

Balle, et. al., "End-to-end optimization of nonlinear transform codes for perceptual quality," In PCTS. IEEE, 2016, pp. 1-5.

Theis, et. al., "Lossy Image Compression with Compressive Autoencoders," ICLR 2017, arXiv:1703.00395v1 [stat.MIL], Mar. 1, 2017, 19 pages.

Li, et. al., "Fully Connected Network-Based Intra Prediction for Image Coding," IEEE Transaction on Image Processing, Vo., 27, Issue 7, 2018, pp. 3236-3247.

Dai, et. al., "A Convolutional Neural Network Approach for Post-Processing in HEVC Intra Coding," MMM, Springer, arXiv:1608.06690v2 [cs.MM], Oct. 29, 2016,, pp. 28-39.

Song, et. al., "Neural Network-Based Arithmetic Coding of Intra Prediction Modes in HEVC," VCIP 2017, IEEE, Dec. 10-13, 2017, 4 pages.

Pfaff, et al., "Neural network based intra prediction for video coding," In Applications of Digital Image Processing XLI, vol. 10752. International Society for Optics and Photonics, 1075213, 7 pages.

Li, et al, "AHG11: Convolutional Neural Network-based In-Loop Filter with Adaptive Model Selection," Document: JVET-U0068-v2, Joint Video Experts Team (JVET) of ITU-T SG 16 WP 3 and ISO/IEC JTC 1/SC 29, 21st Meeting, by teleconference, Jan. 6-15, 2021, 5 pages.

Liu, et al., "JVET common test conditions and evaluation procedures for neural network-based video coding technology," Document: JVET-U2016-r1, Joint Video Experts Team (JVET) of ITU-T SG 16 WP 3 and ISO/IEC JTC 1/SC 29/WG 11 21st Meeting, by teleconference, Jan. 6-15, 2021, 10 pages.

Timofte, et al., "DIV2K dataset: DIVerse 2K resolution high quality images as used for the challenges @ NTIRE (CVPR 2017 and CVPR 2018) and @ PIRM (ECCV 2018)," https://data.vision.ee.ethz.ch/cvl/DIV2K/, 6 pages.

Ma, et al., "BVI-DVC: A Training Database for Deep Video Compression," arXiv:2003.13552v2 [33ss.IV] Oct. 8, 2020, 11 pages.

Suehring, K., Retrieved from the internet: https://vcgit.hhi.fraunhofer.de/jvet/VVCSoftware_VTM/-tags/VTM-10.0, Jul. 15, 2022, 2 pages.

Bossen, F., Retrieved from the internet: https://vcgit.hhi.fraunhofer.de/jvet/VVCSoftware_VTM/-tags/VTM-11.0, Jul. 15, 2022, 1 page.

Foreign Communication From A Related Counterpart Application, International Application No. PCT/CN2022/086899, International Search Report dated Jul. 11, 2022, 8 pages.

Non-Final Office Action dated Jun. 23, 2023, 27 pages, U.S. Appl. No. 17/714,014, filed Jun. 23, 2023.

Non-Final Office Action dated Jun. 8, 2023, 27 pages, U.S. Appl. No. 17/720,125, filed Apr. 13, 2022.

Chinese Office Action from Chinese Patent Application No. 202210357676.0 dated Apr. 23, 2025, 25 pages.

Chinese Office Action from Chinese Patent Application No. 202210399919.7 dated Apr. 18, 2025, 20 pages.

Non-Final Office Action from U.S. Appl. No. 18/487,350 dated Jun. 18, 2025, 30 pages.

Non-Final Office Action from U.S. Appl. No. 18/657,026 dated Jul. 30, 2025, 27 pages.

* cited by examiner

100

CTU        Tile        Slice 106        102        104

400

400

400

600

Blocks of 8x8
Samples
604

Vertical block
Boundary on
The 8x8 grid
608

Non-overlapping blocks of
8x8 samples, which can be
deblocked in parallel
610

Sample
602

Horizontal block boundary
on the 8x8 grid
606

800

900

1100

Residual block

1300

1600

1900

2300

Apply a neural network (NN) filter to an unfiltered sample of a video unit to generate a filtered sample, where the NN filter is applied based on a syntax element of the video unit ⌐2302

Convert between a video media file and a bitstream based on the filtered sample that was generated ⌐2304

UNIFIED NEURAL NETWORK IN-LOOP FILTER SIGNALING

CROSS-REFERENCE TO RELATED APPLICATIONS

This patent application is a continuation application of U.S. application Ser. No. 17/720,125, filed on Apr. 13, 2022, which claims the benefit of International Application No. PCT/CN2021/087615 filed Apr. 15, 2021 by Beijing Bytedance Network Technology Co., Ltd., International Application No. PCT/CN2021/087915 filed Apr. 16, 2021 by Beijing Bytedance Network Technology Co., Ltd., U.S. Provisional Patent Application No. 63/176,871 filed Apr. 19, 2021, by Lemon, Inc., and International Application No. PCT/CN2021/088480 filed Apr. 20, 2021 by Beijing Bytedance Network Technology Co., Ltd., all of which are hereby incorporated by reference in their entireties.

TECHNICAL FIELD

The present disclosure is generally related to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed aspects/embodiments provide one or more neural network (NN) filter models trained as part of an in-loop filtering technology or filtering technology used in a post-processing stage for reducing the distortion incurred during compression. In addition, samples with different characteristics are processed by different NN filter models. Further, the presence of (e.g., application of) NN filter models may be controlled through syntax elements at various levels. For example, the syntax element(s) that indicate whether to apply a NN filter may be at a first level (e.g., in a sequence parameter set (SPS) and/or a sequence header of a video unit). Syntax element(s) that indicate whether to apply a NN filter may also be at a second level (e.g., a picture header, a picture parameter set (PPS), and/or a slice header of the video unit). Still further, syntax element(s) that indicate whether to apply a NN filter may be at a third level (e.g., the syntax element is indicated for a patch of the video unit, a CTU of the video unit, a CTB of the video unit, a block of the video unit, a subpicture of the video unit, a tile of the video unit, or a region of the video unit.

A first aspect relates to a method implemented by a coding apparatus. The method includes applying a neural network (NN) filter to an unfiltered sample of a video unit to generate a filtered sample, wherein the NN filter is applied based on a syntax element of the video unit. The method also includes converting between a video media file and a bitstream based on the filtered sample that was generated.

Optionally, in any of the preceding aspects, another implementation of the aspect provides that the syntax element indicates at least one selected from the group consisting of: whether to enable the NN filter, a number of NN filters to be applied, and a type of NN filter to be applied.

Optionally, in any of the preceding aspects, another implementation of the aspect provides that a first level comprises a sequence level and a syntax element indicated in the first level is indicated in a sequence parameter set (SPS) and/or a sequence header of the video unit; a second level comprises a picture level and a syntax element indicated in the second level is indicated in a picture header, a picture parameter set (PPS), and/or a slice header of the video unit; and a third level comprises a subpicture level a syntax element indicated in the third level is indicated for a patch of the video unit, a coding tree unit (CTU) of the video unit, a coding tree block (CTB) of the video unit, a block of the video unit, a subpicture of the video unit, a tile of the video unit, a slice of the video unit, or a region of the video unit.

Optionally, in any of the preceding aspects, another implementation of the aspect provides that the syntax element is a first syntax element at the first level that indicates whether a NN filter can be adaptively selected at the second level to be applied to a picture or a slice of the video unit.

Optionally, in any of the preceding aspects, another implementation of the aspect provides that the syntax element is a first syntax element at the second level that is conditionally applied based on a second syntax element at the first level, wherein the NN filter is applied at the second level based on the first syntax element based on the second syntax element being a flag that is true, and wherein the NN filter is not applied based on the second syntax element being false.

Optionally, in any of the preceding aspects, another implementation of the aspect provides that the syntax element is a first syntax element at the second level that indicates whether a NN filter can be adaptively selected at the third level to be applied to a subpicture of the video unit, or that indicates whether usage of the NN filter can be controlled at the third level.

Optionally, in any of the preceding aspects, another implementation of the aspect provides that the syntax element is a first syntax element at the second level that indicates whether a NN filter can be adaptively selected at the second level, used at the second level, or applied on the second level; and wherein the first syntax element is signaled based on an indication that the NN filter can be adaptively selected at the second level or an indication that a number of NN filters is greater than one.

Optionally, in any of the preceding aspects, another implementation of the aspect provides that the syntax element is a first syntax element at the third level that is conditionally applied based on a second syntax element at the first level and/or a third syntax at the second level, wherein the first syntax element is coded using context, wherein the NN filter is applied at the third level based on the first syntax element based on one of the second syntax element and the third syntax element being a flag that is true, and wherein the NN filter is not applied based on one of the second syntax element and the third syntax element being false.

Optionally, in any of the preceding aspects, another implementation of the aspect provides that the syntax element is a first syntax element at the third level that is signaled based on an indication that the NN filter can be adaptively selected at the third level or an indication that a number of NN filters is greater than one.

Optionally, in any of the preceding aspects, another implementation of the aspect provides that the syntax element is signaled responsive to the NN filter being enabled for a picture or a slice of the video unit, and wherein the NN filter is one of a plurality (T) of NN filters, and wherein the syntax element includes an index (k).

Optionally, in any of the preceding aspects, another implementation of the aspect provides applying the kl NN filter at the second level of the video unit based on the index k>=0 and k<T.

Optionally, in any of the preceding aspects, another implementation of the aspect provides adaptively selecting a NN filter at the third level based on the index k>=T.

Optionally, in any of the preceding aspects, another implementation of the aspect provides that the index k is restricted to be in a range from 0 to (T−1).

Optionally, in any of the preceding aspects, another implementation of the aspect provides that the syntax element is coded based on a context model that is selected based on a number of allowed NN filters, wherein a filter model index for a color component of the video unit is configured to specify one of K context models, and wherein the one of the K context models is specified as a minimum of K−1 and binIdx, wherein binIdx is an index of a bin to be coded.

Optionally, in any of the preceding aspects, another implementation of the aspect provides that a filter model index for first and second color components of the video unit is coded with a same set of contexts.

Optionally, in any of the preceding aspects, another implementation of the aspect provides that the filter model index for a first color component of the video unit is coded with a different set of contexts than the filter model index for a second color component of the video unit.

Optionally, in any of the preceding aspects, another implementation of the aspect provides that the syntax element is signaled using context coding or bypass coding, or is binarized using fixed-length coding, unary coding, truncated unary coding, signaled unary coding, signed truncated unary coding, truncated binary coding, or exponential Golomb coding.

Optionally, in any of the preceding aspects, another implementation of the aspect provides that the conversion comprises generating the bitstream according to the video media file.

Optionally, in any of the preceding aspects, another implementation of the aspect provides that the conversion comprises parsing the bitstream to obtain the video media file.

A second aspect relates to an apparatus for coding video data comprising a processor and a non-transitory memory with instructions thereon, wherein the instructions upon execution by the processor cause the processor to: apply a neural network (NN) filter to an unfiltered sample of a video unit to generate a filtered sample, wherein the NN filter is applied based on a syntax element of the video unit; and convert between a video media file and a bitstream based on the filtered sample that was generated.

A third aspect relates to a non-transitory computer readable medium storing a bitstream of a video that is generated by a method performed by a video processing apparatus. The method performed by the video processing apparatus comprises applying a neural network (NN) filter to an unfiltered sample of a video unit to generate a filtered sample, wherein the NN filter is applied based on a syntax element of the video unit; and generating the bitstream based on the filtered sample that was generated.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
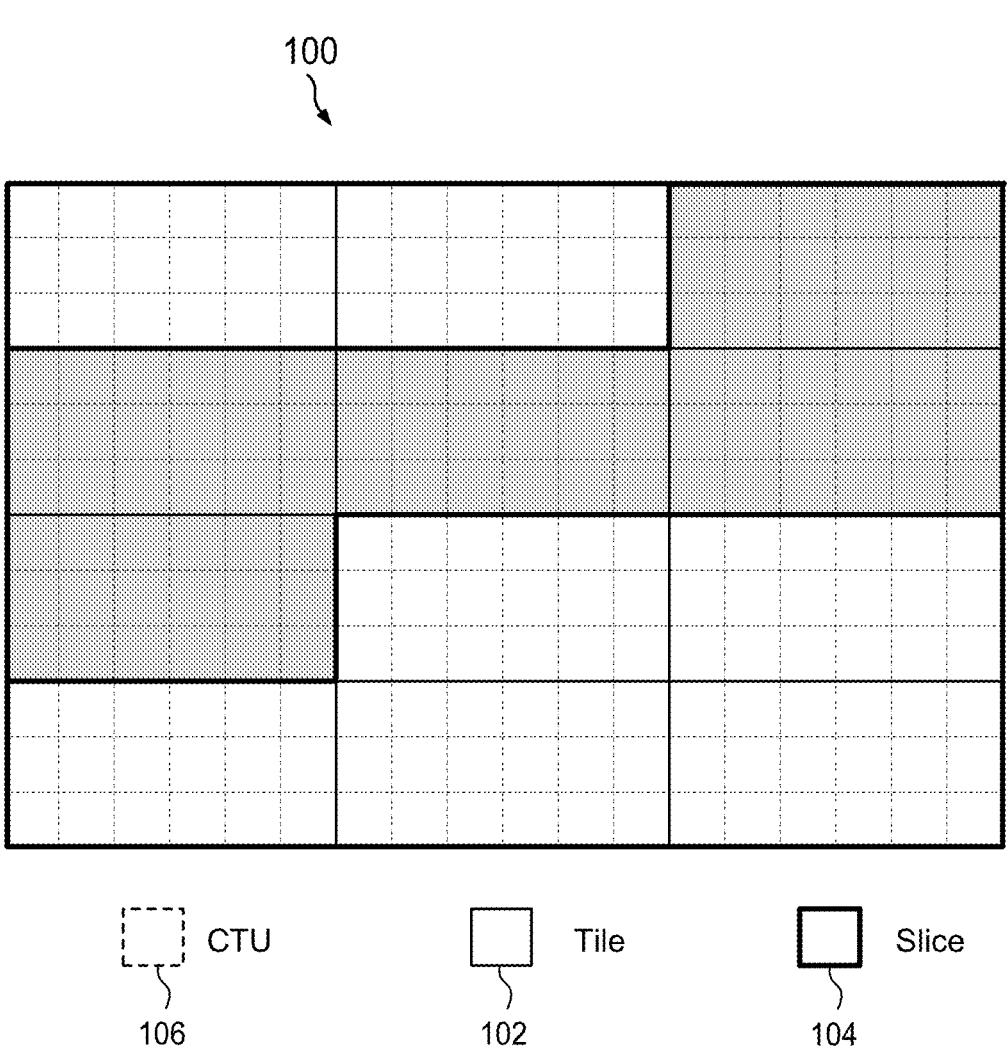
FIG. 1 is an example of raster-scan slice partitioning of a picture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Versatile Video Coding (VVC), also known as H.266, terminology is used in some description only for ease of understanding and not for limiting scope of the disclosed embodiments. As such, the techniques described herein are applicable to other video codec protocols and designs also.

This description is related to video coding. Specifically, this description is related to a loop filter in image/video coding. The disclosed examples may be applied individually or in various combinations, for video bitstreams coded using existing video coding standards, such as the VVC standard, the High-Efficiency Video Coding (HEVC) standard, or the standards to be finalized (e.g., third-generation Audio Video Coding Standard (AVS3)). The disclosed examples may also be applicable to future video coding standards, future video codecs, or as a post-processing method outside of an encoding/decoding process.

Video coding standards have evolved primarily through the development of the well-known International Telecommunication Union-Telecommunication (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards.

Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM).

In April 2018, the Joint Video Expert Team (JVET) between VCEG (Q6/16) and ISO/IEC JTC1 SC29/WG11 (MPEG) was created to work on the VVC standard targeting at fifty percent (50%) bitrate reduction compared to HEVC. VVC version 1 was finalized in July 2020.

Color space and chroma subsampling are discussed. Color space, also known as the color model (or color system), is an abstract mathematical model which simply describes the range of colors as tuples of numbers, typically as 3 or 4 values or color components (e.g., red green blue (RGB)). Basically speaking, color space is an elaboration of the coordinate system and sub-space.

For video compression, the most frequently used color spaces are YCbCr and RGB. YCbCr, Y'CbCr, or Y'Pb/Cb Pr/Cr, also written as $YC_BC_R$ or $Y'C_BC_R$, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

For 4:4:4 chroma subsampling, each of the three Y'CbCr components have the same sample rate, thus there is no chroma subsampling. This scheme is sometimes used in high-end film scanners and cinematic post production.

For 4:2:2 chroma subsampling, the two chroma components are sampled at half the sample rate of luma: the horizontal chroma resolution is halved. This reduces the bandwidth of an uncompressed video signal by one-third with little to no visual difference.

For 4:2:0 chroma subsampling, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of two both horizontally and vertically. There are three variants of 4:2:0 schemes, having different horizontal and vertical siting.

In MPEG-2, Cb and Cr are co-sited horizontally. Cb and Cr are sited between pixels in the vertical direction (sited interstitially). In Joint Photographic Experts Group (JPEG)/ JPEG File Interchange Format (JFIF), H.261, and MPEG-1, Cb and Cr are sited interstitially, halfway between alternate luma samples. In 4:2:0 DV, Cb and Cr are co-sited in the horizontal direction. In the vertical direction, they are co-sited on alternating lines.

Definitions of video units are provided. A picture is divided into one or more tile rows and one or more tile columns. A tile is a sequence of coding tree units (CTUs) that covers a rectangular region of a picture. A tile is divided into one or more bricks, each of which consists of a number of CTU rows within the tile. A tile that is not partitioned into multiple bricks is also referred to as a brick. However, a brick that is a true subset of a tile is not referred to as a tile. A slice either contains a number of tiles of a picture or a number of bricks of a tile.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

FIG. 1 is an example of raster-scan slice partitioning of a picture 100, where the picture is divided into twelve tiles 102 and three raster-scan slices 104. As shown, each of the tiles 102 and slices 104 contains a number of CTUs 106.

Figure 2:
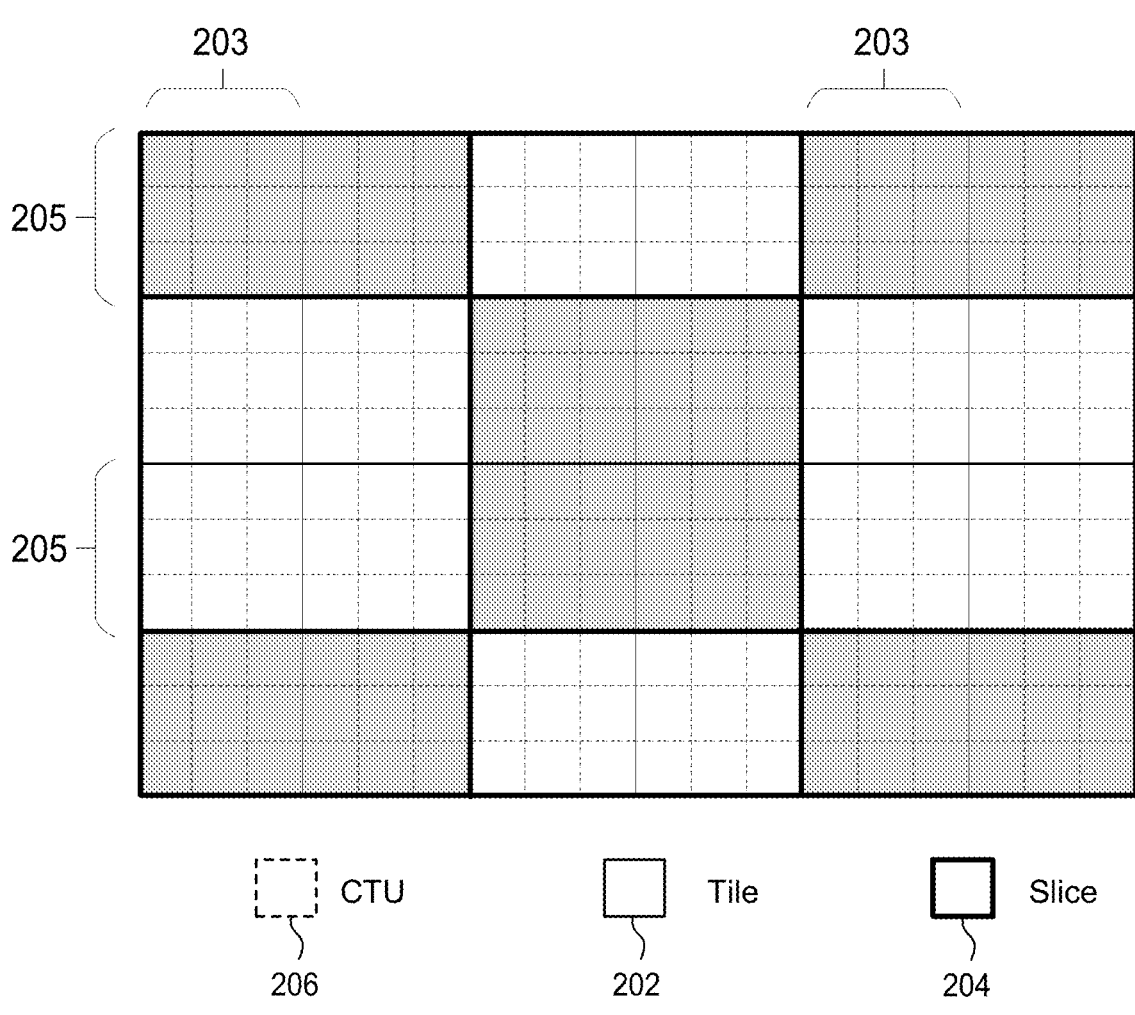
FIG. 2 is an example of rectangular slice partitioning of a picture.

FIG. 2 is an example of rectangular slice partitioning of a picture 200 according to the VVC specification, where the picture is divided into twenty-four tiles 202 (six tile columns 203 and four tile rows 205) and nine rectangular slices 204. As shown, each of the tiles 202 and slices 204 contains a number of CTUs 206.

Figure 3:
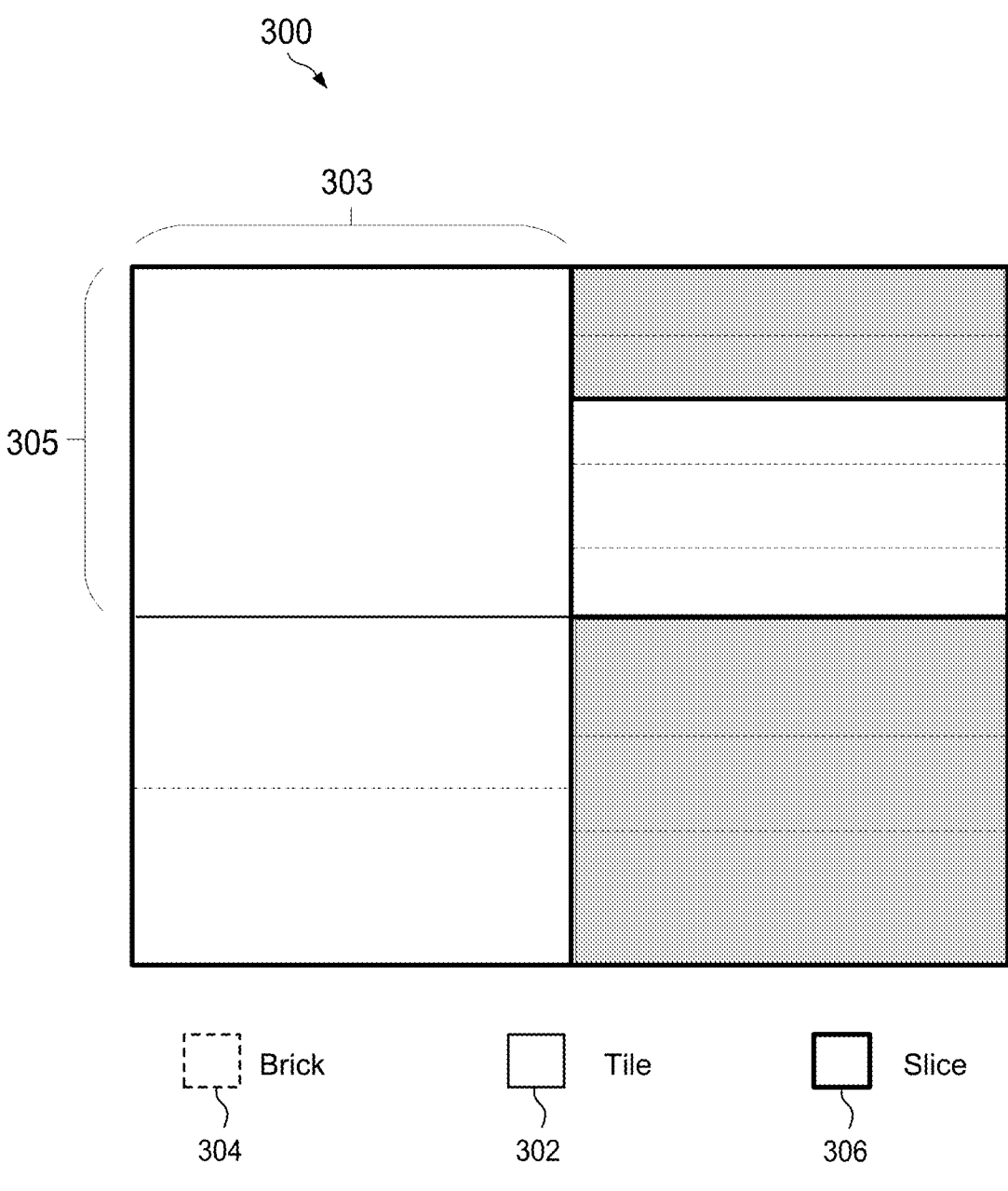
FIG. 3 is an example of a picture partitioned into tiles, bricks, and rectangular slices.

FIG. 3 is an example of a picture 300 partitioned into tiles, bricks, and rectangular slices according to the VVC specification, where the picture is divided into four tiles 302 (two tile columns 303 and two tile rows 305), eleven bricks 304

(the top-left tile contains one brick, the top-right tile contains five bricks, the bottom-left tile contains two bricks, and the bottom-right tile contain three bricks), and four rectangular slices 306.

CTU and coding tree block (CTB) sizes are discussed. In VVC, the coding tree unit (CTU) size, which is signaled in a sequence parameter set (SPS) by the syntax element log2_ctu_size_minus2, could be as small as 4×4. The sequence parameter set raw byte sequence payload (RBSP) syntax is below.

| | Descriptor |
|---|---|
| seq_parameter_set_rbsp( ) { | |
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) | |
| gra_enabled_flag | u(1) |
| sps_seq_parameter_set_id | ue(v) |
| chroma_format_idc | ue(v) |
| if( chroma_format_idc = = 3 ) | |
| separate_colour_plane_flag | u(1) |
| pic_width_in_luma_samples | ue(v) |
| pic_height_in_luma_samples | ue(v) |
| conformance_window_flag | u(1) |
| if( conformance_window_flag ) { | |
| conf_win_left_offset | ue(v) |
| conf_win_right_offset | ue(v) |
| conf_win_top_offset | ue(v) |
| conf_win_bottom_offset | ue(v) |
| } | |
| bit_depth_luma_minus8 | ue(v) |
| bit_depth_chroma_minus8 | ue(v) |
| log2_max_pic_order_cnt_lsb_minus4 | ue(v) |
| sps_sub_layer_ordering_info_present_flag | u(1) |
| for( i = ( sps_sub_layer_ordering_info_present_flag ? | |
| 0 : sps_max_sub_layers_minus1 ); | |
| i <= sps_max_sub_layers_minus1; i++ ) { | |
| sps_max_dec_pic_buffering_minus1[ i ] | ue(v) |
| sps_max_num_reorder_pics[ i ] | ue(v) |
| sps_max_latency_increase_plus1[ i ] | ue(v) |
| } | |
| long_term_ref_pics_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
| num_ref_pic_lists_in_sps[ i ] | ue(v) |
| for( j = 0; j < num_ref_pic_lists_in_sps[ i ]; j++) | |
| ref_pic_list_struct( i, j ) | |
| } | |
| qtbtt_dual_tree_intra_flag | u(1) |
| log2_ctu_size_minus2 | ue(v) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| if( sps_max_mtt_hierarchy_depth_inter_slices != 0 ) { | |
| sps_log2_diff_max_bt_min_qt_inter_slice | ue(v) |
| sps_log2_diff_max_tt_min_qt_inter_slice | ue(v) |
| } | |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if ( sps_max_mtt_hierarchy_depth_ | |
| intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| ... | |

-continued

| | Descriptor |
|---|---|
| rbsp_trailing_bits( ) | |
| } | | log2_ctu_size_minus2 plus 2 specifies the luma coding tree block size of each CTU.

log2_min_luma_coding_block_size_minus2 plus 2 specifies the minimum luma coding block size.

The variables CtbLog2SizeY, CtbSizeY, MinCbLog2SizeY, MinCbSizeY, MinTbLog2SizeY, MaxTbLog2SizeY, MinTbSizeY, MaxTbSizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows.

$$CtbLog2SizeY = log2\_ctu\_size\_minus2 + 2 \qquad (7\text{-}9)$$

$$CtbSizeY = 1 \ll CtbLog2SizeY \qquad (7\text{-}10)$$

$$MinCbLog2SizeY = \qquad (7\text{-}11)$$
$$log2\_min\_luma\_coding\_block\_size\_minus2 + 2$$

$$MinCbSizeY = 1 \ll MinCbLog2SizeY \qquad (7\text{-}12)$$

$$MinTbLog2SizeY = 2 \qquad (7\text{-}13)$$

$$MaxTbLog2SizeY = 6 \qquad (7\text{-}14)$$

$$MinTbSizeY = 1 \ll MinTbLog2SizeY \qquad (7\text{-}15)$$

$$MaxTbSizeY = 1 \ll MaxTbLog2SizeY \qquad (7\text{-}16)$$

$$PicWidthInCtbsY = \text{Ceil}(pic\_width\_in\_luma\_samples \div CtbSizeY) \quad (7\text{-}17)$$

$$PicHeightInCtbsY = \text{Ceil}(pic\_height\_in\_luma\_samples \div CtbSizeY) \quad (7\text{-}18)$$

$$PicSizeInCtbsY = PicWidthInCtbsY * PicHeightInCtbsY \qquad (7\text{-}19)$$

$$PicWidthInMinCbsY = pic\_width\_in\_luma\_samples/MinCbSizeY \quad (7\text{-}20)$$

$$PicHeightInMinCbsY = pic\_height\_in\_luma\_samples/MinCbSizeY \quad (7\text{-}21)$$

$$PicSizeInMinCbsY = PicWidthInMinCbsY * PicHeightInMinCbsY \quad (7\text{-}22)$$

$$PicSizeInSamplesY = \qquad (7\text{-}23)$$
$$pic\_width\_in\_luma\_samples * pic\_height\_in\_luma\_samples$$

$$PicWidthInSamplesC = pic\_width\_in\_luma\_samples/SubWidthC \quad (7\text{-}24)$$

$$PicHeightInSamplesC = pic\_height\_in\_luma\_samples/SubHeightC \quad (7\text{-}25)$$

Figure 4A:
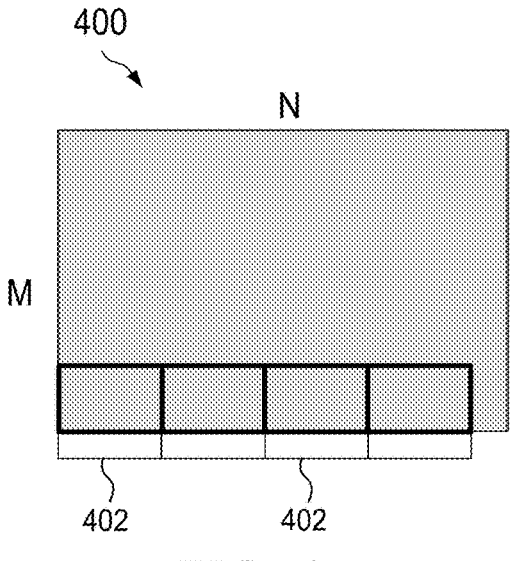
FIG. 4A is an example of coding tree blocks (CTBs) crossing the bottom picture border.
Figure 4B:
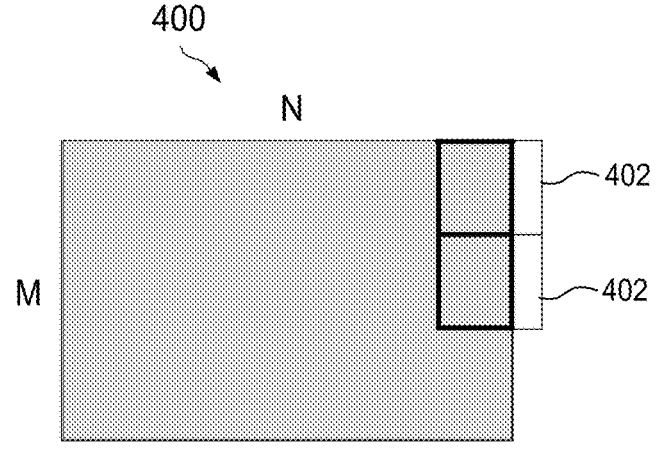
FIG. 4B is an example of CTBs crossing the right picture border.
Figure 4C:
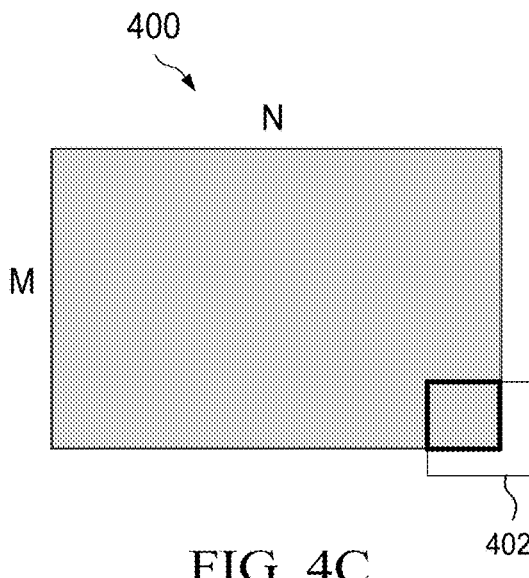
FIG. 4C is an example of CTBs crossing the right bottom picture border.

FIG. 4A is an example of CTBs crossing the bottom picture border. FIG. 4B is an example of CTBs crossing the right picture border. FIG. 4C is an example of CTBs crossing the right bottom picture border. In FIGS. 4A-4C, K=M, L<N; K<M, L=N; K<M, L<N, respectively.

CTUs in a picture 400 are discussed with reference to FIGS. 4A-4C. Suppose the CTB/largest coding unit (LCU) size indicated by M×N (typically M is equal to N, as defined in HEVC/VVC), and for a CTB located at picture (or tile or slice or other kinds of types, picture border is taken as an example) border, K×L samples are within picture border wherein either K<M or L<N. For those CTBs 402 as depicted in FIG. 4A-4C, the CTB size is still equal to M×N, however, the bottom boundary/right boundary of the CTB is outside the picture 400.

Figure 5:
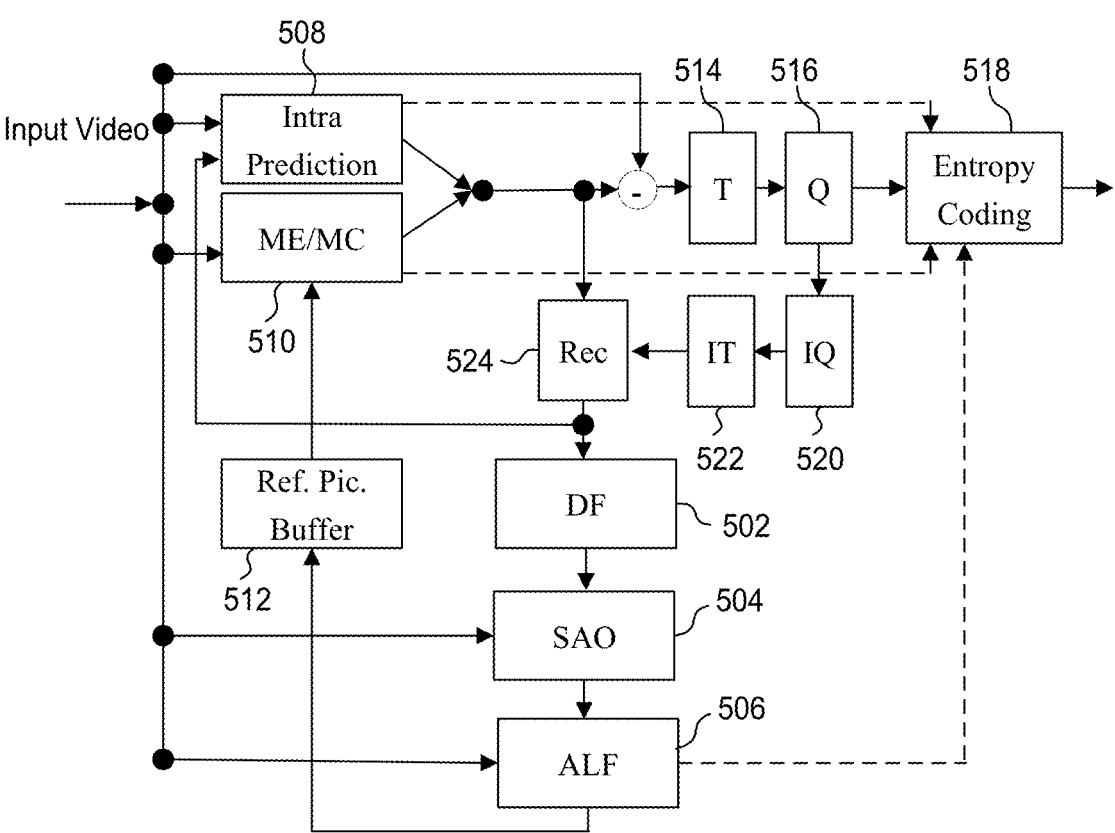
FIG. 5 is an example of encoder block diagram.

The coding flow of a typical video coder/decoder (a.k.a., codec) is discussed. FIG. 5 is an example of encoder block diagram of VVC, which contains three in-loop filtering blocks: deblocking filter (DF), sample adaptive offset (SAO) and adaptive loop filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

FIG. 5 is a schematic diagram of an encoder 500. The encoder 500 is suitable for implementing the techniques of VVC. The encoder 500 includes three in-loop filters, namely a deblocking filter (DF) 502, a sample adaptive offset (SAO) 504, and an ALF 506. Unlike the DF 502, which uses predefined filters, the SAO 504 and the ALF 506 utilize the original samples of the current picture to reduce the mean square errors between the original samples and the reconstructed samples by adding an offset and by applying a FIR filter, respectively, with coded side information signaling the offsets and filter coefficients. The ALF 506 is located at the last processing stage of each picture and can be regarded as a tool trying to catch and fix artifacts created by the previous stages.

The encoder 500 further includes an intra prediction component 508 and a motion estimation/compensation (ME/MC) component 510 configured to receive input video. The intra prediction component 508 is configured to perform intra prediction, while the ME/MC component 510 is configured to utilize reference pictures obtained from a reference picture buffer 512 to perform inter prediction. Residual blocks from inter prediction or intra prediction are fed into a transform component 514 and a quantization component 516 to generate quantized residual transform coefficients, which are fed into an entropy coding component 518. The entropy coding component 518 entropy codes the prediction results and the quantized transform coefficients and transmits the same toward a video decoder (not shown). Quantization components output from the quantization component 516 may be fed into an inverse quantization component 520, an inverse transform component 522, and a reconstruction (REC) component 524. The REC component 524 is able to output images to the DF 502, the SAO 504, and the ALF 506 for filtering prior to those images being stored in the reference picture buffer 512.

The input of the DF 502 is the reconstructed samples before in-loop filters. The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

Figure 6:
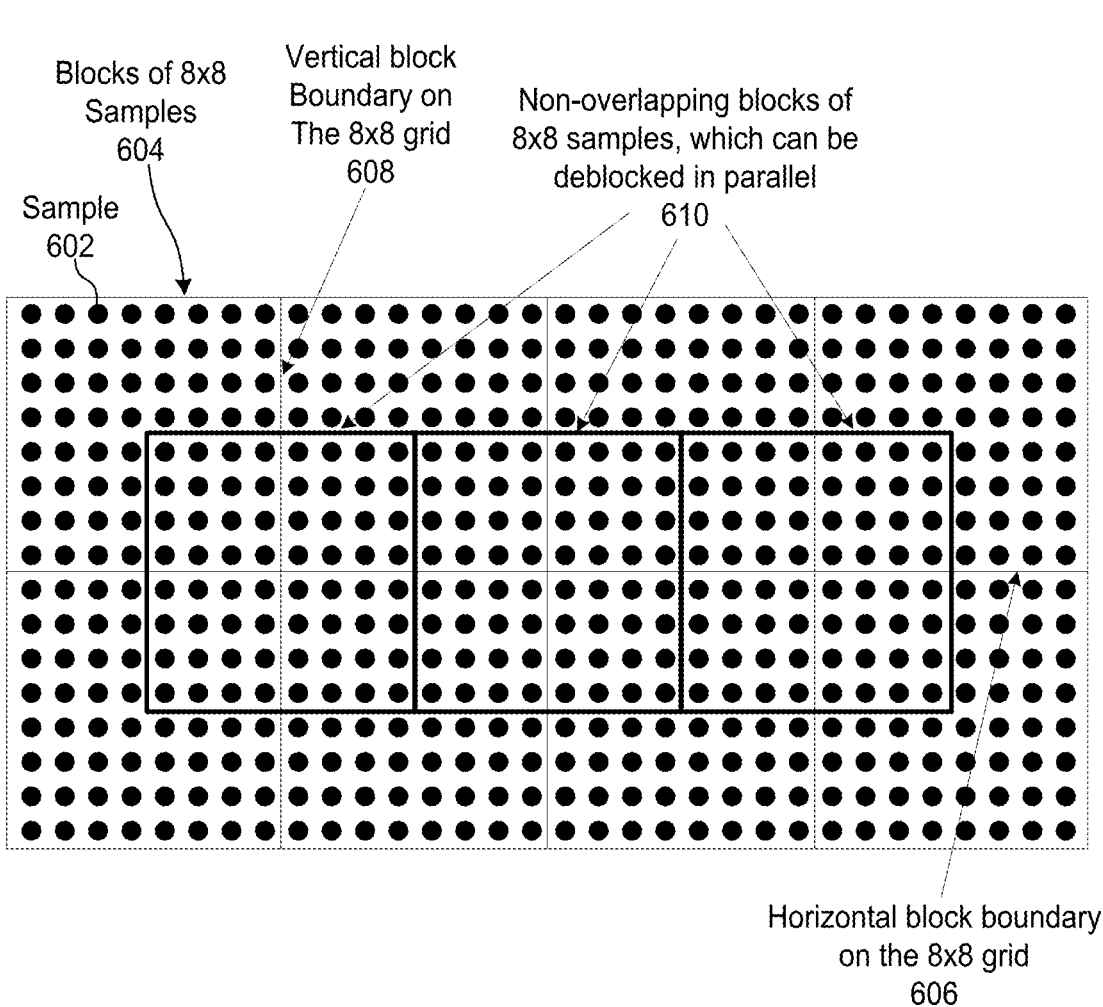
FIG. 6 is an illustration of samples within 8×8 blocks of samples.

FIG. 6 is an illustration 600 of samples 602 within 8×8 blocks of samples 604. As shown, the illustration 600 includes horizontal and vertical block boundaries on an 8×8 grid 606, 608, respectively. In addition, the illustration 600 depicts the nonoverlapping blocks of the 8×8 samples 610, which can be deblocked in parallel.

The boundary decision is discussed. Filtering is applied to 8×8 block boundaries. In addition, it must be a transform block boundary or a coding subblock boundary (e.g., due to usage of Affine motion prediction, Alternative temporal motion vector prediction (ATMVP)). For those which are not such boundaries, the filter is disabled.

The boundary strength calculation is discussed. For a transform block boundary/coding subblock boundary, if it is located in the 8×8 grid, the transform block boundary/coding subblock boundary may be filtered and the setting of bS[x-$D_i$]I[y$D_j$] (wherein [x$D_i$][y$D_j$] denotes the coordinate) for this edge is defined in Table 1 and Table 2, respectively.

TABLE 1

| | Boundary strength (when SPS IBC is disabled) | | | |
|---|---|---|---|---|
| Priority | Conditions | Y | U | V |
| 5 | At least one of the adjacent blocks is intra | 2 | 2 | 2 |
| 4 | TU boundary and at least one of the adjacent blocks has non-zero transform coefficients | 1 | 1 | 1 |
| 3 | Reference pictures or number of MVs (1 for uni-prediction, 2 for bi-prediction) of the adjacent blocks are different | 1 | N/A | N/A |
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 2

| | Boundary strength (when SPS IBC is enabled) | | | |
|---|---|---|---|---|
| Priority | Conditions | Y | U | V |
| 8 | At least one of the adjacent blocks is intra | 2 | 2 | 2 |
| 7 | TU boundary and at least one of the adjacent blocks has non-zero transform coefficients | 1 | 1 | 1 |
| 6 | Prediction mode of adjacent blocks is different (e.g., one is IBC, one is inter) | 1 | | |
| 5 | Both IBC and absolute difference between the motion vectors that belong to the adjacent blocks is greater than or equal to one integer luma sample | 1 | N/A | N/A |
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

The deblocking decision for a luma component is discussed.

Figure 7:
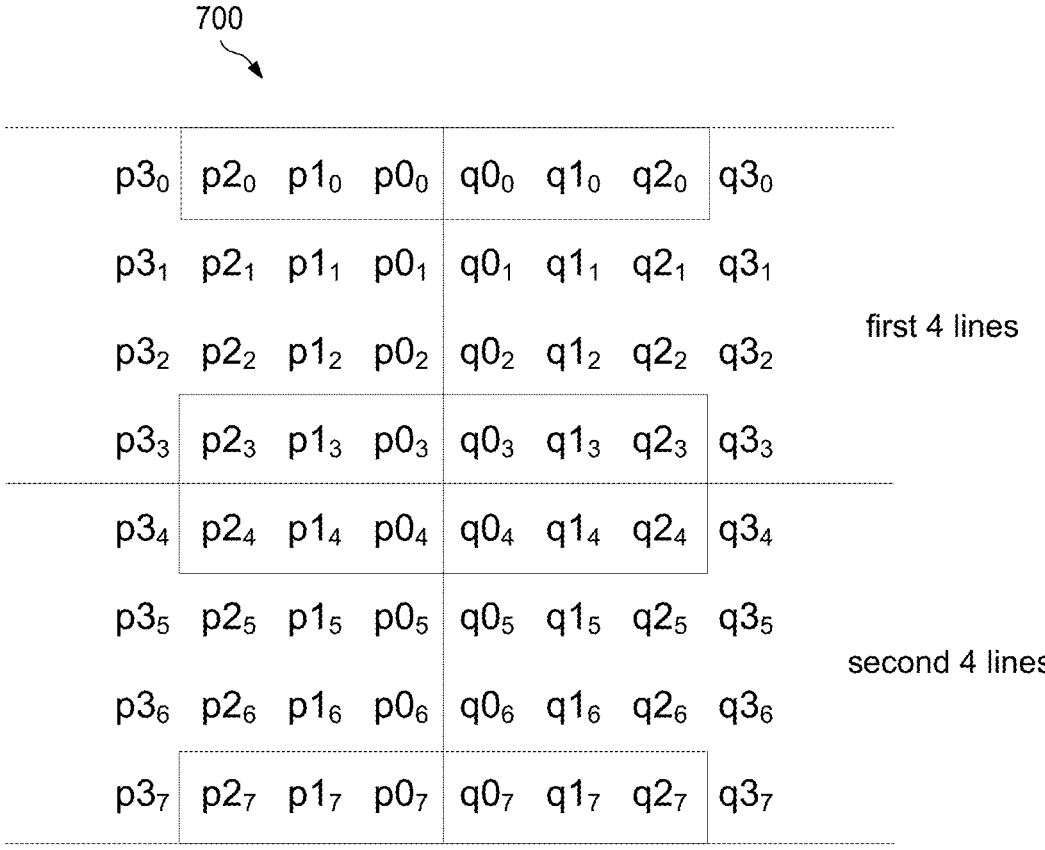
FIG. 7 is an example of pixels involved in filter on/off decision and strong/weak filter selection.

FIG. 7 is an example 700 of pixels involved in filter on/off decision and strong/weak filter selection. A wider-stronger luma filter is used only if all of the Condition 1, Condition 2, and Condition 3 are TRUE. The Condition 1 is the "large block condition." This condition detects whether the samples at P-side and Q-side belong to large blocks, which are represented by the variable bSidePisLargeBlk and bSideQisLargeBlk, respectively. The bSidePisLargeBlk and bSideQisLargeBlk are defined as follows.

--- bSidePisLargeBlk = ((edge type is vertical and po belongs to CU with width >= 32) | | (edge type is horizontal and po belongs to CU with height >= 32))?
TRUE: FALSE
bSideQisLargeBlk = ((edge type is vertical and qo belongs to CU with width >= 32) | | (edge type is horizontal and qo belongs to CU with height >= 32))?
TRUE: FALSE

---

Based on bSidePisLargeBlk and bSideQisLargeBlk, the Condition 1 is defined as follows.

Condition 1=(bSidePisLargeBlk||bSidePisLargeBlk)? TRUE: FALSE

Next, if Condition 1 is true, the Condition 2 will be further checked. First, the following variables are derived.

--- dp0, dp3, dq0, dq3 are first derived as in HEVC
if (p side is greater than or equal to 32)
    dp0=( dp0 + Abs( $p5_0$-2*$p4_0$+$p3_0$ )+1) >> 1
    dp3 =( dp3 + Abs( $p5_3$-2* $p4_3$+$p3_3$ ) + 1) >> 1
if (q side is greater than or equal to 32)
    dq0=( dq0 + Abs( $q5_0$-2* $q4_0$+ $q3_0$ ) +1) >> 1
    dq3 = ( dq3 + Abs( $q5_3$- 2* $q4_3$ + $q3_3$ ) + 1) >> 1
Condition 2 = (d < β) ? TRUE: FALSE
where d= dp0 + dq0 + dp3 + dq3.

---

If Condition 1 and Condition 2 are valid, whether any of the blocks uses sub-blocks is further checked.

---

If (bSidePisLargeBlk)
{
If (mode block P == SUBBLOCKMODE)
    Sp =5
    else
    Sp =7
}
else
    Sp = 3
If (bSideQisLargeBlk)
    {
If (mode block Q == SUBBLOCKMODE)
        Sq =5
        else
Sq =7
}
else
Sq = 3

---

Finally, if both the Condition 1 and Condition 2 are valid, the proposed deblocking method will check the condition 3 (the large block strong filter condition), which is defined as follows.

In the Condition 3 StrongFilterCondition, the following variables are derived.

--- dpq is derived as in HEVC.
$sp_3$ = Abs( $p_3$ − $p_0$ ), derived as in HEVC
if (p side is greater than or equal to 32)
    if(Sp==5)
        $sp_3$ = ( $sp_3$ + Abs( $p_5$ − $p_3$ ) + 1 ) >> 1
    else
        $sp_3$ = ( $sp_3$ + Abs( $p_7$ − $p_3$ ) + 1 ) >> 1
$sq_3$ = Abs( $q_0$ − $q_3$ ), derived as in HEVC
if (q side is greater than or equal to 32)
    If(Sq==5)
        $sq_3$ = ( $sq_3$ + Abs( $q_5$ − $q_3$ ) + 1 ) >> 1

---

-continued

--- else
    $sq_3$ = ( $sq_3$ + Abs( $q_7$ - $q_3$ ) + 1) >> 1

---

As in HEVC, StrongFilterCondition=(dpq is less than (β>>2), $sp_3$+$sq_3$ is less than (3*β>>5), and Abs($p_0$−$q_0$) is less than (5*$t_C$+1)>>1)? TRUE:FALSE.

A stronger deblocking filter for luma (designed for larger blocks) is discussed.

Bilinear filter is used when samples at either one side of a boundary belong to a large block. A sample belonging to a large block is defined as when the width>=32 for a vertical edge, and when height>=32 for a horizontal edge.

The bilinear filter is listed below.

Block boundary samples $p_i$ for i=0 to Sp-1 and $q_j$ for j=0 to Sq-1 (pi and qi are the i-th sample within a row for filtering vertical edge, or the i-th sample within a column for filtering horizontal edge) in HEVC deblocking described above) are then replaced by linear interpolation as follows.

$$p'_i = (f_i * \text{Middle}_{s,t} + (64 - f_i) * P_s + 32) \gg 6), \text{ clipped to } p_i \pm tcPD_i$$

$$q'_j = (g_j * \text{Middle}_{s,t} + (64 - g_j) * Q_s + 32) \gg 6), \text{ clipped to } q_j \pm tcPD_j$$

where $tcPD_i$ and $tcPD_j$ term is a position dependent clipping described in below and $g_j$, $f_i$, $\text{Middle}_{s,t}$, $P_s$ and $Q_s$ are given below.

A deblocking control for chroma is discussed.

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The proposed filter can be applied when the block width or height which orthogonally crosses the block edge is equal to or larger than 8 in chroma sample domain. The second and third one is basically the same as for HEVC luma deblocking decision, which are on/off decision and strong filter decision, respectively.

In the first decision, boundary strength (bS) is modified for chroma filtering and the conditions are checked sequentially. If a condition is satisfied, then the remaining conditions with lower priorities are skipped.

Chroma deblocking is performed when bS is equal to 2, or bS is equal to 1 when a large block boundary is detected.

The second and third condition is basically the same as HEVC luma strong filter decision as follows.

In the second condition: d is then derived as in HEVC luma deblocking. The second condition will be TRUE when d is less than 3.

In the third condition StrongFilterCondition is derived as follows.

dpq is derived as in HEVC $$sp_3 = \text{Abs}(p_3 - p_0), \text{ derived as in } HEVC$$

$$sq_3 = \text{Abs}(q_0 - q_3), \text{ derived as in } HEVC$$

As in HEVC design, StrongFilterCondition=(dpq is less than (β>>2), $sp_3$+$sq_3$ is less than (β>>3), and Abs($p_0$−$q_0$) is less than (5*$t_C$+1)>>1).

A strong deblocking filter for chroma is discussed. The following strong deblocking filter for chroma is defined.

$$p'_2 = (3 * p_3 + 2 * p_2 + p_1 + p_0 + q_0 + 4) \gg 3$$

$$p'_1 = (2 * p_3 + p_2 + 2 * p_1 + p_0 + q_0 + q_1 + 4) \gg 3$$

$$p'_0 = (p_3 + p_2 + p_1 + 2 * p_0 + q_0 + q_1 + q_2 + 4) \gg 3$$

The proposed chroma filter performs deblocking on a 4×4 chroma sample grid.

Position dependent clipping (tcPD) is discussed. The position dependent clipping tcPD is applied to the output samples of the luma filtering process involving strong and long filters that are modifying 7, 5, and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with asymmetrical filter, depending on the result of decision-making process in the boundary strength calculation, position dependent threshold table is selected from two tables (i.e., Tc7 and Tc3 tabulated below) that are provided to decoder as a side information.

$$Tc7 = \{6, 5, 4, 3, 2, 1, 1\}; Tc3 = \{6, 4, 2\};$$

$$tcPD = (Sp == 3)?Tc3: Tc7;$$

$$tcPD = (Sq == 3)?Tc3: Tc7;$$

For the P or Q boundaries being filtered with a short symmetrical filter, position dependent threshold of lower magnitude is applied.

$$Tc3 = \{3, 2, 1\};$$

Following defining the threshold, filtered $p'_i$ and $q'_i$ sample values are clipped according to tcP and tcQ clipping values.

$$p''_i = Clip3(p'_i + tcP_i, p'_i - tcP_i, p'_i);$$

$$q''_j = Clip3(q'_j + tcQ_j, q'_j - tcQ_j, q'_j);$$

where $p'_i$ and $q'_i$ are filtered sample values, $p''_i$ and $q''_j$ are output sample value after the clipping, and $tcP_i$ are clipping thresholds that are derived from the VVC tc parameter and tcPD and tcQD. The function Clip3 is a clipping function as it is specified in VVC.

Sub-block deblocking adjustment is now discussed. To enable parallel friendly deblocking using both long filters and sub-block deblocking the long filters is restricted to modify at most 5 samples on a side that uses sub-block deblocking (AFFINE or ATMVP or decoder side motion vector refinement (DMVR)) as shown in the luma control for long filters. Additionally, the sub-block deblocking is adjusted such that that sub-block boundaries on an 8×8 grid that are close to a coding unit (CU) or an implicit TU boundary is restricted to modify at most two samples on each side.

The following applies to sub-block boundaries that not are aligned with the CU boundary.

```
If (mode block Q == SUBBLOCKMODE && edge !=0) {
    if (!(implicitTU && (edge == (64 / 4))))
        if (edge == 2 || edge == (orthogonalLength − 2) ||
        edge == (56 / 4) || edge == (72 / 4))
            Sp = Sq = 2;
        else
            Sp = Sq = 3;
    else
        Sp = Sq = bSideQisLargeBlk ? 5:3
}
```

Where edge equal to 0 corresponds to CU boundary, edge equal to 2 or equal to orthogonalLength-2 corresponds to sub-block boundary 8 samples from a CU boundary, etc. Where implicit TU is true if implicit split of TU is used.

Sample adaptive offset (SAO) is discussed. The input of SAO is the reconstructed samples after deblocking (DB). The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC and VVC, the region (the unit for SAO parameters signaling) is defined to be a CTU.

Two SAO types that can satisfy the requirements of low complexity are adopted in HEVC. Those two types are edge offset (EO) and band offset (BO), which are discussed in further detail below. An index of an SAO type is coded (which is in the range of [0, 2]). For EO, the sample classification is based on comparison between current samples and neighboring samples according to 1-D directional patterns: horizontal, vertical, 1350 diagonal, and 450 diagonal.

Figure 8:
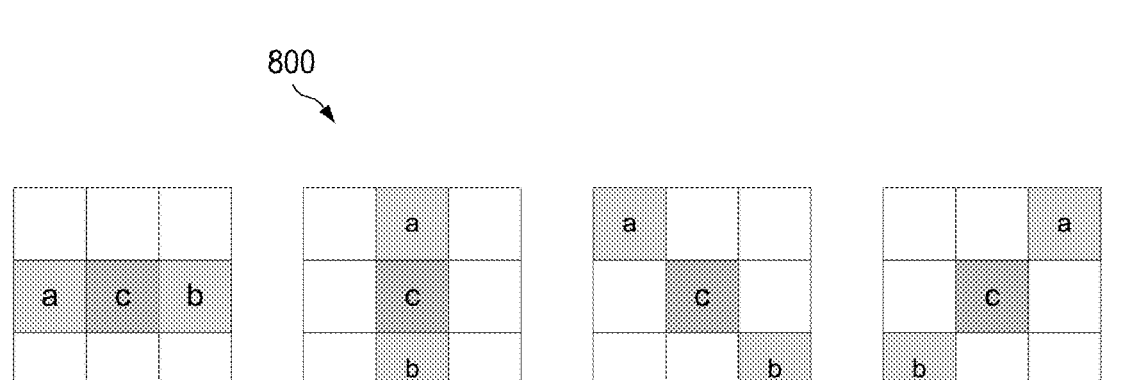
FIG. 8 shows four one dimensional (1-D) directional patterns for EO sample classification.

FIG. 8 shows four one dimensional (1-D) directional patterns 800 for EO sample classification: horizontal (EO class=0), vertical (EO class=1), 135° diagonal (EO class=2), and 450 diagonal (EO class=3).

For a given EO class, each sample inside the CTB is classified into one of five categories. The current sample value, labeled as "c," is compared with its two neighbors along the selected 1-D pattern. The classification rules for each sample are summarized in Table 3. Categories 1 and 4 are associated with a local valley and a local peak along the selected 1-D pattern, respectively. Categories 2 and 3 are associated with concave and convex corners along the selected 1-D pattern, respectively. If the current sample does not belong to EO categories 1-4, then it is category 0 and SAO is not applied.

TABLE 3

| Sample Classification Rules for Edge Offset | |
|---|---|
| Category | Condition |
| 1 | $c < a$ and $c < b$ |
| 2 | $(c < a \text{ \&\& } c == b) \|\| (c == a \text{ \&\& } c < b)$ |
| 3 | $(c > a \text{ \&\& } c == b) \|\| (c == a \text{ \&\& } c > b)$ |
| 4 | $c > a \text{ \&\& } c > b$ |
| 5 | None of above |

Geometry transformation-based adaptive loop filter in Joint Exploration Model (JEM) is discussed. The input of DB is the reconstructed samples after DB and SAO. The sample classification and filtering process are based on the reconstructed samples after DB and SAO.

In the JEM, a geometry transformation-based adaptive loop filter (GALF) with block-based filter adaption is applied. For the luma component, one among twenty-five filters is selected for each 2×2 block, based on the direction and activity of local gradients.

Figure 9:
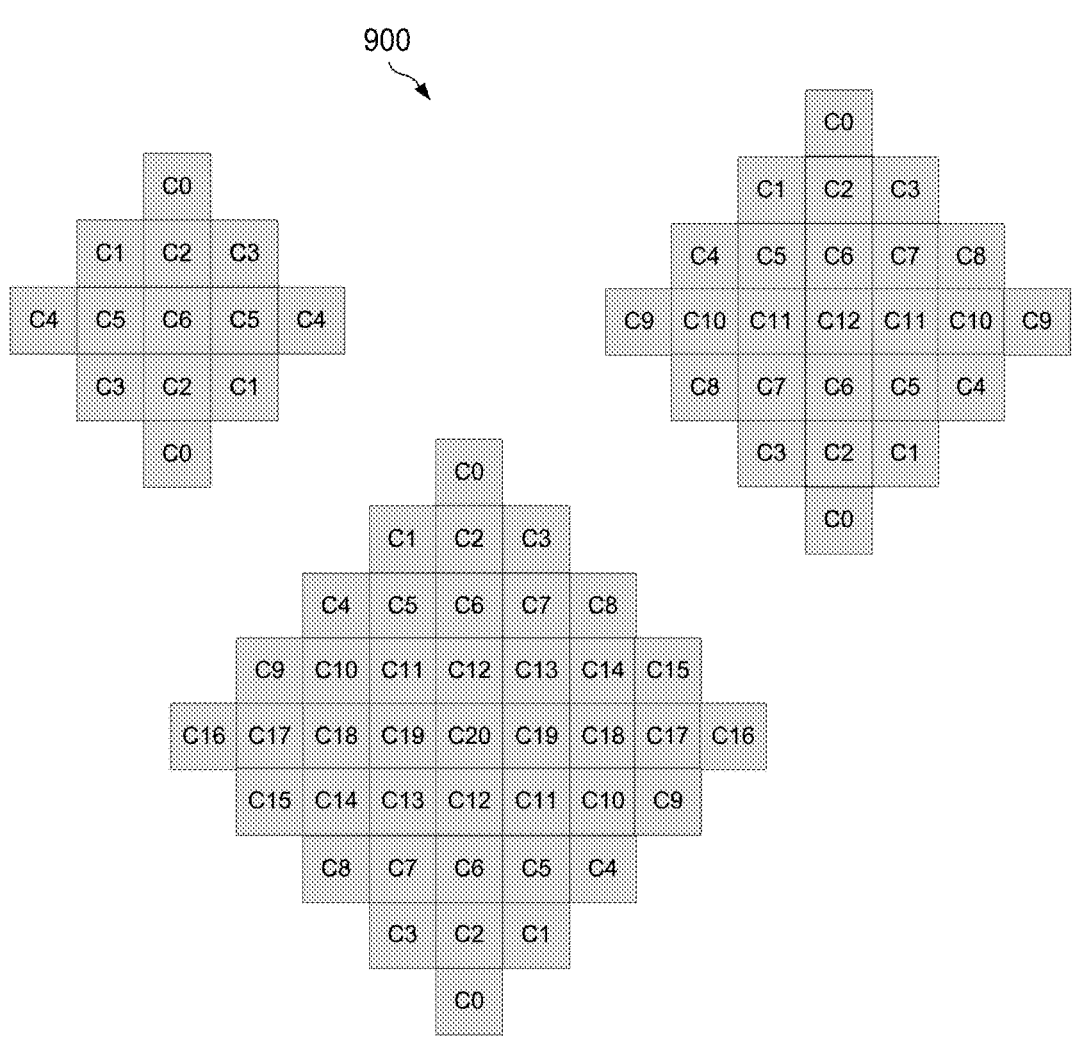
FIG. 9 shows examples of geometry transformation-based adaptive loop filter (GALF) filter shapes.

The filter shape is discussed. FIG. 9 shows examples of GALF filter shapes 900, including on the left a 5×5 diamond, in the middle a 7×7 diamond, and one the right a 9×9 diamond. In the JEM, up to three diamond filter shapes (as shown in FIG. 9) can be selected for the luma component. An index is signaled at the picture level to indicate the filter shape used for the luma component. Each square represents a sample, and Ci (i being 0~6 (left), 0~12 (middle), 0~20 (right)) denotes the coefficient to be applied to the sample. For chroma components in a picture, the 5×5 diamond shape is always used.

Block classification is discussed. Each 2×2 block is categorized into one out of twenty-five classes. The classification index C is derived based on its directionality D and a quantized value of activity A, as follows.

$$C = 5D + \hat{A}. \tag{1}$$

To calculate D and A, gradients of the horizontal, vertical and two diagonal direction are first calculated using 1-D Laplacian.

$$g_v = \sum_{k=i-2}^{i+3} \sum_{l=j-2}^{j+3} V_{k,l}, \; V_{k,l} = |2R(k, l) - R(k, l-1) - R(k, l+1)|, \tag{2}$$

$$g_h = \sum_{k=i-2}^{i+3} \sum_{l=j-2}^{j+3} H_{k,l}, \; H_{k,l} = |2R(k, l) - R(k-1, l) - R(k+1, l)|, \tag{3}$$

$$g_{d1} = \sum_{k=i-2}^{i+3} \sum_{l=j-3}^{j+3} D1_{k,l}, \tag{4}$$

$$D1_{k,l} = |2R(k, l) - R(k-1, l-1) - R(k+1, l+1)| \tag{}$$

$$g_{d2} = \sum_{k=i-2}^{i+3} \sum_{j=j-2}^{j+3} D2_{k,l}, \tag{5}$$

$$D2_{k,l} = |2R(k, l) - R(k-1, l+1) - R(k+1, l-1)| \tag{}$$

Indices i and j refer to the coordinates of the upper left sample in the 2×2 block and R(i, j) indicates a reconstructed sample at coordinate (i, j).

Then D maximum and minimum values of the gradients of horizontal and vertical directions are set as:

$$g_{h,v}^{max} = \max(g_h, g_v), \; g_{h,v}^{min} = \min(g_h, g_v), \tag{6}$$

and the maximum and minimum values of the gradient of two diagonal directions are set as:

$$g_{d0,d1}^{max} = \max(g_{d0}, g_{d1}), \; g_{d0,d1}^{min} = \min(g_{d0}, g_{d1}), \tag{7}$$

To derive the value of the directionality D, these values are compared against each other and with two thresholds $t_1$ and $t_2$:

Step 1. If both $$g_{h,v}^{max} \le t_1 \cdot g_{h,v}^{min}$$

and $$g_{d0,d1}^{max} \le t_1 \cdot g_{d0,d1}^{min}$$

are true, D is set to 0.
Step 2. If $$g_{h,v}^{max} / g_{h,v}^{min} > g_{d0,d1}^{max} / g_{d0,d1}^{min},$$

continue from Step 3; otherwise continue from Step 4.
Step 3. If $$g_{h,v}^{max} > t_2 \cdot g_{h,v}^{min},$$

otherwise D is set to 1.
Step 4. If $$g_{d0,d1}^{max} > t_2 \cdot g_{d0,d1}^{min},$$

D is set to 4; otherwise D is set to 3.
The activity value A is calculated as:

$$A = \sum_{k=i-2}^{i+3} \sum_{l=j-2}^{j+3} (V_{k,l} + H_{k,l}). \tag{8}$$

A is further quantized to the range of 0 to 4, inclusively, and the quantized value is denoted as Â.

For both chroma components in a picture, no classification method is applied, i.e., a single set of ALF coefficients is applied for each chroma component.

Geometric transformation of filter coefficients is discussed.

Figure 10:
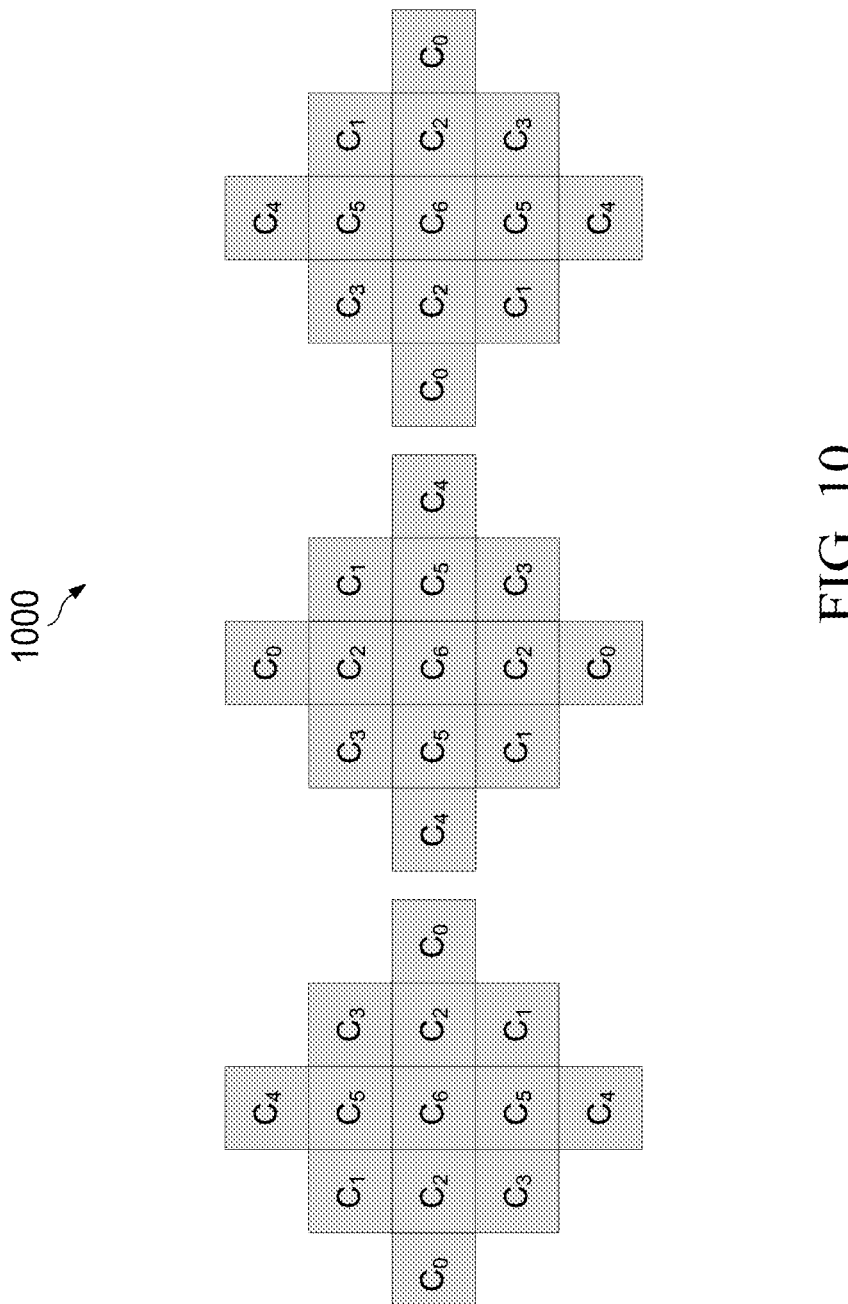
FIG. 10 shows an example of relative coordinates used for the 5×5 diamond filter support.

FIG. 10 shows relative coordinates 1000 for the 5×5 diamond filter support—diagonal, vertical flip, and rotation, respectively (from left to right).

Before filtering each 2×2 block, geometric transformations such as rotation or diagonal and vertical flipping are applied to the filter coefficients f(k, l), which is associated with the coordinate (k, l), depending on gradient values calculated for that block. This is equivalent to applying these transformations to the samples in the filter support region. The idea is to make different blocks to which ALF is applied more similar by aligning their directionality.

Three geometric transformations, including diagonal, vertical flip, and rotation are introduced:

$$\text{Diagonal: } f_D(k, l) = f(l, k), \tag{9}$$

$$\text{Vertical flip: } f_V(k, l) = f(k, K-l-1),$$

$$\text{Rotation: } f_R(k, l) = f(K-l-1, k).$$

where K is the size of the filter and $0 \leq k$, $1 \leq K-1$ are coefficients coordinates, such that location (0,0) is at the upper left corner and location (K−1, K−1) is at the lower right corner. The transformations are applied to the filter coefficients f(k, l) depending on gradient values calculated for that block. The relationship between the transformation and the four gradients of the four directions are summarized in Table 4.

TABLE 1

Mapping of the gradient calculated for one block and the transformations

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Filter parameters signaling is discussed. In the JEM, GALF filter parameters are signalled for the first CTU, i.e., after the slice header and before the SAO parameters of the first CTU. Up to 25 sets of luma filter coefficients could be signalled. To reduce bits overhead, filter coefficients of different classification can be merged. Also, the GALF coefficients of reference pictures are stored and allowed to be reused as GALF coefficients of a current picture. The current picture may choose to use GALF coefficients stored for the reference pictures and bypass the GALF coefficients signalling. In this case, only an index to one of the reference pictures is signalled, and the stored GALF coefficients of the indicated reference picture are inherited for the current picture.

To support GALF temporal prediction, a candidate list of GALF filter sets is maintained. At the beginning of decoding a new sequence, the candidate list is empty. After decoding one picture, the corresponding set of filters may be added to the candidate list. Once the size of the candidate list reaches the maximum allowed value (i.e., 6 in current JEM), a new set of filters overwrites the oldest set in decoding order, and that is, first-in-first-out (FIFO) rule is applied to update the candidate list. To avoid duplications, a set could only be added to the list when the corresponding picture does not use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and the k-th array only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter coded frames to minimize signalling overhead. For intra frames, temporal prediction is not available, and a set of 16 fixed filters is assigned to each class. To indicate the usage of the fixed filter, a flag for each class is signalled and if required, the index of the chosen fixed filter. Even when the fixed filter is selected for a given class, the coefficients of the adaptive filter f(k, l) can still be sent for this class in which case the coefficients of the filter which will be applied to the reconstructed image are sum of both sets of coefficients.

The filtering process of luma component can be controlled at the CU level. A flag is signalled to indicate whether GALF is applied to the luma component of a CU. For chroma component, whether GALF is applied or not is indicated at picture level only.

The filtering process is discussed. At the decoder side, when GALF is enabled for a block, each sample R(i, j) within the block is filtered, resulting in sample value R'(i, j) as shown below, where L denotes filter length, $f_{m,n}$ represents filter coefficient, and f(k, l) denotes the decoded filter coefficients.

$$R'(i, j) = \sum_{k=-L/2}^{L/2} \sum_{l=-L/2}^{L/2} f(k, l) \times R(i + k, j + l) \tag{1}$$

Figure 11:
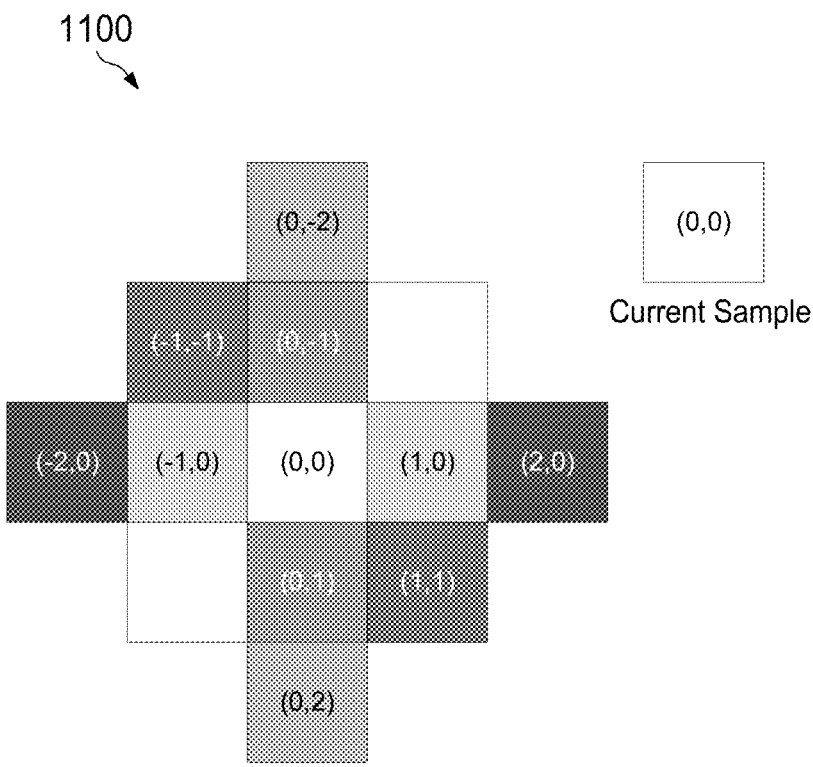
FIG. 11 shows another example of relative coordinates used for the 5×5 diamond filter support.

FIG. 11 shows an example of relative coordinates used for 5×5 diamond filter support supposing the current sample's coordinate (i, j) to be (0, 0). Samples in different coordinates filled with the same color are multiplied with the same filter coefficients.

Geometry transformation-based adaptive loop filter (GALF) in VVC is discussed. In VVC test model 4.0 (VTM4.0), the filtering process of the Adaptive Loop Filter, is performed as follows:

$$O(x, y) = \Sigma_{(i,j)} w(i, j) \cdot I(x + i, y + j), \tag{11}$$

where samples I(x+i, y+j) are input samples, O(x, y) is the filtered output sample (i.e., filter result), and w(i, j) denotes the filter coefficients. In practice, in VTM4.0 it is implemented using integer arithmetic for fixed point precision computations $$O(x, y) = \left( \sum_{i=-\frac{L}{2}}^{\frac{L}{2}} \sum_{j=-\frac{L}{2}}^{\frac{L}{2}} w(i, j) \cdot I(x + i, y + j) + 64 \right) >> 7, \tag{12}$$

where L denotes the filter length, and where w(i, j) are the filter coefficients in fixed point precision.

The current design of GALF in VVC has the following major changes compared to that in JEM:
1) The adaptive filter shape is removed. Only 7×7 filter shape is allowed for luma component and 5×5 filter shape is allowed for chroma component.
2) Signaling of ALF parameters in removed from slice/picture level to CTU level.
3) Calculation of class index is performed in 4×4 level instead of 2×2. In addition, as proposed in JVET-L0147, sub-sampled Laplacian calculation method for ALF classification is utilized. More specifically, there is no need to calculate the horizontal/vertical/45 diagonal/135 degree gradients for each sample within one block. Instead, 1:2 subsampling is utilized.

Non-linear ALF in the current VVC is discussed with regard to filtering reformulation.

Equation (11) can be reformulated, without coding efficiency impact, in the following expression:

$$O(x, y) = I(x, y) + \sum_{(i,j) \neq (0,0)} w(i, j) \cdot (I(x + i, y + j) - I(x, y)), \tag{2}$$

where w(i, j) are the same filter coefficients as in equation (11) [excepted w(0, 0) which is equal to 1 in equation (13) while it is equal to $1-\Sigma_{(i,j)\neq(0,0)}$w(i, j) in equation (11)].

Using the above filter formula of (13), VVC introduces the non-linearity to make ALF more efficient by using a simple clipping function to reduce the impact of neighbor sample values (l(x+i, y+j)) when they are too different with the current sample value (l(x, y)) being filtered.

More specifically, the ALF filter is modified as follows:

$$O'(x, y) = l(x, y) + \sum_{(i,j)\neq(0,0)} w(i, j) \cdot K(I(x + i, y + j) - l(x, y), k(i, j)), \quad (14)$$

where K(d, b)=min(b, max(−b, d)) is the clipping function, and k(i, j) are clipping parameters, which depends on the (i, j) filter coefficient. The encoder performs the optimization to find the best k(i, j).

In the JVET-N0242 implementation, the clipping parameters k(i, j) are specified for each ALF filter, one clipping value is signaled per filter coefficient. It means that up to 12 clipping values can be signalled in the bitstream per Luma filter and up to 6 clipping values for the Chroma filter.

In order to limit the signaling cost and the encoder complexity, only 4 fixed values which are the same for INTER and INTRA slices are used.

Because the variance of the local differences is often higher for Luma than for Chroma, two different sets for the Luma and Chroma filters are applied. The maximum sample value (here 1024 for 10 bits bit-depth) in each set is also introduced, so that clipping can be disabled if it is not necessary.

The sets of clipping values used in the JVET-N0242 tests are provided in the Table 5. The 4 values have been selected by roughly equally splitting, in the logarithmic domain, the full range of the sample values (coded on 10 bits) for Luma, and the range from 4 to 1024 for Chroma.

More precisely, the Luma table of clipping values have been obtained by the following formula:

$$AlfClip_L = \left\{ round\left( (M)^{\frac{1}{N}} \right)^{N-n+1} \right) \text{ for } n \in 1 \ldots N \right\}, \quad (15)$$

$$\text{with } M = 2^{10} \text{ and } N = 4.$$

Similarly, the Chroma tables of clipping values is obtained according to the following formula:

$$AlfClip_C = \left\{ round\left( A \cdot \left( \left( \frac{M}{A} \right)^{\frac{1}{N-1}} \right)^{N-n} \right) \text{ for } n \in 1 \ldots N \right\}, \quad (16)$$

$$\text{with } M = 2^{10}, N = 4 \text{ and } A = 4.$$

TABLE 5

| Authorized clipping values | |
|---|---|
| | INTRA/INTER tile group |
| LUMA | {1024, 181, 32, 6} |
| CHROMA | {1024, 161, 25, 4} |

The selected clipping values are coded in the "alf_data" syntax element by using a Golomb encoding scheme corresponding to the index of the clipping value in the above Table 5. This encoding scheme is the same as the encoding scheme for the filter index.

Convolutional Neural network-based loop filters for video coding are discussed.

In deep learning, a convolutional neural network (CNN, or ConvNet) is a class of deep neural networks, most commonly applied to analyzing visual imagery. They have very successful applications in image and video recognition/processing, recommender systems, image classification, medical image analysis, natural language processing.

CNNs are regularized versions of multilayer perceptrons. Multilayer perceptrons usually mean fully connected networks, that is, each neuron in one layer is connected to all neurons in the next layer. The "fully-connectedness" of these networks makes them prone to overfitting data. Typical ways of regularization include adding some form of magnitude measurement of weights to the loss function. CNNs take a different approach towards regularization: they take advantage of the hierarchical pattern in data and assemble more complex patterns using smaller and simpler patterns. Therefore, on the scale of connectedness and complexity, CNNs are on the lower extreme.

CNNs use relatively little pre-processing compared to other image classification/processing algorithms. This means that the network learns the filters that in traditional algorithms were hand-engineered. This independence from prior knowledge and human effort in feature design is a major advantage.

Deep learning-based image/video compression typically has two implications: end-to-end compression purely based on neural networks, and traditional frameworks enhanced by neural networks. End-to-end compression purely based on neural networks are discussed in Johannes Balle, Valero Laparra, and Eero P. Simoncelli, "End-to-end optimization of nonlinear transform codes for perceptual quality," In: 2016 Picture Coding Symposium (PCS), pp. 1-5, Institute of Electrical and Electronics Engineers (IEEE) and Lucas Theis, Wenzhe Shi, Andrew Cunningham, and Ferenc Huszir, "Lossy image compression with compressive auto-encoders," arXiv preprint arXiv: 1703.00395 (2017). Traditional frameworks enhanced by neural networks are discussed in Jiahao Li, Bin Li, Jizheng Xu, Ruiqin Xiong, and Wen Gao, "Fully Connected Network-Based Intra Prediction for Image Coding," IEEE Transactions on Image Processing 27, 7 (2018), 3236-3247, Yuanying Dai, Dong Liu, and Feng Wu, "A convolutional neural network approach for post-processing in HEVC intra coding," MMM. Springer, 28-39, Rui Song, Dong Liu, Houqiang Li, and Feng Wu, "Neural network-based arithmetic coding of intra prediction modes in HEVC," VCIP. IEEE, 1-4, and J. Pfaff, P. Helle, D. Maniry, S. Kaltenstadler, W. Samek, H. Schwarz, D. Marpe, and T. Wiegand, "Neural network based intra prediction for video coding," Applications of Digital Image Processing XLI, Vol. 10752. International Society for Optics and Photonics, 1075213.

The first type usually takes an auto-encoder like structure, either achieved by convolutional neural networks or recurrent neural networks. While purely relying on neural networks for image/video compression can avoid any manual optimizations or hand-crafted designs, compression efficiency may be not satisfactory. Therefore, works distributed in the second type take neural networks as an auxiliary, and enhance traditional compression frameworks by replacing or enhancing some modules. In this way, they can inherit the merits of the highly optimized traditional frameworks. For example, a fully connected network for the intra prediction is proposed in HEVC as discussed in Jiahao Li, Bin Li, Jizheng Xu, Ruiqin Xiong, and Wen Gao, "Fully Connected Network-Based Intra Prediction for Image Coding," IEEE Transactions on Image Processing 27, 7 (2018), p. 3236-3247.

In addition to intra prediction, deep learning is also exploited to enhance other modules. For example, the in-loop filters of HEVC are replaced with a convolutional neural network and achieve promising results in Yuanying Dai, Dong Liu, and Feng Wu, "A convolutional neural network approach for post-processing in HEVC intra coding," MMM. Springer, 28-39. The work in Rui Song, Dong Liu, Houqiang Li, and Feng Wu, "Neural network-based arithmetic coding of intra prediction modes in HEVC," VCIP. IEEE, 1-4 applies neural networks to improve the arithmetic coding engine.

Convolutional neural network based in-loop filtering is discussed. In lossy image/video compression, the reconstructed frame is an approximation of the original frame, since the quantization process is not invertible and thus incurs distortion to the reconstructed frame. To alleviate such distortion, a convolutional neural network could be trained to learn the mapping from the distorted frame to the original frame. In practice, training must be performed prior to deploying the CNN-based in-loop filtering.

Training is discussed. The purpose of the training processing is to find the optimal value of parameters including weights and bias.

First, a codec (e.g., HM, JEM, VTM, etc.) is used to compress the training dataset to generate the distorted reconstruction frames. Then, the reconstructed frames are fed into the CNN and the cost is calculated using the output of CNN and the groundtruth frames (original frames). Commonly used cost functions include Sum of Absolution Difference (SAD) and Mean Square Error (MSE). Next, the gradient of the cost with respect to each parameter is derived through the back propagation algorithm. With the gradients, the values of the parameters can be updated. The above process repeats until the convergence criteria is met. After completing the training, the derived optimal parameters are saved for use in the inference stage.

The convolutional process is discussed. During convolution, the filter is moved across the image from left to right, top to bottom, with a one-pixel column change on the horizontal movements, then a one-pixel row change on the vertical movements. The amount of movement between applications of the filter to the input image is referred to as the stride, and it is almost always symmetrical in height and width dimensions. The default stride or strides in two dimensions is (1,1) for the height and the width movement.

Figure 12A:
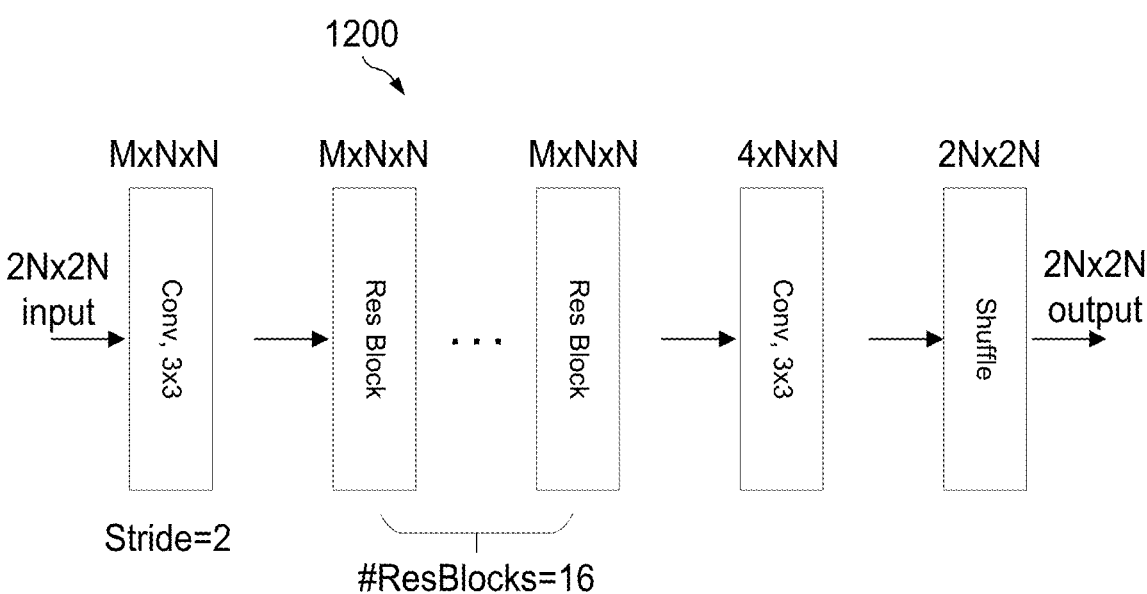
FIG. 12A is an example architecture of the proposed CNN filter.
Figure 12B:
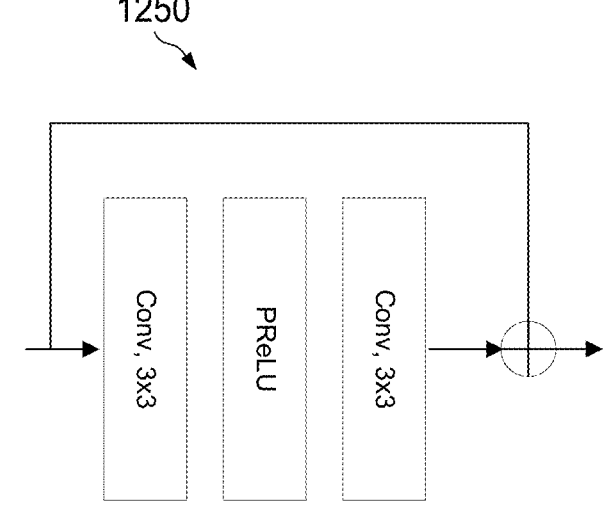
FIG. 12B is an example of construction of residual block (ResBlock).

FIG. 12A is an example architecture 1200 of the proposed CNN filter, and FIG. 12B is an example of construction 1250 of residual block (ResBlock). In most of deep convolutional neural networks, residual blocks are utilized as the basic module and stacked several times to construct the final network wherein in one example, the residual block is obtained by combining a convolutional layer, a ReLU/PReLU activation function and a convolutional layer as shown in FIG. 12B.

Inference is discussed. During the inference stage, the distorted reconstruction frames are fed into CNN and processed by the CNN model whose parameters are already determined in the training stage. The input samples to the CNN can be reconstructed samples before or after DB, or reconstructed samples before or after SAO, or reconstructed samples before or after ALF.

The current CNN-based loop filtering has the following problems. First, an individual CNN model is trained for each quality level (e.g., a quantization parameter (QP), a constant rate factor (CRF), or a bitrate), which results in a large number of CNN models. Second, when QP is taken as the input of neural networks, it is first tiled into a two-dimensional array with the same size as the block to be filtered, and then treated as an additional input plane. Accordingly, the QP information may not be fully exploited. Third, when constructing a candidate list containing multiple models for a coding block, the characteristics of the coding block have not been fully explored.

Disclosed herein are embodiments that solve one or more of the foregoing problems. For example, the present disclosure provides one or more neural network (NN) filter models trained as part of an in-loop filtering technology or filtering technology used in a post-processing stage for reducing the distortion incurred during compression. In addition, samples with different characteristics may be processed by different NN filter models.

The present disclosure also elaborates how to design a unified NN filter model by feeding at least one indicator, which may be related to quality level (e.g., QP, CRF, or bitrate) and thus is a quality-level indicator (QI), as an input to the NN filter, and how to construct a candidate list containing multiple models for a coding block by taking the coding statistics of the block into account. Other examples of this description are directed to combining NN filter models with non-deep learning-based filtering (NDLF) methods Further, examples of this description are directed to controlling the presence of (e.g., application of) NN filter models through syntax elements at various levels. For example, the syntax element(s) that indicate whether to apply a NN filter may be at a first level (e.g., in a sequence parameter set (SPS) and/or a sequence header of a video unit). Syntax element(s) that indicate whether to apply a NN filter may also be at a second level (e.g., a picture header, a picture parameter set (PPS), and/or a slice header of the video unit). Still further, syntax element(s) that indicate whether to apply a NN filter may be at a third level (e.g., the syntax element is indicated for a patch of the video unit, a CTU of the video unit, a CTB of the video unit, a block of the video unit, a subpicture of the video unit, a tile of the video unit, or a region of the video unit.

It should be noted that the concept of a unified NN filter model by feeding the QI as an input to the NN filter process could be also extended to other NN-based coding tools, such as NN-based super-resolution or motion compensation design. In the examples below, NN-based filtering technology is used as an example.

The listing of embodiments below should be considered as examples to explain general concepts. These embodiments should not be interpreted in a narrow way. Furthermore, these embodiments can be combined in any manner.

In the disclosure, a NN filter can be any kind of NN filter, such as a convolutional neural network (CNN) filter. In the following discussion, an NN filter may also be referred to as a CNN filter.

In the following discussion, a video unit may be a sequence, a picture, a slice, a tile, a brick, a subpicture, a CTU/CTB, a CTU/CTB row, one or multiple CUs/coding blocks (CBs), one or multiple CTUs/CTBs, one or multiple Virtual Pipeline Data Unit (VPDU), a sub-region within a picture/slice/tile/brick. A father video unit represents a unit larger than the video unit. Typically, a father unit will contain several video units, for example, when the video unit is CTU, the father unit could be slice, CTU row, multiple CTUs, etc. In some embodiments, the video unit may be a sample/pixel.

Figure 13:
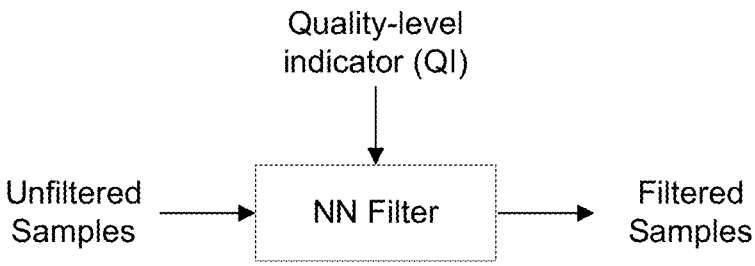
FIG. 13 is an example of a process for generating filtered samples based on a neural network filter model that receives a quality-level indicator as an input in accordance with various examples.

FIG. 13 is an example of a process for generating filtered samples based on a NN filter model that receives a quality-level indicator (QI) as an input. In the process 1300 shown in FIG. 13, at least some unfiltered samples are provided as input into an NN filter. In an example, an unfiltered sample is a sample (e.g., a pixel) of a video unit that has not been subjected to any filtering yet, or has not been subjected to a sufficient amount of filtering yet. The output of the NN filter may thus be a filtered sample. The output of the NN filter is also based on an NN filter model generated using a quality-level indicator (QI) input. The QI input may be related to a quality level of the video unit, such as a QP, CRF, or bitrate.

Figure 14:
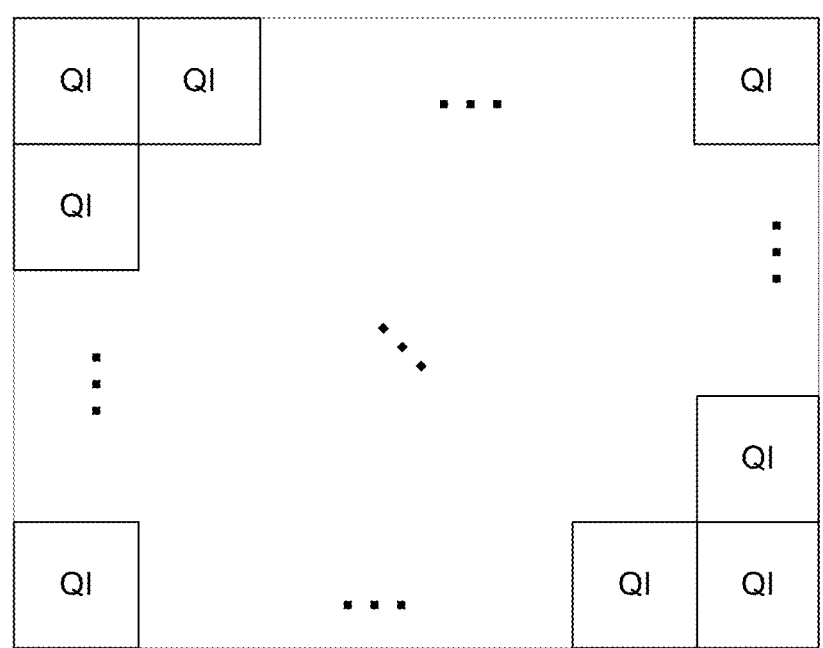
FIG. 14 is an example of a quality-level indicator being spanned or tiled into a two-dimensional array in accordance with various examples.

FIG. 14 is an example of a process 1400 of a quality-level indicator being spanned or tiled into a two-dimensional array in accordance with some examples. For example, in the process 1400, the two-dimensional array may have a same size (e.g., in each of two dimensions) as the video unit to be filtered, and is an additional input plane to the NN filter.

Figure 15:
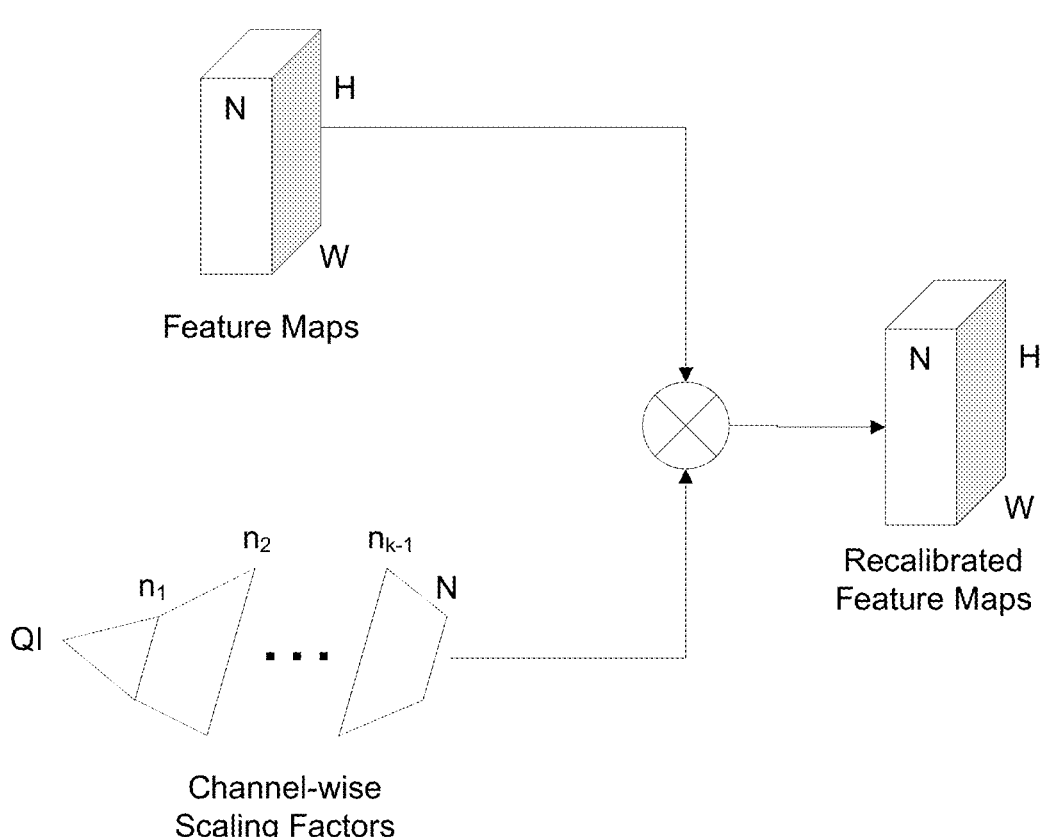
FIG. 15 is an example of a quality-level indicator being fed into a plurality of full-connected layers (e.g., of a NN filter) to be expanded into a one-dimensional vector in accordance with various examples.

FIG. 15 is an example of a process 1500 of a quality-level indicator (QI) being fed into a plurality of full-connected layers (e.g., of a NN filter) to be expanded into a one-dimensional vector. In the process 1500, elements of the resulting one-dimensional vector may serve as channel-wise scaling factors. In the process 1500, the channel-wise scaling factors are useful to recalibrate feature maps of NN filter models (e.g., where N represents channel numbers, W represents width, and H represents height), and thus provide recalibrated feature maps in some examples.

Figure 16:
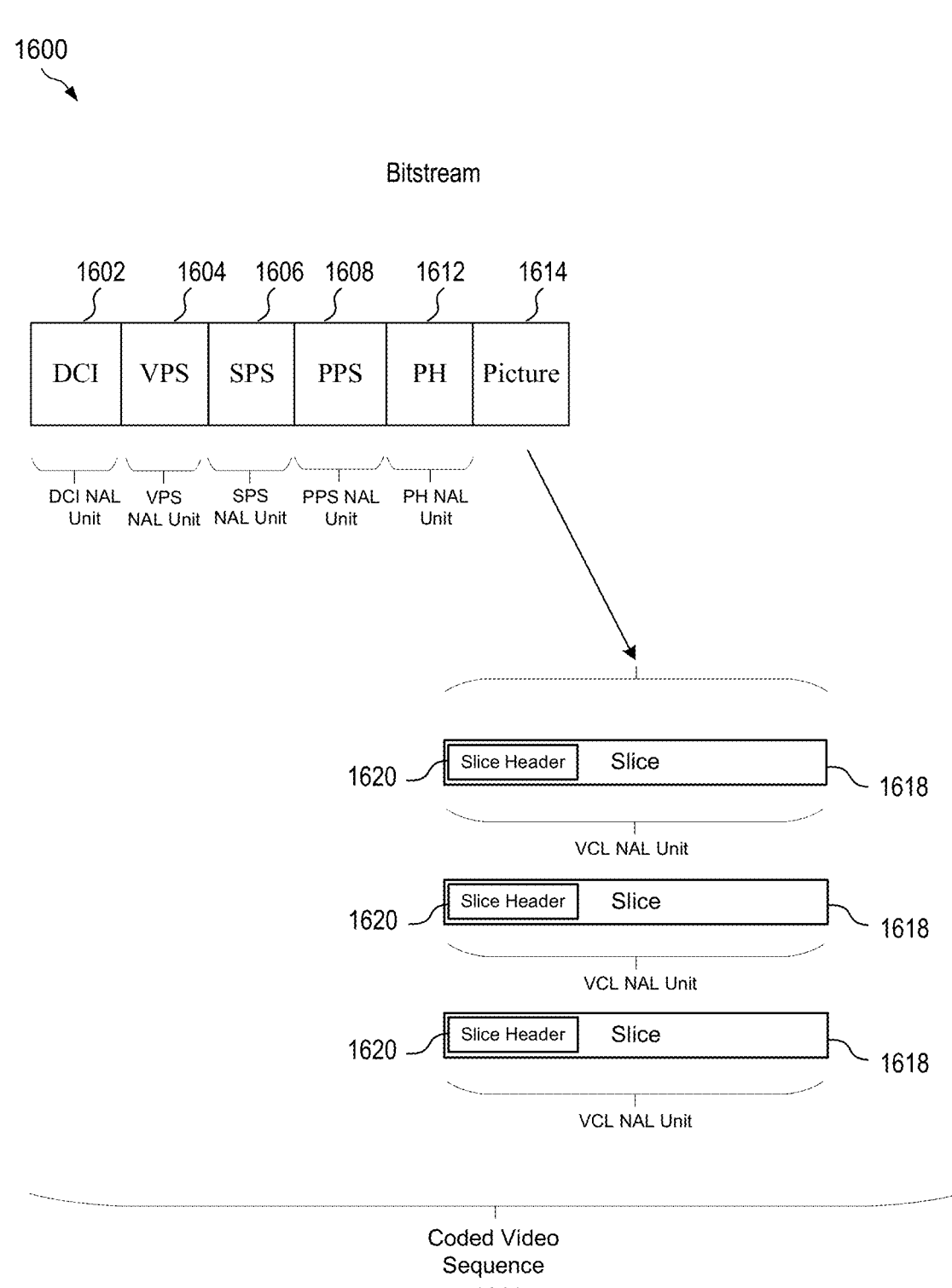
FIG. 16 illustrates an embodiment of a video bitstream in accordance with various examples.

FIG. 16 illustrates an embodiment of a video bitstream 1600. As used herein the video bitstream 1600 may also be referred to as a coded video bitstream, a bitstream, or variations thereof. As shown in FIG. 16, the bitstream 1600 comprises one or more of the following: decoding capability information (DCI) 1602, a video parameter set (VPS) 1604, a sequence parameter set (SPS) 1606, a picture parameter set (PPS) 1608, a picture header (PH) 1612, and a picture 1614. Each of the DCI 1602, the VPS 1604, the SPS 1606, and the PPS 1608 may be generically referred to as a parameter set. In an embodiment, other parameter sets not shown in FIG. 16 may also be included in the bitstream 1600 such as, for example, an adaption parameter set (APS), which is a syntax structure containing syntax elements that apply to zero or more slices as determined by zero or more syntax elements found in slice headers.

As described, embodiments of this description control the presence of (e.g., application of) NN filter models through syntax elements at various levels (e.g., of the bitstream 1600). For example, the syntax element(s) that indicate whether to apply a NN filter may be at a first level (e.g., in a sequence parameter set (SPS) and/or a sequence header of a video unit). Syntax element(s) that indicate whether to apply a NN filter may also be at a second level (e.g., a picture header, a picture parameter set (PPS), and/or a slice header of the video unit). Still further, syntax element(s) that indicate whether to apply a NN filter may be at a third level (e.g., the syntax element is indicated for a patch of the video unit, a CTU of the video unit, a CTB of the video unit, a block of the video unit, a subpicture of the video unit, a tile of the video unit, or a region of the video unit.

The DCI 1602, which may also be referred to a decoding parameter set (DPS) or decoder parameter set, is a syntax structure containing syntax elements that apply to the entire bitstream (e.g., including whether to apply one or more NN filters). The DCI 1602 includes parameters that stay constant for the lifetime of the video bitstream (e.g., bitstream 1600), which can translate to the lifetime of a session. The DCI 1602 can include profile, level, and sub-profile information to determine a maximum complexity interop point that is guaranteed to be never exceeded, even if splicing of video sequences occurs within a session. It further optionally includes constraint flags, which indicate that the video bitstream will be constrained of the use of certain features as indicated by the values of those flags. With this, a bitstream can be labelled as not using certain tools, which allows among other things for resource allocation in a decoder implementation. Like all parameter sets, the DCI 1602 is present when first referenced, and referenced by the very first picture in a video sequence, implying that it has to be sent among the first network abstraction layer (NAL) units in the bitstream. While multiple DCIs 1602 can be in the bitstream 1600, the value of the syntax elements therein cannot be inconsistent when being referenced.

The VPS 1604 includes decoding dependency or information for reference picture set construction of enhancement layers. The VPS 1604 provides an overall perspective or view of a scalable sequence, including what types of operation points are provided, the profile, tier, and level of the operation points, and some other high-level properties of the bitstream that can be used as the basis for session negotiation and content selection, etc.

The SPS 1606 contains data that is common to all the pictures in a sequence of pictures (SOP) (e.g., including whether to apply one or more NN filters). The SPS 1606 is a syntax structure containing syntax elements that apply to zero or more entire coded layer video sequences (CLVSs) as determined by the content of a syntax element found in the PPS 1608 referred to by a syntax element found in each picture header 1612. In contrast, the PPS 1608 contains data that is common to the entire picture 1614. The PPS 1608 is a syntax structure containing syntax elements that apply to zero or more entire coded pictures as determined by a syntax element found in each picture header (e.g., PH 1612) (e.g., including whether to apply one or more NN filters).

The DCI 1602, the VPS 1604, the SPS 1606, and the PPS 1608 are contained in different types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important data that can apply to a number of VCL NAL units) and supplemental enhancement information (timing information and other supplemental data that may enhance usability of the decoded video signal but are not necessary for decoding the values of the samples in the video pictures).

The PH 1612 is a syntax structure containing syntax elements that apply to all slices (e.g., slices 1618) of a coded picture (e.g., picture 1614).

The picture 1614 is an array of luma samples in monochrome format or an array of luma samples and two corresponding arrays of chroma samples in 4:2:0, 4:2:2, and 4:4:4 color format.

The picture 1614 may be either a frame or a field. However, in one CVS 1616, either all pictures 1614 are frames or all pictures 1614 are fields. The coded video sequence (CVS) 1616 is a coded video sequence for every coded layer video sequence (CLVS) in the video bitstream 1600. Notably, the CVS 1616 and the CLVS are the same when the video bitstream 1600 includes a single layer. The CVS 1616 and the CLVS are only different when the video bitstream 1600 includes multiple layers.

Each picture 1614 contains one or more slices 1618. A slice 1618 is an integer number of complete tiles or an integer number of consecutive complete coding tree unit (CTU) rows within a tile of a picture (e.g., picture 1614). Each slice 1618 is exclusively contained in a single NAL unit (e.g., a VCL NAL unit). A tile (not shown) is a rectangular region of CTUs within a particular tile column and a particular tile row in a picture (e.g., picture 1614). A CTU (not shown) is a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB (not shown) is an N×N block of samples for some value of N such that the division of a component into CTBs is a partitioning. A block (not shown) is an M×N (M-column by N-row) array of samples (e.g., pixels), or an M×N array of transform coefficients.

In an embodiment, each slice 1618 contains a slice header 1620. A slice header 1620 is the part of the coded slice 1618 containing the data elements pertaining to all tiles or CTU rows within a tile represented in the slice 1618. That is, the slice header 1620 contains information about the slice 1618 such as, for example, the slice type, which of the reference pictures will be used, and so on.

The pictures 1614 and their slices 1618 comprise data associated with the images or video being encoded or decoded. Thus, the pictures 1614 and their slices 1618 may be simply referred to as the payload or data being carried in the bitstream 1600.

In an embodiment, a first level (e.g., of bitstream 1600) is a sequence level, and a syntax element that is indicated in the first level is indicated in an SPS 1606 and/or a sequence header. In an embodiment, a second level (e.g., of bitstream 1600) is a picture level, and a syntax element that is indicated in the second level is indicated in PPS 1608, PH 1612 and/or a slice header 1620. In an embodiment, a third level (e.g., of bitstream 1600) is a subpicture level, and a syntax element that is indicated in the third level is indicated for a patch of a video unit, a CTU of the video unit, a CTB of the video unit, a block of the video unit, a subpicture of the video unit, a tile of the video unit, a region of the video unit, or the like.

In an embodiment, the syntax element is at the first level and indicates whether a NN filter can be adaptively selected at the second level to be applied to a picture 1614 or a slice 1618 of the video unit. In another embodiment, the syntax element is at the second level and indicates whether a NN filter can be adaptively selected at the third level to be applied to a subpicture of the video unit. When the syntax element is that the second level, it may also indicate whether usage of the NN filter can be controlled at the third level (e.g., by a syntax element at the third level).

In an embodiment, the syntax element is coded using context coding (e.g., context-based adaptive binary arithmetic coding (CABAC) or bypass coding. In another embodiment, the syntax element is binarized using fixed-length coding, unary coding, truncated unary coding, signaled unary coding, signed truncated unary coding, truncated binary coding, or exponential Golomb coding.

The bitstream 1600 may also contain one or more SEI messages, which contain supplemental enhancement information. SEI messages can contain various types of data that indicate the timing of the video pictures or describe various properties of the coded video or how the coded video can be used or enhanced. SEI messages are also defined that can contain arbitrary user-defined data. SEI messages do not affect the core decoding process, but can indicate how the video is recommended to be post-processed or displayed. Some other high-level properties of the video content are conveyed in video usability information (VUI), such as the indication of the color space for interpretation of the video content. As new color spaces have been developed, such as for high dynamic range and wide color gamut video, additional VUI identifiers have been added to indicate them.

Those skilled in the art will appreciate that the bitstream 1600 may contain other parameters and information in practical applications.

A discussion of the model selection is provided.

Example 1

1. A NN filter model may take at least one indicator which may be related to the quality level as input. The indicator is noted as quality-level indicator (QI).

a. In one example, the quality-level indicator of a video unit is the quantization parameter (QP) associated with the video unit.

b. In one example, the quality-level indicator of a video unit is the QP associated with the sequence (e.g., the initial QP signalled in SPS) that the video unit belongs to.

c. In one example, the quality-level indicator of a video unit is the QP associated with the picture or slice that the video unit belongs to.

d. Alternatively, the QP could be replaced by a quantization step corresponding to the QPs described in above bullets a, b, and c. For example, the QI input may be an output of a quantization process applied to a video unit, where the quantization process is based on a QP of the video unit, a QP of a sequence that includes the video unit, or a QP of a picture or slice that includes the video unit.

e. In one example, the quality-level indicator is first tiled or spanned into a two-dimensional arrays with the same size as the video unit to be filtered and then treated as an additional input plane, such as the tiling process shown in FIG. 14 for example.

i. In one example, the video unit is a CTU/CTB.

f. In one example, the quality-level indicator is fed into several fully-connected layers of the NN filter to be expanded into a one-dimensional vector, whose elements will serve as the channel-wise scaling factors to recalibrate the feature maps of NN filter models.

i. In one example, the feature maps of NN filter models are denoted as $f \in R^{N \times W \times H}$, where N, W, and H are the channel numbers, width, and height respectively. Let $S \in R^N$ represent the one-dimensional vector obtained by the fully connected layers. Then, the above recalibration process could be written as: $F^{i,j,k} = f^{i,j,k} \times S^i$, $1 \leq i \leq N$, $1 \leq j \leq W$, $1 \leq k \leq H$, where F is the recalibrated feature maps, such as shown in FIG. 15 for example.

g. In one example, the quality-level indicator is used as an additional input plane as well as the recalibration factors, i.e., aspects e and f could be combined.

h. In one example, the quality-level indicator may be signaled from the encoder to decoder, such as in SPS, picture parameter set (PPS), picture header, slice header, CTU, CU, or at any region level. In some examples, the PPS may include information on entropy coding mode, slice groups. motion prediction, and deblocking filters.

i. In one example, f(QI) instead of QI may be fed into the NN, wherein f is any function.

j. In one example, the usage of QI may depend on color components.

i. For example, a first QI may be used for a first component (such as luma) and a second QI may be used for a second component (such as chroma like Cb or Cr). The first QI may indicate the quality level of the first component and the second QI may indicate the quality level of the second component.

ii. For example, a first QI may be used for a first component (such as luma) and the first QI may also be used for a second component (such as chroma like Cb or Cr). The first QI may indicate the quality level of the first component.

iii. For example, QI may be used for NN filtering for a first component (such as luma) but not for a second component (such as chroma like Cb or Cr).

iv. For example, QI may be used for NN filtering for all components.

k. In one example, the QI used to filter a first video unit may indicate the quality of a region or picture comprising the first video unit l. In one example, the QI used to filter a first video unit may indicate the quality of region or picture not comprising the first video unit.

i. For example, the QI may indicate the quality of region or picture which is referred to by the first video unit.

Example 2

2. In a second embodiment, constructing the filtering candidate list could be dependent on the coding statistics of the video unit (e.g., prediction modes, qp, slice type, etc.).

a. In one example, the candidate list could be dependent on the ratio of a first group of samples coded by coding tool (or coding mode) X in the video unit.

i. In one example, X is one prediction mode, such as intra coded mode.

1) Alternatively, X may be any other coding tools such as any inter-prediction tool or transform/quantization coding tool.

ii. In one example, X is multiple prediction modes, such as including intra/palette/IBC coded mode.

iii. In one example, one candidate in the candidate list is the NN filter model corresponding to the candidate for coding intra slices if the ratio of intra-coded samples is no smaller than or greater than a threshold iv. In one example, the first candidate is the NN filter model corresponding to the intra-slice if the ratio of intra-coded samples is no smaller than or greater than a threshold.

v. In the above examples, the threshold may be predefined.

1) In one example, the video unit is a CTU/CTB.

2) In one example, the threshold is set to 0.5.

3) Alternatively, the threshold may be derived on-the-fly, such as according to decoded information, e.g., sequence or picture or slice level QP.

4) Alternatively, the threshold may be derived on-the-fly, such as according to color component.

b. In one example, the above methods of Example 2 may be applied conditionally.

i. In one example, the above method(s) may be applied to luma component only.

ii. In one example, the above method(s) may be applied to multiple color components.

1) In one example, coding statistics of the luma block may be used to determine the candidate list for luma; and coding statistics of the chroma block may be used to determine the candidate list for chroma.

2) In another example, coding statistics of the luma block may be used to determine the candidate list for both luma and chroma.

iii. In one example, the above method(s) may be applied to certain temporal layers.

1) In one example, they may be applied to temporal layers with ID greater than K (e.g., K=3).

2) In one example, they may be applied to temporal layers with ID smaller than K (e.g., K=4).

iv. In one example, the above method(s) may be applied to certain picture/slice types, such as P or B slices.

c. The first group of samples may be in the same picture containing the video unit to be filtered by NN.

i. Alternatively, the first group of samples may be in a different picture as the video unit to be filtered by NN. For example, the first group of samples may be in a reference picture of the video unit.

ii. Alternatively, the first group of samples may be in multiple pictures coded/decoded prior to the picture comprising the video unit to be filtered.

Example 3

3. In a third embodiment, one of the NN filters described above may be exclusively used with NDLF, e.g., when the NN filter is applied, then one or multiple kinds of the NDLF may not be applied any more, or vice versa.

a. In one example, the NDLF may include one or more of Deblocking filter, SAO, cross-component (CC)-SAO, ALF, CC-ALF, luma mapping with chroma scaling (LMCS), bilateral filter, transform-domain filtering method, and the like.

b. In one example, the proposed NN-based in-loop filters are used with various kinds of NDLFs, such as in combination with one or more NDLFs.

i. In one example, the original loop filters, such as deblocking (DB), SAO, ALF, CC-SAO, and CC-ALF are all turned off when the NN filters are applied.

c. In one example, the proposed NN-based filters are used exclusively with certain kinds of NDLF(s).

i. In one example, the NN filter may be applied when ALF is disabled.

ii. In one example, the NN filter may be applied to chroma components when CC-ALF is disabled.

iii. In one example, the NN filter may be applied to chroma components when CC-SAO is disabled.

d. In one example, a first kind of NDLF is determined to be turned off when NN-based filtering is applied and, as a result, the information related to the first kind of NDLF is not signaled in case the NN-based filtering is turned on.

i. In one example, the first kind of NDLF is inferred to be turned off when the information related to the first kind of NDLF is not signaled in case the NN-based filtering is turned on.

ii. Alternatively, the information related to the first kind of NDLF is signaled, but it is required that the information should indicate the first kind of NDLF is not signaled in case the NN-based filtering is turned on.

e. In one example, the above methods may be applied to a video unit, such as a CTU, a CTB, a CTU/CTB row, a slice, a tile, a picture, a sequence, a subpicture, and the like.

Example 4

4. In a fourth embodiment, a proposed NN filter may be used together with one or more NDLFs.
a. In one example, the proposed NN filter may be applied before or after a given NDLF (e.g., DB, SAO, CC-SAO, ALF, CC-ALF).
b. In one example, for a given video unit (e.g., a sequence, a picture, a subpicture, a slice, a tile, a CTU, a CTB, a CU, a prediction unit (PU), a transform unit (TU), or the like), the NN filter may be applied when the NDLFs are not applied.
i. In one example, for samples for which a type of NDLF (e.g., ALF, CC-SAO, CC-ALF, or the like) is disabled, the NN filter may be applied.
ii. In one example, for samples for which NN filtering is disabled, a type of NDLF (e.g., CC-SAO, ALF, CC-ALF, or the like) may be applied.

Example 5

5. In a fifth embodiment, an interaction between a NN filter and NDLF(s) may depend on color formats and/or color components.
a. For example, one of a NN filter and NDLF may be exclusively used for a first color format/component but they may be used together for a second color format/component.

Example 6

6. In a sixth embodiment, an interaction between a NN filter and NDLF(s) may depend on a standard profile, tier, level, and/or constraints flags.

Example 7

7. In a seventh embodiment, a NN-based filter may be applied after a given in-loop filtering method, such as a bilateral filter.

Example 8

8. In an eighth embodiment, a NN-based filter may be applied before a given in-loop filtering method, which may also include a higher-level on/off control
a. In one example, the high-level may indicate the slice-level or picture level or subpicture level or tile level.
b. In one example, the given in-loop filtering method may be the SAO, CC-SAO, ALF, or the like.

Example 9

9. In a ninth embodiment, whether a NN filter model is applied (e.g., is used and/or is enabled), or the presence of NN filter model(s), may be controlled by adding one or more syntax elements in a first level (e.g., a sequence level, such as in SPS or sequence header).
a. One or more syntax elements in a first level may comprise a first flag indicating whether NN filter is enabled.

b. One or more syntax elements in a first level may comprise a syntax element indicating the number of NN filters may be used.
i. The indication of the number of NN filters may be signaled only if NN filter is enabled (e.g., the first flag is true).
ii. The indication of the number of NN filters may be coded with k-th exponential Golomb coding.
1. In one example, k equals to 0 or 1.
2. In one example, k may be a positive integer.
iii. The indication of the number of NN filters may be coded with the fixed-length codes.
iv. The indication of the number of NN filters may be coded with the variable length codes.
c. One or more syntax elements in a first level may comprise a syntax element indicating the types or set of NN filters may be used.
i. The syntax element may be signaled only if NN filter is enabled (e.g., the first flag is true).
d. One or more syntax elements in a first level may comprise a syntax element indicating the NN filter to be used in the first level.
e. One or more syntax elements in a first level may comprise a syntax element indicating whether NN filter can be adaptively selected in a second level.
f. Alternatively, furthermore, one or more syntax elements may be at a second level (e.g., a picture level, such as in a picture header (PH) or picture parameter set (PPS), or slice level such as slice header (SH)) may be further signaled. In the following discussion, PH may be replaced by SH.
i. Alternatively, furthermore, the syntax elements at the second level may be conditionally signalled, e.g., according to those signaled in the first level.
ii. In one example, when the first flag is true, syntax related to NN filter models (e.g., usage/enabling of NN filter models and/or indications of which NN filter model) will be present in PPS or PH (e.g., at the second level).
1. In one example, the indicators of NN filter models for a video unit are dependent on the syntax related to NN filter models in PPS or PH.
iii. In one example, when the first flag is false, no syntax related to NN filter models will be present in the second level, and NN filter models will not be used for any video units.
iv. One or more syntax elements in a second level may comprise a syntax element indicating the number of NN filters may be used.
1. The indication of the number of NN filters may be coded with k-th exponential Golomb coding.
a. In one example, k equals to 0 or 1.
b. In one example, k may be a positive integer.
2. The indication of the number of NN filters may be coded with the fixed-length codes.
3. The indication of the number of NN filters may be coded with the variable length codes.
v. One or more syntax elements in a second level may comprise a syntax element indicating the types or set of NN filters may be used.
vi. One or more syntax elements in a second level may comprise a syntax element indicating the NN filter to be used in the second level.
vii. One or more syntax elements in a second level may comprise a syntax element indicating whether NN filter can be adaptively selected in a third level.

1. Alternatively, one or more syntax elements in a second level may comprise a syntax element indicating whether NN filter can be adaptively selected in the second level.

viii. One or more syntax elements in a second level may comprise a syntax element indicating whether NN filter can be applied on the second level.

ix. One or more syntax elements in a second level may comprise a specific syntax element indicating whether the usage (e.g., enabled or not enabled) of NN filter can be controlled in a third level.

1. In one example, the specific syntax element is signaled only if it is indicated that NN filter can be applied on the second level.

x. One or more syntax elements in a second level may comprise a syntax element indicating whether NN filter can be used at the second level.

1. In one example, the syntax element indicating the NN filter to be used in the second level is signaled only if it is indicated that NN filter can be used at the second level.

2. In one example, the syntax element indicating whether NN filter can be adaptively selected in the second level is signaled only if it is indicated that NN filter can be used at the second level.

xi. In one example, the syntax element indicating the NN filter to be used in the second level is signaled only if it is indicated that NN filter can be adaptively selected in the second level.

xii. In one example, the syntax element indicating the NN filter to be used in the second level is signaled only if it is indicated that number of NN filters is larger than one.

xiii. A syntax element (e.g., picture_cnnlf_set_index [comIdx]) may be signaled if CNN filter is enabled for the second level (e.g., a picture). If it is equal to k, wherein k>=0 and k<T (e.g., T=3), the k-th CNN filter is used for the second level. If it is equal to T, then CNN filter is adaptively selected at a third level.

1. Alternatively, furthermore, the syntax element may be restricted to be within a range, such as [0, number of NN filters−1].

g. Alternatively, furthermore, one or more syntax elements at a third level (e.g., a patch, a CTU, a CTB, a block, a subpicture, a tile, a slice, and/or a region containing multiple samples) may be further signaled.

i. Alternatively, furthermore, the syntax elements at the third level may be conditionally signaled, such as according to those syntax element(s) signaled in the first and/or second level.

ii. Alternatively, the syntax elements at the third level may be coded using context.

iii. In one example, when the first flag is true, syntax related to NN filter models (e.g., usage/enabling of NN filter models and/or indications of which NN filter model) will be present in PH (picture header) or PPS.

1. In one example, a second flag is signaled to indicate whether NN filter is used in the third level.

a. In one example, the second flag is signaled only if it is indicated at the second level that the usage (e.g., enabling or not) of NN filter is controlled in a third level.

b. In one example, the second flag is signaled only if it is indicated at the second level that NN filter can be adaptively selected in a third level.

c. In one example, the second flag is signaled only if a specific NN filter is selected at the second level.

d. In one example, the second flag is signaled only it is indicated at the second level that NN filter can be applied on the second level.

e. In one example, the second flag is signaled decoupled of which NN filter is selected at the second level.

f. In one example, the second flag is always signaled if the first flag is true.

g. In one example, the second flag is always signaled if it is indicated at the second level that NN filter can be applied on the second level.

h. Whether to signal the second flag may depend on at least one selected from the group consisting of: slice or picture type; CTU mode; CTU size; and number of NN filters.

2. In one example, the indicators of NN filter models for a video unit are dependent on the syntax related to NN filter models in PH or PPS.

3. In one example, the indicators of NN filter models is signaled only if the second flag is true.

4. In one example, the indicators of NN filter models is signaled only if it is indicated at the first or second level that filters are adaptively selected at the third level.

iv. In one example, the syntax element indicating the NN filter to be used in the third level is signaled only if it is indicated that NN filter can be adaptively selected in the third level.

1. Alternatively, the syntax element indicating the NN filter to be used in the third level is signaled only if it is indicated that NN filter is not adaptively selected in the second level.

v. In one example, the syntax element indicating the NN filter to be used in the third level is signaled only if it is indicated that number of NN filters is larger than one.

vi. In one example, when the first flag is false, no syntax related to NN filter models will be present in the third level, and NN filter models will not be used for any video units.

vii. Alternatively, furthermore, context model selection for coding the syntax element may be dependent on the number of allowed filters.

1. In one example, the filter model index for a given color component may use up to K contexts.

a. In one example, the model selection may be defined as Min(binIdx, K−1) wherein the binIdx is the index of the bin to be coded.

2. In one example, the filter model index for two color components (e.g., U and V) may be coded with a same set of contexts.

3. In one example, the filter model index for two color components (e.g., Y and U, or Y and V) may be coded with different sets of contexts.

h. In one example, the information disclosed to be signaled at the second level may be signaled at the third level.

i. In one example, the information disclosed to be signaled at the second level may be signaled in the first region/patch/CTU consisted in the second level.

ii. In one example, the information disclosed to be signaled at the second level may be signaled in the first region/patch/CTU that NN filtering is enabled consisted in the second level.

Example 10

10. In a tenth embodiment, one or multiple syntax elements may be present for a video unit and the value of the one or multiple syntax elements may indicate that the NN filter is adaptively applied to samples in the video unit, and/or that the same model is applied for those with NN filter applied.

a. In one example, only one syntax element may be present, and the following applies:

i. For the value equal to K0 (e.g., K0 being equal to 0), NN filter is disabled for all samples in the video unit.

ii. For the value equal to Ki (e.g., Ki being equal to M (M!=K0)), NN filter is enabled for all samples in the video unit and the same filter model is applied.

iii. For the value equal to Kj (e.g., Kj being equal to N (N!=K0 and N!=Ki)), NN filter is adaptively enabled for all samples in the video unit and the same model is applied.

1. Alternatively, furthermore, for different regions within the video unit, NN filter may be enabled or disabled.

2. Alternatively, furthermore, at least for one region within the video unit, NN filter may be disabled.

3. Alternatively, furthermore, for a region within the video unit, whether to enable or disable the NN filter may be further signaled.

4. In one example, the video unit may be a picture/slice/subpicture.

5. In one example, the region within the video unit may be a CTU/CTB or other regions including more than one sample/pixel.

b. In one example, multiple syntax elements may be present in a first level (e.g., a picture/slice), and the following applies:

i. In one example, a first syntax element (e.g., 1-bit flag) may be used to indicate whether NN filter is disabled for all samples in the video unit.

1. Alternatively, furthermore, a second syntax element may be present to indicate whether on/off control is present in a second level.

ii. Alternatively, a first syntax element (e.g., non-binary) may be used to indicate one of the following cases:

1. Whether NN filter is disabled for all samples in the video unit; whether all samples share the same model and model index; whether on/off control and/or model index may be further present in a second level (e.g., in CTU).

c. Alternatively, furthermore, a second syntax element may be present to indicate whether on/off control is present in a second level (e.g., in CTU).

i. Alternatively, furthermore, the second syntax element may be conditionally signaled according to the values of the first syntax element.

d. Alternatively, furthermore, whether to signal the model index in a second level (e.g., in CTU) may further depend on the values of the one or multiple syntax elements.

i. In one example, if the value indicates that the same model is applied for those samples with NN filter applied (regardless adaptively enabled or always enabled), the indication of the model index in the second level is skipped.

Example 11

11. In an eleventh embodiment, one or multiple syntax elements may be present in a region-level to indicate whether all samples with NN filter applied share the same model and the region size is no larger than a picture/slice (e.g., a CTU/CTB).

a. Alternatively, furthermore, a model index may be further signaled if the one or multiple syntax elements indicate that NN filter is applied to all regions.

i. In one example, the model index may be signaled before the first CTU or together with the first CTU or together with the first CTU with NN filter applied.

b. Alternatively, furthermore, indication of on/off control of NN filters for a region may be further signaled.

c. Alternatively, furthermore, indication of filter model index for a region may be conditionally signaled according to the one or multiple syntax elements.

i. In one example, indication of filter model index for a region may be skipped if the one or multiple syntax elements indicate that whether all samples with NN filter applied share the same model.

Example 12

12. In a twelfth embodiment, a first syntax element (e.g., alternative_tool_set) may be signaled at a first video unit (e.g., sequence header, SPS, picture header, PPS, slice header, or the like) to indicate the usage of at least one alternative coding tool.

a. In one example, one flag of alternative_tool_set indicates whether a specific alternative coding tool is used or not (e.g., 0 indicates not to be used, 1 indicates to be used).

b. In one example, (alternative_tool_set & M) may be used to test whether a specific alternative coding tool is used or not (e.g., (alternative_tool_set & M) equal to 0 indicates not to be used, (alternative_tool_set & M) equal to 1 indicates to be used). For example, M=1, 2, 4, 8, 16, 32, 64, 128 or any 2K.

i. In one example, (alternative_tool_set & 1) may be used to test whether alternative filtering is used or not (e.g., (alternative_tool_set & 1) equal to 0 indicates not to be used, (alternative_tool_set & 1) equal to 1 indicates to be used).

c. In one example, some bits may be reserved.

i. For example, the highest (or lowest) N bits of alternative_tool_set may be reserved, such as for N=7.

d. For example, at least one alternative coding tool may be a NN-based coding tool.

e. For example, alternative filtering may be a NN-based filtering method.

f. In one example, the alternative coding tool is a NN-based coding method, such as NN-based super resolution, NN-based interpolation filter, NN-based intra prediction, or the like.

Example 13

13. In a thirteenth embodiment, a syntax element described above may be set to a default value (e.g., 0) if it is not signaled.

Example 14

14. In a fourteenth embodiment, the syntax elements described above may be signaled individually for different color components.

a. For example, a syntax element may be indexed by the color component.

Example 15

15. In a fifteenth embodiment, NN-based filtering or NN filtering methods disclosed in this documents may also be referred to as "alternative filtering."

Example 16

16. In a sixteenth embodiment, at least one syntax element described above may be signaled by context coding.
a. Alternatively, at least one syntax element described above may be signaled by bypass coding.

Example 17

17. In a seventeenth embodiment, at least one syntax element described above may be binarized using fixed length coding, or unary coding, or truncated unary coding, or signed unary coding, or signed truncated unary coding, or truncated binary coding, or exponential Golomb coding or any other binarized coding method.
a. For example, the syntax element indicating the number of alternative filters (or NN filters) (e.g., num_of_alternative_filter_minus1) may be binarized with unary coding.
b. For example, the syntax element indicating the alternative filter (or NN filter) (e.g., picture_alternative_filter_set_index[comIdx]) at picture level may be binarized with unary coding.
c. For example, the syntax element indicating the alternative filter (or NN filter) (e.g., picture_alternative_filter_set_index[comIdx]) at picture level may be binarized with unary coding.
d. For example, the syntax element indicating the alternative filter (or NN filter) (e.g., alternative_filter_l-cu_set_index[compIdx][LcuIdx]) at patch or CTU or block level may be binarized with unary coding.

Example 18

18. In an eighteenth embodiment, at least one of the syntax elements disclosed in the document may be used as a hook.
a. In one example, a decoder may parse the syntax element but no further operation is conducted based on the syntax element.
b. In one example, a decoder may parse the syntax element but ignore it.
c. In one example, a decoder may parse the syntax element and record it.
d. In one example, a decoder may parse the syntax element and use it out of the coding loop, such as in the pre-processing or post-processing.

Example 19

19. In a nineteenth embodiment, the above methods may be applied to any kind of NN based coding methods.
a. In one example, they may be applied to the unified NN filtering method (in-loop or post-processing).
b. In one example, they may be applied to the non-unified NN filtering method (in-loop or post-processing).
A first exemplary embodiment is discussed.

This first exemplary embodiment presents a convolutional neural network-based in-loop filtering method wherein adaptive model selection is introduced. The proposed Deep in-loop filter with Adaptive Model selection (DAM) method is developed from the prior contribution proposed in JVET-U0068. Several changes and/or modifications are further introduced: migration of the algorithm to VTM-11.0, improved network structure, refined model candidates, adaptive inference size. Compared with VTM-11.0, the proposed method demonstrates BD-rate reductions for {Y, Cb, Cr}, under AI, RA, and LDB configurations.

In this first exemplary embodiment, convolutional neural networks (CNN) are utilized to construct in-loop filters for reducing the distortion incurred during compression. The network structure is revised from the one discussed in Yue Li, Li Zhang, Kai Zhang, "AHG11: Convolutional neural network-based in-loop filter with adaptive model selection," JVET-U0068. Similar to JVET-U0068, residual blocks are utilized as the basic module and stacked several times to construct the final network. As a further development from JVET-U0068, the presented model is equipped with more residual bocks but fewer feature maps in each residual block, leading to an increased representation capability with a similar model size. In addition, to deal with different types of content, individual networks are trained for different types of slices and quality levels. Moreover, some new features are introduced to further improve the coding performance.

The first exemplary embodiment is related to that shown in FIGS. 12A and 12B. To increase the receptive field and reduce the complexity, the proposed method contains a convolutional layer with a stride of 2 at the beginning. After passing through this layer, the spatial resolution of feature maps reduces to the half of the input size along both horizontal and vertical direction. The feature maps output from the first convolutional layer then go through several sequentially stacked residual blocks. In this first exemplary embodiment, there may be 32 residual blocks instead of the 16 shown in FIG. 12A. The last convolutional layer takes the feature maps from the last residual block as an input and produces 4 feature maps of N×N size. Finally, a shuffle layer is adopted to generate the filter image whose spatial resolution is the same as the input to the CNN (e.g., 2N×2N). Other details related to the network architecture are illustrated as below:

For all of convolutional layers, a kernel size of 3×3 is used. For internal convolutional layers, number of feature maps is M (M=96). For the activation function, PReLU is used.

Different groups of models are trained for I slice and B slice, respectively.

When training the CNN filters for intra slices, prediction and partition information are additionally fed into the network.

When training the CNN filters for inter slices, prediction information is additionally fed into the network.

In the proposed technique of the first exemplary embodiment, each slice or block could determine whether to apply the CNN-based filter or not. When the CNN-based filter is determined to be applied to a slice/block, which model from a candidate model list including three models could be further decided. To this end, individual models are trained with QPs in {17, 22, 27, 32, 37, 42}. Given a test QP for coding a sequence, denoted as q, the candidate model list includes models trained with QPs equal to {q, q−5, q−10}. The selection process is based on the rate-distortion cost at the encoder side. Indication of on/off control as well as the model index, if needed, are signalled in the bitstream.

To enable a higher representation capability and maintain a similar model size, the number of residual blocks increases from 16 to 32 while the number of feature maps in each residual block decreases from 128 to 96.

The granularity of the filter determination and the model selection is dependent on resolution and QP. In the proposed scheme, given a higher resolution and a larger QP, the determination and selection will be performed for a larger region.

The candidate model list is different across different temporal layers. For a low temporal layer, the third candidate is replaced by the intra-slice NN filter model if the ratio of intra-coded samples is no smaller than a threshold. For a high temporal layer, the third candidate, i.e., the model corresponding to $q-10$, is replaced by the model corresponding to $q+5$.

For all-intra configuration, model selection is disabled while on/off control is still preserved.

An open source machine learning framework, such as PyTorch, is useful for performing the inference of the proposed CNN filters in VTM. The network information in the inference stage is provided in Table 1-1 as suggested by S. Liu, A. Segall, E. Alshina, R.-L. Liao., "JVET common test conditions and evaluation procedures for neural network-based video coding technology," JVET-U2016.

TABLE 1-2

Network Information for NN-based
Video Coding Tool Testing in Inference Stage
Network Information in Inference Stage

| Mandatory | HW environment: | |
|---|---|---|
| | GPU Type | N/A |
| | Framework: | PyTorch v1.6 |
| | Number of GPUs per Task | 0 |
| | Total Parameter Number | 5.51M/model |
| | Parameter Precision (Bits) | 32 (F) |
| | Memory Parameter (MB) | ~22.3M/model, 24 models in total |
| | MAC (Giga) | 11541 (Input: 3840 × 2160) |
| Optional | Total Conv. Layers | 69 |
| | Total FC Layers | 0 |
| | Total Memory (MB) | |
| | Batch size: | 1 |
| | Patch size | 32 × 32, 64 × 64, 128 × 128, 256 × 256 |
| | Changes to network configuration or weights required to generate rate points | |
| | Peak Memory Usage | |
| | Other information: | |

PyTorch may also be used as the training platform. The DIV2K (from https://data.vision.ee.ethz.ch/cvl/DIV2K/, R. Timofte, E. Agustsson, S. Gu, J. Wu, A. Ignatov, L. V. Gool) and BVI-DVC (from Ma, Di, Fan Zhang, and David R. Bull. "BVI-DVC: A Training Database for Deep Video Compression." arXiv preprint arXiv: 2003.13552 (2020)) datasets are adopted to train the CNN filters of I slices and B slices, respectively. Different CNN models are trained to adapt to different QP points. The network information in the training stage is provided in Table 1-2 as suggested by S. Liu, A. Segall, E. Alshina, R.-L. Liao., "JVET common test conditions and evaluation procedures for neural network-based video coding technology," JVET-U2016.

TABLE 1-3

Network Information for NN-based
Video Coding Tool Testing in Training Stage
Network Information in Training Stage

| Mandatory | GPU Type | GPU: Tesla-V100-SXM2-32GB |
|---|---|---|
| | Framework: | PyTorch v1.6 |
| | Number of GPUs per Task | 2 |
| | Epoch: | 90 |
| | Batch size: | 64 |
| | Training time: | 60 h/model |
| | Training data information: | DIV2K, BVI-DVC |
| | Training configurations for generating compressed training data (if different to VTM CTC): | VTM-9.0, QP {17, 22, 27, 32, 37, 42} |
| | Loss function: | L1, L2 |
| Optional | Number of iterations | |
| | Patch size | 128 × 128 |
| | Learning rate: | 1e-4 |
| | Optimizer: | ADAM |
| | Preprocessing: | |
| | Other information: | |

The proposed CNN-based in-loop filtering method is tested on top of VTM-11.0 (from https://vcgit.hhi.fraunhofer.de/jvet/VVCSoftware_VTM/-/tags/VTM-11.0) according to the common test conditions suggested by S. Liu, A. Segall, E. Alshina, R.-L. Liao., "JVET common test conditions and evaluation procedures for neural network-based video coding technology," JVET-U2016. Deblocking filtering and SAO are disabled while ALF (and CCALF) is placed after the proposed CNN-based filtering. Test results are shown in Table 1-4 through Table 1-5. Under AI configurations, the proposed method demonstrates BD-rate reductions for Y, Cb, and Cr. Under RA configurations, the proposed method demonstrates BD-rate reductions for Y, Cb, and Cr. Under LDB configurations, the proposed method demonstrates BD-rate reductions for Y, Cb, and Cr.

TABLE 1-4

Performance of the proposed method on top of VTM11.0 (RA)

| | RA | | | | |
|---|---|---|---|---|---|
| | Y | U | V | EncT | DecT |
| Class A1 | | | | | |
| Class A2 | | | | | |
| Class B | −11.19% | −31.30% | −28.89% | 277% | 32571% |
| Class C | −12.81% | −28.26% | −29.26% | 214% | 31552% |
| Class E | | | | | |
| Overall | | | | | |
| Class D | −14.33% | −30.02% | −30.64% | 204% | 28984% |
| Class F | −6.01% | −17.34% | −17.56% | 381% | 12782% |

TABLE 1-4

Performance of the proposed method on top of VTM11.0 (LDB)

| | LDB | | | | |
|---|---|---|---|---|---|
| | Y | U | V | EncT | DecT |
| Class A1 | | | | | |
| Class A2 | | | | | |
| Class B | | | | | |
| Class C | | | | | |
| Class E | | | | | |
| Overall | | | | | |
| Class D | | | | | |
| Class F | | | | | |

TABLE 1-5

Performance of the proposed method on top of VTM11.0 (AI)

| | AI | | | | |
|---|---|---|---|---|---|
| | Y | U | V | EncT | DecT |
| Class A1 | −7.57% | −18.35% | −18.54% | 234% | 19512% |
| Class A2 | −7.82% | −22.65% | −22.44% | 172% | 16331% |
| Class B | −7.89% | −23.52% | −22.77% | 156% | 14257% |
| Class C | −9.28% | −21.78% | −24.25% | 126% | 9553% |
| Class E | −11.82% | −26.01% | −26.12% | 164% | 15761% |
| Overall | −8.79% | −22.54% | −22.90% | 163% | 14295% |
| Class D | −9.03% | −22.91% | −24.43% | 120% | 8993% |
| Class F | −4.55% | −13.58% | −11.70% | 125% | 5637% |

This first exemplary embodiment presents a CNN-based in-loop filtering method. The proposed CNN-based method demonstrates useful coding gains.

A second exemplary embodiment is discussed, which provides a solution of conditional in-loop filtering with parameter selection.

In particular, this second exemplary method presents a conditional in-loop filtering method. It is developed from the prior contribution proposed in JVET-U0068. The proposed CNN-architecture is conditioned on an auxiliary parameter based on QP, leading to a unified model to handle different quality levels. To better capture local characteristics of an image, the proposed embodiments enables an adaptive selection of the auxiliary parameter at block level and slice level. Compared with VTM-11.0, the proposed method demonstrates BD-rate reductions for {Y, Cb, Cr}, under AI, RA, and LDB configurations.

In this second exemplary embodiment, convolutional neural networks (CNN) are utilized to construct in-loop filters for reducing the distortion incurred during compression. The network structure is revised from the one discussed in Yue Li, Li Zhang, Kai Zhang, "AHG11: Convolutional neural network-based in-loop filter with adaptive model selection," JVET-U0068. Similar to JVET-U0068, residual blocks are utilized as the basic module and stacked several times to construct the final network. As a further development from (or modification to) JVET-U0068, the second exemplary embodiment introduces an auxiliary parameter based on QP as an input to the network (e.g., to the NN filter), leading to a unified filter model that can handle various quality levels. Moreover, some new features are introduced to further improve the coding performance.

Figure 17:
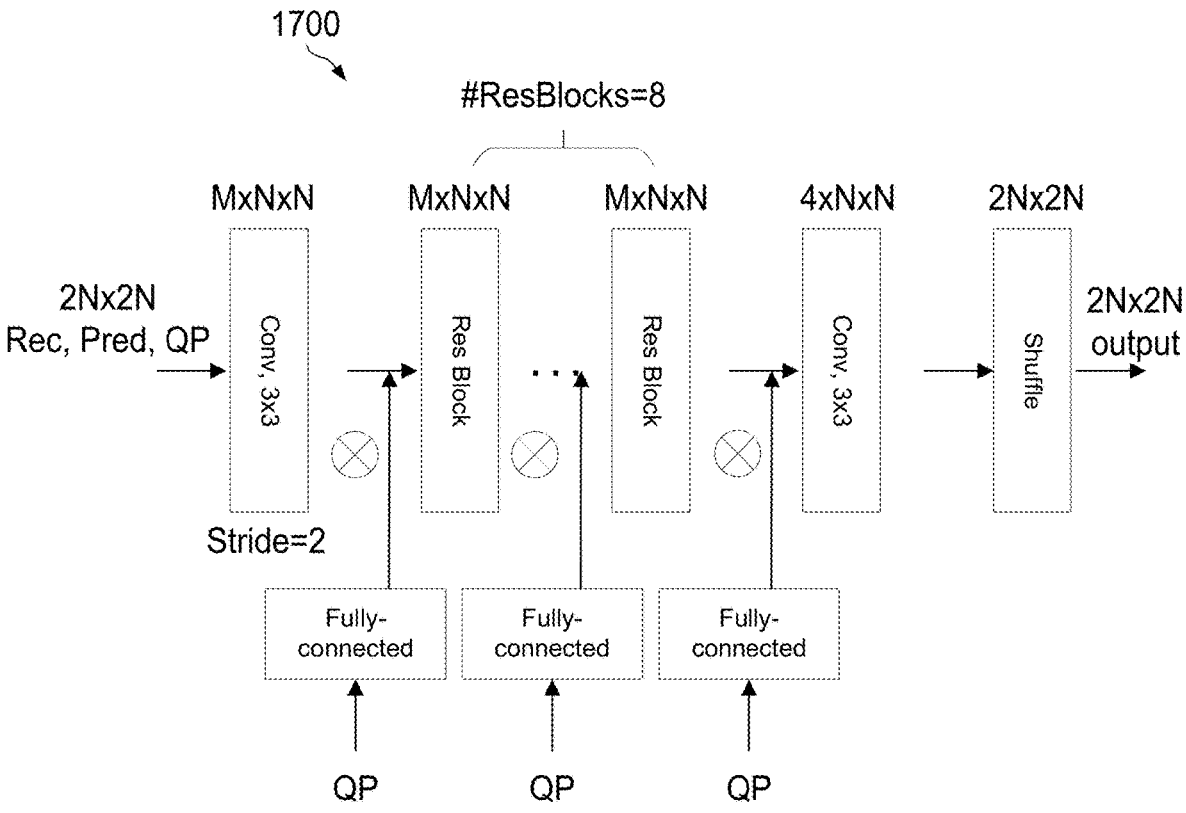
FIG. 17 is an example architecture of a CNN filter in accordance with various examples.

The second exemplary embodiment uses a proposed CNN filtering method as shown in FIG. 17. FIG. 17 is an example architecture 1700 of the proposed CNN filter. The convolutional parts are similar to the one presented in JVET-U0068. The process of feeding a QP into the network is twofold. First, QP is tiled into a 2-dimensional array having a same size as the block to be filtered. The 2-dimensional array is then treated as an additional input plane. Second, the QP is fed into fully-connected layers to be expanded into a 1-dimensional vector, whose elements will serve as channel-wise scaling factors to recalibrate the feature maps. In the example architecture 1700, M denotes the number of feature maps (e.g., M=96 in some examples) and N denotes a number of samples in one dimension.

In the second exemplary embodiment, each slice or block could determine whether to apply the CNN-based filter. When the CNN-based filter is determined to be applied to a slice/block, which auxiliary parameter from a candidate set with three possible auxiliary parameters could be further decided. Given a test QP for coding a sequence, denoted as q, the candidate set includes three auxiliary parameters. The candidate set may be predefined to be to {q, q−5, q−10} and {q, q−5, q+5} for lower temporal layer and higher temporal layer, respectively. The selection process is based on the rate-distortion cost at the encoder side. The indication of on/off control as well as the auxiliary parameter index, if needed, are signalled in the bitstream. Other details regarding to the parameter selection are listed as below.

1. The granularity of the filter determination and auxiliary parameter selection is dependent on the picture resolution and QP. In the proposed scheme, given a higher resolution and a larger QP, the determination and selection will be performed for a larger region.

2. Intra-slice NN filter may be used for an inter-slice. For a low temporal layer, the inter-slice NN filter input with the third auxiliary parameter candidate is replaced by the intra-slice NN filter model if the ratio of intra-coded samples is no smaller than a threshold.

3. For all-intra configuration, the parameter selection is disabled while on/off control is still preserved.

An open source machine learning framework, such as PyTorch, is useful for performing the inference of the proposed CNN filters in VTM. The network information in the inference stage is provided in Table 2-1 as suggested by S. Liu, A. Segall, E. Alshina, R.-L. Liao., "JVET common test conditions and evaluation procedures for neural network-based video coding technology," JVET-U2016.

TABLE 2-5

Network Information for NN-based
Video Coding Tool Testing in Inference Stage
Network Information in Inference Stage

| Mandatory | HW environment: | |
|---|---|---|
| | GPU Type | N/A |
| | Framework: | PyTorch v1.6 |
| | Number of GPUs per Task | 0 |
| | Total Parameter Number | 5.56M/model |
| | Parameter Precision (Bits) | 32 (F) |
| | Memory Parameter (MB) | ~22.6M/model, 4 models in total |
| | MAC (Giga) | 11624 (Input: 3840 × 2160) |
| Optional | Total Conv. Layers | 69 |
| | Total FC Layers | 10 |
| | Total Memory (MB) | |
| | Batch size: | 1 |
| | Patch size | 32 × 32, 64 × 64, 128 × 128, 256 × 256 |
| | Changes to network configuration or weights required to generate rate points | |
| | Peak Memory Usage | |
| | Other information: | |

PyTorch may also be used as the training platform. The DJV2K and BVJ-DVC datasets (e.g., as described above) are adopted to train the CNN filters of I slices and B slices, respectively. A unified CNN model is trained to tackle different QP points. The network information in the training stage is provided in Table 2-2 as suggested by S. Liu, A. Segall, E. Alshina, R.-L. Liao., "JVET common test conditions and evaluation procedures for neural network-based video coding technology," JVET-U2016.

TABLE 2-6

| | | Network Information for NN-based Video Coding Tool Testing in Training Stage Network Information in Training Stage | |
|---|---|---|
| Mandatory | GPU Type | GPU: Tesla-V100-SXM2-32GB |
| | Framework: | PyTorch v1.6 |
| | Number of GPUs per Task | 2 |
| | Epoch: | 90 |
| | Batch size: | 64 |
| | Training time: | 120 h/model |
| | Training data information: | DIV2K, BVI-DVC |
| | Training configurations for generating compressed training data (if different to VTM CTC): | VTM-9.0, QP {17, 22, 27, 32, 37, 42} |
| | Loss function: | L1, L2 |
| Optional | Number of iterations | |
| | Patch size | 128 × 128 |
| | Learning rate: | 1e−4 |
| | Optimizer: | ADAM |
| | Preprocessing: | |
| | Other information: | |

The proposed CNN-based in-loop filtering method is tested on top of VTM-11.0, as described above, according to the common test conditions defined above. Deblocking filtering and SAO are disabled while ALF (and CCALF) is placed after the proposed CNN-based filtering. Test results are shown in Table 1-4 through Table 2-5. Under AI configurations, the proposed method demonstrates BD-rate reductions for Y, Cb, and Cr. Under RA configurations, the proposed method demonstrates BD-rate reductions for Y, Cb, and Cr. Under LDB configurations, the proposed method demonstrates BD-rate reductions for Y, Cb, and Cr.

TABLE 2-7

Performance of the proposed method on top of VTM11.0 (RA)

| | RA | | | | |
|---|---|---|---|---|---|
| | Y | U | V | EncT | DecT |
| Class A1 | | | | | |
| Class A2 | | | | | |
| Class B | | | | | |
| Class C | −12.14% | −23.57% | −23.47% | 218% | 28362% |
| Class E | | | | | |
| Overall | | | | | |
| Class D | −13.79% | −24.15% | −23.65% | 208% | 25445% |
| Class F | −6.09% | −12.85% | −12.34% | 389% | 14745% |

TABLE 2-4

Performance of the proposed method on top of VTM11.0 (LDB)

| | LDB | | | | |
|---|---|---|---|---|---|
| | Y | U | V | EncT | DecT |
| Class A1 | | | | | |
| Class A2 | | | | | |
| Class B | | | | | |
| Class C | | | | | |
| Class E | | | | | |
| Overall | | | | | |
| Class D | | | | | |
| Class F | | | | | |

TABLE 2-5

Performance of the proposed method on top of VT11.0 (AI)

| | AI | | | | |
|---|---|---|---|---|---|
| | Y | U | V | EncT | DecT |
| Class A1 | | | | | |
| Class A2 | | | | | |
| Class B | | | | | |
| Class C | | | | | |
| Class E | | | | | |
| Overall | | | | | |
| Class D | | | | | |
| Class F | | | | | |

This second exemplary embodiment presents a CNN-based in-loop filtering method. The proposed CNN-based in-loop filtering method demonstrates useful coding gains.

A third exemplary embodiment is discussed.

The third exemplary embodiment presents a convolutional neural network-based in-loop filtering method, in which a unified model is trained to handle various quality levels. It is an extended and/or modified version of the prior contribution JVET-U0068. The proposed CNN-architecture takes a QP as input. To better capture local characteristics of an image, the proposed embodiments enables adaptive model selection at block level and slice level. Compared with VTM-11.0, the proposed method demonstrates BD-rate reductions for {Y, Cb, Cr}, under AI, RA, and LDB configurations.

In this third exemplary embodiment, convolutional neural networks (CNN) are utilized to construct in-loop filters for reducing the distortion incurred during compression. The network structure is revised from the one discussed in Yue Li, Li Zhang, Kai Zhang, "AHG11: Convolutional neural network-based in-loop filter with adaptive model selection," JVET-U0068. Similar to JVET-U0068, residual blocks are utilized as the basic module and stacked several times to construct the final network. As a further development from (or modification to) JVET-U0068, the presented models takes QP as input, leading to a unified model that can handle various quality levels. Moreover, some new features are introduced to further improve the coding performance.

The third exemplary embodiment uses the proposed CNN filtering method as shown in FIG. 17 and described above. To increase the receptive field and reduce the complexity, the proposed method contains a convolutional layer with a stride of 2 at the beginning. After passing through this layer, the spatial resolution of feature maps reduces to the half of the input size in both horizontal and vertical direction. The feature maps output from the first convolutional layer then go through several sequentially stacked residual blocks. The last convolutional layer takes the feature maps from the last residual block as an input and produces 4 feature maps of N×N. Finally, a shuffle layer is adopted to generate the filter image whose spatial resolution is the same as the input to the CNN, i.e., 2N×2N. Other details related to the network architecture are illustrated as below:

1. For all of convolutional layers, kernel size of 3×3 is used. For internal convolutional layers, number of feature maps is 96. For the activation function, PReLU is used.

2. Different groups of models are trained for I slice and B slice, respectively.

3. When training the CNN filters for intra slices, prediction and partition information are additionally fed into the network.

4. When training the CNN filters for inter slices, prediction information is additionally fed into the network.

In the third exemplary embodiment, each slice or block could determine whether to apply the CNN-based filter. When CNN-based filter is determined to be applied to a slice/block, which model from a candidate model list including three models could be further decided. Accordingly, given a test QP for coding a slice/block, denoted as q, the candidate model list includes three models corresponding to {q, q–5, q–10}. The selection process is based on the rate-distortion cost at the encoder side, and indication of on/off control as well as the model index, if needed, are signalled in the bitstream.

As shown in FIG. 17, QP is first tiled into a 2-dimensional array with a same size as the block to be filtered and then treated as an additional input plane. In addition, QP is fed into fully connected layers to be expanded into a 1-dimensional vector, whose elements will serve as the channel-wise scaling factors to recalibrate the feature maps.

The model selection granularity is dependent on resolution and QP. Larger block size is considered for higher resolution and larger QP.

The candidate model list is different across different temporal layers. For low temporal layers, the third candidate is replaced by the intra-slice NN filter model if the ratio of intra-coded samples is no smaller than a threshold. For high temporal layers, the third candidate, i.e., the q–10 model is replaced by the q+5 model.

For all-intra configuration, model selection is disabled while on/off control is still preserved.

An open source machine learning framework, such as PyTorch, is useful for performing the inference of the proposed CNN filters in VTM. The network information in the inference stage is provided in Table 3-1 as suggested by S. Liu, A. Segall, E. Alshina, R.-L. Liao., "JVET common test conditions and evaluation procedures for neural network-based video coding technology," JVET-U2016.

TABLE 3-8

| | Network Information for NN-based Video Coding Tool Testing in Inference Stage Network Information in Inference Stage | |
|---|---|---|
| Mandatory | HW environment: | |
| | GPU Type | N/A |
| | Framework: | PyTorch v1.6 |
| | Number of GPUs per Task | 0 |
| | Total Parameter Number | 5.56M/model |
| | Parameter Precision (Bits) | 32 (F) |
| | Memory Parameter (MB) | ~22.6M/model, 4 models in total |
| | MAC (Giga) | 11624 (Input: 3840 × 2160) |
| Optional | Total Conv. Layers | 69 |
| | Total FC Layers | 10 |
| | Total Memory (MB) | |
| | Batch size: | 1 |
| | Patch size | 32 × 32, 64 × 64, 128 × 128, 256 × 256 |
| | Changes to network configuration or weights required to generate rate points | |
| | Peak Memory Usage | |
| | Other information: | |

PyTorch may also be used as the training platform. The DIV2K and BVI-DVC datasets (e.g., as described above) are adopted to train the CNN filters of I slices and B slices, respectively. A unified CNN model is trained to tackle different QP points. The network information in the training stage is provided in Table 3-2 as suggested by S. Liu, A. Segall, E. Alshina, R.-L. Liao., "JVET common test conditions and evaluation procedures for neural network-based video coding technology," JVET-U2016.

TABLE 3-9

| | Network Information for NN-based Video Coding Tool Testing in Training Stage Network Information in Training Stage | |
|---|---|---|
| Mandatory | GPU Type | GPU: Tesla-V100-SXM2-32GB |
| | Framework: | PyTorch v1.6 |
| | Number of GPUs per Task | 2 |
| | Epoch: | 90 |
| | Batch size: | 64 |
| | Training time: | 120 h/model |
| | Training data information: | DIV2K, BVI-DVC |
| | Training configurations for generating compressed training data (if different to VTM CTC): | VTM-9.0, QP {17, 22, 27, 32, 37, 42} |
| | Loss function: | L1, L2 |
| Optional | Number of iterations | |
| | Patch size | 128 × 128 |
| | Learning rate: | 1e-4 |
| | Optimizer: | ADAM |
| | Preprocessing: | |
| | Other information: | |

The proposed CNN-based in-loop filtering method is tested on top of VTM-11.0, as described above, according to the common test conditions defined above. Deblocking filtering and SAO are disabled while ALF (and CCALF) is placed after the proposed CNN-based filtering. Test results are shown in Table 1-4 through Table 3-5. Under AI configurations, the proposed method demonstrates BD-rate reductions for Y, Cb, and Cr. Under RA configurations, the proposed method demonstrates BD-rate reductions for Y, Cb, and Cr. Under LDB configurations, the proposed method demonstrates BD-rate reductions for Y, Cb, and Cr.

TABLE 3-10

Performance of the proposed method on top of VTM11.0 (RA)

| | RA | | | | |
|---|---|---|---|---|---|
| | Y | U | V | EncT | DecT |
| Class A1 | | | | | |
| Class A2 | | | | | |
| Class B | | | | | |
| Class C | –12.14% | –23.57% | –23.47% | 218% | 28362% |
| Class E | | | | | |
| Overall | | | | | |
| Class D | –13.79% | –24.15% | –23.65% | 208% | 25445% |
| Class F | –6.09% | –12.85% | –12.34% | 389% | 14745% |

TABLE 3-4

Performance of the proposed method on top of VTM11.0 (LDB)

| | LDB | | | | |
|---|---|---|---|---|---|
| | Y | U | V | EncT | DecT |
| Class A1 | | | | | |
| Class A2 | | | | | |
| Class B | | | | | |
| Class C | | | | | |
| Class E | | | | | |
| Overall | | | | | |
| Class D | | | | | |
| Class F | | | | | |

TABLE 3-5

| Performance of the proposed method on top of VT11.0 (AI) | | | | | |
|---|---|---|---|---|---|
| | AI | | | | |
| | Y | U | V | EncT | DecT |
| Class A1 | | | | | |
| Class A2 | | | | | |
| Class B | | | | | |
| Class C | | | | | |
| Class E | | | | | |
| Overall | | | | | |
| Class D | | | | | |
| Class F | | | | | |

A fourth exemplary embodiment is discussed. In the fourth exemplary embodiment, changes, modifications, and/or improvements to a current AVS specification are described. In the following tables, such changes, modifications, and/or improvements are shown to text by italics indicating cancelled text and underline indicating added text, with respect to the AVS specification.

TABLE 4-1

| Sequence Header. | |
|---|---|
| Sequence Header Definition | Descriptor |
| sequence_header( ) { | |
|   video_sequence_start_code | f(32) |
|   profile_id | u(8) |
|   level_id | u(8) |
|   progressive_sequence | u(1) |
|   field_coded_sequence | u(1) |
|   library_stream_flag | u(1) |
|   if (! LibraryStreamFlag) { | |
|     library_picture_enable_flag | u(1) |
|     if (LibraryPictureEnableFlag) { | |
|       duplicate_sequence_header_flag | u(1) |
|     } | |
|   } | |
|   marker_bit | f(1) |
|   horizontal_size | u(14) |
|   marker_bit | f(1) |
|   vertical_size | u(14) |
|   chroma_format | u(2) |
|   sample_precision | u(3) |
|   if (profile_id == 0x22 || profile_id == 0x32) { | |
|     encoding_precision | u(3) |
|   } | |
|   marker_bit | f(1) |
|   aspect_ratio | u(4) |
|   frame_rate_code | u(4) |
|   marker_bit | f(1) |
|   bit_rate_lower | u(18) |
|   marker_bit | f(1) |
|   bit_rate_upper | u(12) |
|   low_delay | u(1) |
|   temporal_id_enable_flag | u(1) |
|   marker_bit | f(1) |
|   bbv_buffer_size | u(18) |
|   marker_bit | f(1) |
|   max_dpb_minus1 | u(4) |
|   rpl1_index_exist_flag | u(1) |
|   rpl1_same_as_rpl0_flag | u(1) |
|   marker_bit | f(1) |
|   num_ref_pic_list_set[0] | ue(v) |
|   for (j = 0; j < NumRefPicListSet[0]; j++) { | |
|     reference_picture_list_set(0, j) | |
|   } | |
|   if (! Rpl1SameAsRpl0Flag) { | |
|     num_ref_pic_list_set[1] | ue(v) |
|     for (j = 0; j < NumRefPicListSet[1]; j++) { | |
|       reference_picture_list_set(1, j) | |
|     } | |
|   } | |

TABLE 4-1-continued

| Sequence Header. | |
|---|---|
| Sequence Header Definition | Descriptor |
|   num_ref_default_active_minus1[0] | ue(v) |
|   num_ref_default_active_minus1[1] | ue(v) |
|   log2_lcu_size_minus2 | u(3) |
|   log2_min_cu_size_minus2 | u(2) |
|   log2_max_part_ratio_minus2 | u(2) |
|   max_split_times_minus6 | u(3) |
|   log2_min_qt_size_minus2 | u(3) |
|   log2_max_bt_size_minus2 | u(3) |
|   log2_max_eqt_size_minus3 | u(2) |
|   marker_bit | f(1) |
|   weight_quant_enable_flag | u(1) |
|   if (WeightQuantEnableFlag) | |
|   { | |
|     load_seq_weight_quant_data_flag | u(1) |
|     if (load_seq_weight_quant_data_flag == '1') { | |
|       weight_quant_matrix( ) | |
|     } | |
|   } | |
|   st_enable_flag | u(1) |
|   sao_enable_flag | u(1) |
|   alf_enable_flag | u(1) |
|   affine_enable_flag | u(1) |
|   smvd_enable_flag | u(1) |
|   ipcm_enable_flag | u(1) |
|   amvr_enable_flag | u(1) |
|   num_of_hmvp_cand | u(4) |
|   umve_enable_flag | u(1) |
|   if ((NumOfHmvpCand != 0) && AmvrEnableFlag) { | |
|     emvr_enable_flag | u(1) |
|   } | |
|   intra_pf_enable_flag | u(1) |
|   tscpm_enable_flag | u(1) |
|   marker_bit | f(1) |
|   dt_enable_flag | u(1) |
|   if (DtEnableFlag) { | |
|     log2_max_dt_size_minus4 | u(2) |
|   } | |
|   pbt_enable_flag | u(1) |
|   EipmEnableFlag = 0 | |
|   MipfEnableFlag = 0 | |
|   IntraPfChromaEnableFlag = 0 | |
|   UmveEnhancementEnableFlag = 0 | |
|   AffineUmveEnableFlag = 0 | |
|   SbTmvpEnableFlag = 0 | |
|   SrccEnableFlag = 0 | |
|   EnhancedStEnableFlag = 0 | |
|   EnhancedTscpmEnableFlag = 0 | |
|   MaecEnableFlag = 0 | |
|   if (profile_id == 0x30 || profile_id == 0x32) { | |
|     <u>cnnlf_enable_flag</u> | <u>u(1)</u> |
|     <u>EipmEnableFlag = 1</u> | |
|     pmc_enable_flag | u(1) |
|     if (TscpmEnableFlag) { | |
|       EnhancedTscpmEnableFlag = 1 | |
|     } | |
|     iip_enable_flag | u(1) |
|     sawp_enable_flag | u(1) |
|     MipfEnableFlag = 1 | |
|     if (IntraPfEnableFlag) { | |
|       IntraPfChromaEnableFlag = 1 | |
|     } | |
|     if (UmveEnableFlag) { | |
|       UmveEnhancementEnableFlag = 1 | |
|     } | |
|     if (AffineEnableFlag) { | |
|       AffineUmveEnableFlag = 1 | |
|     } | |
|     if (AffineEnableFlag) { | |
|       sp_enable_flag | u(1) |
|     } | |
|     awp_enable_flag | u(1) |
|     SbTmvpEnableFlag = 1 | |
|     etmvp_mvap_enable_flag | u(1) |
|     dmvr_enable_flag | u(1) |
|     bio_enable_flag | u(1) |

TABLE 4-1-continued

Sequence Header.

| Sequence Header Definition | Descriptor |
|---|---|
| bgc_enable_flag | u(1) |
| inter_pf_enable_flag | u(1) |
| inter_pc_enable_flag | u(1) |
| obmc_enable_flag | u(1) |
| if (StEnableFlag) { | |
| EnhancedStEnableFlag = 1 | |
| } | |
| sbt_enable_flag | u(1) |
| ist_enable_flag | u(1) |
| SrccEnableFlag = 1 | |
| MaecEnableFlag = 1 | |
| esao_enable_flag | u(1) |
| ccsao_enable_flag | u(1) |
| if (EsaoEnableFlag) { | |
| SaoEnableFlag = 0 | |
| } | |
| if (AlfEnableFlag) { | |
| ealf_enable_flag | u(1) |
| } | |
| ibc_enable_flag | u(1) |
| isc_enable_flag | u(1) |
| if (IbcEnableFlag \|\| IscEnableFlag) { | |
| num_of_intra_hmvp_cand | u(4) |
| } | |
| fimc_enable_flag | u(1) |
| } | |
| if (low_delay == '0') | |
| output_reorder_delay | u(5) |
| cross_patch_loop_filter_enable_flag | u(1) |
| ref_colocated_patch_flag | u(1) |
| stable_patch_flag | u(1) |
| if (stable_patch_flag == '1') { | |
| uniform_patch_flag | u(1) |
| if (uniform_patch_flag == '1') { | |
| marker_bit | f(1) |
| patch_width_minus1 | ue(v) |
| patch_height_minus1 | ue(v) |
| } | |
| } | |
| reserved_bits | r(2) |
| next_start_code( ) | |
| } | |

TABLE 4-2

Intra Picture Header

| Intra Picture Header Definition | Descriptor |
|---|---|
| intra_picture_header( ) { | |
| intra_picture_start_code | f(32) |
| bbv_delay | u(32) |
| time_code_flag | u(1) |
| if (time_code_flag == '1') | |
| time_code | u(24) |
| decode_order_index | u(8) |
| if (LibraryStreamFlag) | |
| library_picture_index | ue(v) |
| if (temporal_id_enable_flag == '1') | |
| temporal_id | u(3) |
| if (low_delay == '0') | |
| picture_output_delay | ue(v) |
| if (low_delay == '1') | |
| bbv_check_times | ue(v) |
| progressive_frame | u(1) |
| if (progressive_frame == '0') | |
| picture_structure | u(1) |
| top_field_first | u(1) |
| repeat_first_field | u(1) |
| if (field_coded_sequence == '1') { | |
| top_field_picture_flag | u(1) |
| reserved_bits | r(1) |
| } | |

TABLE 4-2-continued

Intra Picture Header

| Intra Picture Header Definition | Descriptor |
|---|---|
| ref_pic_list_set_flag[0] | u(1) |
| if (RefPicListSetFlag[0]) { | |
| if (NumRefPicListSet[0] > 1) { | |
| ref_pic_list_set_index[0] | ue(v) |
| } | |
| } | |
| else { | |
| reference_picture_list_set(0, NumRefPicListSet[0]) | |
| } | |
| if (Rpl1IndexExistFlag) | |
| ref_pic_list_set_flag[1] | u(1) |
| if (RefPicListSetFlag[1]) { | |
| if (Rpl1IndexExistFlag && NumRefPicListSet[1] > 1) { | |
| ref_pic_list_set_index[1] | ue(v) |
| } | |
| } | |
| else { | |
| reference_picture_list_set(1, NumRefPicListSet[1]) | |
| } | |
| fixed_picture_qp_flag | u(1) |
| picture_qp | u(7) |
| if ((! FixedPictureQpFlag) && (profile_id == 0x32 \|\| | |
| profile_id == 0x30)) { | |
| cu_delta_qp_flag | u(1) |
| if (CuDeltaQpFlag) { | |
| cu_qp_group_size_log2_minus3 | u(2) |
| } | |
| } | |
| deblocking_filter_disable_flag | u(1) |
| if (! DeblckingFilterDisableFlag) { | |
| if (profile_id == 0x32 \|\| profile_id == 0x30) { | |
| deblocking_filter_type | u(1) |
| } | |
| deblocking_filter_parameter_flag | u(1) |
| if ( deblocking_filter_parameter_flag == '1' ) { | |
| alpha_c_offset | se(v) |
| beta_offset | se(v) |
| } | |
| if (profile_id == 0x32 \|\| profile_id == 0x30) { | |
| picture_dbr_v_enable_flag | u(1) |
| if (PictureDbrVEnableFlag) { | |
| dbr_v_offset0_minus1 | u(2) |
| dbr_v_offset1_minus1 | u(2) |
| } | |
| picture_alt_dbr_v_enable_flag | u(1) |
| if (PictureAltDbrVEnableFlag) { | |
| dbr_v_alt_offset0_minus1 | u(2) |
| dbr_v_alt_offset1_minus1 | u(2) |
| } | |
| if (PictureDbrVEnableFlag \|\| | |
| PictureAltDbrVEnableFlag) { | |
| dbr_v_threshold_minus1 | u(1) |
| } | |
| picture_dbr_h_enable_flag | u(1) |
| if (PictureDbrHEnableFlag) { | |
| dbr_h_offset0_minus1 | u(2) |
| dbr_h_offset1_minus1 | u(2) |
| } | |
| picture_alt_dbr_h_enable_flag | u(1) |
| if (PictureAltDbrHEnableFlag) { | |
| dbr_h_alt_offset0_minus1 | u(2) |
| dbr_h_alt_offset1_minus1 | u(2) |
| } | |
| if (PictureDbrHEnableFlag \|\| | |
| PictureAltDbrHEnableFlag) { | |
| dbr_h_threshold_minus1 | u(1) |
| } | |
| } | |
| } | |
| chroma_quant_param_disable_flag | u(1) |
| if (chroma_quant_param_disable_flag == '0') { | |
| chroma_quant_param_delta_cb | se(v) |
| chroma_quant_param_delta_cr | se(v) |
| } | |
| if (WeightQuantEnableFlag) { | |
| picture_weight_quant_enable_flag | u(1) |

TABLE 4-2-continued

Intra Picture Header

| Intra Picture Header Definition | Descriptor |
|---|---|
| if (PictureWeightQuantEnableFlag) { | |
|     picture_weight_quant_data_index | u(2) |
|     if (picture_weight_quant_data_index == '01') { | |
|         reserved_bits | r(1) |
|         weight_quant_param_index | u(2) |
|         weight_quant_model | u(2) |
|         if (weight_quant_param_index == '01') { | |
|             for ( i=0; i<6; i++ ) { | |
|                 weight_quant_param_delta1[i] | se(v) |
|             } | |
|         } | |
|         if (weight_quant_param_index == '10') { | |
|             for ( i=0; i<6; i++ ) { | |
|                 weight_quant_param_delta2[i] | se(v) |
|             } | |
|         } | |
|     } | |
|     else if (picture_weight_quant_data_index == '10') { | |
|         weight_quant_matrix( ) | |
|     } | |
| } | |
| if (EsaoEnableFlag) { | |
|     esao_parameter_picture_header_set( ) | |
| } | |
| if (CcsaoEnableFlag) { | |
|     ccsao_parameter_picture_header_set( ) | |
| } | |
| if (AlfEnableFlag) { | |
|     for (compIdx=0; compIdx<3; compIdx++) { | |
|         picture_alf_enable_flag[compIdx] | u(1) |
|     } | |
|     if (PictureAlfEnableFlag[0] == 1 \|\| | |
| PictureAlfEnableFlag[1] == 1 \|\| | |
| PictureAlfEnableFlag[2] == 1) { | |
|         alf_parameter_set( ) | |
|     } | |
| } | |
| if (CnnlfEnableFlag) { | |
|     for (compIdx=0; compIdx<3; compIdx++) { | |
|         picture_cnnlf_enable_flag[comIdx] | u(1) |
|         if (PictureCnnlfEnableFlag[comIdx]) { | |
|             picture_cnnlf_set_index [comIdx] | u(2)(2) |
|         } | |
|     } | |
| } | |
| } | |
| ... | |

TABLE 4-3

Inter Picture Header.

| Inter Picture Header Definition | Descriptor |
|---|---|
| inter_picture_header( ) { | |
|     inter_picture_start_code | f(32) |
|     random_access_decodable_flag | u(1) |
|     bbv_delay | u(32) |
|     picture_coding_type | u(2) |
|     decode_order_index | u(8) |
|     if (temporal_id_enable_flag == '1') | |
|         temporal_id | u(3) |
|     if (low_delay == '0') | |
|         picture_output_delay | ue(v) |
|     if (low_delay == '1') | |
|         bbv_check_times | ue(v) |
|     progressive_frame | u(1) |
|     if (progressive_frame == '0') { | |
|         picture_structure | u(1) |
|     } | |
|     top_field_first | u(1) |
|     repeat_first_field | u(1) |

TABLE 4-3-continued

Inter Picture Header.

| Inter Picture Header Definition | Descriptor |
|---|---|
|     if (field_coded_sequence == '1') { | |
|         top_field_picture_flag | u(1) |
|         reserved_bits | r(1) |
|     } | |
|     ref_pic_list_set_flag[0] | u(1) |
|     if (RefPicListSetFlag[0]) { | |
|         if ( NumRefPicListSet[0] > 1 ) { | |
|             ref_pic_list_set_index[0] | ue(v) |
|         } | |
|     } | |
|     else { | |
|         reference_picture_list_set(0, NumRefPicListSet[0]) | |
|     } | |
|     if (Rpl1IndexExistFlag) | |
|         ref_pic_list_set_flag[1] | u(1) |
|     if (RefPicListSetFlag[1]) { | |
|         if (Rpl1IndexExistFlag && NumRefPicListSet[1] > 1) { | |
|             ref_pic_list_set_index[1] | ue(v) |
|         } | |
|     } | |
|     else { | |
|         reference_picture_list_set(1, NumRefPicListSet[1]) | |
|     } | |
|     num_ref_active_override_flag | u(1) |
|     if (num_ref_active_override_flag == '1') | |
|         num_ref_active_minus1[0] | ue(v) |
|         if (picture_coding_type == '10') | |
|             num_ref_active_minus1[1] | ue(v) |
|     } | |
|     fixed_picture_qp_flag | u(1) |
|     picture_qp | u(7) |
|     if ((! FixedPictureQpFlag) && (profile_id == 0x32 \|\| | |
| profile_id == 0x30)) { | |
|         cu_delta_qp_flag | u(1) |
|         if (CuDeltaQpFlag) { | |
|             cu_qp_group_size_log2_minus3 | u(2) |
|         } | |
|     } | |
|     if (! ((picture_coding_type == '10') && | |
| (PictureStructure == 1))) | |
|         reserved_bits | r(1) |
|     deblocking_filter_disable_flag | u(1) |
|     if (! DeblockingFilterDisableFlag) { | |
|         if (profile_id == 0x32 \|\| profile_id == 0x30) { | |
|             deblocking_filter_type | u(1) |
|         } | |
|         deblocking_filter_parameter_flag | u(1) |
|         if (deblocking_filter_parameter_flag == '1') { | |
|             alpha_c_offset | se(v) |
|             beta_offset | se(v) |
|         } | |
|         if (profile_id == 0x32 \|\| profile_id == 0x30) { | |
|             picture_dbr_v_enable_flag | u(1) |
|             if (PictureDbrVEnableFlag) { | |
|                 dbr_v_offset0_minus1 | u(2) |
|                 dbr_v_ offset1_minus1 | u(2) |
|             } | |
|             picture_alt_dbr_v_enable_flag | u(1) |
|             if (PictureAltDbrVEnableFlag) { | |
|                 dbr_v_alt_offset0_minus1 | u(2) |
|                 dbr_v_alt_offset1_minus1 | u(2) |
|             } | |
|             if (PictureDbrVEnableFlag \|\| | |
| PictureAltDbrVEnableFlag) { | |
|                 dbr_v_threshold_minus1 | u(1) |
|             } | |
|             picture_dbr_h_enable_flag | u(1) |
|             if (PictureDbrHEnableFlag) { | |
|                 dbr_h_offset0_minus1 | u(2) |
|                 dbr_h_ offset1_minus1 | u(2) |
|             } | |
|             picture_alt_dbr_h_enable_flag | u(1) |
|             if (PictureAltDbrHEnableFlag) { | |
|                 dbr_h_alt_offset0_minus1 | u(2) |
|                 dbr_h_alt_offset1_minus1 | u(2) |
|             } | |

TABLE 4-3-continued

| Inter Picture Header. | |
| --- | --- |
| Inter Picture Header Definition | Descriptor |
| if (PictureDbrHEnableFlag \|\| | |
| PictureAltDbrHEnableFlag) { | |
| dbr_h_threshold_minus1 | u(1) |
| } | |
| } | |
| } | |
| chroma_quant_param_disable_flag | u(1) |
| if (chroma_quant_param_disable_flag == '0') { | |
| chroma_quant_param_delta_cb | se(v) |
| chroma_quant_param_delta_cr | se(v) |
| } | |
| if (WeightQuantEnableFlag) { | |
| picture_weight_quant_enable_flag | u(1) |
| if (PictureWeightQuantEnableFlag) { | |
| picture_weight_quant_data_index | u(2) |
| if (picture_weight_quant_data_index == '01') { | |
| reserved_bits | r(1) |
| weight_quant_param_index | u(2) |
| weight_quant_model | u(2) |
| if (weight_quant_param_index == '01') { | |
| for (i=0; i<6; i++) { | |
| weight_quant_param_delta1[i] | se(v) |
| } | |
| } | |
| if (weight_quant_param_index == '10') { | |
| for (i=0; i<6; i++) { | |
| weight_quant_param_delta2[i] | se(v) |
| } | |
| } | |
| } | |
| else if (picture_weight_quant_data_index == '10') { | |
| weight_quant_matrix( ) | |
| } | |
| } | |
| } | |
| if (EsaoEnableFlag) { | |
| esao_parameter_picture_header_set( ) | |
| } | |
| if (CcsaoEnableFlag) { | |
| ccsao_parameter_picture_header_set( ) | |
| } | |
| if (AlfEnableFlag) { | |
| for (compIdx=0; compIdx<3; compIdx++) { | |
| picture_alf_enable_flag[compIdx] | u(1) |
| } | |
| if (PictureAlfEnableFlag[0] == 1 \|\| | |
| PictureAlfEnableFlag[1] == 1 \|\| | |
| PictureAlfEnableFlag[2] == 1) { | |
| alf_parameter_set( ) | |
| } | |
| } | |
| if (CnnlfEnableFlag) { | |
| for (compIdx=0; compIdx>3; compIdx++) { | |
| picture_cnnlf_enable_flag[comIdx] | u(1) |
| if (PictureCnnlfEnableFlag[comIdx]) { | |
| picture_cnnlf_set_index[comIdx] | u(2) |
| } | |
| } | |
| } | |
| } | |
| } | |
| ... | |

TABLE 4-4

| Patch. | |
| --- | --- |
| Patch Definition | Descriptor |
| patch( ) { | |
| patch_start_code | f(32) |
| if (! FixedPictureQpFlag) { | |
| fixed_patch_qp_flag | u(1) |

TABLE 4-4-continued

| Patch. | |
| --- | --- |
| Patch Definition | Descriptor |
| patch_qp | u(7) |
| } | |
| if (SaoEnableFlag) { | |
| for (compIdx=0; compIdx<3; compIdx++) { | |
| patch_sao_enable_flag[compIdx] | u(1) |
| } | |
| } | |
| while (! byte_aligned( )) | |
| aec_byte_alignment_bit | f(1) |
| do { | |
| if (! FixedQP) { | |
| if (! CuDeltaQpFlag) { | |
| lcu_qp_delta | ae(v) |
| } | |
| PreviousDeltaQP = lcu_qp_delta | |
| } | |
| if (SaoEnableFlag) { | |
| if (PatchSaoEnableFlag[0] \|\| PatchSaoEnableFlag[1] \|\| | |
| PatchSaoEnableFlag[2]) { | |
| if (MergeFlagExist) | |
| sao_merge_type_index | ae(v) |
| if (SaoMergeMode == 'SAO_NON_MERGE') { | |
| for (compIdx=0; compIdx<3; compIdx++) { | |
| if (PatchSaoEnableFlag[compIdx]) { | |
| sao_mode[compIdx] | ae(v) |
| if (SaoMode[compIdx] == | |
| 'SAO_Interval') { | |
| for (j=0; j<MaxOffsetNumber; j++) { | |
| sao_interval_offset_abs[compIdx][j] | ae(v) |
| if (SaoIntervalOffsetAbs[compIdx][j]) | |
| sao_interval_offset_sign[compIdx][j] | ae(v) |
| } | |
| sao_interval_start_pos[compIdx] | ae(v) |
| sao_interval_delta_pos_minus2 | ae(v) |
| [compIdx] | |
| } | |
| if (SaoMode[compIdx] == 'SAO_Edge') { | |
| for (j=0; j<MaxOffsetNumber; j++) | |
| sao_edge_offset[compIdx][j] | ae(v) |
| sao_edge_type[compIdx] | ae(v) |
| } | |
| } | |
| } | |
| } | |
| } | |
| } | |
| if (EsaoEnableFlag) { | |
| for(compIdx=0; compIdx<3; compIdx++) { | |
| if (PictureEsaoEnableFlag[compIdx] && | |
| PictureEsaoLcuControlFlag[compIdx]) { | |
| esao_lcu_enable_flag[compIdx][LcuIdx] | ae(v) |
| if (EsaoLcuEnableFlag[compIdx] | |
| [LcuIdx] && | |
| PictureEsaoSetNum[compIdx]>1) { | |
| esao_lcu_set_index[compIdx][LcuIdx] | ae(v) |
| } | |
| } | |
| } | |
| } | |
| if (CcsaoEnableFlag) { | |
| for(compIdx=1; compIdx<3; compIdx++) { | |
| if (PictureCcsaoEnableFlag[compIdx] && | |
| PictureCcsaoLcuControlFlag[compIdx]) { | |
| ccsao_lcu_enable_flag[compIdx][LcuIdx] | ae(v) |
| if (CcsaoLcuEnableFlag[compIdx] | |
| [LcuIdx] && | |
| PictureCcsaoSetNum[compIdx]>1){ | |
| ccsao_lcu_set_index[compIdx][LcuIdx] | ae(v) |
| } | |
| } | |
| } | |
| } | |
| for (compIdx=0; compIdx<3; compIdx++) { | |
| if (PictureAlfEnableFlag[compIdx] == 1) | |
| alf_lcu_enable_flag[compIdx][LcuIdx] | ae(v) |
| } | |

TABLE 4-4-continued

| Patch. | |
| --- | --- |
| Patch Definition | Descriptor |
| for (compIdx=0; compIdx<3; compIdx++) { | |
|    cnnlf_lcu_flag[compIdx][LcuIdx] | |
|      if (cnnlf_lcu_flag[compIdx][LcuIdx] && | |
|      picture_cnnlf_set_index[compIdx] == 3) ) | |
|       cnnlf_lcu_set_index[compIdx][LcuIdx] | ae(v) |
| } | |
| x0 = (LcuIdx % PictureWidthInLcu) * LcuSize | |
| y0 = (LcuIdx / PictureWidthInLcu) * LcuSize | |
| Component = 0 | |
| coding_unit_tree(x0, y0, 0, 1<<LcuSizeInBit, | |
| 1<<LcuSizeInBit, 1, 'PRED_No_Constraint') | |
| aec_lcu_stuffing_bit | ae(v) |
| } while (! is_end_of_patch( )) | |
| next_start_code( ) | |
| patch_end_code | f(32) |
| } | |

A fifth exemplary embodiment is discussed. In the fifth exemplary embodiment, changes, modifications, and/or improvements to a current AVS specification are described. In the following tables, such changes, modifications, and/or improvements are shown to text by italics indicating cancelled text and underline indicating added text, with respect to the AVS specification.

TABLE 5-1

| Sequence Header. | |
| --- | --- |
| Sequence header definition | Descriptor |
| sequence_header( ) { | |
| video_sequence_start_code | f(32) |
| profile_id | u(8) |
| level_id | u(8) |
| progressive_sequence | u(1) |
| field_coded_sequence | u(1) |
| library_stream_flag | u(1) |
| if (! LibraryStreamFlag) { | |
| library_picture_enable_flag | u(1) |
| if (LibraryPictureEnableFlag) { | |
| duplicate_sequence_header_flag | u(1) |
| } | |
| } | |
| marker_bit | f(1) |
| horizontal_size | u(14) |
| marker_bit | f(1) |
| vertical_size | u(14) |
| chroma_format | u(2) |
| sample_precision | u(3) |
| if (profile_id == 0x22 || profile_id == 0x32) { | |
| encoding_precision | u(3) |
| } | |
| marker_bit | f(1) |
| aspect_ratio | u(4) |
| frame_rate_code | u(4) |
| marker_bit | f(1) |
| bit_rate_lower | u(18) |
| marker_bit | f(1) |
| bit_rate_upper | u(12) |
| low_delay | u(1) |
| temporal_id_enable_flag | u(1) |
| marker_bit | f(1) |
| bbv_buffer_size | u(18) |
| marker_bit | f(1) |
| max_dpb_minus1 | u(4) |
| rpl1_index_exist_flag | u(1) |
| rpl1_same_as_rpl0_flag | u(1) |
| marker_bit | f(1) |
| num_ref_pic_list_set[0] | ue(v) |
| for (j = 0; j < NumRefPicListSet[0]; j++) { | |
| reference_picture_list_set(0, j) | |
| } | |

TABLE 5-1-continued

| Sequence Header. | |
| --- | --- |
| Sequence header definition | Descriptor |
| if (! Rpl1SameAsRp10Flag) { | |
| num_ref_pic_list_set[1] | ue(v) |
| for (j = 0; j < NumRefPicListSet[1]; j++) { | |
| reference_picture_list_set(1, j) | |
| } | |
| } | |
| num_ref_default_active_minus1[0] | ue(v) |
| num_ref_default_active_minus1[1] | ue(v) |
| log2_lcu_size_minus2 | u(3) |
| log2_min_cu_size_minus2 | u(2) |
| log2_max_part_ratio_minus2 | u(2) |
| max_split_times_minus6 | u(3) |
| log2_min_qt_size_minus2 | u(3) |
| log2_max_bt_size_minus2 | u(3) |
| log2_max_eqt_size_minus3 | u(2) |
| marker_bit | f(1) |
| weight_quant_enable_flag | u(1) |
| if (WeightQuantEnableFlag) | |
| { | |
| load_seq_weight_quant_data_flag | u(1) |
| if (load_seq_weight_quant_data_flag == '1') { | |
| weight_quant_matrix( ) | |
| } | |
| } | |
| st_enable_flag | u(1) |
| sao_enable_flag | u(1) |
| alf_enable_flag | u(1) |
| affine_enable_flag | u(1) |
| smvd_enable_flag | u(1) |
| ipcm_enable_flag | u(1) |
| amvr_enable_flag | u(1) |
| num_of_hmvp_cand | u(4) |
| umve_enable_flag | u(1) |
| if ((NumOfHmvpCand != 0) && AmvrEnableFlag) { | |
| emvr_enable_flag | u(1) |
| } | |
| intra_pf_enable_flag | u(1) |
| tscpm_enable_flag | u(1) |
| marker_bit | f(1) |
| dt_enable_flag | u(1) |
| if (DtEnableFlag) { | |
| log2_max_dt_size_minus4 | u(2) |
| } | |
| pbt_enable_flag | u(1) |
| EipmEnableFlag = 0 | |
| MipfEnableFlag = 0 | |
| IntraPfChromaEnableFlag = 0 | |
| UmveEnhancementEnableFlag = 0 | |
| AffineUmveEnableFlag = 0 | |
| SbTmvpEnableFlag = 0 | |
| SrccEnableFlag = 0 | |
| EnhancedStEnableFlag = 0 | |
| EnhancedTscpmEnableFlag = 0 | |
| MaecEnableFlag = 0 | |
| if (profile_id == 0x30 || profile_id == 0x32) { | |
| EipmEnableFlag = 1 | |
| pmc_enable_flag | u(1) |
| if (TscpmEnableFlag) { | |
| EnhancedTscpmEnableFlag = 1 | |
| } | |
| iip_enable_flag | u(1) |
| sawp_enable_flag | u(1) |
| MipfEnableFlag = 1 | |
| if (IntraPfEnableFlag) { | |
| IntraPfChromaEnableFlag = 1 | |
| } | |
| if (UmveEnableFlag) { | |
| UmveEnhancementEnableFlag = 1 | |
| } | |
| if (AffineEnableFlag) { | |
| AffineUmveEnableFlag = 1 | |
| } | |
| if (AffineEnableFlag) { | |
| sp_enable_flag | u(1) |
| } | |
| awp_enable_flag | u(1) |

TABLE 5-1-continued

Sequence Header.

| Sequence header definition | Descriptor |
|---|---|
| SbTmvpEnableFlag = 1 | |
| etmvp_mvap_enable_flag | u(1) |
| dmvr_enable_flag | u(1) |
| bio_enable_flag | u(1) |
| bgc_enable_flag | u(1) |
| inter_pf_enable_flag | u(1) |
| inter_pc_enable_flag | u(1) |
| obmc_enable_flag | u(1) |
| if (StEnableFlag) { | |
|   EnhancedStEnableFlag = 1 | |
| } | |
| sbt_enable_flag | u(1) |
| ist_enable_flag | u(1) |
| SrccEnableFlag = 1 | |
| MaecEnableFlag = 1 | |
| esao_enable_flag | u(1) |
| ccsao_enable_flag | u(1) |
| if (EsaoEnableFlag) { | |
|   SaoEnableFlag = 0 | |
| } | |
| if (AlfEnableFlag) { | |
|   ealf_enable_flag | u(1) |
| } | |
| ibc_enable_flag | u(1) |
| isc_enable_flag | u(1) |
| if (IbcEnableFlag ‖ IscEnableFlag) { | |

TABLE 5-1-continued

Sequence Header.

| Sequence header definition | Descriptor |
|---|---|
|   num_of_intra_hmvp_cand | u(4) |
| } | |
| fimc_enable_flag | u(1) |
| alternative_tool_set | u(8) |
| if (AlternativeFilterEnableFlag) | |
| { | |
|   num_of_alternative_filter_minus1 | ue(v) |
| } | |
| } | |
| if (low_delay == '0') | |
|   output_reorder_delay | u(5) |
| cross_patch_loop_filter_enable_flag | u(1) |
| ref_colocated_patch_flag | u(1) |
| stable_patch_flag | u(1) |
| if (stable_patch_flag == '1') { | |
|   uniform_patch_flag | u(1) |
|   if (uniform_patch_flag == '1') { | |
|     marker_bit | f(1) |
|     patch_width_minus1 | ue(v) |
|     patch_height_minus1 | ue(v) |
|   } | |
| } | |
| reserved_bits | r(2) |
| next_start_code( ) | |
| } | |

TABLE 5-2

Intra Picture Header.

| Intra prediction picture header definition | Descriptor |
|---|---|
| intra_picture_header( ) { | |
|   intra_picture_start_code | f(32) |
|   bbv_delay | u(32) |
|   time_code_flag | u(1) |
|   if (time_code_flag == '1') | |
|     time_code | u(24) |
|   decode_order_index | u(8) |
|   if (LibraryStreamFlag) | |
|     library_picture_index | ue(v) |
|   if (temporal_id_enable_flag == '1') | |
|     temporal_id | u(3) |
|   if (low_delay == '0') | |
|     picture_output_delay | ue(v) |
|   if (low_delay == '1') | |
|     bbv_check_times | ue(v) |
|   progressive_frame | u(1) |
|   if (progressive_frame == '0') | |
|     picture_structure | u(1) |
|   top_field_first | u(1) |
|   repeat_first_field | u(1) |
|   if (field_coded_sequence == '1') { | |
|     top_field_picture_flag | u(1) |
|     reserved_bits | r(1) |
|   } | |
|   ref_pic_list_set_flag[0] | u(1) |
|   if (RefPicListSetFlag[0]) { | |
|     if (NumRefPicListSet[0] > 1) { | |
|       ref_pic_list_set_index[0] | ue(v) |
|     } | |
|   } | |
|   else { | |
|     reference_picture_list_set(0, NumRefPicListSet[0]) | |
|   } | |
|   if (Rpl1IndexExistFlag) | |
|     ref_pic_list_set_flag[1] | u(1) |
|   if (RefPicListSetFlag[1]) { | |
|     if (Rpl1IndexExistFlag && NumRefPicListSet[1] > 1) { | |
|       ref_pic_list_set_index[1] | ue(v) |
|     } | |
|   } | |
|   else { | |

TABLE 5-2-continued

| Intra Picture Header. | |
| --- | --- |
| Intra prediction picture header definition | Descriptor |

```
        reference_picture_list_set(1, NumRefPicListSet[1])
    }
    fixed_picture_qp_flag                                              u(1)
    picture_qp                                                        u(7)
    if ((! FixedPictureQpFlag) && (profile_id == 0x32 || profile_id == 0x30))
{
        cu_delta_qp_flag                                             u(1)
        if (CuDeltaQpFlag) {
            cu_qp_group_size_log2_minus3                             u(2)
        }
    }
    deblocking_filter_disable_flag                                   u(1)
    if (! DeblckingFilterDisableFlag) {
        if (profile_id == 0x32 || profile_id == 0x30) {
            deblocking_filter_type                                  u(1)
        }
        deblocking_filter_parameter_flag                            u(1)
        if ( deblocking_filter_parameter_flag == '1' ) {
            alpha_c_offset                                          se(v)
            beta_offset                                             se(v)
        }
        if (profile_id == 0x32 || profile_id == 0x30) {
            picture_dbr_v_enable_flag                               u(1)
            if (PictureDbrVEnableFlag) {
                dbr_v_offset0_minus1                                u(2)
                dbr_v_offset1_minus1                                u(2)
            }
            picture_alt_dbr_v_enable_flag                          u(1)
            if (PictureAltDbrVEnableFlag) {
                dbr_v_alt_offset0_minus1                            u(2)
                dbr_v_alt_offset1_minus1                            u(2)
            }
            if (PictureDbrVEnableFlag || PictureAltDbrVEnableFlag) {
                dbr_v_threshold_minus1                              u(1)
            }
            picture_dbr_h_enable_flag                              u(1)
            if (PictureDbrHEnableFlag) {
                dbr_h_offset0_minus1                                u(2)
                dbr_h_offset1_minus1                                u(2)
            }
            picture_alt_dbr_h_enable_flag                          u(1)
            if (PictureAltDbrHEnableFlag) {
                dbr_h_alt_offset0_minus1                            u(2)
                dbr_h_alt_offset1_minus1                            u(2)
            }
            if (PictureDbrHEnableFlag || PictureAltDbrHEnableFlag) {
                dbr_h_threshold_minus1                              u(1)
            }
        }
    }
    chroma_quant_param_disable_flag                                 u(1)
    if (chroma_quant_param_disable_flag == '0') {
        chroma_quant_param_delta_cb                                 se(v)
        chroma_quant_param_delta_cr                                 se(v)
    }
    if (WeightQuantEnableFlag) {
        picture_weight_quant_enable_flag                            u(1)
        if (PictureWeightQuantEnableFlag) {
            picture_weight_quant_data_index                         u(2)
            if (picture_weight_quant_data_index == '01') {
                reserved_bits                                       r(1)
                weight_quant_param_index                            u(2)
                weight_quant_model                                  u(2)
                if (weight_quant_param_index == '01') {
                    for ( i=0; i<6; i++ ) {
                        weight_quant_param_delta1[i]                se(v)
                    }
                }
                if (weight_quant_param_index == '10') {
                    for ( i=0; i<6; i++ ) {
                        weight_quant_param_delta2[i]                se(v)
                    }
                }
            }
            else if (picture_weight_quant_data_index == '10') {
                weight_quant_matrix( )
```

TABLE 5-2-continued

Intra Picture Header.

| Intra prediction picture header definition | Descriptor |
|---|---|
| ` }` | |
| ` }` | |
| `}` | |
| `if (EsaoEnableFlag) {` | |
| ` esao_parameter_picture_header_set( )` | |
| `}` | |
| `if (CcsaoEnableFlag) {` | |
| ` ccsao_parameter_picture_header_set( )` | |
| `}` | |
| `if (AlfEnableFlag) {` | |
| ` for (compIdx=0; compIdx<3; compIdx++) {` | |
| ` ``picture_alf_enable_flag[compIdx]` | u(1) |
| ` }` | |
| ` if (PictureAlfEnableFlag[0] == 1 \|\| PictureAlfEnableFlag[1] == 1 \|\|` | |
| `PictureAlfEnableFlag[2] == 1) {` | |
| ` alf_parameter_set( )` | |
| ` }` | |
| `}` | |
| `if (SawpEnableFlag) {` | |
| ` ``picture_awp_refine_index` | u(1) |
| `}` | |
| `if (IbcEnableFlag) {` | |
| ` ``picture_ibc_enable_flag` | u(1) |
| ` if (PictureIbcEnableFlag && 序列级 SIBC) {` | |
| ` ``picture_sibc_enable_flag` | u(1) |
| ` }` | |
| `}` | |
| `if (IscEnableFlag) {` | |
| ` ``picture_isc_os_enable_flag` | u(1) |
| ` ``picture_isc_evs_ubvs_enable_flag` | u(1) |
| `}` | |
| `if (FimcEnableFlag) {` | |
| ` ``picture_fimc_enable_flag` | u(1) |
| `}` | |
| `if (IstEnableFlag) {` | |
| ` ``picture_ts_enable_flag` | u(1) |
| `}` | |
| `if (PmcEnableFlag){` | |
| ` ``picture_pmc_param_index` | u(1) |
| `}` | |
| `if (AlternativeFilterEnableFlag) {` | |
| ` for (compIdx=0; compIdx<3; compIdx++) {` | |
| ` ``picture_alternative_filter_enable_flag[comIdx]` | u(1) |
| ` if (PictureAlternativeFilterEnableFlag[comIdx]) {` | |
| ` ``picture_alternative_filter_adaptive_flag[comIdx]` | u(1) |
| ` if (PictureAlternativeFilterAdaptiveFlag[comIdx] == 0 && )` | |
| ` if (NumOfAlternativeFilter > 1)` | |
| ` ``picture_alternative_filter_set_index[comIdx]` | ue(v) |
| ` }` | |
| ` }` | |
| ` }` | |
| ` }` | |
| ` }` | |
| `}` | |
| `next_start_code( )` | |
| `}` | |

TABLE 5-3

Inter Picture Header.

| Inter prediction picture header definition | Descriptor |
|---|---|
| `inter_picture_header( ) {` | |
| ` ``inter_picture_start_code` | f(32) |
| ` ``random_access_decodable_flag` | u(1) |
| ` ``bbv_delay` | u(32) |
| ` ``picture_coding_type` | u(2) |
| ` ``decode_order_index` | u(8) |
| ` if (temporal_id_enable_flag == '1')` | |
| ` ``temporal_id` | u(3) |
| ` if (low_delay == '0')` | |
| ` ``picture_output_delay` | ue(v) |
| ` if (low_delay == '1')` | |

TABLE 5-3-continued

| Inter Picture Header. | |
| --- | --- |
| Inter prediction picture header definition | Descriptor |
|     bbv_check_times | ue(v) |
| progressive_frame | u(1) |
| if (progressive_frame == '0') { | |
|     picture_structure | u(1) |
| } | |
| top_field_first | u(1) |
| repeat_first_field | u(1) |
| if (field_coded_sequence == '1') { | |
|     top_field_picture_flag | u(1) |
|     reserved_bits | r(1) |
| } | |
| ref_pic_list_set_flag[0] | u(1) |
| if (RefPicListSetFlag[0]) { | |
|   if ( NumRefPicListSet[0] > 1 ) { | |
|       ref_pic_list_set_index[0] | ue(v) |
|   } | |
| } | |
| else { | |
|   reference_picture_list_set(0, NumRefPicListSet[0]) | |
| } | |
| if (Rpl1IndexExistFlag) | |
|     ref_pic_list_set_flag[1] | u(1) |
| if (RefPicListSetFlag[1]) { | |
|   if (Rpl1IndexExistFlag && NumRefPicListSet[1] > 1) { | |
|       ref_pic_list_set_index[1] | ue(v) |
|   } | |
| } | |
| else { | |
|   reference_picture_list_set(1, NumRefPicListSet[1]) | |
| } | |
| num_ref_active_override_flag | u(1) |
| if (num_ref_active_override_flag == '1') | |
|     num_ref_active_minus1[0] | ue(v) |
|   if (picture_coding_type == '10') | |
|       num_ref_active_minus1[1] | ue(v) |
| } | |
| fixed_picture_qp_flag | u(1) |
| picture_qp | u(7) |
| if ((! FixedPictureQpFlag) && (profile_id == 0x32 ‖ profile_id == 0x30)) { | |
|     cu_delta_qp_flag | u(1) |
|   if (CuDeltaQpFlag) { | |
|       cu_qp_group_size_log2_minus3 | u(2) |
|   } | |
| } | |
| if (! ((picture_coding_type == '10') && (PictureStructure == 1))) | |
|     reserved_bits | r(1) |
| deblocking_filter_disable_flag | u(1) |
| if (! DeblockingFilterDisableFlag) { | |
|   if (profile_id == 0x32 ‖ profile_id == 0x30) { | |
|     deblocking_filter_type | u(1) |
|   } | |
|   deblocking_filter_parameter_flag | u(1) |
|   if (deblocking_filter_parameter_flag == '1') { | |
|     alpha_c_offset | se(v) |
|     beta_offset | se(v) |
|   } | |
|   if (profile_id == 0x32 ‖ profile_id == 0x30) { | |
|     picture_dbr_v_enable_flag | u(1) |
|     if (PictureDbrVEnableFlag) { | |
|       dbr_v_offset0_minus1 | u(2) |
|       dbr_v_ offset1_minus1 | u(2) |
|     } | |
|     picture_alt_dbr_v_enable_flag | u(1) |
|     if (PictureAltDbrVEnableFlag) { | |
|       dbr_v_alt_offset0_minus1 | u(2) |
|       dbr_v_alt_offset1_minus1 | u(2) |
|     } | |
|     if (PictureDbrVEnableFlag ‖ PictureAltDbrVEnableFlag) { | |
|       dbr_v_threshold_minus1 | u(1) |
|     } | |
|     picture_dbr_h_enable_flag | u(1) |
|     if (PictureDbrHEnableFlag) { | |
|       dbr_h_offset0_minus1 | u(2) |
|       dbr_h_ offset1_minus1 | u(2) |
|     } | |
|     picture_alt_dbr_h_enable_flag | u(1) |

TABLE 5-3-continued

Inter Picture Header.

| Inter prediction picture header definition | Descriptor |
|---|---|
| if (PictureAltDbrHEnableFlag) { | |
| dbr_h_alt_offset0_minus1 | u(2) |
| dbr_h_alt_offset1_minus1 | u(2) |
| } | |
| if (PictureDbrHEnableFlag \|\| PictureAltDbrHEnableFlag) { | |
| dbr_h_threshold_minus1 | u(1) |
| } | |
| } | |
| } | |
| chroma_quant_param_disable_flag | u(1) |
| if (chroma_quant_param_disable_flag == '0') { | |
| chroma_quant_param_delta_cb | se(v) |
| chroma_quant_param_delta_cr | se(v) |
| } | |
| if (WeightQuantEnableFlag) { | |
| picture_weight_quant_enable_flag | u(1) |
| if (PictureWeightQuantEnableFlag) { | |
| picture_weight_quant_data_index | u(2) |
| if (picture_weight_quant_data_index == '01') { | |
| reserved_bits | r(1) |
| weight_quant_param_index | u(2) |
| weight_quant_model | u(2) |
| if (weight_quant_param_index == '01') { | |
| for (i=0; i<6; i++) { | |
| weight_quant_param_delta1[i] | se(v) |
| } | |
| } | |
| if (weight_quant_param_index == '10') { | |
| for (i=0; i<6; i++) { | |
| weight_quant_param_delta2[i] | se(v) |
| } | |
| } | |
| } | |
| else if (picture_weight_quant_data_index == '10') { | |
| weight_quant_matrix( ) | |
| } | |
| } | |
| } | |
| if (EsaoEnableFlag) { | |
| esao_parameter_picture_header_set( ) | |
| } | |
| if (CcsaoEnableFlag) { | |
| ccsao_parameter_picture_header_set( ) | |
| } | |
| if (AlfEnableFlag) { | |
| for (compIdx=0; compIdx<3; compIdx++) { | |
| picture_alf_enable_flag[compIdx] | u(1) |
| } | |
| if (PictureAlfEnableFlag[0] == 1 \|\| PictureAlfEnableFlag[1] == 1 \|\| | |
| PictureAlfEnableFlag[2] == 1) { | |
| alf_parameter_set( ) | |
| } | |
| } | |
| if (AffineEnableFlag) { | |
| affine_subblock_size_flag | u(1) |
| } | |
| if (IbcEnableFlag) { | |
| picture_ibc_enable_flag | u(1) |
| } | |
| if (IscEnableFlag) { | |
| picture_isc_os_enable_flag | u(1) |
| picture_isc_evs_ubvs_enable_flag | u(1) |
| } | |
| if (FimcEnableFlag) { | |
| picture_fimc_enable_flag | u(1) |
| } | |
| if (IstEnableFlag \|\| SbtEnableFlag) { | |
| picture_ts_enable_flag | u(1) |
| } | |
| if ((AwpEnableFlag && PictureType == 2) \|\| SawpEnableFlag) { | |
| picture_awp_refine_index | u(1) |
| } | |
| if (UmveEnhancementEnableFlag) { | |
| picture_umve_step_set_index | u(1) |
| } | |
| if (ObmcEnableFlag && PictureType == 2) { | |

TABLE 5-3-continued

| Inter Picture Header. | |
| --- | --- |
| Inter prediction picture header definition | Descriptor |
| picture_obmc_blending_set_index | u(1) |
| } | |
| if (PmcEnableFlag){ | |
| picture_pmc_param_index | u(1) |
| } | |
| if (InterPcEnableFlag){ | |
| picture_inter_pc_skip_flag | u(1) |
| } | |
| next_start_code( ) | |
| if (AlternativeFilterEnableFlag) { | |
|   for (compIdx=0; compIdx<3; compIdx++) { | |
|     <u>picture_alternative_filter_enable_flag[comIdx]</u> | <u>u(1)</u> |
|     <u>if (PictureAlternativeFilterEnableFlag[comIdx]) {</u> | |
|       picture_alternative_filter_adaptive_flag[comIdx] | <u>u(1)</u> |
|       <u>if (PictureAlternativeFilterAdaptiveFlag[comIdx] == 0)</u> | |
|         if (NumOfAlternativeFilter > 1) | |
|         picture_alternative_filter_set_index[comIdx] | ue(v) |
|     <u>}</u> | |
|     <u>}</u> | |
|     <u>}</u> | |
|   <u>}</u> | |
| <u>}</u> | |
| } | |

TABLE 5-4

| Patch or slice. | |
| --- | --- |
| Slice Definition | Descriptor |
| patch( ) { | |
|   patch_start_code | f(32) |
|   if (! FixedPictureQpFlag) { | |
|     fixed_patch_qp_flag | u(1) |
|     patch_qp | u(7) |
|   } | |
|   if (SaoEnableFlag) { | |
|     for (compIdx=0; compIdx<3; compIdx++) { | |
|       patch_sao_enable_flag[compIdx] | u(1) |
|     } | |
|   } | |
|   while (! byte_aligned( )) | |
|     aec_byte_alignment_bit | f(1) |
|   do { | |
|     if (! FixedQP) { | |
|       if (! CuDeltaQpFlag) { | |
|         lcu_qp_delta | ae(v) |
|       } | |
|       PreviousDeltaQP = lcu_qp_delta | |
|     } | |
|     if (SaoEnableFlag) { | |
|       if (PatchSaoEnableFlag[0] \|\| PatchSaoEnableFlag[1] \|\| | |
|       PatchSaoEnableFlag[2]) { | |
|         if (MergeFlagExist) | |
|         sao_merge_type_index | ae(v) |
|         if (SaoMergeMode == 'SAO_NON_MERGE') { | |
|           for (compIdx=0; compIdx<3; compIdx++) { | |
|             if (PatchSaoEnableFlag[compIdx]) { | |
|               sao_mode[compIdx] | ae(v) |
|               if (SaoMode[compIdx] == 'SAO_Interval') { | |
|                 for (j=0; j<MaxOffsetNumber; j++) { | |
|                   sao_interval_offset_abs[compIdx] [j] | ae(v) |
|                   if (SaoIntervalOffsetAbs[compIdx][j]) | |
|                   sao_interval_offset_sign[compIdx][j] | ae(v) |
|                 } | |
|                 sao_interval_start_pos[compIdx] | ae(v) |
|                 sao_interval_delta_pos_minus2[compIdx] | ae(v) |
|               } | |
|               if (SaoMode[compIdx] == 'SAO_Edge') { | |
|                 for (j=0; j<MaxOffsetNumber; j++) | |
|                   sao_edge_offset[compIdx][j] | ae(v) |
|                 sao_edge_type[compIdx] | ae(v) |

TABLE 5-4-continued

| Patch or slice. | |
|---|---|
| Slice Definition | Descriptor |

```
            }
          }
        }
      }
    }
  }
  if (EsaoEnableFlag) {
    for(compIdx=0; compIdx<3; compIdx++) {
      if (PictureEsaoEnableFlag[compIdx] &&
      PictureEsaoLcuControlFlag[compIdx]) {
        esao_lcu_enable_flag[compIdx][LcuIdx]                    ae(v)
        if (EsaoLcuEnableFlag[compIdx][LcuIdx] &&
        PictureEsaoSetNum[compIdx]>1) {
          esao_lcu_set_index[compIdx][LcuIdx]                    ae(v)
        }
      }
    }
  }
  if (CcsaoEnableFlag) {
    for(compIdx=1; compIdx<3; compIdx++) {
      if (PictureCcsaoEnableFlag[compIdx] &&
      PictureCcsaoLcuControlFlag[compIdx]) {
        ccsao_lcu_enable_flag[compIdx][LcuIdx]                   ae(v)
        if (CcsaoLcuEnableFlag[compIdx][LcuIdx] &&
        PictureCcsaoSetNum[compIdx]>1){
          ccsao_lcu_set_index[compIdx][LcuIdx]                   ae(v)
        }
      }
    }
  }
  for (compIdx=0; compIdx<3; compIdx++) {
    if (PictureAlfEnableFlag[compIdx] == 1)
      alf_lcu_enable_flag[compIdx][LcuIdx]                       ae(v)
  }
  for (compIdx=0; compIdx<3; compIdx++) {
    if (pictureAlternativeFilterAdaptiveFlag[compIdx]) {
      alternative_filter_lcu_enable_flag[compIdx][LcuIdx]        ae(v)
      if (AlternativeFilterLcuEnableFlag[compIdx][LcuIdx]) {
        if (NumOfAlternativeFilter > 1)
          alternative_filter_lcu_set_index[compIdx][LcuId        ae(v)
x]
      }
    }
  }
  x0 = (LcuIdx % PictureWidthInLcu) * LcuSize
  y0 = (LcuIdx / PictureWidthInLcu) * LcuSize
  Component = 0
  coding_unit_tree(x0, y0, 0, 1<<LcuSizeInBit, 1<<LcuSizeInBit, 1,
  'PRED_No_Constraint')
  aec_lcu_stuffing_bit                                           ae(v)
} while (! is_end_of_patch( ))
next_start_code( )
patch_end_code                                                  f(32)
}
```

A sixth exemplary embodiment is discussed. In the sixth exemplary embodiment, changes, modifications, and/or improvements to a current AVS specification are described. In the following tables, such changes, modifications, and/or improvements are shown to text by italics indicating cancelled text and underline indicating added text, with respect to the AVS specification.

TABLE 6-1

| Sequence Header. | |
|---|---|
| Sequence header definition | Descriptor |
| sequence_header( ) { | |
| video_sequence_start_code | f(32) |

TABLE 6-1-continued

| Sequence Header. | |
|---|---|
| Sequence header definition | Descriptor |
| profile_id | u(8) |
| level_id | u(8) |
| progressive_sequence | u(1) |
| field_coded_sequence | u(1) |
| library_stream_flag | u(1) |
| if (! LibraryStreamFlag) { | |
| library_picture_enable_flag | u(1) |
| if (LibraryPictureEnableFlag) { | |
| duplicate_sequence_header_flag | u(1) |
| } | |
| } | |

TABLE 6-1-continued

Sequence Header.

| Sequence header definition | Descriptor |
|---|---|
| marker_bit | f(1) |
| horizontal_size | u(14) |
| marker_bit | f(1) |
| vertical_size | u(14) |
| chroma_format | u(2) |
| sample_precision | u(3) |
| if (profile_id == 0x22 ǁ profile_id == 0x32) { | |
|    encoding_precision | u(3) |
| } | |
| marker_bit | f(1) |
| aspect_ratio | u(4) |
| frame_rate_code | u(4) |
| marker_bit | f(1) |
| bit_rate_lower | u(18) |
| marker_bit | f(1) |
| bit_rate_upper | u(12) |
| low_delay | u(1) |
| temporal_id_enable_flag | u(1) |
| marker_bit | f(1) |
| bbv_buffer_size | u(18) |
| marker_bit | f(1) |
| max_dpb_minus1 | u(4) |
| rpl1_index_exist_flag | u(1) |
| rpl1_same_as_rpl0_flag | u(1) |
| marker_bit | f(1) |
| num_ref_pic_list_set[0] | ue(v) |
| for (j = 0; j < NumRefPicListSet[0]; j++) { | |
|    reference_picture_list_set(0, j) | |
| } | |
| if (! Rpl1SameAsRpl0Flag) { | |
|    num_ref_pic_list_set[1] | ue(v) |
|    for (j = 0; j < NumRefPicListSet[1]; j++) { | |
|       reference_picture_list_set(1, j) | |
|    } | |
| } | |
| num_ref_default_active_minus1[0] | ue(v) |
| num_ref_default_active_minus1[1] | ue(v) |
| log2_lcu_size_minus2 | u(3) |
| log2_min_cu_size_minus2 | u(2) |
| log2_max_part_ratio_minus2 | u(2) |
| max_split_times_minus6 | u(3) |
| log2_min_qt_size_minus2 | u(3) |
| log2_max_bt_size_minus2 | u(3) |
| log2_max_eqt_size_minus3 | u(2) |
| marker_bit | f(1) |
| weight_quant_enable_flag | u(1) |
| if (WeightQuantEnableFlag) | |
| { | |
|    load_seq_weight_quant_data_flag | u(1) |
|    if (load_seq_weight_quant_data_flag == '1') { | |
|       weight_quant_matrix( ) | |
|    } | |
| } | |
| st_enable_flag | u(1) |
| sao_enable_flag | u(1) |
| alf_enable_flag | u(1) |
| affine_enable_flag | u(1) |
| smvd_enable_flag | u(1) |
| ipcm_enable_flag | u(1) |
| amvr_enable_flag | u(1) |
| num_of_hmvp_cand | u(4) |
| umve_enable_flag | u(1) |
| if ((NumOfHmvpCand != 0) && AmvrEnableFlag) { | |
|    emvr_enable_flag | u(1) |
| } | |
| intra_pf_enable_flag | u(1) |
| tscpm_enable_flag | u(1) |
| marker_bit | f(1) |
| dt_enable_flag | u(1) |
| if (DtEnableFlag) { | |
|    log2_max_dt_size_minus4 | u(2) |
| } | |
| pbt_enable_flag | u(1) |
| EipmEnableFlag = 0 | |
| MipfEnableFlag = 0 | |
| IntraPfChromaEnableFlag = 0 | |

TABLE 6-1-continued

Sequence Header.

| Sequence header definition | Descriptor |
|---|---|
| UmveEnhancementEnableFlag = 0 | |
| AffineUmveEnableFlag = 0 | |
| SbTmvpEnableFlag = 0 | |
| SrccEnableFlag = 0 | |
| EnhancedStEnableFlag = 0 | |
| EnhancedTscpmEnableFlag = 0 | |
| MaecEnableFlag = 0 | |
| if (profile_id == 0x30 ǁ profile_id == 0x32) { | |
|    EipmEnableFlag = 1 | |
|    pmc_enable_flag | u(1) |
|    if (TscpmEnableFlag) { | |
|       EnhancedTscpmEnableFlag = 1 | |
|    } | |
|    iip_enable_flag | u(1) |
|    sawp_enable_flag | u(1) |
|    MipfEnableFlag = 1 | |
|    if (IntraPfEnableFlag) { | |
|       IntraPfChromaEnableFlag = 1 | |
|    } | |
|    if (UmveEnableFlag) { | |
|       UmveEnhancementEnableFlag = 1 | |
|    } | |
|    if (AffineEnableFlag) { | |
|       AffineUmveEnableFlag = 1 | |
|    } | |
|    if (AffineEnableFlag) { | |
|       sp_enable_flag | u(1) |
|    } | |
|    awp_enable_flag | u(1) |
|    SbTmvpEnableFlag = 1 | |
|    etmvp_mvap_enable_flag | u(1) |
|    dmvr_enable_flag | u(1) |
|    bio_enable_flag | u(1) |
|    bgc_enable_flag | u(1) |
|    inter_pf_enable_flag | u(1) |
|    inter_pc_enable_flag | u(1) |
|    obmc_enable_flag | u(1) |
|    if (StEnableFlag) { | |
|       EnhancedStEnableFlag = 1 | |
|    } | |
|    sbt_enable_flag | u(1) |
|    ist_enable_flag | u(1) |
|    SrccEnableFlag = 1 | |
|    MaecEnableFlag = 1 | |
|    esao_enable_flag | u(1) |
|    ccsao_enable_flag | u(1) |
|    if (EsaoEnableFlag) { | |
|       SaoEnableFlag = 0 | |
|    } | |
|    if (AlfEnableFlag) { | |
|       ealf_enable_flag | u(1) |
|    } | |
|    ibc_enable_flag | u(1) |
|    isc_enable_flag | u(1) |
|    if (IbcEnableFlag ǁ IscEnableFlag) { | |
|       num_of_intra_hmvp_cand | u(4) |
|    } | |
|    fimc_enable_flag | u(1) |
|    alternative_tool_set | u(8) |
|    if (AlternativeFilterEnableFlag) | |
|    { | |
|       num_of_alternative_filter_minus1 | ue(v) |
|    } | |
| } | |
| if (low_delay == '0') | |
|    output_reorder_delay | u(5) |
| cross_patch_loop_filter_enable_flag | u(1) |
| ref_colocated_patch_flag | u(1) |
| stable_patch_flag | u(1) |
| if (stable_patch_flag == '1') { | |
|    uniform_patch_flag | u(1) |
|    if (uniform_patch_flag == '1') { | |

TABLE 6-1-continued

| Sequence Header. | |
| --- | --- |
| Sequence header definition | Descriptor |
|     marker_bit | f(1) |
|     patch_width_minus1 | ue(v) |
|     patch_height_minus1 | ue(v) |
|   } | |
| } | |

TABLE 6-1-continued

| Sequence Header. | |
| --- | --- |
| Sequence header definition | Descriptor |
|     reserved_bits | r(2) |
|   next_start_code( ) | |
| } | |

TABLE 6-2

| Intra prediction picture header. | |
| --- | --- |
| Intra prediction picture header definition | Descriptor |
| intra_picture_header( ) { | |
|   intra_picture_start_code | f(32) |
|   bbv_delay | u(32) |
|   time_code_flag | u(1) |
|   if (time_code_flag == '1') | |
|     time_code | u(24) |
|   decode_order_index | u(8) |
|   if (LibraryStreamFlag) | |
|     library_picture_index | ue(v) |
|   if (temporal_id_enable_flag == '1') | |
|     temporal_id | u(3) |
|   if (low_delay == '0') | |
|     picture_output_delay | ue(v) |
|   if (low_delay == '1') | |
|     bbv_check_times | ue(v) |
|   progressive_frame | u(1) |
|   if (progressive_frame == '0') | |
|     picture_structure | u(1) |
|   top_field_first | u(1) |
|   repeat_first_field | u(1) |
|   if (field_coded_sequence == '1') { | |
|     top_field_picture_flag | u(1) |
|     reserved_bits | r(1) |
|   } | |
|   ref_pic_list_set_flag[0] | u(1) |
|   if (RefPicListSetFlag[0]) { | |
|     if (NumRefPicListSet[0] > 1) { | |
|       ref_pic_list_set_index[0] | ue(v) |
|     } | |
|   } | |
|   else { | |
|     reference_picture_list_set(0, NumRefPicListSet[0]) | |
|   } | |
|   if (Rpl1IndexExistFlag) | |
|     ref_pic_list_set_flag[1] | u(1) |
|   if (RefPicListSetFlag[1]) { | |
|     if (Rpl1IndexExistFlag && NumRefPicListSet[1] > 1) { | |
|       ref_pic_list_set_index[1] | ue(v) |
|     } | |
|   } | |
|   else { | |
|     reference_picture_list_set(1, NumRefPicListSet[1]) | |
|   } | |
|   fixed_picture_qp_flag | u(1) |
|   picture_qp | u(7) |
|   if ((! FixedPictureQpFlag) && (profile_id == 0x32 \|\| profile_id == 0x30)) { | |
|     cu_delta_qp_flag | u(1) |
|     if (CuDeltaQpFlag) { | |
|       cu_qp_group_size_log2_minus3 | u(2) |
|     } | |
|   } | |
|   deblocking_filter_disable_flag | u(1) |
|   if (! DeblckingFilterDisableFlag) { | |
|     if (profile_id == 0x32 \|\| profile_id == 0x30) { | |
|       deblocking_filter_type | u(1) |
|     } | |
|     deblocking_filter_parameter_flag | u(1) |
|     if ( deblocking_filter_parameter_flag == '1' ) { | |
|       alpha_c_offset | se(v) |
|       beta_offset | se(v) |
|     } | |
|     if (profile_id == 0x32 \|\| profile_id == 0x30) { | |

TABLE 6-2-continued

Intra prediction picture header.

| Intra prediction picture header definition | Descriptor |
| --- | --- |
| picture_dbr_v_enable_flag | u(1) |
| if (PictureDbrVEnableFlag) { | |
| dbr_v_offset0_minus1 | u(2) |
| dbr_v_ offset1_minus1 | u(2) |
| } | |
| picture_alt_dbr_v_enable_flag | u(1) |
| if (PictureAltDbrVEnableFlag) { | |
| dbr_v_alt_offset0_minus1 | u(2) |
| dbr_v_alt_offset1_minus1 | u(2) |
| } | |
| if (PictureDbrVEnableFlag ‖ PictureAltDbrVEnableFlag) { | |
| dbr_v_threshold_minus1 | u(1) |
| } | |
| picture_dbr_h_enable_flag | u(1) |
| if (PictureDbrHEnableFlag) { | |
| dbr_h_offset0_minus1 | u(2) |
| dbr_h_ offset1_minus1 | u(2) |
| } | |
| picture_alt_dbr_h_enable_flag | u(1) |
| if (PictureAltDbrHEnableFlag) { | |
| dbr_h_alt_offset0_minus1 | u(2) |
| dbr_h_alt_offset1_minus1 | u(2) |
| } | |
| if (PictureDbrHEnableFlag ‖ PictureAltDbrHEnableFlag) { | |
| dbr_h_threshold_minus1 | u(1) |
| } | |
| } | |
| } | |
| chroma_quant_param_disable_flag | u(1) |
| if (chroma_quant_param_disable_flag == '0') { | |
| chroma_quant_param_delta_cb | se(v) |
| chroma_quant_param_delta_cr | se(v) |
| } | |
| if (WeightQuantEnableFlag) { | |
| picture_weight_quant_enable_flag | u(1) |
| if (PictureWeightQuantEnableFlag) { | |
| picture_weight_quant_data_index | u(2) |
| if (picture_weight_quant_data_index == '01') { | |
| reserved_bits | r(1) |
| weight_quant_param_index | u(2) |
| weight_quant_model | u(2) |
| if (weight_quant_param_index == '01') { | |
| for ( i=0; i<6; i++ ) { | |
| weight_quant_param_delta1[i] | se(v) |
| } | |
| } | |
| if (weight_quant_param_index == '10') { | |
| for ( i=0; i<6; i++ ) { | |
| weight_quant_param_delta2[i] | se(v) |
| } | |
| } | |
| } | |
| else if (picture_weight_quant_data_index == '10') { | |
| weight_quant_matrix( ) | |
| } | |
| } | |
| } | |
| if (EsaoEnableFlag) { | |
| esao_parameter_picture_header_set( ) | |
| } | |
| if (CcsaoEnableFlag) { | |
| ccsao_parameter_picture_header_set( ) | |
| } | |
| if (AlfEnableFlag) { | |
| for (compIdx=0; compIdx<3; compIdx++) { | |
| picture_alf_enable_flag[compIdx] | u(1) |
| } | |
| if (PictureAlfEnableFlag[0] == 1 ‖ PictureAlfEnableFlag[1] == 1 ‖ | |
| PictureAlfEnableFlag[2] == 1) { | |
| alf_parameter_set( ) | |
| } | |
| } | |
| if (SawpEnableFlag) { | |
| picture_awp_refine_index | u(1) |
| } | |
| if (IbcEnableFlag) { | |

TABLE 6-2-continued

Intra prediction picture header.

| Intra prediction picture header definition | Descriptor |
|---|---|
|     picture_ibc_enable_flag | u(1) |
|     if (PictureIbcEnableFlag && 序列级 SIBC) { | |
|         picture_sibc_enable_flag | u(1) |
|     } | |
|   } | |
|   if (IscEnableFlag) { | |
|     picture_isc_os_enable_flag | u(1) |
|     picture_isc_evs_ubvs_enable_flag | u(1) |
|   } | |
|   if (FimcEnableFlag) { | |
|     picture_fimc_enable_flag | u(1) |
|   } | |
|   if (IstEnableFlag) { | |
|     picture_ts_enable_flag | u(1) |
|   } | |
|   if (PmcEnableFlag){ | |
|     picture_pmc_param_index | u(1) |
|   } | |
|   if (AlternativeFilterEnableFlag) { | |
|     for (compIdx=0; compIdx<3; compIdx++) { | |
|         picture_alternative_filter_enable_flag[comIdx] | u(1) |
|         if (PictureAlternativeFilterEnableFlag[comIdx]) { | |
|            picture_alternative_filter_adaptive_flag[comIdx] | u(1) |
|            if (PictureAlternativeFilterAdaptiveFlag[comIdx] == 0) | |
|              if (NumOfAlternativeFilter > 1) | |
|                picture_alternative_filter_set_index[comIdx] | ue(v) |
|         } | |
|       } | |
|     } | |
|   } | |
|   } | |
|   next_start_code( ) | |
| } | |

TABLE 6-3

Inter prediction picture header.

| Inter prediction picture header definition | Descriptor |
|---|---|
| inter_picture_header( ) { | |
|   inter_picture_start_code | f(32) |
|   random_access_decodable_flag | u(1) |
|   bbv_delay | u(32) |
|   picture_coding_type | u(2) |
|   decode_order_index | u(8) |
|   if (temporal_id_enable_flag == '1') | |
|     temporal_id | u(3) |
|   if (low_delay == '0') | |
|     picture_output_delay | ue(v) |
|   if (low_delay == '1') | |
|     bbv_check_times | ue(v) |
|   progressive_frame | u(1) |
|   if (progressive_frame == '0') { | |
|     picture_structure | u(1) |
|   } | |
|   top_field_first | u(1) |
|   repeat_first_field | u(1) |
|   if (field_coded_sequence == '1') { | |
|     top_field_picture_flag | u(1) |
|     reserved_bits | r(1) |
|   } | |
|   ref_pic_list_set_flag[0] | u(1) |
|   if (RefPicListSetFlag[0]) { | |
|     if ( NumRefPicListSet[0] > 1 ) { | |
|       ref_pic_list_set_index[0] | ue(v) |
|     } | |
|   } | |
|   else { | |
|     reference_picture_list_set(0, NumRefPicListSet[0]) | |
|   } | |
|   if (Rpl1IndexExistFlag) | |
|     ref_pic_list_set_flag[1] | u(1) |

TABLE 6-3-continued

Inter prediction picture header.

| Inter prediction picture header definition | Descriptor |
|---|---|
| if (RefPicListSetFlag[1]) { | |
| if (Rpl1IndexExistFlag && NumRefPicListSet[1] > 1) { | |
|   ref_pic_list_set_index[1] | ue(v) |
| } | |
| } | |
| else { | |
| reference_picture_list_set(1, NumRefPicListSet[1]) | |
| } | |
| num_ref_active_override_flag | u(1) |
| if (num_ref_active_override_flag == '1') | |
|   num_ref_active_minus1[0] | ue(v) |
|   if (picture_coding_type == '10') | |
|     num_ref_active_minus1[1] | ue(v) |
| } | |
| fixed_picture_qp_flag | u(1) |
| picture_qp | u(7) |
| if ((! FixedPictureQpFlag) && (profile_id == 0x32 \|\| profile_id == 0x30)) { | |
|   cu_delta_qp_flag | u(1) |
|   if (CuDeltaQpFlag) { | |
|     cu_qp_group_size_log2_minus3 | u(2) |
|   } | |
| } | |
| if (! ((picture_coding_type == '10') && (PictureStructure == 1))) | |
|   reserved_bits | r(1) |
| deblocking_filter_disable_flag | u(1) |
| if (! DeblockingFilterDisableFlag) { | |
|   if (profile_id == 0x32 \|\| profile_id == 0x30) { | |
|     deblocking_filter_type | u(1) |
|   } | |
|   deblocking_filter_parameter_flag | u(1) |
|   if (deblocking_filter_parameter_flag == '1') { | |
|     alpha_c_offset | se(v) |
|     beta_offset | se(v) |
|   } | |
|   if (profile_id == 0x32 \|\| profile_id == 0x30) { | |
|     picture_dbr_v_enable_flag | u(1) |
|     if (PictureDbrVEnableFlag) { | |
|       dbr_v_offset0_minus1 | u(2) |
|       dbr_v_ offset1_minus1 | u(2) |
|     } | |
|     picture_alt_dbr_v_enable_flag | u(1) |
|     if (PictureAltDbrVEnableFlag) { | |
|       dbr_v_alt_offset0_minus1 | u(2) |
|       dbr_v_alt_offset1_minus1 | u(2) |
|     } | |
|     if (PictureDbrVEnableFlag \|\| PictureAltDbrVEnableFlag) { | |
|       dbr_v_threshold_minus1 | u(1) |
|     } | |
|     picture_dbr_h_enable_flag | u(1) |
|     if (PictureDbrHEnableFlag) { | |
|       dbr_h_offset0_minus1 | u(2) |
|       dbr_h_ offset1_minus1 | u(2) |
|     } | |
|     picture_alt_dbr_h_enable_flag | u(1) |
|     if (PictureAltDbrHEnableFlag) { | |
|       dbr_h_alt_offset0_minus1 | u(2) |
|       dbr_h_alt_offset1_minus1 | u(2) |
|     } | |
|     if (PictureDbrHEnableFlag \|\| PictureAltDbrHEnableFlag) { | |
|       dbr_h_threshold_minus1 | u(1) |
|     } | |
|   } | |
| } | |
| chroma_quant_param_disable_flag | u(1) |
| if (chroma_quant_param_disable_flag == '0') { | |
|   chroma_quant_param_delta_cb | se(v) |
|   chroma_quant_param_delta_cr | se(v) |
| } | |
| if (WeightQuantEnableFlag) { | |
|   picture_weight_quant_enable_flag | u(1) |
|   if (PictureWeightQuantEnableFlag) { | |
|     picture_weight_quant_data_index | u(2) |
|     if (picture_weight_quant_data_index == '01') { | |
|       reserved_bits | r(1) |
|       weight_quant_param_index | u(2) |
|       weight_quant_model | u(2) |

TABLE 6-3-continued

Inter prediction picture header.

| Inter prediction picture header definition | Descriptor |
|---|---|

```
        if (weight_quant_param_index == '01') {
            for (i=0; i<6; i++) {
                weight_quant_param_delta1[i]                          se(v)
            }
        }
        if (weight_quant_param_index == '10') {
            for (i=0; i<6; i++) {
                weight_quant_param_delta2[i]                          se(v)
            }
        }
    }
    else if (picture_weight_quant_data_index == '10') {
        weight_quant_matrix( )
    }
  }
}
if (EsaoEnableFlag) {
  esao_parameter_picture_header_set( )
}
if (CcsaoEnableFlag) {
  ccsao_parameter_picture_header_set( )
}
if (AlfEnableFlag) {
    for (compIdx=0; compIdx<3; compIdx++) {
        picture_alf_enable_flag[compIdx]                              u(1)
    }
    if (PictureAlfEnableFlag[0] == 1 || PictureAlfEnableFlag[1] == 1 ||
    PictureAlfEnableFlag[2] == 1) {
        alf_parameter_set( )
    }
}
if (AffineEnableFlag) {
    affine_subblock_size_flag                                         u(1)
}
if (IbcEnableFlag) {
    picture_ibc_enable_flag                                           u(1)
}
if (IscEnableFlag) {
    picture_isc_os_enable_flag                                        u(1)
    picture_isc_evs_ubvs_enable_flag                                  u(1)
}
if (FimcEnableFlag) {
    picture_fimc_enable_flag                                          u(1)
}
if (IstEnableFlag || SbtEnableFlag) {
    picture_ts_enable_flag                                            u(1)
}
if ((AwpEnableFlag && PictureType == 2) || SawpEnableFlag) {
    picture_awp_refine_index                                          u(1)
}
if (UmveEnhancementEnableFlag) {
    picture_umve_step_set_index                                       u(1)
}
if (ObmcEnableFlag && PictureType == 2) {
    picture_obmc_blending_set_index                                   u(1)
}
if (PmcEnableFlag){
    picture_pmc_param_index                                           u(1)
}
if (InterPcEnableFlag){
    picture_inter_pc_skip_flag                                        u(1)
}
next_start_code( )
if (AlternativeFilterEnableFlag) {
    for (compIdx=0; compIdx<3; compIdx++) {
        picture_alternative_filter_enable_flag[comIdx]                u(1)
        if (PictureAlternativeFilterEnableFlag[comIdx]) {
            picture_alternative_filter_adaptive_flag[comIdx]          u(1)
            if (PictureAlternativeFilterAdaptiveFlag[comIdx] == 0)
                if (NumOfAlternativeFilter > 1)
                    picture_alternative_filter_set_index[comIdx]      ue(v)
        }
    }
}
```

TABLE 6-3-continued

| Inter prediction picture header. | |
| --- | --- |
| Inter prediction picture header definition | Descriptor |
|     }<br>  }<br>} | |

TABLE 6-4

| Patch or slice. | |
| --- | --- |
| Slice Definition | Descriptor |
| patch( ) { | |
|   patch_start_code | f(32) |
|   if (! FixedPictureQpFlag) { | |
|     fixed_patch_qp_flag | u(1) |
|     patch_qp | u(7) |
|   } | |
|   if (SaoEnableFlag) { | |
|     for (compIdx=0; compIdx<3; compIdx++) { | |
|       patch_sao_enable_flag[compIdx] | u(1) |
|     } | |
|   } | |
|   while (! byte_aligned( )) | |
|     aec_byte_alignment_bit | f(1) |
|   do { | |
|     if (! FixedQP) { | |
|       if (! CuDeltaQpFlag) { | |
|         lcu_qp_delta | ae(v) |
|       } | |
|       PreviousDeltaQP = lcu_qp_delta | |
|     } | |
|     if (SaoEnableFlag) { | |
|       if (PatchSaoEnableFlag[0] \|\| PatchSaoEnableFlag[1] \|\| | |
|       PatchSaoEnableFlag[2]) { | |
|         if (MergeFlagExist) | |
|           sao_merge_type_index | ae(v) |
|         if (SaoMergeMode == 'SAO_NON_MERGE') { | |
|           for (compIdx=0; compIdx<3; compIdx++) { | |
|             if (PatchSaoEnableFlag[compIdx]) { | |
|               sao_mode[compIdx] | ae(v) |
|               if (SaoMode[compIdx] == 'SAO_Interval') { | |
|                 for (j=0; j<MaxOffsetNumber; j++) { | |
|                   sao_interval_offset_abs[compIdx][j] | ae(v) |
|                   if (SaoIntervalOffsetAbs[compIdx][j]) | |
|                     sao_interval_offset_sign[compIdx][j] | ae(v) |
|                 } | |
|               sao_interval_start_pos[compIdx] | ae(v) |
|               sao_interval_delta_pos_minus2[compIdx] | ae(v) |
|              } | |
|              if (SaoMode[compIdx] == 'SAO_Edge') { | |
|                 for (j=0; j<MaxOffsetNumber; j++) | |
|               sao_edge_offset[compIdx][j] | ae(v) |
|               sao_edge_type[compIdx] | ae(v) |
|              } | |
|             } | |
|            } | |
|           } | |
|         } | |
|       } | |
|     } | |
|     if (EsaoEnableFlag) { | |
|       for(compIdx=0; compIdx<3; compIdx++) { | |
|         if (PictureEsaoEnableFlag[compIdx] && | |
|         PictureEsaoLcuControlFlag[compIdx]) { | |
|           esao_lcu_enable_flag[compIdx][LcuIdx] | ae(v) |
|           if (EsaoLcuEnableFlag[compIdx][LcuIdx] && | |
|           PictureEsaoSetNum[compIdx]>1) { | |
|             esao_lcu_set_index[compIdx][LcuIdx] | ae(v) |
|           } | |
|         } | |
|       } | |
|     } | |
|     if (CcsaoEnableFlag) { | |
|       for(compIdx=1; compIdx<3; compIdx++) { | |
|         if (PictureCcsaoEnableFlag[compIdx] && | |

TABLE 6-4-continued

Patch or slice.

| Slice Definition | Descriptor |
|---|---|
| PictureCcsaoLcuControlFlag[compIdx]) { | |
|     ccsao_lcu_enable_flag[compIdx][LcuIdx] | ae(v) |
|     if (CcsaoLcuEnableFlag[compIdx][LcuIdx] && | |
|     PictureCcsaoSetNum[compIdx]>1){ | |
|         ccsao_lcu_set_index[compIdx][LcuIdx] | ae(v) |
|     } | |
|     } | |
|   } | |
| } | |
| for (compIdx=0; compIdx<3; compIdx++) { | |
|   if (PictureAlfEnableFlag[compIdx] == 1) | |
|     alf_lcu_enable_flag[compIdx][LcuIdx] | ae(v) |
| } | |
| for (compIdx=0; compIdx<3; compIdx++) { | |
|   if (pictureAlternativeFilterAdaptiveFlag[compIdx]) { | |
|     b[compIdx][LcuIdx] | ae(v) |
|     if (AlternativeFilterLcuEnableFlag[compIdx][LcuIdx]) { | |
|       if (NumOfAlternativeFilter > 1) | |
|         alternative_filter_lcu_set_index[compIdx][LcuIdx] | ae(v) |
|     } | |
|   } | |
|   } | |
| } | |
| x0 = (LcuIdx % PictureWidthInLcu) * LcuSize | |
| y0 = (LcuIdx / PictureWidthInLcu) * LcuSize | |
| Component = 0 | |
| coding_unit_tree(x0, y0, 0, 1<<LcuSizeInBit, 1<<LcuSizeInBit, 1, | |
| 'PRED_No_Constraint') | |
| aec_lcu_stuffing_bit | ae(v) |
| } while (! is_end_of_patch( )) | |
| next_start_code( ) | |
| patch_end_code | f(32) |
| } | |

The sequence header is discussed, in which enhanced temporal motion vector prediction and motion vector angle prediction enable flag etmvp_mvap_enable_flag may be a binary variable. A value of '1' indicates that enhanced temporal motion vector prediction and motion vector angle prediction can be used; a value of '0' Vindicates that enhanced temporal motion vector prediction and motion vector angle prediction should not be used. The value of EtmvpMvapEnableFlag is equal to the value of etmvp_mvap_enable_flag. If etmvp_mvap_enable_flag does not exist in the bitstream, the value of EtmvpMvapEnableFlag is 0.

In this sixth exemplary embodiment, an alternative toolset is represented as alternative_tool_set, which may be an 8-bit unsigned integer. This identifies whether to use optional tools. If alternative_tool_set is not present in the bitstream, the value of alternative_tool_set shall be '00000000'. A value of '1' in the last bit of alternative_tool_set indicates that selective filtering can be used; a value of '0' in the last bit of alternative_tool_set indicates that selective filtering should not be used. The value of AlternativeFilterEnableFlag is equal to the value of alternative_tool_set & 0x01. If alternative_tool_set does not exist in the bitstream, the value of AlternativeFilterEnableFlag is equal to 0. Other bits are reserved.

A selective filter model number is discussed, which may be represented as num_of_alternative_filter_minus1, which indicates the number of filter models available for selective filtering. The parsing process is described further below. The value of NumOfAlternativeFilter is equal to the value of num_of_alternative_filter_minus1 plus 1. The value of NumOfAlternativeFilter is equal to 0 if num_of_alternative_filter_minus1 is not present in the bitstream.

An enhanced adaptive correction filter is discussed, which may be represented as enable flag ealf_enable_flag, which can be a binary variable. A value of '1' indicates that enhanced adaptive correction filtering should be used; a value of '0' indicates that enhanced adaptive correction filtering should not be used. The value of EalfEnableFlag is equal to the value of ealf_enable_flag. If ealf_enable_flag is not present in the bitstream, the value of EalfEnableFlag is 0.

The intra picture header/inter picture header are discussed. The picture-level adaptive correction filtering enable flag (e.g., picture_alf_enable_flag[compIdx]) may be a binary variable. A value of '1' indicates that adaptive correction filtering can be used for the compIdx-th component of the current image; a value of '0' indicates that adaptive correction filtering should not be used for the compIdx-th component of the current image. The value of PictureAlfEnableFlag[compIdx] is equal to the value of picture_alf_enable_flag[compIdx].

The picture picture-level selective filtering enable flag (e.g., picture_alternative_filter_enable_flag[compIdx]) may be a binary variable. A value of '1' indicates that the compIdx-th component of the current image can be filtered by a neural network; a value of '0' means that the compIdx-th component of the current image should not be filtered by a neural network. The value of PictureAlternativeFilterEnableFlag[compIdx] is equal to the value of picture_alternative_filter_enable_flag[compIdx]. If picture_alternative_filter_enable_flag[compIdx] does not exist in the bitstream, the value of PictureAlternativeFilterEnableFlag[compIdx] is 0.

In this sixth exemplary embodiment, the picture-level selective filter adaptive flag (e.g., picture_alternative_filter_adaptive_flag[compIdx]) may be a binary variable. A value of '1' indicates that adaptive selective filtering can be used for the compIdx-th component of the current image; a value of '0' indicates that adaptive selective filtering should not be used for the compIdx-th component of the current image. The value of PictureAlternativeFilterAdaptiveFlag[compIdx] is equal to the value of picture_alternative_filter_adaptive_flag[compIdx]. If picture_alternative_filter_adaptive_flag[compIdx] does not exist in the bitstream, the value of PictureAlternativeFilterAdaptiveFlag[compIdx] is 0.

The picture-level selective filter model index (e.g., picture_alternative_filter_set_index[compIdx]) indicates the model index of the compIdx-th component of the current image using selective filtering. The value of PictureAlternativeFilterSetIndex[compIdx] is equal to the value of picture_alternative_filter_set_index[compIdx]. A parsing process is described further below. If picture_alternative_filter_set_index[compIdx] does not exist in the bitstream, the value of PictureAlternativeFilterSetIndex[compIdx] is −1.

The picture level block copy intra prediction enable flag (e.g., picture_ibc_enable_flag) may be a binary variable. A value of '1' indicates that the current picture can use block copy intra prediction; a value of '0' indicates that the current picture should not use block copy intra prediction. The value of PictureIbcEnableFlag is equal to the value of picture_ibc_enable_flag. If picture_ibc_enable_flag does not exist in the bitstream, the value of PictureIbcEnableFlag is 0.

Pieces and/or slices are described further. The maximum coding unit adaptive correction filter enable flag (e.g., alf_lcu_enable_flag[compIdx][LcuIdx]) may be a binary variable. A value of '1' indicates that the samples of the LcuIdx-th LCU compIdx component should use adaptive modification filtering; a value of '0' indicates that the samples of the LcuIdx-th LCU compIdx component should not use adaptive modification filtering. The value of AlfLCUEnableFlag[compIdx][LcuIdx] is equal to the value of alf_lcu_enable_flag[compIdx][LcuIdx].

The maximum coding unit selective filtering enable flag (e.g., alternative_filter_lcu_enable_flag[compIdx][LcuIdx]) may be a binary variable. A value of '1' indicates that the samples of the LcuIdx-th largest coding unit compIdx component should use selective filtering; a value of '0' indicates that the samples of the LcuIdx-th largest coding unit compIdx component should not use neural network filtering. The parsing process is described further below. The value of AlternativeFilterLcuEnableFlag[compIdx][LcuIdx] is equal to the value of alternative_filter_lcu_enable_flag[compIdx][LcuIdx]. If alternative_filter_lcu_enable_flag[compIdx][LcuIdx] does not exist in the bitstream, the value of AlternativeFilterLcuEnableFlag[compIdx][LcuIdx] is 0.

In this sixth exemplary embodiment, the maximum coding unit neural network filter model index (e.g., alternative_filter_lcu_set_index[compIdx][LcuIdx]) indicates the model index of the selective filtering used by the samples of the LcuIdx largest coding unit compIdx component, (the parsing processes of which is described further below), and the value range is 0 to NumOfAlternativeFilter−1. The value of AlternativeFilterLCUSetIndex[compIdx][LcuIdx] is equal to the value of alternative_filter_lcu_set_index[compIdx][LcuIdx]. If alternative_filter_lcu_set_index[compIdx][LcuIdx] does not exist in the bitstream, the value of AlternativeFilterLCUSetIndex[compIdx][LcuIdx] is −1.

An advanced entropy coding maximum coding unit stuffing bit (e.g., aec_lcu_stuffing_bit) includes one or more padding bits. The value of the unit aec_lcu_stuffing_bit of the last largest coding unit of the slice shall be '1', and the parsing procedure is described further below.

Various parsing processes are now described. When parsing k-order exponential Golomb code, firstly look for the first non-zero bit from the current position of the bit stream, record the number of zero bits found as leadingZeroBits, and then calculate CodeNum according to leadingZeroBits. Described in pseudocode as follows:

```
leadingZeroBits = −1
for (b=0; ! b; leadingZeroBits++) {
  b = read_bits(1)
}
CodeNum = 2^{leadingZeroBits+k} − 2^k + read_bits(leadingZeroBits + k)
```

Table 6-5 gives the structure of exponential Golomb codes of order 0, 1, 2 and 3. The bit string of Exponential Golomb code is divided into two parts: "prefix" and "suffix". The prefix consists of leadingZeroBits consecutive '0's and a '1'. The suffix consists of leadingZeroBits+k bits, that is, the xi string in the table, and the value of xi is '0' or '1'.

TABLE 6-5 k-order exponential Golomb code.

| Order | Codeword Structure | CodeNum value range |
|---|---|---|
| k = 0 | 1 | 0 |
|  | 0 1 $x_0$ | 1~2 |
|  | 0 0 1 $x_1$ $x_0$ | 3~6 |
|  | 0 0 0 1 $x_2$ $x_1$ $x_0$ | 7~14 |
|  | . . . | . . . |
| k = 1 | 1 $x_0$ | 0~1 |
|  | 0 1 $x_1$ $x_0$ | 2~5 |
|  | 0 0 1 $x_2$ $x_1$ $x_0$ | 6~13 |
|  | 0 0 0 1 $x_3$ $x_2$ $x_1$ $x_0$ | 14~29 |
|  | . . . | . . . |
| k = 2 | 1 $x_1$ $x_0$ | 0~3 |
|  | 0 1 $x_2$ $x_1$ $x_0$ | 4~11 |
|  | 0 0 1 $x_3$ $x_2$ $x_1$ $x_0$ | 12~27 |
|  | 0 0 0 1 $x_4$ $x_3$ $x_2$ $x_1$ $x_0$ | 28~59 |
|  | . . . | . . . |
| k = 3 | 1 $x_2$ $x_1$ $x_0$ | 0~7 |
|  | 0 1 $x_3$ $x_2$ $x_1$ $x_0$ | 8~23 |
|  | 0 0 1 $x_4$ $x_3$ $x_2$ $x_1$ $x_0$ | 24~55 |
|  | 0 0 0 1 $x_5$ $x_4$ $x_3$ $x_2$ $x_1$ $x_0$ | 56~119 |
|  | . . . | . . . |

When parsing the grammar elements described by ue(v) and se(v) use exponential Golomb codes of order 0, and their parsing process is:

ue(v): The value of the syntax element is equal to Code-Num;

se(v): Calculate the value of the syntax element according to the mapping relationship of the signed exponential Golomb code given in Table 6-6.

TABLE 6-6

Mapping relationship between se(v) and CodeNum

| CodeNum value | syntax element value |
|---|---|
| 0 | 0 |
| 1 | 1 |
| 2 | −1 |
| 3 | 2 |
| 4 | −2 |
| 5 | 3 |
| 6 | −3 |
| k | $(-1)^{k+1} \times \mathrm{Ceil}(k \div 2)$ |

When parsing the grammar elements described by ae(v), and before parsing the slice, first initialize all binary symbolic models and entropy codecs as described below. The binary symbol string is then parsed sequentially from the bit stream as described below. Finally, the value of the syntax element described by ae(v) is obtained according to the binary symbol string as described below.

If any of the following conditions exist, initialize the entropy codec.

Condition: the current coding unit contains only luma components and IntraLumaPredMode is equal to 'Intra_Luma_PCM', or the current coding unit contains luma and chroma components and IntraLumaPredMode is equal to 'Intra_Luma_PCM' and IntraChromaPredMode is not equal to 'Intra_Chroma_PCM', after parsing the pcm_coeff of the luma coding block, initialize the entropy codec.

Condition: the current coding unit contains only chroma components and IntraChromaPredMode is equal to 'Intra_ Chroma_PCM', or the current coding unit contains luma and chroma components and IntraLumaPredMode is equal to 'Intra_Luma_PCM' and IntraChromaPredMode is equal to 'Intra_Chroma_PCM', after parsing the pcm_coeff of the chroma coding block, Initialize the entropy codec.

TABLE 8.3.3.2.1

| Export a binary symbolic model (references to various sections refer to the AVS specification) | | | |
|---|---|---|---|
| Syntax element | ctxIdxInc | ctxIdxStart | Number of ctx |
| lcu_qp_delta | See 8.3.3.2.2 in the AVS specification | 0 | 4 |
| sao_merge_type_index | binIdx+SaoMergeLeftAvai+SaoMergeUpAvai−1 | 4 | 3 |
| sao_mode | 0 | 7 | 1 |
| sao_interval_offset_abs | 0 | 8 | 1 |
| alf_lcu_enable_flag | 0 | 9 | 1 |
| qt_split_flag | See 8.3.3.2.3 | 10 | 4 |
| bet_split_flag | See 8.3.3.2.4 | 14 | 9 |
| bet_split_type_flag | See 8.3.3.2.5 | 23 | 3 |
| bet_split_dir_flag | See 8.3.3.2.6 | 26 | 5 |
| root_cu_constraint | 0 | 31 | 1 |
| intra_chroma_pred_mode_index | See 8.3.3.2.7 | 32 | 3 |
| chroma_eipm_index | 0 | 35 | 1 |
| chroma_pmc_index | 0 | 36 | 1 |
| chroma_pmc_param_index | 0 | 37 | 1 |
| ctp_u | 0 | 38 | 1 |
| ctp_v | 0 | 39 | 1 |
| chroma_st_flag | 0 | 40 | 1 |
| ts_cu_flag | 0 | 41 | 1 |
| skip_flag | See 8.3.3.2.8 | 42 | 4 |
| advamced_prediction_flag | 0 | 46 | 1 |
| affine_flag | 0 | 47 | 1 |
| affine_umve_flag | 0 | 48 | 1 |
| direct_flag | See 8.3.3.2.9 | 49 | 2 |
| inter_pf_flag | 0 | 51 | 1 |
| inter_pf_index | 0 | 52 | 1 |
| inter_pc_flag | 0 | 53 | 1 |
| inter_pc_index | binIdx | 54 | 2 |
| intra_cu_flag | See 8.3.3.2.10 | 56 | 6 |
| sawp_flag | 0 | 62 | 1 |
| dt_split_flag | 0 | 63 | 1 |
| dt_split_dir | 0 | 64 | 1 |
| dt_split_hqt_flag | 0 | 65 | 1 |
| dt_split_vqt_flag | 0 | 66 | 1 |
| dt_split_hadt_flag | 0 | 67 | 1 |
| dt_split_vadt_flag | 0 | 68 | 1 |
| umve_mv_index | 0 | 69 | 1 |
| umve_step_index | 0 | 70 | 1 |
| umve_dir_index | binIdx | 71 | 2 |
| cu_affine_cand_index | binIdx | 73 | 4 |
| etmvp_flag | 0 | 77 | 1 |
| cu_etmvp_cand_index | binIdx | 78 | 4 |
| awp_flag | 0 | 82 | 1 |
| awp_mvr_cand_flag0 awp_mvr_cand_flag1 | 0 | 83 | 1 |
| awp_mvr_cand_step0 awp_mvr_cand_step1 | 0 | 84 | 1 |
| awp_mvr_cand_dir0 awp_mvr_cand_dir1 | binIdx | 85 | 2 |
| awp_cand_index0 | 0 | 87 | 1 |
| awp_cand_index1 | See 8.3.3.2.11 | 88 | 2 |
| affine_umve_step_index0 affine_umve_step_index1 | 0 | 90 | 1 |
| affine_umve_dir_index0 affine_umve_dir_index1 | binIdx | 91 | 2 |
| cu_subtype_index | binIdx | 93 | 11 |
| isc_ibc_cu_flag | 0 | 104 | 1 |
| ibc_cu_flag | See 8.3.3.2.12 | 105 | 3 |
| sbic_flag | 0 | 108 | 1 |
| sibc_dir_flag | 0 | 109 | 1 |

TABLE 8.3.3.2.1-continued

Export a binary symbolic model (references to various
sections refer to the AVS specification)

| Syntax element | ctxIdxInc | ctxIdxStart | Number of ctx |
|---|---|---|---|
| cbvp_index | binIdx | 110 | 6 |
| abvr_index | binIdx | 116 | 1 |
| extend_mvr_flag | 0 | 117 | 1 |
| affine_amvr_index | binIdx | 118 | 2 |
| amvr_index | binIdx | 120 | 4 |
| inter_pred_ref_mode_indes | See 8.3.3.2.13 | 124 | 3 |
| smvd_flag | 0 | 127 | 1 |
| pu_reference_index_l0 | See 8.3.3.2.14 | 128 | 3 |
| pu_reference_index_l1 | | | |
| mv_diff_x_abs_l0 | See 8.3.3.2.15 | 131 | 3 |
| mv_diff_x_abs_l0_affine | | | |
| mv_diff_x_abs_l1 | | | |
| mv_diff_x_abs_l1_affine | | | |
| mv_diff_y_abs_l0 | See 8.3.3.2.15 | 134 | 3 |
| mv_diff_y_abs_l0_affine | | | |
| mv_diff_y_abs_l1 | | | |
| mv_diff_y_abs_l1_affine | | | |
| mv_diff_x_abs_bv | See 8.3.3.2.16 | 137 | 7 |
| mv_diff_y_abs_bv | See 8.3.3.2.17 | 144 | 8 |
| sibc_flag | 0 | 152 | 1 |
| sibc_dir_flag | 0 | 153 | 1 |
| bgc_flag | 0 | 154 | 1 |
| bgc_index | 0 | 155 | 1 |
| intra_luma_pred_mode_index | See 8.3.3.2.18 | 156 | 7 |
| sawp_pred_mode0_index | | | |
| sawp_pred_mode1_index | | | |
| luma_eipm_index | 0 | 163 | 1 |
| intra_pf_flag | 0 | 164 | 1 |
| iip_flag | 0 | 165 | 1 |
| ctp_zero_flag | See 8.3.3.2.19 | 166 | 2 |
| pbt_cu_flag | 0 | 168 | 1 |
| ctp_y[i] | 0 | 169 | 1 |
| cu_qp_delta_abs | See 8.3.3.2.20 | 170 | 4 |
| enhanced_ts_flag | 0 | 174 | 1 |
| sbt_cu_flag | See 8.3.3.2.21 | 175 | 2 |
| sbt_quad_flag | 0 | 177 | 1 |
| sbt_dir_flag | See 8.3.3.2.22 | 178 | 3 |
| scan_region_x | See 8.3.3.2.23 | 181 | 28 |
| scan_region_y | See 8.3.3.2.23 | 209 | 28 |
| significant_flag | See 8.3.3.2.24 | 237 | 60 |
| coeff_abs_level_greater1_flag | See 8.3.3.2.25 | 297 | 22 |
| coeff_abs_level_greater2_flag | | | |
| coeff_abs_level_greater4_flag | | | |
| coeff_abs_level_greater8_flag | | | |
| coeff_run | See 8.3.3.2.26 | 319 | 24 |
| coeff_level_minus1 | See 8.3.3.2.26 | 333 | 24 |
| coeff_last | See 8.3.3.2.27 | 357 | 34 |
| est_cu_flag | 0 | 391 | 1 |
| esao_lcu_enable_flag | 0 | 392 | 1 |
| ccsao_lcu_enable_flag | 0 | 393 | 1 |
| isc_match_type | 0 | 394 | 1 |
| isc_pixel_match_type | 0 | 395 | 1 |
| isc_next_remaining_pixel_in_cu | binIdx | 396 | 3 |
| isc_sv_above_flag | 0 | 399 | 1 |
| isc_sv_recent_flag | 0 | 400 | 1 |
| isc_sv_recent_index | binIdx | 401 | 3 |
| isc_sv_y_abs | See 8.3.3.2.16 | 404 | 7 |
| isc_sv_x_non_zero_flag | 0 | 411 | 1 |
| isc_sv_y_non_zero_flag | 0 | 412 | 1 |
| isc_subtype_flag | 0 | 413 | 1 |
| isc_ups_present_flag | 0 | 414 | 1 |
| isc_evs_ups_num_minus1 | 0 | 415 | 1 |
| isc_ups_max_length_minus1 | Min(binIdx,3) | 416 | 4 |
| str_length_minus1_prefix | (binIdx+1)>>1 | 420 | 3 |
| alternative_filter_lcu_enable_flag | compIdx | 423 | 3 |
| alternative_filter_lcu_set_index | compIdx*3+Min(binIdx,3) | 426 | 9 |

TABLE 8.3.3.3.1

| Parsing process (references to various sections refer to the AVS specification) | |
| --- | --- |
| Syntax element | Inverse binarization method |
| lcu_qp_delta | See 8.3.4.5 |
| sao_merge_type_index | See 8.3.4.6 |
| sao_mode | See 8.3.4.2, maxVal=2, The value of sao_mode is equal to synElVal |
| sao_interval_offset_abs | See 8.3.4.2 , maxVal=7 , The value of sao_interval_offset_abs is equal to synElVal |
| sao_interval_offset_sign | See 8.3.4.4, The value of sao_interval_offset_sign is equal to synElVal |
| sao_interval_start_pos | See 8.3.4.7 |
| sao_interval_delta_pos_minus2 | See 8.3.4.8 |
| sao_edge_offset[compIdx][j] ( j = 0~3 ) | See 8.3.4.9 |
| sao_edge_type | See 8.3.4.10 |
| alf_lcu_enable_flag | See 8.3.4.4, The value of alf_lcu_enable_flag is equal to synElVal |
| aec_lcu_stuffing_bit | See 8.3.4.4, The value of aec_lcu_stuffing_bit is equal to synElVal |
| qt_split_flag | See 8.3.4.4, The value of qt_split_flag is equal to synElVal |
| bet_split_flag | See 8.3.4.4, The value of bet_split_flag is equal to synElVal |
| bet_split_type_flag | See 8.3.4.4, The value of bet_split_type_flag is equal to synElVal |
| root_cu_constraint | See 8.3.4.4, The value of root_cu_constraint is equal to synElVal |
| intra_chroma_pred_mode_index | See 8.3.4.2, maxVal=((TscpmEnableFlag ‖ PmcEnableFlag) ? 5 : 4)), The value of intra_chroma_pred_mode_index is equal to synElVal |
| chroma_eipm_index | See 8.3.4.2, maxVal=3, The value of chroma_eipm_index is equal to synElVal |
| chroma_pmc_index | See 8.3.4.4, The value of chroma_pmc_index is equal to synElVal |
| chroma_pmc_param_index | See 8.3.4.4, The value of chroma_pmc_param_index is equal to synElVal |
| ctp_u | See 8.3.4.4, The value of ctp_u is equal to synElVal |
| ctp_v | See 8.3.4.4, The value of ctp_v is equal to synElVal |
| skip_flag | See 8.3.4.4, The value of skip_flag is equal to synElVal |
| advanced_pred_flag | See 8.3.4.4, The value of advanced_pred_flag is equal to synElVal |
| awp_flag | See 8.3.4.4, The value of awp_flag is equal to synElVal |
| etmvp_flag | See 8.3.4.4, The value of etmvp_flag is equal to synElVal |
| cu_etmvp_cand_idx | See 8.3.4.2, maxVal=4, The value of cu_etmvp_cand_idx is equal to synElVal |
| affine_flag | See 8.3.4.4, The value of affine_flag is equal to synElVal |
| affine_umve_flag | See 8.3.4.4, The value of affine_umve_flag is equal to synElVal |
| direct_flag | See 8.3.4.4, The value of direct_flag is equal to synElVal |
| inter_pf_flag | See 8.3.4.4, The value of inter_pf_flag is equal to synElVal |
| inter_pf_index | See 8.3.4.4, The value of inter_pf_index is equal to synElVal |
| inter_pc_flag | See 8.3.4.4, The value of inter_pc_flag is equal to synElVal |
| inter_pc_index | See 8.3.4.2, maxVal=2, The value of inter_pc_index is equal to synElVal |
| intra_cu_flag | See 8.3.4.4, The value of intra_cu_flag is equal to synElVal |
| sawp_index | See 8.3.4.15 |
| sawp_pred_mode0_index | See 8.3.4.12 |
| sawp_pred_mode1_index | If the value of sawp_pred_mode0_index is less than 4, see 8.3.4.12 ; otherwise, see 8.3.4.13 |
| dt_split_flag | See 8.3.4.4, The value of dt_split_flag is equal to synElVal |
| dt_split_dir | See 8.3.4.4, The value of dt_split_dir is equal to synElVal |
| dt_split_hqt_flag | See 8.3.4.4 , The value of dt_split_hqt_flag is equal to synElVal |
| dt_split_vqt_flag | See 8.3.4.4 , The value of dt_split_vqt_flag is equal to synElVal |
| dt_split_hadt_flag | See 8.3.4.4 , The value of dt_split_hadt_flag is equal to synElVal |
| dt_split_vadt_flag | See 8.3.4.4 , The value of dt_split_vadt_flag is equal to synElVal |
| umve_mv_index | See 8.3.4.2, maxVal=1, The value of umve_mv_index is equal to synElVal |
| umve_step_index | If the value of PictureUmveStepSetIndexis 0, see 8.3.4.2, maxVal=4 , The value of umve_step_index is equal to synElVal ; otherwise, see 8.3.4.11 |
| umve_dir_index | See 8.3.4.14 |
| cu_affine_cand_index | See 8.3.4.2, maxVal=4, The value of cu_affine_cand_index is equal to synElVal |
| awp_index | See 8.3.4.15 |
| awp_mvr_cand_flag0 | See 8.3.4.4, The value of awp_mvr_cand_flag0 is equal to synElVal |

TABLE 8.3.3.3.1-continued

| Parsing process (references to various sections refer to the AVS specification) | |
| --- | --- |
| Syntax element | Inverse binarization method |
| awp_mvr_cand_flag1 | See 8.3.4.4, The value of awp_mvr_cand_flag1 is equal to synElVal |
| awp_mvr_cand_step0 | See 8.3.4.2, maxVal=4, The value of awp_mvr_cand_step0 is equal to synElVal |
| awp_mvr_cand_step1 | See 8.3.4.2, maxVal=4, The value of awp_mvr_cand_step1 is equal to synElVal |
| awp_mvr_cand_dir0 | See 8.3.4.14 |
| awp_mvr_cand_dir1 | See 8.3.4.14 |
| awp_cand_index0 | See 8.3.4.2, maxVal=5, The value of awp_cand_index0 is equal to synElVal |
| awp_cand_index1 | See 8.3.4.2 , maxVal=(AwpMvrCandFlag0 == 0 && AwpMvrCandFlag1 == 0) \|\| (AwpMvrCandFlag0 == 1 && AwpMvrCandFlag1 == 1 && AwpMvrCandStep1 && AwpMvrCandDir0 == AwpMvrCandDir1)? 4 : 5, The value of awp_cand_index1 is equal to synElVal |
| affine_umve_step_index0 | See 8.3.4.2 , maxVal=4 , The value of affine_umve_step_index0 is equal to synElVal |
| affine_umve_step_index1 | See 8.3.4.2 , maxVal=4 , The value of affine_umve_step_index1 is equal to synElVal |
| affine_umve_dir_index0 | See 8.3.4.14 |
| affine_umve_dir_index1 | See 8.3.4.14 |
| cu_subtype_index | See 8.3.4.2 , maxVal=((PictureType == 1) ? (1+ NumOfHmvpCand) : (3+NumOfHmvpCand)), The value of cu_subtype_index is equal to synElVal |
| isc_ibc_cu_flag | See 8.3.4.4 , The value of isc_ibc_cu_flag is equal to synElVal |
| ibc_cu_flag | See 8.3.4.4, The value of ibc_cu_flag is equal to synElVal |
| isc_subtype_flag | See 8.3.4.4, The value of isc_subtype_flag is equal to synElVal |
| cbvp_index | See 8.3.4.2, maxVal=6, The value of cbvp_index is equal to synElVal |
| abvr_index | See 8.3.4.2, maxVal=1, The value of abvr_index is equal to synElVal |
| extend_mvr_flag | See 8.3.4.4 , The value of extend_mvr_flag is equal to synElVal |
| affine_amvr_index | See 8.3.4.2, maxVal=2, The value of affine_amvr_index is equal to synElVal |
| amvr_index | See 8.3.4.2, maxVal=4, The value of amvr_index is equal to synElVal |
| inter_pred_ref_mode_index | See 8.3.4.16 |
| smvd_flag | See 8.3.4.4, The value of smvd_flag is equal to synElVal |
| pu_reference_index_l0 | See 8.3.4.2, maxVal=NumRefActive[0]−1, The value of pu_reference_index_l0 is equal to synElVal |
| pu_reference_indexl1 | See 8.3.4.2, maxVal=NumRefActive[1]−1, The value of pu_reference_index_l1 is equal to synElVal |
| mv_diff_x_abs_l0 mv_diff_x_abs_l0_affine mv_diff_x_abs_l1 mv_diff_x_absl1_affine | See 8.3.4.17 |
| mv_diff_x_sign_l0 mv_diff_x_sign_l0_affine mv_diff_x_sign_l1 mv_diff_x_sign_l1_affine mv_diff_x_sign_bv | See 8.3.4.4 , The value of mv_diff_x_sign_l0 ` mv_diff_x_sign_l0_affine ` mv_diff_x_sign_l1 ` mv_diff_x_sign_l1_affine, ormv_diff_x_sign_bv is equal to synElVal |
| mv_diff_y_abs_l0 mv_diff_y_abs_l0_affine mv_diff_y_abs_l1 mv_diff_y_abs_l1_affine | See 8.3.4.17 |
| mv_diff_y_sign_l0 mv_diff_y_sign_l0_affine mv_diff_y_sign_l1 mv_diff_y_sign_l1_affine mv_diff_y_sign_bv | See 8.3.4.4 , The value of mv_diff_y_sign_l0 ` mv_diff_y_sign_l0_affine ` mv_diff_y_sign_l1 ` mv_diff_y_sign_l1_affine, or mv_diff_y_sign_bv is equal to synElVal |
| mv_diff_x_abs_bv ` mv_diff_y_abs_bv | See 8.3.4.18 |
| sibc_flag | See 8.3.4.4, The value of sibc_flag is equal to synElVal |
| sibc_dir_flag | See 8.3.4.4, The value of sibc_dir_flag is equal to synElVal |
| bgc_flag | See 8.3.4.4, The value of bgc_flag is equal to synElVal |
| bgc_index | See 8.3.4.4, The value of bgc_index is equal to synElVal |
| intra_luma_pred_mode_index | See 8.3.4.19 |
| luma_eipm_index | See 8.3.4.4, The value of luma_eipm_index is equal to synElVal |
| intra_pf_flag | See 8.3.4.4, The value of intra_pf_flag is equal to synElVal |
| iip_flag | See 8.3.4.4, The value of iip_flag is equal to synElVal |
| ctp_zero_flag | See 8.3.4.4, The value of ctp_zero_flag is equal to synElVal |

TABLE 8.3.3.3.1-continued

| Parsing process (references to various sections refer to the AVS specification) | |
|---|---|
| Syntax element | Inverse binarization method |
| pbt_cu_flag | See 8.3.4.4, The value of pbt_cu_flag is equal to synElVal |
| ctp_y[i] | See 8.3.4.4, The value of cty_y[i] is equal to synElVal |
| cu_qp_delta_abs | See 8.3.4.3, The value of cu_qp_delta_abs is equal to synElVal |
| cu_qp_delta_sign | See 8.3.4.4, The value of cu_qp_delta_sign is equal to synElVal |
| enhanced_ts_flag | See 8.3.4.4, The value of enhanced_ts_flag is equal to synElVal |
| sbt_cu_flag | See 8.3.4.4, The value of sbt_cu_flag is equal to synElVal |
| sbt_quad_flag | See 8.3.4.4, The value of sbt_quad_flag is equal to synElVal |
| sbt_dir_flag | See 8.3.4.4, The value of sbt_dir_flag is equal to synElVal |
| chroma_st_flag | See 8.3.4.4 , The value of chroma_st_flag is equal to synElVal |
| ts_cu_flag | See 8.3.4.4, The value of ts_cu_flag is equal to synElVal |
| scan_region_x | See 8.3.4.20 , The value of scan_region_x is equal to synElVal |
| scan_region_y | See 8.3.4.20 , The value of scan_region_y is equal to synElVal |
| significant_flag | See 8.3.4.4 , The value of significant_flag is equal to synElVal |
| coeff_abs_level_greater1_flag | See 8.3.4.4, The value of coeff_abs_level_greater1_flag is equal to synElVal |
| coeff_abs_level_greater2_flag | See 8.3.4.4, The value of coeff_abs_level_greater2_flag is equal to synElVal |
| coeff_abs_level_greater4_flag | See 8.3.4.4, The value of coeff_abs_level_greater4_flag is equal to synElVal |
| coeff_abs_level_greater8_flag | See 8.3.4.4, The value of coeff_abs_level_greater8_flag is equal to synElVal |
| coeff_abs_level_remaining | See 8.3.4.21 , The value of coeff_abs_level_remaining is equal to synElVal |
| coeff_run | See 8.3.4.22, TH=16, The value of coeff_run is equal to synElVal |
| coeff_level_minus1 | See 8.3.4.22, TH=8, The value of coeff_level_minus1 is equal to synElVal |
| coeff_sign | See 8.3.4.4, The value of coeff_sign is equal to synElVal |
| coeff_last | See 8.3.4.4, The value of coeff_last is equal to synElVal |
| est_tu_flag | See 8.3.4.4, The value of est_tu_flag is equal to synElVal |
| aec_ipcm_stuffing_bit | See 8.3.4.4, The value of aec_ipcm_stuffing_bit is equal to synElVal |
| esao_lcu_enable_flag | See 8.3.4.4, The value of esao_lcu_enable_flag is equal to synElVal |
| esao_lcu_set_index | See 8.3.4.2, maxVal=1, The value of esao_lcu_set_index is equal to synElVal |
| ccsao_lcu_enable_flag | See 8.3.4.4, The value of ccsao_lcu_enable_flag is equal to synElVal |
| ccsao_lcu_set_index | See 8.3.4.2, maxVal=PictureCcsaoSetNum, The value of ccsao_lcu_set_index is equal to synElVal |
| isc_match_type | See 8.3.4.4 , The value of isc_match_type is equal to synElVal |
| isc_sv_above_flag | See 8.3.4.4 , The value of isc_sv_above_flag is equal to synElVal |
| isc_sv_recent_flag | See 8.3.4.4 , The value of isc_sv_recent_flag is equal to synElVal |
| isc_sv_x_non_zero_flag | See 8.3.4.4, The value of isc_sv_x_non_zero_flag is equal to synElVal |
| isc_sv_y_non_zero_flag | See 8.3.4.4, The value of isc_sv_y_non_zero_flag is equal to synElVal |
| isc_sv_x_sign | See 8.3.4.4, The value of isc_sv_x_sign is equal to synElVal |
| isc_sv_y_sign | See 8.3.4.4, The value of isc_sv_y_sign is equal to synElVal |
| isc_sv_x_abs_minus1 | See 8.3.4.23, The value of isc_sv_x_abs_minus1 is equal to synElVal |
| isc_sv_y_abs | See 8.3.4.18 |
| isc_unmatched_pixel_y[i][j] | See table 89 in the AVS specification, len=BitDepth, The value of isc_unmatched_pixel_y[i][j] is equal to synElVal |
| isc_unmatched_pixel_cb[i][j] | See table 89 , len=BitDepth, The value of isc_unmatched_pixel_cb[i][j] is equal to synElVal |
| isc_unmatched_pixel_cr[i][j] | See table 89 , len=BitDepth, The value of isc_unmatched_pixel_cr[i][j] is equal to synElVal |
| isc_nos_up_y[i] | See table 89, len=BitDepth, The value of isc_nos_up_y[i] is equal to synElVal |
| isc_nos_up_cb[i] | See table 89, len=BitDepth, The value of isc_nos_up_cb[i] is equal to synElVal |
| isc_nos_up_cr[i] | See table 89, len=BitDepth, The value of isc_nos_up_cr[i] is equal to synElVal |
| isc_sv_recent_index | See 8.3.4.2, maxVal=11, The value of isc_sv_recent_index is equal to synElVal |

TABLE 8.3.3.3.1-continued

| Parsing process (references to various sections refer to the AVS specification) | |
| --- | --- |
| Syntax element | Inverse binarization method |
| isc_next_remaining_pixel_in_cu | See 8.3.4.24, The value of isc_next_remaining_pixel_in_cu is equal to synElVal |
| isc_pixel_match_type | See 8.3.4.4, The value of isc_pixel_match_type is equal to synElVal |
| isc_ups_present_flag | See 8.3.4.4, The value of isc_ups_present_flag is equal to synElVal |
| isc_num_of_new_pv | See Table 6-5, k=0, The value of isc_num_of_new_pv is equal to CodeNum |
| isc_num_of_reused_pv | See Table 6-5, k=0, The value of isc_num_of_reused_pv is equal to CodeNum |
| isc_prev_pv_not_reused_run | See Table 6-5 , k=0 , The value of isc_prev_pv_not_reused_run is equal to CodeNum |
| isc_ups_max_length_minus1 | See 8.3.4.2 , maxVal = NumTotalPixel , The value of isc_ups_max_length_minus1 is equal to synElVal |
| isc_evs_ups_num_minus1 | See 8.3.4.2, maxVal = NumTotalPixel − NumCodedPixel + FirstStringNumFlag − 1 , The value of isc_evs_ups_num_minus1 is equal to synElVal |
| str_length_minus1_prefix | See 8.3.4.2 , maxVal = maxValPrefix , The value of str_length_minus1_prefix is equal to synElVal |
| str_length_minus1_infix | See table 89, len= Ceil(Log(maxValInfix+1))−1, The value of str_length_minus1_infix is equal to synElVal |
| str_length_minus1_suffix | See table 89, len=1, The value of str_length_minus1_suffix is equal to synElVal |
| pv_address_prefix | See table 89 , len= Ceil(Log(MaxValPvAddress))−1, The value of pv_address_prefix is equal to synElVal |
| pv_address_infix | See table 89, len=1, The value of pv_address_infix is equal to synElVal |
| pv_address_suffix | See table 89, len=1, The value of pv_address_suffix is equal to synElVal |
| isc_fopixel_y | See table 89, len=BitDepth, The value of isc_fopixel_y is equal to synElVal |
| isc_fopixel_cb | See table 89, len=BitDepth, The value of isc_fopixel_cb is equal to synElVal |
| isc_fopixel_cr | See table 89, len=BitDepth, The value of isc_fopixel_cr is equal to synElVal |
| alternative_filter_lcu_enable_flag | See 8.3.4.2 , maxVal = 1 , The value of alternative_filter_lcu_enable_flag is equal to svnElVal |
| alternative_filter_lcu_set_index | See 8.3.4.2 , maxVal = NumOfAlternativeFilter−1 , The value of alternative_filter_lcu_set_index is equal to synElVal |

The grades defined in this section are shown in Table B.2.

TABLE B.2

| Grades | |
| --- | --- |
| Value of profile_id | Grade |
| 0x00 | Prohibited |
| 0x20 | Benchmark 8-bit grade (Main 8 bit profile) |
| 0x22 | Benchmark 10-bit grade (Main 10 bit profile) |
| 0x30 | Enhanced 8-bit grade (High 8 bit profile) |
| 0x32 | Enhanced 10-bit grade (High 10 bit profile) |
| other | Reserved |

For a given profile, different levels support the same subset of syntax.

The bitstream of the benchmark 8-bit profile should meet the following conditions:

The value of profile_id shall be 0x20.

The value of progressive_sequence is '1'.

The value of chroma_format shall be '01'.

The value of sample_precision shall be '001'.

The value of PictureStructure of all coded pictures shall be the same between the start code of the video sequence and the end code of the first video sequence, or between the start code of the video sequence and the first video editing code.

The value of progressive_frame of all coded pictures shall be the same between the start code of the video sequence and the end code of the first video sequence that follows, or between the start code of the video sequence and the first video editing code that follows.

The value of MiniSize shall be 8.

The value range of log2_lcu_size_minus2 should be 3 to 5.

The value of log2_min_cu_size_minus2 shall be 0.

The value of patch_width_minus1 shall be PictureWidthInLCU−1.

The value of stable_patch_flag shall be '1'.

The value of ref_colocated_patch_flag shall be '0'.

The value of uniform_patch_flag shall be '1'.

Patches belonging to the same image should appear in ascending order according to the value of patch_index.

If any side length of a coding block is greater than 64, only skip mode or inter prediction mode shall be selected for the coding block. If inter prediction mode is selected, the value of ctp_zero_flag shall be '1'.

If the number of luma samples of the current coding unit is less than 64, the current coding unit shall not use skip mode and direct mode, and the prediction reference mode of the prediction unit of the current coding unit shall not be 'PRED_List01'.

The value of MaxSplitTimes shall be 6.

The value of MaxPartRatio shall be 8.

The value of log2_max_bt_size_minus2 shall be 4 or 5.

If the width and height of the LCU of an I picture are both equal to 128, the LCU shall use quadtree split and the value of qt_split_flag shall be '1'.

If the width of the coding tree node is equal to 128 and the height is equal to 64 and the coding tree node is split, then the coding tree node shall use vertical binary tree division and the value of bet_split_dir_flag shall be '1'.

If the width of the coding tree node is equal to 64 and the height is equal to 128 and the coding tree node is split, then the coding tree node shall use horizontal binary tree split and the value of bet_split_dir_flag shall be '0'.

If the library_stream_flag of the current sequence is '1', all pictures of this sequence shall be I pictures.

If the syntax element duplicate_sequence_header_flag is present in the bitstream, the value of this syntax element shall be '1'.

There should only be at most 1 knowledge image in the decoded image buffer.

The value of NumOfUpdatedLibrary shall be 1.

The value of MinLibraryUpdatePeriod shall be 1.

The value of MAX_TEMPORAL_ID shall be 7.

Class limits specified in B.3.2.

Supported levels include: 2.0.15, 2.0.30, 2.0.60, 4.0.30, 4.0.60, 6.0.30, 6.2.30, 6.0.60, 6.2.60, 6.0.120, 6.2.120, 8.0.30, 8.2.30, 8.0.60, 8.2.60, 8.0.120, 8.2.120, 10.0.30, 10.2.30, 10.0.60, 10.2.60, 10.0.120, and 10.2.120.

The bit stream of the benchmark 10-bit grade shall meet the following conditions:

The value of profile_id shall be 0x22.

The value of progressive_sequence shall be '1'.

The value of chroma_format shall be '01'.

The value of sample_precision should be '001' or '010'.

The value of encoding_precision shall be '001' or '010'.

The value of PictureStructure of all coded pictures shall be the same between the start code of the video sequence and the end code of the first video sequence, or between the start code of the video sequence and the first video editing code.

The value of progressive_frame of all coded pictures shall be the same between the start code of the video sequence and the end code of the first video sequence that follows, or between the start code of the video sequence and the first video editing code that follows.

The value of MiniSize shall be 8.

The value range of log2_lcu_size_minus2 should be 3 to 5.

The value of log2_min_cu_size_minus2 shall be 0.

The value of patch_width_minus1 shall be PictureWidthInLCU−1.

The value of stable_patch_flag shall be '1'.

The value of ref_colocated_patch_flag shall be '0'.

The value of uniform_patch_flag shall be '1'.

Patches belonging to the same image should appear in ascending order according to the value of patch_index.

If any side length of a coding block is greater than 64, only skip mode or inter prediction mode shall be selected for the coding block. If inter prediction mode is selected, the value of ctp_zero_flag shall be '1'.

If the number of luma samples of the current coding unit is less than 64, the current coding unit shall not use skip mode and direct mode, and the prediction reference mode of the prediction unit of the current coding unit shall not be 'PRED_List01'.

The value of MaxSplitTimes shall be 6.

The value of MaxPartRatio shall be 8.

The value of log2_max_bt_size_minus2 shall be 4 or 5.

If the width and height of the LCU of an I picture are both equal to 128, the LCU shall use quadtree split and the value of qt_split_flag shall be T.

If the width of the coding tree node is equal to 128 and height is equal to 64 and the coding tree node is split, then the coding tree node shall use vertical binary tree division and the value of bet_split_dir_flag shall be 1.

If the width of the coding tree node is equal to 64 and the height is equal to 128 and the coding tree node is split, then the coding tree node shall use horizontal binary tree split and the value of bet_split_dir_flag shall be '0'.

If the library_stream_flag of the current sequence is '1', all pictures of this sequence shall be I pictures.

If the syntax element duplicate_sequence_header_flag is present in the bitstream, the value of this syntax element shall be '1'.

There should only be at most 1 knowledge image in the decoded image buffer.

The value of NumOfUpdatedLibrary shall be 1.

The value of MinLibraryUpdatePeriod shall be 1.

The value of MAX_TEMPORAL_ID shall be 7.

Class limits specified in B.3.2.

Supported levels include: 2.0.15, 2.0.30, 2.0.60, 4.0.30, 4.0.60, 6.0.30, 6.2.30, 6.0.60, 6.2.60, 6.0.120, 6.2.120, 8.0.30, 8.2.30, 8.0.60, 8.2.60, 8.0.120, 8.2.120, 10.0.30, 10.2.30, 10.0.60, 10.2.60, 10.0.120, and 10.2.120.

The bit stream of the enhanced 8-bit grade should meet the following conditions.

The value of profile_id shall be 0x30.

The value of progressive_sequence shall be '1'.

The value of chroma_format shall be '01'.

The value of sample_precision shall be '001'.

The value of PictureStructure of all coded pictures shall be the same between the start code of the video sequence and the end code of the first video sequence, or between the start code of the video sequence and the first video editing code.

The value of progressive_frame of all coded pictures shall be the same between the start code of the video sequence and the end code of the first video sequence that follows, or between the start code of the video sequence and the first video editing code that follows.

The value of MiniSize shall be 8.

The value range of log2_lcu_size_minus2 should be 3 to 5.

The value of log2_min_cu_size_minus2 shall be 0.

The value of stable_patch_flag shall be '1'.

The value of ref_colocated_patch_flag shall be '0'.

The value of uniform_patch_flag shall be '1'.

Patches belonging to the same image should appear in ascending order according to the value of patch_index.

If any side length of a coding block is greater than 64, only skip mode or inter prediction mode shall be selected for the coding block. If inter prediction mode is selected, the value of ctp_zero_flag shall be '1'.

If the number of luma samples of the current coding unit is less than 64, the current coding unit shall not use skip mode and direct mode, and the prediction reference mode of the prediction unit of the current coding unit shall not be 'PRED_List01'.

The value of MaxSplitTimes shall be 6.

The value of MaxPartRatio shall be 8.

The value of log2_max_bt_size_minus2 shall be 4 or 5.

If the width and height of the LCU of an I picture are both equal to 128, the LCU shall use quadtree split and the value of qt_split_flag shall be '1'.

If the width of the coding tree node is equal to 128 and the height is equal to 64 and the coding tree node is split, then the coding tree node shall use vertical binary tree division and the value of bet_split_dir_flag shall be '1'.

If the width of the coding tree node is equal to 64 and the height is equal to 128 and the coding tree node is split, then the coding tree node shall use horizontal binary tree split and the value of bet_split_dir_flag shall be '0'.

If the library_stream_flag of the current sequence is '1', all pictures of this sequence shall be I pictures.

If the syntax element duplicate_sequence_header_flag is present in the bitstream, the value of this syntax element shall be '1'.

At most 1 knowledge image should exist in the decoded image buffer.

The value of NumOfUpdatedLibrary shall be 1.

The value of MinLibraryUpdatePeriod shall be 1.

The value range of num_of_alternative_filter_minus1 should be 0~3.

The value of MAX_TEMPORAL_ID shall be 7.

Class limits specified in B.3.2.

Supported levels include: 2.0.15, 2.0.30, 2.0.60, 4.0.30, 4.0.60, 6.0.30, 6.2.30, 6.4.30, 6.6.30, 6.0.60, 6.2.60, 6.4.60, 6.6.60, 6.0.120, 6.2.120, 6.4.120, 6.6.120, 8.0.30, 8.2.30, 8.4.30, 8.6.30, 8.0.60, 8.2.60, 8.4.60, 8.6.60, 8.0.120, 8.2.120, 8.4.120, 8.6.120, 10.0.30, 10.2.30, 10.4.30, 10.6.30, 10.0.60, 10.2.60, 10.4.60, 10.6.60, 10.0.120, 10.2.120, 10.4.120, and 10.6.120.

To enhance the bit stream of the 10-bit grade, the following conditions should be met:

The value of profile_id shall be 0x32.

The value of progressive_sequence shall be '1'.

The value of chroma_format shall be '01'.

The value of sample_precision should be '001' or '010'.

The value of encoding_precision shall be '001' or '010'.

The value of PictureStructure of all coded pictures shall be the same between the start code of the video sequence and the end code of the first video sequence, or between the start code of the video sequence and the first video editing code.

The value of progressive_frame of all coded pictures shall be the same between the start code of the video sequence and the end code of the first video sequence that follows, or between the start code of the video sequence and the first video editing code that follows.

The value of MiniSize shall be 8.

The value range of log2_lcu_size_minus2 should be 3 to 5.

The value of log2_min_cu_size_minus2 shall be 0.

The value of stable_patch_flag shall be '1'.

The value of ref_colocated_patch_flag shall be '0'.

The value of uniform_patch_flag shall be '1'.

Patches belonging to the same image should appear in ascending order according to the value of patch_index.

If any side length of a coding block is greater than 64, only skip mode or inter prediction mode shall be selected for the coding block. If inter prediction mode is selected, the value of ctp_zero_flag shall be '1'.

If the number of luma samples of the current coding unit is less than 64, the current coding unit shall not use skip mode and direct mode, and the prediction reference mode of the prediction unit of the current coding unit shall not be 'PRED_List01'.

The value of MaxSplitTimes shall be 6.

The value of MaxPartRatio shall be 8.

The value of log2_max_bt_size_minus2 shall be 4 or 5.

If the width and height of the LCU of an I picture are both equal to 128, the LCU shall use quadtree split and the value of qt_split_flag shall be T.

If the width of the coding tree node is equal to 128 and the height is equal to 64 and the coding tree node is split, then the coding tree node shall use vertical binary tree division and the value of bet_split_dir_flag shall be '1'.

If the width of the coding tree node is equal to 64 and the height is equal to 128 and the coding tree node is split, then the coding tree node shall use horizontal binary tree split and the value of bet_split_dir_flag shall be '0'.

If the library_stream_flag of the current sequence is '1', all pictures of this sequence shall be I pictures.

If the syntax element duplicate_sequence_header_flag is present in the bitstream, the value of this syntax element shall be '1'.

There should only be at most 1 knowledge image in the decoded image buffer.

The value of NumOfUpdatedLibrary shall be 1.

The value of MinLibraryUpdatePeriod shall be 1.

The value of MAX_TEMPORAL_ID shall be 7.

The value range of num_of_alternative_filter_minus1 should be 0~3.

Class limits specified in B.3.2.

Supported levels include: 2.0.15, 2.0.30, 2.0.60, 4.0.30, 4.0.60, 6.0.30, 6.2.30, 6.4.30, 6.6.30, 6.0.60, 6.2.60, 6.4.60, 6.6.60, 6.0.120, 6.2.120, 6.4.120, 6.6.120, 8.0.30, 8.2.30, 8.4.30, 8.6.30, 8.0.60, 8.2.60, 8.4.60, 8.6.60, 8.0.120, 8.2.120, 8.4.120, 8.6.120, 10.0.30, 10.2.30, 10.4.30, 10.6.30, 10.0.60, 10.2.60, 10.4.60, 10.6.60, 10.0.120, 10.2.120, 10.4.120, and 10.6.120.

A seventh exemplary embodiment is discussed. In the seventh exemplary embodiment, changes, modifications, and/or improvements to a current AVS specification are described. In the following tables, such changes, modifications, and/or improvements are shown to text by italics indicating cancelled text and underline indicating added text, with respect to the AVS specification.

TABLE 7-1

Sequence Header.

| Sequence header definition | Descriptor |
| --- | --- |
| sequence_header( ) { | |
|   video_sequence_start_code | f(32) |
|   profile_id | u(8) |
|   level_id | u(8) |
|   progressive_sequence | u(1) |
|   field_coded_sequence | u(1) |
|   library_stream_flag | u(1) |
|   if (! LibraryStreamFlag) { | |
|     Library_picture_enable_flag | u(1) |
|     if (LibraryPictureEnableFlag) { | |
|       duplicate_sequence_header_flag | u(1) |
|     } | |
|   } | |
|   marker_bit | f(1) |
|   horizontal_size | u(14) |
|   marker_bit | f(1) |
|   vertical_size | u(14) |
|   chroma_format | u(2) |
|   sample_precision | u(3) |
|   if (profile_id == 0x22 \|\| profile_id == 0x32) { | |
|     encoding_precision | u(3) |
|   } | |
|   marker_bit | f(1) |
|   aspect_ratio | u(4) |
|   frame_rate_code | u(4) |
|   marker_bit | f(1) |
|   bit_rate_lower | u(18) |
|   marker_bit | f(1) |
|   bit_rate_upper | u(12) |
|   low_delay | u(1) |
|   temporal_id_enable_flag | u(1) |
|   marker_bit | f(1) |
|   bbv_buffer_size | u(18) |
|   marker_bit | f(1) |
|   max_dpb_minus1 | u(4) |
|   rpl1_index_exist_flag | u(1) |

TABLE 7-1-continued

| Sequence Header. | |
| --- | --- |
| Sequence header definition | Descriptor |
| rpl1_same_as_rpl0_flag | u(1) |
| marker_bit | f(1) |
| num_ref_pic_list_set[0] | ue(v) |
| for (j = 0; j < NumRefPicListSet[0]; j++) { | |
| reference_picture_list_set(0, j) | |
| } | |
| if (! Rpl1SameAsRpl0Flag) { | |
| num_ref_pic_list_set[1] | ue(v) |
| for (j = 0; j < NumRefPicListSet[1]; j++) { | |
| reference_picture_list_set(1, j) | |
| } | |
| } | |
| num_ref_default_active_minus1[0] | ue(v) |
| num_ref_default_active_minus1[1] | ue(v) |
| log2_lcu_size_minus2 | u(3) |
| log2_min_cu_size_minus2 | u(2) |
| log2_max_part_ratio_minus2 | u(2) |
| max_split_times_minus6 | u(3) |
| log2_min_qt_size_minus2 | u(3) |
| log2_max_bt_size_minus2 | u(3) |
| log2_max_eqt_size_minus3 | u(2) |
| marker_bit | f(1) |
| weight_quant_enable_flag | u(1) |
| if (WeightQuantEnableFlag) | |
| { | |
| load_seq_weight_quant_data_flag | u(1) |
| if (load_seq_weight_quant_data_flag == '1') { | |
| weight_quant_matrix( ) | |
| } | |
| } | |
| st_enable_flag | u(1) |
| sao_enable_flag | u(1) |
| alf_enable_flag | u(1) |
| affine_enable_flag | u(1) |
| smvd_enable_flag | u(1) |
| ipcm_enable_flag | u(1) |
| amvr_enable_flag | u(1) |
| num_of_hmvp_cand | u(4) |
| umve_enable_flag | u(1) |
| if ((NumOfHmvpCand != 0) && AmvrEnableFlag) { | |
| emvr_enable_flag | u(1) |
| } | |
| intra_pf_enable_flag | u(1) |
| tscpm_enable_flag | u(1) |
| marker_bit | f(1) |
| dt_enable_flag | u(1) |
| if (DtEnableFlag) { | |
| log2_max_dt_size_minus4 | u(2) |
| } | |
| pbt_enable_flag | u(1) |
| EipmEnableFlag = 0 | |
| MipfEnableFlag = 0 | |
| IntraPfChromaEnableFlag = 0 | |
| UmveEnhancementEnableFlag = 0 | |
| AffineUmveEnableFlag = 0 | |
| SbTmvpEnableFlag = 0 | |
| SrccEnableFlag = 0 | |
| EnhancedStEnableFlag = 0 | |
| EnhancedTscpmEnableFlag = 0 | |
| MaecEnableFlag = 0 | |
| if (profile_id == 0x30 \|\| profile_id == 0x32) { | |
| EipmEnableFlag = 1 | |
| pmc_enable_flag | u(1) |
| if (TscpmEnableFlag) { | |
| EnhancedTscpmEnableFlag = 1 | |
| } | |
| iip_enable_flag | u(1) |
| sawp_enable_flag | u(1) |
| MipfEnableFlag = 1 | |
| if (IntraPfEnableFlag) { | |
| IntraPfChromaEnableFlag = 1 | |
| } | |
| if (UmveEnableFlag) { | |
| UmveEnhancementEnableFlag = 1 | |
| } | |
| if (AffineEnableFlag) { | |

TABLE 7-1-continued

| Sequence Header. | |
| --- | --- |
| Sequence header definition | Descriptor |
| AffineUmveEnableFlag = 1 | |
| } | |
| if (AffineEnableFlag) { | |
| sp_enable_flag | u(1) |
| } | |
| awp_enable_flag | u(1) |
| SbTmvpEnableFlag = 1 | |
| etmvp_mvap_enable_flag | u(1) |
| dmvr_enable_flag | u(1) |
| bio_enable_flag | u(1) |
| bgc_enable_flag | u(1) |
| inter_pf_enable_flag | u(1) |
| inter_pc_enable_flag | u(1) |
| obmc_enable_flag | u(1) |
| if (StEnableFlag) { | |
| EnhancedStEnableFlag = 1 | |
| } | |
| sbt_enable_flag | u(1) |
| ist_enable_flag | u(1) |
| SrccEnableFlag = 1 | |
| MaecEnableFlag = 1 | |
| esao_enable_flag | u(1) |
| ccsao_enable_flag | u(1) |
| if (EsaoEnableFlag) { | |
| SaoEnableFlag = 0 | |
| } | |
| if (AlfEnableFlag) { | |
| ealf_enable_flag | u(1) |
| } | |
| ibc_enable_flag | u(1) |
| isc_enable_flag | u(1) |
| if (IbcEnableFlag \|\| IscEnableFlag) { | |
| num_of_intra_hmvp_cand | u(4) |
| } | |
| fimc_enable_flag | u(1) |
| nn_tools_set_hook | u(8) |
| if (NnFilterEnableFlag) | |
| { | |
| num_of_nn_filter_minus1 | ue(v) |
| } | |
| } | |
| if (low_delay == '0') | |
| output_reorder_delay | u(5) |
| cross_patch_loop_filter_enable_flag | u(1) |
| ref_colocated_patch_flag | u(1) |
| stable_patch_flag | u(1) |
| if (stable_patch_flag == '1') { | |
| uniform_patch_flag | u(1) |
| if (uniform_patch_flag == '1') { | |
| marker_bit | f(1) |
| patch_width_minus1 | ue(v) |
| patch_height_minus1 | ue(v) |
| } | |
| } | |
| reserved_bits | r(2) |
| next_start_code( ) | |
| } | |

TABLE 7-2

| Intra Picture Header. | |
| --- | --- |
| Intra prediction picture header definition | Descriptor |

| | |
| --- | --- |
| intra_picture_header( ) { | |
|   intra_picture_start_code | f(32) |
|   bbv_delay | u(32) |
|   time_code_flag | u(1) |
|   if (time_code_flag == '1') | |
|     time_code | u(24) |
|   decode_order_index | u(8) |
|   if (LibraryStreamFlag) | |
|     library_picture_index | ue(v) |
|   if (temporal_id_enable_flag== '1') | |
|     temporal_id | u(3) |
|   if (low_delay == '0') | |
|     picture_output_delay | ue(v) |
|   if (low_delay == '1') | |
|     bbv_check_times | ue(v) |
|   progressive_frame | u(1) |
|   if (progressive_frame == '0') | |
|     picture_structure | u(1) |
|   top_field_first | u(1) |
|   repeat_first_field | u(1) |
|   if (field_coded_sequence == '1') { | |
|     top_field_picture_flag | u(1) |
|     reserved_bits | r(1) |
|   } | |
|   ref_pic_list_set_flag[0] | u(1) |
|   if (RefPicListSetFlag[0]) { | |
|     if (NumRefPicListSet[0] > 1) { | |
|       ref_pic_list_set_index[0] | ue(v) |
|     } | |
|   } | |
|   else { | |
|     reference_picture_list_set(0, NumRefPicListSet[0]) | |
|   } | |
|   if (Rpl1IndexExistFlag) | |
|     ref_pic_list_set_flag[1] | u(1) |
|   if (RefPicListSetFlag[1]) { | |
|     if (Rpl1IndexExistFlag && NumRefPicListSet[1] > 1) { | |
|       ref_pic_list_set_index[1] | ue(v) |
|     } | |
|   } | |
|   else { | |
|     reference_picture_list_set(1, NumRefPicListSet[1]) | |
|   } | |
|   fixed_picture_qp_flag | u(1) |
|   picture_qp | u(7) |
|   if ((! FixedPictureQpFlag) && (profile_id == 0x32 \|\| profile_id == 0x30)) | |
| { | |
|     cu_delta_qp_flag | u(1) |
|     if (CuDeltaQpFlag) { | |
|       cu_qp_group_size_log2_minus3 | u(2) |
|     } | |
|   } | |
|   deblocking_filter_disable_flag | u(1) |
|   if (! DeblckingFilterDisableFlag) { | |
|     if (profile_id == 0x32 \|\| profile_id == 0x30) { | |
|       deblocking_filter_type | u(1) |
|     } | |
|     deblocking_filter_parameter_flag | u(1) |
|     if ( deblocking_filter_parameter_flag == '1' ) { | |
|      alpha_c_offset | se(v) |
|      beta_offset | se(v) |
|     } | |
|     if (profile_id == 0x32 \|\| profile_id == 0x30) { | |
|       picture_dbr_v_enable_flag | u(1) |
|       if (PictureDbrVEnableFlag) { | |
|         dbr_v_offset0_minus1 | u(2) |
|         dbr_v_offset1_minus1 | u(2) |
|       } | |
|       picture_alt_dbr_v_enable_flag | u(1) |
|       if (PictureAltDbrVEnableFlag) { | |
|         dbr_v_alt_offset0_minus1 | u(2) |
|         dbr_v_alt_offset1_minus1 | u(2) |
|       } | |
|       if (PictureDbrVEnableFlag \|\| PictureAltDbrVEnableFlag) { | |
|         dbr_v_threshold_minus1 | u(1) |
|       } | |

TABLE 7-2-continued

| Intra Picture Header. | |
| --- | --- |
| Intra prediction picture header definition | Descriptor |

| | |
| --- | --- |
|     picture_dbr_h_enable_flag | u(1) |
|     if (PictureDbrHEnableFlag) { | |
|       dbr_h_offset0_minus1 | u(2) |
|       dbr_h_offset1_minus1 | u(2) |
|     } | |
|     picture_alt_dbr_h_enable_flag | u(1) |
|     if (PictureAltDbrHEnableFlag) { | |
|       dbr_h_alt_offset0_minus1 | u(2) |
|       dbr_h_alt_offset1_minus1 | u(2) |
|     } | |
|     if (PictureDbrHEnableFlag \|\| PictureAltDbrHEnableFlag) { | |
|       dbr_h_threshold_minus1 | u(1) |
|     } | |
|   } | |
| } | |
| chroma_quant_param_disable_flag | u(1) |
| if (chroma_quant_param_disable_flag == '0') { | |
|   chroma_quant_param_delta_cb | se(v) |
|   chroma_quant_param_delta_cr | se(v) |
| } | |
| if (WeightQuantEnableFlag) { | |
|   picture_weight_quant_enable_flag | u(1) |
|   if (PictureWeightQuantEnableFlag) { | |
|     picture_weight_quant_data_index | u(2) |
|     if (picture_weight_quant_data_index == '01') { | |
|       reserved_bits | r(1) |
|       weight_quant_param_index | u(2) |
|       weight_quant_model | u(2) |
|       if (weight_quant_param_index == '01') { | |
|         for ( i=0; i<6; i++ ) { | |
|           weight_quant_param_delta1[i] | se(v) |
|         } | |
|       } | |
|       if (weight_quant_param_index == '10') { | |
|         for ( i=0; i<6; i++ ) { | |
|           weight_quant_param_delta2[i] | se(v) |
|         } | |
|       } | |
|     } | |
|     else if (picture_weight_quant_data_index == '10') { | |
|       weight_quant_matrix( ) | |
|     } | |
|   } | |
| } | |
| if (EsaoEnableFlag) { | |
|   esao_parameter_picture_header_set( ) | |
| } | |
| if (CcsaoEnableFlag) { | |
|   ccsao_parameter_picture_header_set( ) | |
| } | |
| if (AlfEnableFlag) { | |
|   for (compIdx=0; compIdx<3; compIdx++) { | |
|     picture_alf_enable_flag[compIdx] | u(1) |
|   } | |
|   if (PictureAlfEnableFlag[0] == 1 \|\| PictureAlfEnableFlag[1] == 1 \|\| | |
| PictureAlfEnableFlag[2] == 1) { | |
|     alf_parameter_set( ) | |
|   } | |
| } | |
| if (SawpEnableFlag) { | |
|   picture_awp_refine_index | u(1) |
| } | |
| if (IbcEnableFlag) { | |
|   picture_ibc_enable_flag | u(1) |
|   if (PictureIbcEnableFlag && 序列级 SIBC) { | |
|     picture_sibc_enable_flag | u(1) |
|   } | |
| } | |
| if (IscEnableFlag) { | |
|   picture_isc_os_enable_flag | u(1) |
|   picture_isc_evs_ubvs_enable_flag | u(1) |
| } | |
| if (FimcEnableFlag) { | |
|   picture_fimc_enable_flag | u(1) |
| } | |
| if (IstEnableFlag) { | |

TABLE 7-2-continued

Intra Picture Header.

| Intra prediction picture header definition | Descriptor |
|---|---|
|     picture_ts_enable_flag | u(1) |
|   } | |
| if (PmcEnableFlag){ | |
|     picture_pmc_param_index | u(1) |
|   } | |
| if (NnFilterEnableFlag) { | |
|     for (compIdx=0;compIdx<3; compIdx++) { | |
|         picture_nn_filter_enable_flag[comIdx] | u(1) |
|         if (PictureNnFilterEnableFlag[comIdx]) { | |
|           picture_nn_filter_AdaptiveFlag[comIdx] == 0) { | u(1) |
|             if (PictureNnFilterAdaptiveFlag[comIdx] == 0) { | |
|               if (NumOfNnFilter > 1) { | |
|                 picture_nn_filter_set_index[comIdx] | ue(v) |
|               } | |
|             } | |
|           } | |
|         } | |
|     } | |
| next_start_code( ) | |
| } | |

TABLE 7-3

Inter Picture Header.

| Inter prediction picture header definition | Descriptor |
|---|---|
| inter_picture_header( ) { | |
|   inter_picture_start_code | f(32) |
|   random_access_decodable_flag | u(1) |
|   bbv_delay | u(32) |
|   picture_coding_type | u(2) |
|   decode_order_index | u(8) |
|   if (temporal_id_enable_flag == '1') | |
|     temporal_id | u(3) |
|   if (low_delay == '0') | |
|     picture_output_delay | ue(v) |
|   if (low_delay == '1') | |
|     bbv_check_times | ue(v) |
|   progressive_frame | u(1) |
|   if (progressive_frame == '0') { | |
|     picture_structure | u(1) |
|   } | |
|   top_field_first | u(1) |
|   repeat_first_field | u(1) |
|   if (field_coded_sequence == '1') { | |
|     top_field_picture_flag | u(1) |
|     reserved_bits | r(1) |
|   } | |
|   ref_pic_list_set_flag[0] | u(1) |
|   if (RefPicListSetFlag[0]) { | |
|     if ( NumRefPicListSet[0] > 1 ) { | |
|       ref_pic_list_set_index[0] | ue(v) |
|     } | |
|   } | |
|   else { | |
|     reference_picture_list_set(0, NumRefPicListSet[0]) | |
|   } | |
|   if (Rpl1IndexExistFlag) | |
|     ref_pic_list_set_flag[1] | u(1) |
|   if (RefPicListSetFlag[1]) { | |
|     if (Rpl1IndexExistFlag && NumRefPicListSet[1] > 1) { | |
|       ref_pic_list_set_index[1] | ue(v) |
|     } | |
|   } | |
|   else { | |
|     reference_picture_list_set(1, NumRefPicListSet[1]) | |
|   } | |
|   num_ref_active_override_flag | u(1) |
|   if (num_ref_active_override_flag == '1') | |
|     num_ref_active_minus1[0] | ue(v) |
|     if (picture_coding_type == '10') | |
|       num_ref_active_minus1[1] | ue(v) |

TABLE 7-3-continued

| Inter Picture Header. | |
|---|---|
| Inter prediction picture header definition | Descriptor |
| } | |
| fixed_picture_qp_flag | u(1) |
| picture_qp | u(7) |
| if ((! FixedPictureQpFlag) && (profile_id == 0x32 \|\| profile_id == 0x30)) { | |
|   cu_delta_qp_flag | u(1) |
|   if (CuDeltaQpFlag) { | |
|     cu_qp_group_size_log2_minus3 | u(2) |
|   } | |
| } | |
| if (! ((picture_coding_type == '10') && (PictureStructure == 1))) | |
|   reserved_bits | r(1) |
| deblocking_filter_disable_flag | u(1) |
| if (! DeblockingFilterDisableFlag) { | |
|   if (profile_id == 0x32 \|\| profile_id == 0x30) { | |
|     deblocking_filter_type | u(1) |
|   } | |
|   deblocking_filter_parameter_flag | u(1) |
|   if (deblocking_filter_parameter_flag == '1') { | |
|     alpha_c_offset | se(v) |
|     beta_offset | se(v) |
|   } | |
|   if (profile_id == 0x32 \|\| profile_id == 0x30) { | |
|     picture_dbr_v_enable_flag | u(1) |
|     if (PictureDbrVEnableFlag) { | |
|       dbr_v_offset0_minus1 | u(2) |
|       dbr_v_offset1_minus1 | u(2) |
|     } | |
|     picture_alt_dbr_v_enable_flag | u(1) |
|     if (PictureAltDbrVEnableFlag) { | |
|       dbr_v_alt_offset0_minus1 | u(2) |
|       dbr_v_alt_offset1_minus1 | u(2) |
|     } | |
|     if (PictureDbrVEnableFlag \|\| PictureAltDbrVEnableFlag) { | |
|       dbr_v_threshold_minus1 | u(1) |
|     } | |
|     picture_dbr_h_enable_flag | u(1) |
|     if (PictureDbrHEnableFlag) { | |
|       dbr_h_offset0_minus1 | u(2) |
|       dbr_h_offset1_minus1 | u(2) |
|     } | |
|     picture_alt_dbr_h_enable_flag | u(1) |
|     if (PictureAltDbrHEnableFlag) { | |
|       dbr_h_alt_offset0_minus1 | u(2) |
|       dbr_h_alt_offset1_minus1 | u(2) |
|     } | |
|     if (PictureDbrHEnableFlag \|\| PictureAltDbrHEnableFlag) { | |
|       b | u(1) |
|     } | |
|   } | |
| } | |
| chroma_quant_param_disable_flag | u(1) |
| if (chroma_quant_param_disable_flag == '0') { | |
|   chroma_quant_param_delta_cb | se(v) |
|   chroma_quant_param_delta_cr | se(v) |
| } | |
| if (WeightQuantEnableFlag) { | |
|   picture_weight_quant_enable_flag | u(1) |
|   if (PictureWeightQuantEnableFlag) { | |
|     picture_weight_quant_data_index | u(2) |
|     if (picture_weight_quant_data_index == '01') { | |
|       reserved_bits | r(1) |
|       weight_quant_param_index | u(2) |
|       weight_quant_model | u(2) |
|       if (weight_quant_param_index == '01') { | |
|         for (i=0; i<6; i++) { | |
|           weight_quant_param_delta1[i] | se(v) |
|         } | |
|       } | |
|       if (weight_quant_param_index == '10') { | |
|         for (i=0; i<6; i++) { | |
|           weight_quant_param_delta2[i] | se(v) |
|         } | |
|       } | |
|     } | |
|     else if (picture_weight_quant_data_index == '10') { | |
|       weight_quant_matrix( ) | |

TABLE 7-3-continued

| Inter prediction picture header definition | Descriptor |
|---|---|
|      } | |
|     } | |
|   } | |
| if (EsaoEnableFlag) { | |
|     esao_parameter_picture_header_set( ) | |
| } | |
| if (CcsaoEnableFlag) { | |
|     ccsao_parameter_picture_header_set( ) | |
| } | |
| if (AlfEnableFlag) { | |
|     for (compIdx=0; compIdx<3; compIdx++) { | |
|       picture_alf_enable_flag[compIdx] | u(1) |
|     } | |
|     if (PictureAlfEnableFlag[0] == 1 \|\|   PictureAlfEnableFlag[1] == 1   \|\| | |
| PictureAlfEnableFlag[2] == 1) { | |
|       alf_parameter_set( ) | |
|     } | |
| } | |
| if (AffineEnableFlag) { | |
|     affine_subblock_size_flag | u(1) |
| } | |
| if (IbcEnableFlag) { | |
|     picture_ibc_enable_flag | u(1) |
| } | |
| if (IscEnableFlag) { | |
|     picture_isc_os_enable_flag | u(1) |
|     picture_isc_evs_ubvs_enable_flag | u(1) |
| } | |
| if (FimcEnableFlag) { | |
|     picture_fimc_enable_flag | u(1) |
| } | |
| if (IstEnableFlag \|\| SbtEnableFlag) { | |
|     picture_ts_enable_flag | u(1) |
| if ((AwpEnableFlag && PictureType == 2) \|\| SawpEnableFlag) { | |
|     picture_awp_refine_index | u(1) |
| } | |
| if (UmveEnhancementEnableFlag) { | |
|     picture_umve_step_set_index | u(1) |
| } | |
| if (ObmcEnableFlag && PictureType == 2) { | |
|     picture_obmc_blending_set_index | u(1) |
| } | |
| if (PmcEnableFlag){ | |
|     picture_pmc_param_index | u(1) |
| } | |
| if (InterPcEnableFlag){ | |
|     picture_inter_pc_skip_flag | u(1) |
| } | |
| if (NnFilterEnableFlag) { | |
|     for (compIdx=0; compIdx<3; compIdx++) { | |
|       <u>picture_nn_filter_enable_flag[comIdx]</u> | <u>u(1)</u> |
|       <u>if (PictureNnFilterEnableFlag[comIdx]) {</u> | |
|         <u>picture_nn_filter_adaptive_flag[comIdx]</u> | <u>u(1)</u> |
|         <u>if (PictureNnFilterAdaptiveFlag[comIdx] == 0) {</u> | |
|           <u>if (NumOfNnFilter > 1) {</u> | |
|             <u>picture_nn_filter_set_index[comIdx]</u> | <u>ue(v)</u> |
|           <u>}</u> | |
|         <u>}</u> | |
|       <u>}</u> | |
|     <u>}</u> | |
|   <u>}</u> | |
|   next_start_code( ) | |
| } | |

TABLE 7-4

| Slice definition | Descriptor |
|---|---|
| Patch or slice. | |
| patch( ) { | |
|   patch_start_code | f(32) |

TABLE 7-4-continued

Patch or slice.

| Slice definition | Descriptor |
|---|---|
| if (! FixedPictureQpFlag) { | |
|   fixed_patch_qp_flag | u(1) |
|   patch_qp | u(7) |
| } | |
| if (SaoEnableFlag) { | |
|   for (compIdx=0; compIdx<3; compIdx++) { | |
|     patch_sao_enable_flag[compIdx] | u(1) |
|   } | |
| } | |
| while (! byte_aligned( )) | |
|   aec_byte_alignment_bit | f(1) |
| do { | |
|   if (! FixedQP) { | |
|     if (! CuDeltaQpFlag) { | |
|       lcu_qp_delta | ae(v) |
|     } | |
|     PreviousDeltaQP = lcu_qp_delta | |
|   } | |
|   if (SaoEnableFlag) { | |
|     if (PatchSaoEnableFlag[0]  ||  PatchSaoEnableFlag[1]  ||  PatchSaoEnableFlag[2]) { | |
|       if (MergeFlagExist) | |
|         sao_merge_type_index | ae(v) |
|       if (SaoMergeMode == 'SAO_NON_MERGE') { | |
|         for (compIdx=0; compIdx<3; compIdx++) { | |
|           if (PatchSaoEnableFlag[compIdx]) { | |
|             sao_mode[compIdx] | ae(v) |
|             if (SaoMode[compIdx] == 'SAO_Interval') { | |
|               for (j=0; j<MaxOffsetNumber; j++) { | |
|                 sao_interval_offset_abs[compIdx][j] | ae(v) |
|                 if (SaoIntervalOffsetAbs[compIdx][j]) | |
|                   sao_interval_offset_sign[com pIdx][j] | ae(v) |
|               } | |
|               sao_interval_start_pos[compIdx] | ae(v) |
|               sao_interval_delta_pos_minus2[compI dx] | ae(v) |
|             } | |
|             if (SaoMode[compIdx] == 'SAO_Edge') { | |
|               for (j=0; j<MaxOffsetNumber; j++) | |
|                 sao_edge_offset[compIdx][j] | ae(v) |
|               sao_edge_type[compIdx] | ae(v) |
|             } | |
|           } | |
|         } | |
|       } | |
|     } | |
|   } | |
|   if (EsaoEnableFlag) { | |
|     for(compIdx=0; compIdx<3; compIdx++) { | |
|       if    (PictureEsaoEnableFlag[compIdx] && PictureEsaoLcuControlFlag[compIdx]) { | |
|         esao_lcu_enable_flag[compIdx][LcuIdx] | ae(v) |
|         if  (EsaoLcuEnableFlag[compIdx][LcuIdx] && PictureEsaoSetNum[compIdx]>1) { | |
|           esao_lcu_set_index[compIdx][LcuIdx] | ae(v) |
|         } | |
|       } | |
|     } | |
|   } | |
|   if (CcsaoEnableFlag) { | |
|     for(compIdx=1; compIdx<3; compIdx++) { | |
|       if    (PictureCcsaoEnableFlag[compIdx] && PictureCcsaoLcuControlFlag[compIdx]) { | |
|         ccsao_lcu_enable_flag[compIdx][LcuIdx] | ae(v) |
|         if   (CcsaoLcuEnableFlag[compIdx][LcuIdx] && PictureCcsaoSetNum[compIdx]>1){ | |
|           ccsao_lcu_set_index_[compIdx][LcuIdx] | ae(v) |
|         } | |
|       } | |
|     } | |
|   } | |
|   for (compIdx=0; compIdx<3; compIdx++) { | |
|     if (PictureAlfEnableFlag[compIdx] == 1) | |

TABLE 7-4-continued

| Patch or slice. | |
| --- | --- |
| Slice definition | Descriptor |
|     alf_lcu_enable_flag[compIdx][LcuIdx] | ae(v) |
|   } | |
|   for (compIdx=0; compIdx<3; compIdx++) { | |
|     if (pictureNnFilterAdaptiveFlag[compIdx]) { | |
|       nn_filter_lcu_enabled_flag[compIdx][LcuIdx] | ae(v) |
|       if (NnFilterLcuEnableFlag[compIdx][LcuIdx] { | |
|         if (NumOfNnFilter > 1) { | |
|           nn_filter_lcu_set_index[compIdx][LcuIdx] | ae(v) |
|         } | |
|       } | |
|     } | |
|   } | |
|   x0 = (LcuIdx % PictureWidthInLcu) * LcuSize | |
|   y0 = (LcuIdx / PictureWidthInLcu) * LcuSize | |
|   Component = 0 | |
|   coding_unit_tree(x0, y0, 0, 1<<LcuSizeInBit, 1<<LcuSizeInBit, 1, | |
|   'PRED_No_Constraint') | |
|   aec_lcu_stuffing_bit | ae(v) |
|   } while (! is_end_of_patch( )) | |
|   next_start_code( ) | |
|   patch_end_code | f(32) |
| } | |

The sequence header is discussed further. The enhanced sample offset compensation enable flag (e.g., esao_enable_flag) may be a binary variable. A value of '1' indicates that enhanced sample offset compensation can be used; a value of '0' indicates that enhanced sample offset compensation should not be used. The value of EsaoEnableFlag is equal to the value of esao_enable_flag. If esao_enable_flag does not exist in the bitstream, the value of EsaoEnableFlag is 0. If the value of EsaoEnableFlag is 1, the value of SaoEnableFlag shall be 0.

The enhanced temporal motion vector prediction and motion vector angle prediction enable flag (e.g., etmvp_mvap_enable_flag) may be a binary variable. A value of '1' indicates that enhanced temporal motion vector prediction and motion vector angle prediction can be used; a value of '0' indicates that enhanced temporal motion vector prediction and motion vector angle prediction should not be used. The value of EtmvpMvapEnableFlag is equal to the value of etmvp_mvap_enable_flag. If etmvp_mvap_enable_flag does not exist in the bitstream, the value of EtmvpMvapEnableFlag is 0.

In this seventh exemplary embodiment, a neural network toolset (e.g., nn_tools_set_hook) may be an 8-bit unsigned integer. A tool that identifies whether to use a neural network. If nn_tools_set_hook is not present in the bitstream, the value of nn_tools_set_hook shall be '00000000'. The decoding process should ignore these bits.

The value of the last bit of nn_tools_set_hook is '1', which means that neural network filtering can be used; the value of the last bit of nn_tools_set_hook is '0', which means that neural network filtering should not be used. The value of NnFilterEnableFlag is equal to the value of nn_tools_set_hook & 0x01. If nn_tools_set_hook does not exist in the bitstream, the value of NnFilterEnableFlag is equal to 0. Other bits are reserved.

Number of Neural Network Filter Models num_of_nn_filter_minus1

Indicates the number of filter models available for neural network filtering. An example of the parsing process is described further below. The value of NumOfNnFilter is equal to the value of num_of_nn_filter_minus1 plus 1. If num_of_nn_filter_minus1 is not present in the bitstream, the value of NumOfNnFilter is equal to 0. The decoding process should ignore these bits.

The enhanced adaptive correction filter enable flag (e.g., ealf_enable_flag) may be a binary variable. A value of '1' indicates that enhanced adaptive correction filtering should be used; a value of '0' indicates that enhanced adaptive correction filtering should not be used. The value of EalfEnableFlag is equal to the value of ealf_enable_flag. If ealf_enable_flag is not present in the bitstream, the value of EalfEnableFlag is 0.

The image reorder delay (e.g., output_reorder_delay) may be a 5-bit unsigned integer. The reordering delay caused by the inconsistency between the image encoding and decoding order and the display order, in units of decoded images. Since the display time of a decoded image is related to the values of syntax elements such as progressive_sequence, progressive_frame, repeat_first_field, picture_structure, etc., the absolute length of this time is not fixed, but the number of decoded images displayed during this time is fixed. When the low_delay value is '0', the value of OutputReorderDelay is equal to the value of output_reorder_delay; when the low_delay value is '1', the value of OutputReorderDelay is 0.

The intra picture header/inter picture header are now discussed. The weighted quantization parameter index (e.g., weight_quant_param_index) may be a 2-bit unsigned integer. Weighted quantization parameter index for the current image. A value of '11' is reserved.

The weighted quantization matrix model (e.g., weight_quant_model) may be a 2-bit unsigned integer specifying the distribution model of the weighted quantization parameters. A value of '11' is reserved. If weight_quant_model exists in the bitstream of the current image header, the value of WeightQuantModel is equal to the value of weight_quant_model.

The weighted quantization parameter delta 1 is weight_quant_param_delta1[i]. The weighted quantization parameter delta 2 is weight_quant_param_delta2[i].

The increment of the weighted quantization parameter of the current image, the value range is −128 to 127. For the parsing process, see below. See 9.2.6 in the AVS specification for the decoding process. If weight_quant_param_delta1[i] or weight_quant_param_delta2[i] does not exist in the bitstream of the current picture header, the value of weight_quant_param_delta1[i] or weight_quant_param_delta2[i] is 0.

The picture-level adaptive correction filtering enable flag (e.g., picture_alf_enable_flag[compIdx]) may be a binary variable. A value of '1' indicates that adaptive correction filtering can be used for the compIdx-th component of the current image; a value of '0' indicates that adaptive correction filtering should not be used for the compIdx-th component of the current image. The value of PictureAlfEnableFlag[compIdx] is equal to the value of picture_alf_enable_flag[compIdx].

In this seventh exemplary embodiment, the picture-level neural network filtering enable flag (e.g., picture_nn_filter_enable_flag[compIdx]) may be a binary variable. A value of '1' indicates that the compIdx-th component of the current image can be filtered by a neural network; a value of '0' means that the compIdx-th component of the current image should not be filtered by a neural network. The value of PictureNnFilterEnableFlag[compIdx] is equal to the value of picture_nn_filter_enable_flag[compIdx]. If picture_nn_filter_enable_flag[compIdx] does not exist in the bitstream, the value of PictureNnFilterEnableFlag[compIdx] is 0. The decoding process should ignore these bits.

The picture-level selective filtering adaptive flag (e.g., picture_nn_filter_adaptive_flag[compIdx]) may be a binary variable. A value of '1' indicates that the compIdx-th component of the current image can use adaptive neural network filtering; a value of '0' indicates that the compIdx-th component of the current image should not use adaptive neural network filtering. The value of PictureNnFilterAdaptiveFlag[compIdx] is equal to the value of picture_nn_filter_adaptive_flag[compIdx]. If picture_nn_filter_adaptive_flag[compIdx] does not exist in the bitstream, the value of PictureNnFilterAdaptiveFlag[compIdx] is 0. The decoding process should ignore these bits.

The image-level god-level network filter model index (e.g., picture_nn_filter_set_index[compIdx]) may represent the model index of the compIdx-th component of the current image filtered using the neural network. See below for the parsing process, the value ranges from 0 to NumOfNnFilter−1. The value of PictureNnFilterSetIndex[compIdx] is equal to the value of picture_nn_filter_set_index[compIdx]. If picture_nn_filter_set_index[compIdx] does not exist in the bitstream, the value of PictureNnFilterSetIndex[compIdx] is −1. The decoding process should ignore these bits.

The picture level block copy intra prediction enable flag (e.g., picture_ibc_enable_flag) may be a binary variable. A value of '1' indicates that the current picture can use block copy intra prediction; a value of '0' indicates that the current picture should not use block copy intra prediction. The value of PictureIbcEnableFlag is equal to the value of picture_ibc_enable_flag. If picture_ibc_enable_flag does not exist in the bitstream, the value of PictureIbcEnableFlag is 0.

A piece is now discussed. The LCU cross-component sample offset compensation set index (e.g., ccsao_lcu_set_index[compIdx][LcuIdx]) may indicate the cross-component sample offset compensation group that should be used for the samples of the LcuIdx largest coding unit compIdx component, see below for the parsing process. The value of CcsaoLcuSetIndex[compIdx][LcuIdx] is equal to the value of ccsao_lcu_set_idx[compIdx][LcuIdx]. The value range of ccsao_lcu_set_index[compIdx][LcuIdx] is 0 to 3. If ccsao_l- cu_set_index[compIdx][LcuIdx] does not exist in the bitstream, the value of ccsao_lcu_set_index[compIdx][LcuIdx] is 0.

The maximum coding unit adaptive correction filter enable flag (e.g., alf_lcu_enable_flag[compIdx][LcuIdx]) may be a binary variable. A value of '1' indicates that the samples of the LcuIdx-th LCU compIdx component should use adaptive modification filtering; a value of '0' indicates that the samples of the LcuIdx-th LCU compIdx component should not use adaptive modification filtering. The value of AlfLCUEnableFlag[compIdx][LcuIdx] is equal to the value of alf_lcu_enable_flag[compIdx][LcuIdx].

In this seventh exemplary embodiment, the maximum coding unit neural network filter enable flag (e.g., nn_filter_lcu_enable_flag[compIdx][LcuIdx]) may be a binary variable. A value of '1' indicates that samples of the LcuIdx-th largest coding unit compIdx component should be filtered using a neural network; a value of '0' indicates that samples of the LcuIdx-th largest coding unit compIdx component should not be filtered using a neural network. The parsing process is described further below. The value of NnFilterLcuEnableFlag[compIdx][LcuIdx] is equal to the value of nn_filter_lcu_enable_flag[compIdx][LcuIdx]. If nn_filter_lcu_enable_flag[compIdx][LcuIdx] does not exist in the bitstream, the value of NnFilterLcuEnableFlag[compIdx][LcuIdx] is 0. The decoding process should ignore these bits.

The maximum coding unit neural network filter model index (e.g., nn_filter_lcu_set_index[compIdx][LcuIdx]) may indicate the model index of the neural network filter used by the samples of the LcuIdx largest coding unit compIdx component, see 8.3 for the parsing process, and the value range is 0 to NumOfNnFilter−1. The value of NnFilterLCUSetIndex[compIdx][LcuIdx] is equal to the value of nn_filter_lcu_set_index[compIdx][LcuIdx]. If nn_filter_lcu_set_index[compIdx][LcuIdx] does not exist in the bitstream, the value of NnFilterLCUSetIndex[compIdx][LcuIdx] is −1. The decoding process should ignore these bits.

The advanced entropy coding maximum coding unit stuffing bit (e.g., aec_lcu_stuffing_bit) may comprise padding bits. The value of the unit acc_lcu_stuffingbit of the last largest coding unit of the slice shall be '1', and a parsing procedure is described further below.

The patch end code (e.g., patch-end-code) may comprise a bit string '0x0000018F', and marks or indicates the end of the slice.

Various parsing processes are now described. When parsing k-order exponential Golomb code, firstly look for the first non-zero bit from the current position of the bit stream, record the number of zero bits found as leadingZeroBits, and then calculate CodeNum according to leadingZeroBits. Described in pseudocode as follows:

```
leadingZeroBits = −1
for (b=0; ! b; leadingZeroBits++) {
    b = read_bits(1)
}
CodeNum = 2^{leadingZeroBits+k} − 2^k + read_bits(leadingZeroBits + k)
```

Table 7-5 gives the structure of exponential Golomb codes of order 0, 1, 2 and 3. The bit string of Exponential Golomb code is divided into two parts: "prefix" and "suffix". The prefix consists of leadingZeroBits consecutive '0's and a '1'. The suffix consists of leadingZeroBits+k bits, that is, the xi string in the table, and the value of xi is '0' or '1'.

TABLE 7-5

| k exponential Golomb code. | | |
|---|---|---|
| Order | Codeword structure | CodeNum value range |
| k = 0 | 1 | 0 |
| | 0 1 $x_0$ | 1~2 |
| | 0 0 1 $x_1$ $x_0$ | 3~6 |
| | 0 0 0 1 $x_2$ $x_1$ $x_0$ | 7~14 |
| | . . . | . . . |
| k = 1 | 1 $x_0$ | 0~1 |
| | 0 1 $x_1$ $x_0$ | 2~5 |
| | 0 0 1 $x_2$ $x_1$ $x_0$ | 6~13 |
| | 0 0 0 1 $x_3$ $x_2$ $x_1$ $x_0$ | 14~29 |
| | . . . | . . . |
| k = 2 | 1 $x_1$ $x_0$ | 0~3 |
| | 0 1 $x_2$ $x_1$ $x_0$ | 4~11 |
| | 0 0 1 $x_3$ $x_2$ $x_1$$x_0$ | 12~27 |
| | 0 0 0 1 $x_4$ $x_3$ $x_2$ $x_1$ $x_0$ | 28~59 |
| | . . . | . . . |
| k = 3 | 1 $x_2$ $x_1$ $x_0$ | 0~7 |
| | 0 1 $x_3$ $x_2$ $x_1$ $x_0$ | 8~23 |
| | 0 0 1 $x_4$ $x_3$ $x_2$ $x_1$ $x_0$ | 24~55 |
| | 0 0 0 1 $x_5$ $x_4$ $x_3$ $x_2$ $x_1$ $x_0$ | 56~119 |
| | . . . | . . . |

When parsing the grammar elements described by ue(v) and se(v) use exponential Golomb codes of order 0, and their parsing process is:

ue(v): The value of the syntax element is equal to Code-Num;

se(v): Calculate the value of the syntax element according to the mapping relationship of the signed exponential Golomb code given in Table 7-6.

TABLE 7-6

| Mapping relationship between se(v) and CodeNum | |
|---|---|
| CodeNum value | Syntax element value |
| 0 | 0 |
| 1 | 1 |
| 2 | −1 |
| 3 | 2 |
| 4 | −2 |
| 5 | 3 |
| 6 | −3 |
| k | $(-1)^{k+1} \times \mathrm{Ceil}(k \div 2)$ |

When parsing the grammar elements described by ae(v), and before parsing the slice, first initialize all binary symbolic models and entropy codecs as described below. The binary symbol string is then parsed sequentially from the bit stream as described below. Finally, the value of the syntax element described by ae(v) is obtained according to the binary symbol string as described below.

If any of the following conditions exist, initialize the entropy codec, see 8.3.2.2

The current coding unit contains only luma components and IntraLumaPredMode is equal to 'Intra_Luma_PCM', or the current coding unit contains luma and chroma components and IntraLumaPredMode is equal to 'Intra_Luma_PCM' and IntraChromaPredMode is not equal to 'Intra_Chroma_PCM', after parsing the pcm_coeff of the luma coding block, initialize the entropy codec.

The current coding unit contains only chroma components and IntraChromaPredMode is equal to 'Intra_Chroma_PCM', or the current coding unit contains luma and chroma components and IntraLumaPredMode is equal to 'Intra_Luma_PCM' and IntraChromaPredMode is equal to 'Intra_Chroma_PCM', after parsing the pcm_coeff of the chroma coding block, Initialize the entropy codec.

TABLE 8.3.3.2.1

| Export a binary symbolic model (references to various sections refer to the AVS specification) | | | |
|---|---|---|---|
| Syntax element | ctxIdxInc | ctxIdxStart | Number of ctx |
| lcu_qp_delta | See 8.3.3.2.2 | 0 | 4 |
| sao_merge_type_index | binIdx+SaoMergeLeftAvai+SaoMergeUpAvai−1 | 4 | 3 |
| sao_mode | 0 | 7 | 1 |
| sao_interval_offset_abs | 0 | 8 | 1 |
| alf_lcu_enable_flag | 0 | 9 | 1 |
| qt_split_flag | See 8.3.3.2.3 | 10 | 4 |
| bet_split_flag | See 8.3.3.2.4 | 14 | 9 |
| bet_split_type_flag | See 8.3.3.2.5 | 23 | 3 |
| bet_split_dir_flag | See 8.3.3.2.6 | 26 | 5 |
| root_cu_constraint | 0 | 31 | 1 |
| intra_chroma_pred_mode_index | See 8.3.3.2.7 | 32 | 3 |
| chroma_eipm_index | 0 | 35 | 1 |
| chroma_pmc_index | 0 | 36 | 1 |
| chroma_pmc_param_index | 0 | 37 | 1 |
| ctp_u | 0 | 38 | 1 |
| ctp_v | 0 | 39 | 1 |
| chroma_st_flag | 0 | 40 | 1 |
| ts_cu_flag | 0 | 41 | 1 |
| skip flag | See 8.3.3.2.8 | 42 | 4 |
| advamced_prediction_flag | 0 | 46 | 1 |
| affine_flag | 0 | 47 | 1 |
| affine_umve_flag | 0 | 48 | 1 |
| direct_flag | See 8.3.3.2.9 | 49 | 2 |
| inter_pf_flag | 0 | 51 | 1 |
| inter_pf_index | 0 | 52 | 1 |
| inter_pc_flag | 0 | 53 | 1 |
| inter_pc_index | binIdx | 54 | 2 |
| intra_cu_flag | See 8.3.3.2.10 | 56 | 6 |
| sawp_flag | 0 | 62 | 1 |
| dt_split_flag | 0 | 63 | 1 |
| dt_split_dir | 0 | 64 | 1 |
| dt_split_hqt_flag | 0 | 65 | 1 |

TABLE 8.3.3.2.1-continued

Export a binary symbolic model (references to various sections refer to the AVS specification)

| Syntax element | ctxIdxInc | ctxIdxStart | Number of ctx |
|---|---|---|---|
| dt_split_vqt_flag | 0 | 66 | 1 |
| dt_split_hadt_flag | 0 | 67 | 1 |
| dt_split_vadt_flag | 0 | 68 | 1 |
| umve_mv_index | 0 | 69 | 1 |
| umve_step_index | 0 | 70 | 1 |
| umve_dir_index | binIdx | 71 | 2 |
| cu_affine_cand_index | binIdx | 73 | 4 |
| etmvp_flag | 0 | 77 | 1 |
| cu_etmvp_cand_index | binIdx | 78 | 4 |
| awp_flag | 0 | 82 | 1 |
| awp_mvr_cand_flag0 | 0 | 83 | 1 |
| awp_mvr_cand_flag1 | | | |
| awp_mvr_cand_step0 | 0 | 84 | 1 |
| awp_mvr_cand_step1 | | | |
| awp_mvr_cand_dir0 | binIdx | 85 | 2 |
| awp_mvr_cand_dir1 | | | |
| awp_cand_index0 | 0 | 87 | 1 |
| awp_cand_index1 | See 8.3.3.2.11 | 88 | 2 |
| affine_umve_step_index0 | 0 | 90 | 1 |
| affine_umve_step_index1 | | | |
| affine_umve_dir_index0 | binIdx | 91 | 2 |
| affine_umve_dir_index1 | | | |
| cu_subtype_index | binIdx | 93 | 11 |
| isc_ibc_cu_flag | 0 | 104 | 1 |
| ibc_cu_flag | See 8.3.3.2.12 | 105 | 3 |
| sbic_flag | 0 | 108 | 1 |
| sibc_dir_flag | 0 | 109 | 1 |
| cbvp_index | binIdx | 110 | 6 |
| abvr_index | binIdx | 116 | 1 |
| extend_mvr_flag | 0 | 117 | 1 |
| affine_amvr_index | binIdx | 118 | 2 |
| amvr_index | binIdx | 120 | 4 |
| inter_pred_ref_mode_indes | See 8.3.3.2.13 | 124 | 3 |
| smvd_flag | 0 | 127 | 1 |
| pu_reference_index_l0 | See 8.3.3.2.14 | 128 | 3 |
| pu_reference_index_l1 | | | |
| mv_diff_x_abs_l0 | See 8.3.3.2.15 | 131 | 3 |
| mv_diff_x_abs_l0_affine | | | |
| mv_diff_x_absl1 | | | |
| mv_diff_x_absl1_affine | | | |
| mv_diff_y_abs_l0 | See 8.3.3.2.15 | 134 | 3 |
| mv_diff_y_abs_l0_affine | | | |
| mv_diff_y_abs_l1 | | | |
| mv_diff_y_abs_l1_affine | | | |
| mv_diff_x_abs_bv | See 8.3.3.2.16 | 137 | 7 |
| mv_diff_y_abs_bv | See 8.3.3.2.17 | 144 | 8 |
| sibc_flag | 0 | 152 | 1 |
| sibc_dir_flag | 0 | 153 | 1 |
| bgc_flag | 0 | 154 | 1 |
| bgc_index | 0 | 155 | 1 |
| intra_luma_pred_mode_index | See 8.3.3.2.18 | 156 | 7 |
| sawp_pred_mode0_index | | | |
| sawp_pred_mode1_index | | | |
| luma_eipm_index | 0 | 163 | 1 |
| intra_pf_flag | 0 | 164 | 1 |
| iip_flag | 0 | 165 | 1 |
| ctp_zero_flag | See 8.3.3.2.19 | 166 | 2 |
| pbt_cu_flag | 0 | 168 | 1 |
| ctp_y[i] | 0 | 169 | 1 |
| cu_qp_delta_abs | See 8.3.3.2.20 | 170 | 4 |
| enhanced_ts_flag | 0 | 174 | 1 |
| sbt_cu_flag | See 8.3.3.2.21 | 175 | 2 |
| sbt_quad_flag | 0 | 177 | 1 |
| sbt_dir_flag | See 8.3.3.2.22 | 178 | 3 |
| scan_region_x | See 8.3.3.2.23 | 181 | 28 |
| scan_region_y | See 8.3.3.2.23 | 209 | 28 |
| significant_flag | See 8.3.3.2.24 | 237 | 60 |
| coeff_abs_level_greater1_flag | See 8.3.3.2.25 | 297 | 22 |
| coeff_abs_level_greater2_flag | | | |
| coeff_abs_level_greater4_flag | | | |
| coeff_abs_level_greater8_flag | | | |
| coeff_run | See 8.3.3.2.26 | 319 | 24 |
| coeff_level_minus1 | See 8.3.3.2.26 | 333 | 24 |
| coeff_last | See 8.3.3.2.27 | 357 | 34 |
| est_cu_flag | 0 | 391 | 1 |
| esao_lcu_enable_flag | 0 | 392 | 1 |

TABLE 8.3.3.2.1-continued

| Export a binary symbolic model (references to various sections refer to the AVS specification) | | | |
|---|---|---|---|
| Syntax element | ctxIdxInc | ctxIdxStart | Number of ctx |
| ccsao_lcu_enable_flag | 0 | 393 | 1 |
| isc_match_type | 0 | 394 | 1 |
| isc_pixel_match_type | 0 | 395 | 1 |
| isc_next_remaining_pixel_in_cu | binIdx | 396 | 3 |
| isc_sv_above_flag | 0 | 399 | 1 |
| isc_sv_recent_flag | 0 | 400 | 1 |
| isc_sv_recent_index | binIdx | 401 | 3 |
| isc_sv_y_abs | See 8.3.3.2.16 | 404 | 7 |
| isc_sv_x_non_zero_flag | 0 | 411 | 1 |
| isc_sv_y_non_zero_flag | 0 | 412 | 1 |
| isc_subtype_flag | 0 | 413 | 1 |
| isc_ups_present_flag | 0 | 414 | 1 |
| isc_evs_ups_num_minus1 | 0 | 415 | 1 |
| isc_ups_max_length_minus1 | Min(binIdx,3) | 416 | 4 |
| str_length_minus1_prefix | (binIdx+1)>>1 | 420 | 3 |
| nn_filter_lcu_enable_flag | compIdx | 423 | 3 |
| nn_filter_lcu_set_index | compIdx*3+Min(binIdx,2) | 426 | 9 |

TABLE 8.3.3.3.1

| Parsing process | |
|---|---|
| Syntax element | Inverse binarization method |
| lcu_qp_delta | See 8.3.4.5 |
| sao_merge_type_index | See 8.3.4.6 |
| sao_mode | See 8.3.4.2, maxVal=2, The value of sao_mode is equal to synElVal |
| sao_interval_offset_abs | See 8.3.4.2 , maxVal=7 , The value of sao_interval_offset_abs is equal to synElVal |
| sao_interval_offset_sign | See 8.3.4.4, The value of sao_interval_offset_sign is equal to synElVal |
| sao_interval_start_pos | See 8.3.4.7 |
| sao_interval_delta_pos_minus2 | See 8.3.4.8 |
| sao_edge_offset[compIdx][j] ( j = 0~3 ) | See 8.3.4.9 |
| sao_edge_type | See 8.3.4.10 |
| alf_lcu_enable_flag | See 8.3.4.4, The value of alf_lcu_enable_flag is equal to synElVal |
| aec_lcu_stuffing_bit | See 8.3.4.4, The value of aec_lcu_stuffing_bit is equal to synElVal |
| qt_split_flag | See 8.3.4.4 , The value of qt_split_flag is equal to synElVal |
| bet_split_flag | See 8.3.4.4, The value of bet_split_flag is equal to synElVal |
| bet_split_type_flag | See 8.3.4.4, The value of bet_split_type_flag is equal to synElVal |
| root_cu_constraint | See 8.3.4.4, The value of root_cu_constraint is equal to synElVal |
| intra_chroma_pred_mode_index | See 8.3.4.2 , maxVal=((TscpmEnableFlag ‖ PmcEnableFlag) ? 5 : 4)) , The value of intra_chroma_pred_mode_index is equal to synElValo |
| chroma_eipm_index | See 8.3.4.2 , maxVal=3 , The value of chroma_eipm_index is equal to synElVal |
| chroma_pmc_index | See 8.3.4.4, The value of chroma_pmc_index is equal to synElVal |
| chroma_pmc_param_index | See 8.3.4.4, The value of chroma_pmc_param_index is equal to synElVal |
| ctp_u | See 8.3.4.4, The value of ctp_u is equal to synElVal |
| ctp_v | See 8.3.4.4, The value of ctp_v is equal to synElVal |
| skip_flag | See 8.3.4.4, The value of skip_flag is equal to synElVal |
| advanced_pred_flag | See 8.3.4.4, The value of advanced_pred_flag is equal to synElVal |
| awp_flag | See 8.3.4.4, The value of awp_flag is equal to synElVal |
| etmvp_flag | See 8.3.4.4, The value of etmvp_flag is equal to synElVal |
| cu_etmvp_cand_idx | See 8.3.4.2 , maxVal=4 , The value of cu_etmvp_cand_idx is equal to synElVal |
| affine_flag | See 8.3.4.4, The value of affine_flag is equal to synElVal |
| affine_umve_flag | See 8.3.4.4, The value of affine_umve_flag is equal to synElVal |
| direct_flag | See 8.3.4.4, The value of direct_flag is equal to synElVal |
| inter_pf_flag | See 8.3.4.4 , The value of inter_pf_flag is equal to synElVal |

TABLE 8.3.3.3.1-continued

| Parsing process | |
|---|---|
| Syntax element | Inverse binarization method |
| inter_pf_index | See 8.3.4.4 , The value of inter_pf_index is equal to synElVal |
| inter_pc_flag | See 8.3.4.4 , The value of inter_pc_flag is equal to synElVal |
| inter_pc_index | See 8.3.4.2, maxVal=2, The value of inter_pc_index is equal to synElVal |
| intra_cu_flag | See 8.3.4.4 , The value of intra_cu_flag is equal to synElVal |
| sawp_index | See 8.3.4.15 |
| sawp_pred_mode0_index | See 8.3.4.12 |
| sawp_pred_mode1_index | If the value of sawp_pred_mode0_index is less than 4, See 8.3.4.12 ; otherwise, See 8.3.4.13 |
| dt_split_flag | See 8.3.4.4 , The value of dt_split_flag is equal to synElVal |
| dt_split_dir | See 8.3.4.4, The value of dt_split_dir is equal to synElVal |
| dt_split_hqt_flag | See 8.3.4.4, The value of dt_split_hqt_flag is equal to synElVal |
| dt_split_vqt_flag | See 8.3.4.4, The value of dt_split_vqt_flag is equal to synElVal |
| dt_split_hadt_flag | See 8.3.4.4, The value of dt_split_hadt_flag is equal to synElVal |
| dt_split_vadt_flag | See 8.3.4.4, The value of dt_split_vadt_flag is equal to synElVal |
| umve_mv_index | See 8.3.4.2, maxVal=1, The value of umve_mv_index is equal to synElVal |
| umve_step_index | If the value of PictureUmveStepSetIndex is equal to 0, See 8.3.4.2, maxVal=4, The value of umve_step_index is equal to synElVal ; otherwise, See 8.3.4.11 |
| umve_dir_index | See 8.3.4.14 |
| cu_affine_cand_index | See 8.3.4.2 , maxVal=4 , The value of cu_affine_cand_index is equal to synElVal |
| awp_index | See 8.3.4.15 |
| awp_mvr_cand_flag0 | See 8.3.4.4, The value of awp_mvr_cand_flag0 is equal to synElVal |
| awp_mvr_cand_flag1 | See 8.3.4.4, The value of awp_mvr_cand_flag1 is equal to synElVal |
| awp_mvr_cand_step0 | See 8.3.4.2 , maxVal=4 , The value of awp_mvr_cand_step0 is equal to synElVal |
| awp_mvr_cand_step1 | See 8.3.4.2 , maxVal=4 , The value of awp_mvr_cand_step1 is equal to synElVal |
| awp_mvr_cand_dir0 | See 8.3.4.14 |
| awp_mvr_cand_dir1 | See 8.3.4.14 |
| awp_cand_index0 | See 8.3.4.2, maxVal=5, The value of awp_cand_index0 is equal to synElVal |
| awp_cand_index1 | See 8.3.4.2 , maxVal=(AwpMvrCandFlag0 == 0 && AwpMvrCandFlag1 == 0) \|\| (AwpMvrCandFlag0 == 1 && AwpMvrCandFlag1 == 1 && AwpMvrCandStep0 == AwpMvrCandStep1 && AwpMvrCandDir0 == AwpMvrCandDir1)? 4 : 5 , The value of awp_cand_index1 is equal to synElVal |
| affine_umve_step_index0 | See 8.3.4.2 , maxVal=4 , The value of affine_umve_step_index0 is equal to synElVal |
| affine_umve_step_index1 | See 8.3.4.2 , maxVal=4 , The value of affine_umve_step_index1 is equal to synElVal |
| affine_umve_dir_index0 | See 8.3.4.14 |
| affine_umve_dir_index1 | See 8.3.4.14 |
| cu_subtype_index | See 8.3.4.2 , maxVal=((PictureType == 1) ? (1+ NumOfHmvpCand) : (3+NumOfHmvpCand)) , The value of cu_subtype_index is equal to synElVal |
| isc_ibc_cu_flag | See 8.3.4.4, The value of isc_ibc_cu_flag is equal to synElVal |
| ibc_cu_flag | See 8.3.4.4 , The value of ibc_cu_flag is equal to synElVal |
| isc_subtype_flag | See 8.3.4.4, The value of isc_subtype_flag is equal to synElVal |
| cbvp_index | See 8.3.4.2, maxVal=6, The value of cbvp_index is equal to synElVal |
| abvr_index | See 8.3.4.2, maxVal=1, The value of abvr_index is equal to synElVal |
| extend_mvr_flag | See 8.3.4.4, The value of extend_mvr_flag is equal to synElVal |
| affine_amvr_index | See 8.3.4.2 , maxVal=2 , The value of affine_amvr_index is equal to synElVal |
| amvr_index | See 8.3.4.2, maxVal=4, The value of amvr_index is equal to synElVal |

TABLE 8.3.3.3.1-continued

| Parsing process | |
| --- | --- |
| Syntax element | Inverse binarization method |
| inter_pred_ref_mode_index | See 8.3.4.16 |
| smvd_flag | See 8.3.4.4, The value of smvd_flag is equal to synElVal |
| pu_reference_index_l0 | See 8.3.4.2, maxVal=NumRefActive[0]−1, The value of pu_reference_index_l0 is equal to synElVal |
| pu_reference_index_l1 | See 8.3.4.2, maxVal=NumRefActive[1]−1, The value of pu_reference_index_l1 is equal to synElVal |
| mv_diff_x_abs_l0 mv_diff_x_abs_l0_affine mv_diff_x_abs_l1 mv_diff_x_abs_l1_affine | See 8.3.4.17 |
| mv_diff_x_ sign_l0 mv_diff_x_ sign_l0_ affine mv_diff_x_ sign_l1 mv_diff_x _sign_l1_affine mv_diff_x_ sign_ bv | See 8.3.4.4 , The value of mv_diff_x_sign_l0 ` mv_diff_x_sign_l0_affine ` mv_diff_x_sign_l1 ` mv_diff_x_sign_l1_affine, or mv_diff_x_sign_bv is equal to synElVal |
| mv_diff_y_abs_l0 mv_diff_y_abs_l0_affine mv_diff_y_abs_l1 mv_diff_y_abs_l1_affine | See 8.3.4.17 |
| mv_diff_y_sign_l0 mv_diff_y_sign_l0_affine mv_diff_y_sign_l1 mv_diff_y_sign_l1_affine mv_diff_y_sign_bv | See 8.3.4.4 , The value of mv_diff_y_sign_l0 ` mv_diff_y_sign_l0_affine ` mv_diff_y_signl1 ` mv_diff_y_sign_l1_affine, or mv_diff_y_sign_bv is equal to synElVal |
| mv_diff_x_abs_bv ` mv_diff_y_abs_bv | See 8.3.4.18 |
| sibc_flag | See 8.3.4.4, The value of sibc_flag is equal to synElVal |
| sibc_dir_flag | See 8.3.4.4 , The value of sibc_dir_flag is equal to synElVal |
| bgc_flag | See 8.3.4.4, The value of bgc_flag is equal to synElVal |
| bgc_index | See 8.3.4.4, The value of bgc_index is equal to synElVal |
| intra_luma_pred_mode_index | See 8.3.4.19 |
| luma_eipm_index | See 8.3.4.4, The value of luma_eipm_index is equal to synElVal |
| intra_pf_flag | See 8.3.4.4 , The value of intra_pf_flag is equal to synElVal |
| iip_flag | See 8.3.4.4, The value of iip_flag is equal to synElVal |
| ctp_zero_flag | See 8.3.4.4 , The value of ctp_zero_flag is equal to synElVal |
| pbt_cu_flag | See 8.3.4.4 , The value of pbt_cu_flag is equal to synElVal |
| ctp_y[i] | See 8.3.4.4, The value of cty_y[i] is equal to synElVal |
| cu_qp_delta_abs | See 8.3.4.3, The value of cu_qp_delta_abs is equal to synElVal |
| cu_qp_delta_sign | See 8.3.4.4, The value of cu_qp_delta_sign is equal to synElVal |
| enhanced_ts_flag | See 8.3.4.4, The value of enhanced_ts_flag is equal to synElVal |
| sbt_cu_flag | See 8.3.4.4, The value of sbt_cu_flag is equal to synElVal |
| sbt_quad_flag | See 8.3.4.4 , The value of sbt_quad_flag is equal to synElVal |
| sbt_dir_flag | See 8.3.4.4 , The value of sbt_dir_flag is equal to synElVal |
| chroma_st_flag | See 8.3.4.4 , The value of chroma_st_flag is equal to synElVal |
| ts_cu_flag | See 8.3.4.4, The value of ts_cu_flag is equal to synElVal |
| scan_region_x | See 8.3.4.20 , The value of scan_region_x is equal to synElVal |
| scan_region_y | See 8.3.4.20 , The value of scan_region_y is equal to synElVal |
| significant_flag | See 8.3.4.4 , The value of significant_flag is equal to synElVal |
| coeff_abs_level_greater1_flag | See 8.3.4.4, The value of coeff_abs_level_greater1_flag is equal to synElVal |
| coeff_abs_level_greater2_flag | See 8.3.4.4, The value of coeff_abs_level_greater2_flag is equal to synElVal |
| coeff_abs_level_greater4_flag | See 8.3.4.4, The value of coeff_abs_level_greater4_flag is equal to synElVal |
| coeff_abs_level_greater8_flag | See 8.3.4.4, The value of coeff_abs_level_greater8_flag is equal to synElVal |
| coeff_abs_level_remaining | See 8.3.4.21, The value of coeff_abs_level_remaining is equal to synElVal |
| coeff_run | See 8.3.4.22, TH=16, The value of coeff_run is equal to synElVal |
| coeff_level_minus1 | See 8.3.4.22, TH=8, The value of coeff_level_minus1 is equal to synElVal |

TABLE 8.3.3.3.1-continued

| | |
|---|---|
| Parsing process | |
| Syntax element | Inverse binarization method |
| coeff_sign | See 8.3.4.4, The value of coeff_sign is equal to synElVal |
| coeff_last | See 8.3.4.4, The value of coeff_last is equal to synElVal |
| est_tu_flag | See 8.3.4.4, The value of est_tu_flag is equal to synElVal |
| aec_ipcm_stuffing_bit | See 8.3.4.4, The value of aec_ipcm_stuffing_bit is equal to synElVal |
| esao_lcu_enable_flag | See 8.3.4.4, The value of esao_lcu_enable_flag is equal to synElVal |
| esao_lcu_set_index | See 8.3.4.2 , maxVal=1 , The value of esao_lcu_set_index is equal to synElVal |
| ccsao_lcu_enable_flag | See 8.3.4.4, The value of ccsao_lcu_enable_flag is equal to synElVal |
| ccsao_lcu_set_index | See 8.3.4.2, maxVal=PictureCcsaoSetNum, The value of ccsao_lcu_set_index is equal to synElVal |
| isc_match_type | See 8.3.4.4 , The value of isc_match_type is equal to synElVal |
| isc_sv_above_flag | See 8.3.4.4, The value of isc_sv_above_flag is equal to synElVal |
| isc_sv_recent_flag | See 8.3.4.4, The value of isc_sv_recent_flag is equal to synElVal |
| isc_sv_x_non_zero_flag | See 8.3.4.4 , The value of isc_sv_x_non_zero_flag is equal to synElVal |
| isc_sv_y_non_zero_flag | See 8.3.4.4 , The value of isc_sv_y_non_zero_flag is equal to synElVal |
| isc_sv_x_sign | See 8.3.4.4 , The value of isc_sv_x_sign is equal to synElVal |
| isc_sv_y_sign | See 8.3.4.4 , The value of isc_sv_y_sign is equal to synElVal |
| isc_sv_x_abs_minus1 | See 8.3.4.23, The value of isc_sv_x_abs_minus1 is equal to synElVal |
| isc_sv_y_abs | See 8.3.4.18 |
| isc_unmatched_pixel_y[i][j] | See table 89 , len=BitDepth, The value of isc_unmatched_pixel_y[i][j] is equal to synElVal |
| isc_unmatched_pixel_cb[i][j] | See table 89 , len=BitDepth, The value of isc_unmatched_pixel_cb[i][j] is equal to synElVal |
| isc_unmatched_pixel_cr[i][j] | See table 89 , len=BitDepth, The value of isc_unmatched_pixel_cr[i][j] is equal to synElVal |
| isc_nos_up_y[i] | See table 89, len=BitDepth, The value of isc_nos_up_y[i] is equal to synElVal |
| isc_nos_up_cb[i] | See table 89 , len=BitDepth, The value of isc_nos_up_cb[i] is equal to synElVal |
| isc_nos_up_cr[i] | See table 89 , len=BitDepth, The value of isc_nos_up_cr[i] is equal to synElVal |
| isc_sv_recent_index | See 8.3.4.2 , maxVal=11 , The value of isc_sv_recent_index is equal to synElVal |
| isc_next_remaining_pixel_in_cu | See 8.3.4.24 , The value of isc_next_remaining_pixel_in_cu is equal to synElVal |
| isc_pixel_match_type | See 8.3.4.4, The value of isc_pixel_match_type is equal to synElVal |
| isc_ups_present_flag | See 8.3.4.4, The value of isc_ups_present_flag is equal to synElVal |
| isc_num_of_new_pv | See Table 7-5, k=0, The value of isc_num_of_new_pv is equal to CodeNum |
| isc_num_of_reused_pv | See Table 7-5 , k=0 , The value of isc_num_of_reused_pv is equal to CodeNum |
| isc_prev_pv_not_reused_run | See Table 7-5 , k=0 , The value of isc_prev_pv_not_reused_run is equal to CodeNum |
| isc_ups_max_length_minus1 | See 8.3.4.2, maxVal = NumTotalPixel, The value of isc_ups_max_length_minus1 is equal to synElVal |
| isc_evs_ups_num_minus1 | See 8.3.4.2 , maxVal = NumTotalPixel – NumCodedPixel + FirstStringNumFlag – 1, The value of isc_evs_ups_num_minus1 is equal to synElVal |
| str_length_minus1_prefix | See 8.3.4.2, maxVal = maxValPrefix, The value of str_length_minus1_prefix is equal to synElVal |
| str_length_minus1_infix | See table 89 , len= Ceil(Log(maxValInfix+1))–1, The value of str_length_minus1_infix is equal to synElVal |
| str_length_minus1_suffix | See table 89 , len=1, The value of str_length_minus1_suffix is equal to synElVal |
| pv_address_prefix | See table 89, len= Ceil(Log(MaxValPvAddress))–1, The value of pv_address_prefix is equal to synElVal |
| pv_address_infix | See table 89, len=1, The value of pv_address_infix is equal to synElVal |
| pv_address_suffix | See table 89, len=1, The value of pv_address_suffix is equal to synElVal |
| isc_fopixel_y | See table 89, len=BitDepth, The value of isc_fopixel_y is equal to synElVal |

TABLE 8.3.3.3.1-continued

| Parsing process | |
| --- | --- |
| Syntax element | Inverse binarization method |
| isc_fopixel_cb | See table 89, len=BitDepth, The value of isc_fopixel_cb is equal to synElVal |
| isc_fopixel_cr | See table 89, len=BitDepth, The value of isc_fopixel_cr is equal to synElVal |
| nn_filter_lcu_enable_flag | See 8.3.4.4, The value of nn_filter_lcu_enable_flag is equal to synElVal |
| nn_filter_lcu_set_index | See 8.3.4.2, maxVal = NumOfNnFilter−1, The value of nn_filter_leu_set_index is equal to synElVal |

The bitstream of the enhanced 8-bit grade should meet the following conditions:

The value of profile_id shall be 0x30.

The value of progressive_sequence shall be 1.

The value of chroma_format shall be '01'.

The value of sample_precision shall be '001'

The value of PictureStructure of all coded pictures shall be the same between the start code of the video sequence and the end code of the first video sequence, or between the start code of the video sequence and the first video editing code.

The value of progressive_frame of all coded pictures shall be the same between the start code of the video sequence and the end code of the first video sequence that follows, or between the start code of the video sequence and the first video editing code that follows.

The value of MiniSize shall be 8.

The value range of log2_lcu_size_minus2 should be 3 to 5.

The value of log2_min_cu_size_minus2 shall be 0.

The value of stable_patch_flag shall be '1'.

The value of ref_colocated_patch_flag shall be '0'.

The value of uniform_patch_flag shall be '1'

Patches belonging to the same image should appear in ascending order according to the value of patch_index.

If any side length of a coding block is greater than 64, only skip mode or inter prediction mode shall be selected for the coding block. If inter prediction mode is selected, the value of ctp_zero_flag shall be '1'

If the number of luma samples of the current coding unit is less than 64, the current coding unit shall not use skip mode and direct mode, and the prediction reference mode of the prediction unit of the current coding unit shall not be 'PRED_List01'.

The value of MaxSplitTimes shall be 6.

The value of MaxPartRatio shall be 8.

The value of log2_max_bt_size_minus2 shall be 4 or 5.

If the width and height of the LCU of an I picture are both equal to 128, the LCU shall use quadtree split and the value of qt_split_flag shall be '1'.

If the width of the coding tree node is equal to 128 and the height is equal to 64 and the coding tree node is split, then the coding tree node shall use vertical binary tree division and the value of bet_split_dir_flag shall be '1'.

If the width of the coding tree node is equal to 64 and the height is equal to 128 and the coding tree node is split, then the coding tree node shall use horizontal binary tree split and the value of bet_split_dir_flag shall be '0'.

If the library_stream_flag of the current sequence is '1', all pictures of this sequence shall be I pictures.

If the syntax element duplicate_sequence_header_flag is present in the bitstream, the value of this syntax element shall be '1'.

At most 1 knowledge image should exist in the decoded image buffer.

The value of NumOfUpdatedLibrary shall be 1.

The value of MinLibraryUpdatePeriod shall be 1.

In this seventh exemplary embodiment, the value range of num_of_nn_filter_minus1 should be 0~3.

In this seventh exemplary embodiment, the value of MAX_TEMPORAL_ID shall be 7.

In this seventh exemplary embodiment, class limits specified in B.3.2.

In this seventh exemplary embodiment, supported levels include: 2.0.15, 2.0.30, 2.0.60, 4.0.30, 4.0.60, 6.0.30, 6.2.30, 6.4.30, 6.6.30, 6.0.60, 6.2.60, 6.4.60, 6.6.60, 6.0.120, 6.2.120, 6.4.120, 6.6.120, 8.0.30, 8.2.30, 8.4.30, 8.6.30, 8.0.60, 8.2.60, 8.4.60, 8.6.60, 8.0.120, 8.2.120, 8.4.120, 8.6.120, 10.0.30, 10.2.30, 10.4.30, 10.6.30, 10.0.60, 10.2.60, 10.4.60, 10.6.60, 10.0.120, 10.2.120, 10.4.120, and 10.6.120.

To enhance the bit stream of the 10-bit grade, the following conditions should be met:

The value of profile_id shall be 0x32.

The value of progressive_sequence shall be '1'.

The value of chroma_format shall be '01'.

The value of sample_precision should be '001' or '010'.

The value of encoding_precision shall be '001' or '010'.

The value of PictureStructure of all coded pictures shall be the same between the start code of the video sequence and the end code of the first video sequence, or between the start code of the video sequence and the first video editing code.

The value of progressive_frame of all coded pictures shall be the same between the start code of the video sequence and the end code of the first video sequence that follows, or between the start code of the video sequence and the first video editing code that follows.

The value of MiniSize shall be 8.

The value range of log2_lcu_size_minus2 should be 3 to 5.

The value of log2_min_cu_size_minus2 shall be 0.

The value of stable_patch_flag shall be '1'.

The value of ref_colocated_patch_flag shall be '0'.

The value of uniform_patch_flag shall be '1'.

Patches belonging to the same image should appear in ascending order according to the value of patch_index.

If any side length of a coding block is greater than 64, only skip mode or inter prediction mode shall be selected for the coding block. If inter prediction mode is selected, the value of ctp_zero_flag shall be '1'.

If the number of luma samples of the current coding unit is less than 64, the current coding unit shall not use skip mode and direct mode, and the prediction reference mode of the prediction unit of the current coding unit shall not be 'PRED_List01'.

The value of MaxSplitTimes shall be 6.

The value of MaxPartRatio shall be 8.

The value of log2_max_bt_size_minus2 shall be 4 or 5.

If the width and height of the LCU of an I picture are both equal to 128, the LCU shall use quadtree split and the value of qt_split_flag shall be T.

If the width of the coding tree node is equal to 128 and the height is equal to 64 and the coding tree node is split, then the coding tree node shall use vertical binary tree division and the value of bet_split_dir_flag shall be 1.

If the width of the coding tree node is equal to 64 and the height is equal to 128 and the coding tree node is split, then the coding tree node shall use horizontal binary tree split and the value of bet_split_dir_flag shall be '0'.

If the library_stream_flag of the current sequence is '1', all pictures of this sequence shall be I pictures.

If the syntax element duplicate_sequence_header_flag is present in the bitstream, the value of this syntax element shall be 1.

At most 1 knowledge image should exist in the decoded image buffer.

The value of NumOfUpdatedLibrary shall be 1.

The value of MinLibraryUpdatePeriod shall be 1.

The value of MAX_TEMPORAL_ID shall be 7.

In this seventh exemplary embodiment, the value range of num_of_nn_filter_minus1 should be 0~3.

In this seventh exemplary embodiment, class limits specified in B.3.2.

In this seventh exemplary embodiment, supported levels include: 2.0.15, 2.0.30, 2.0.60, 4.0.30, 4.0.60, 6.0.30, 6.2.30, 6.4.30, 6.6.30, 6.0.60, 6.2.60, 6.4.60, 6.6.60, 6.0.120, 6.2.120, 6.4.120, 6.6.120, 8.0.30, 8.2.30, 8.4.30, 8.6.30, 8.0.60, 8.2.60, 8.4.60, 8.6.60, 8.0.120, 8.2.120, 8.4.120, 8.6.120, 10.0.30, 10.2.30, 10.4.30, 10.6.30, 10.0.60, 10.2.60, 10.4.60, 10.6.60, 10.0.120, 10.2.120, 10.4.120 and 10.6.120.

Figure 18:
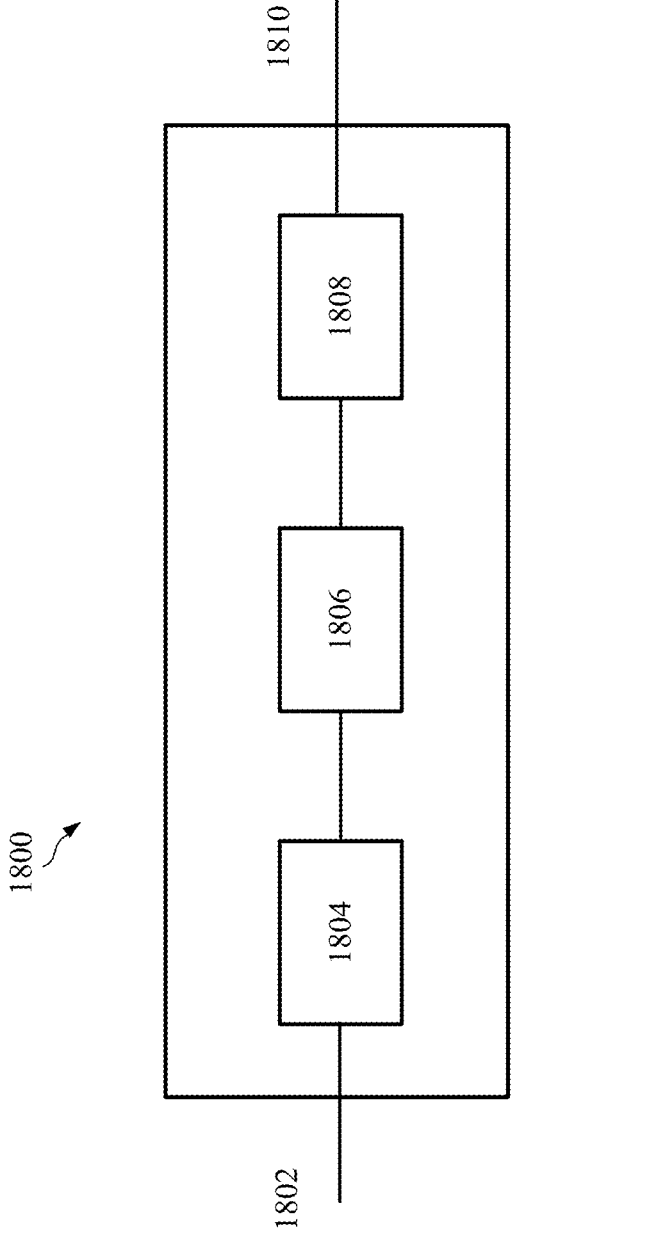
FIG. 18 is a block diagram showing an example video processing system.

Turning now to FIG. 18, a block diagram showing an example video processing system 1800 in which various embodiments disclosed herein may be implemented. Various implementations may include some or all of the components of the video processing system 1800. The video processing system 1800 may include input 1802 for receiving video content. The video content may be received in a raw or uncompressed format, e.g., 8 or 10 bit multi-component pixel values, or may be in a compressed or encoded format. The input 1802 may represent a network interface, a peripheral bus interface, or a storage interface. Examples of network interface include wired interfaces such as Ethernet, passive optical network (PON), etc. and wireless interfaces such as Wi-Fi or cellular interfaces.

The video processing system 1800 may include a coding component 1804 that may implement the various coding or encoding methods described in the present document. The coding component 1804 may reduce the average bitrate of video from the input 1802 to the output of the coding component 1804 to produce a coded representation of the video. The coding techniques are therefore sometimes called video compression or video transcoding techniques. The output of the coding component 1804 may be either stored, or transmitted via a communication connected, as represented by the component 1806. The stored or communicated bitstream (or coded) representation of the video received at the input 1802 may be used by the component 1808 for generating pixel values or displayable video that is sent to a display interface 1810. The process of generating user-viewable video from the bitstream representation is sometimes called video decompression. Furthermore, while certain video processing operations are referred to as "coding"

operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), Peripheral Component Interconnect (PCI), Integrated Drive Electronics (IDE) interface, and the like. The embodiments described in the present document may be embodied in various electronic devices such as mobile phones, laptops, smartphones or other devices that are capable of performing digital data processing and/or video display.

Figure 19:
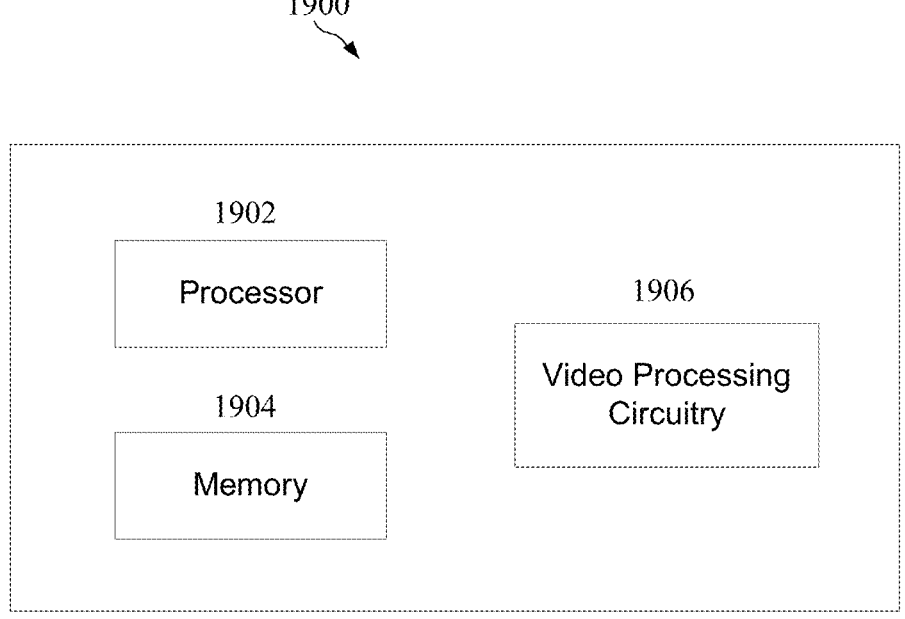
FIG. 19 is a block diagram of a video processing apparatus.

FIG. 19 is a block diagram of a video processing apparatus 1900. The apparatus 1900 may be used to implement one or more of the methods described herein. The apparatus 1900 may be embodied in a smartphone, tablet, computer, Internet of Things (IoT) receiver, and so on. The apparatus 1900 may include one or more processors 1902, one or more memories 1904 and video processing hardware 1906 (a.k.a., video processing circuitry). The processor(s) 1902 may be configured to implement one or more methods described in the present document. The memory (memories) 1904 may be used for storing data and code used for implementing the methods and embodiments described herein. The video processing hardware 1906 may be used to implement, in hardware circuitry, some embodiments described in the present document. In some embodiments, the hardware 1906 may be partly or completely located within the processor 1902, e.g., a graphics processor.

Figure 20:
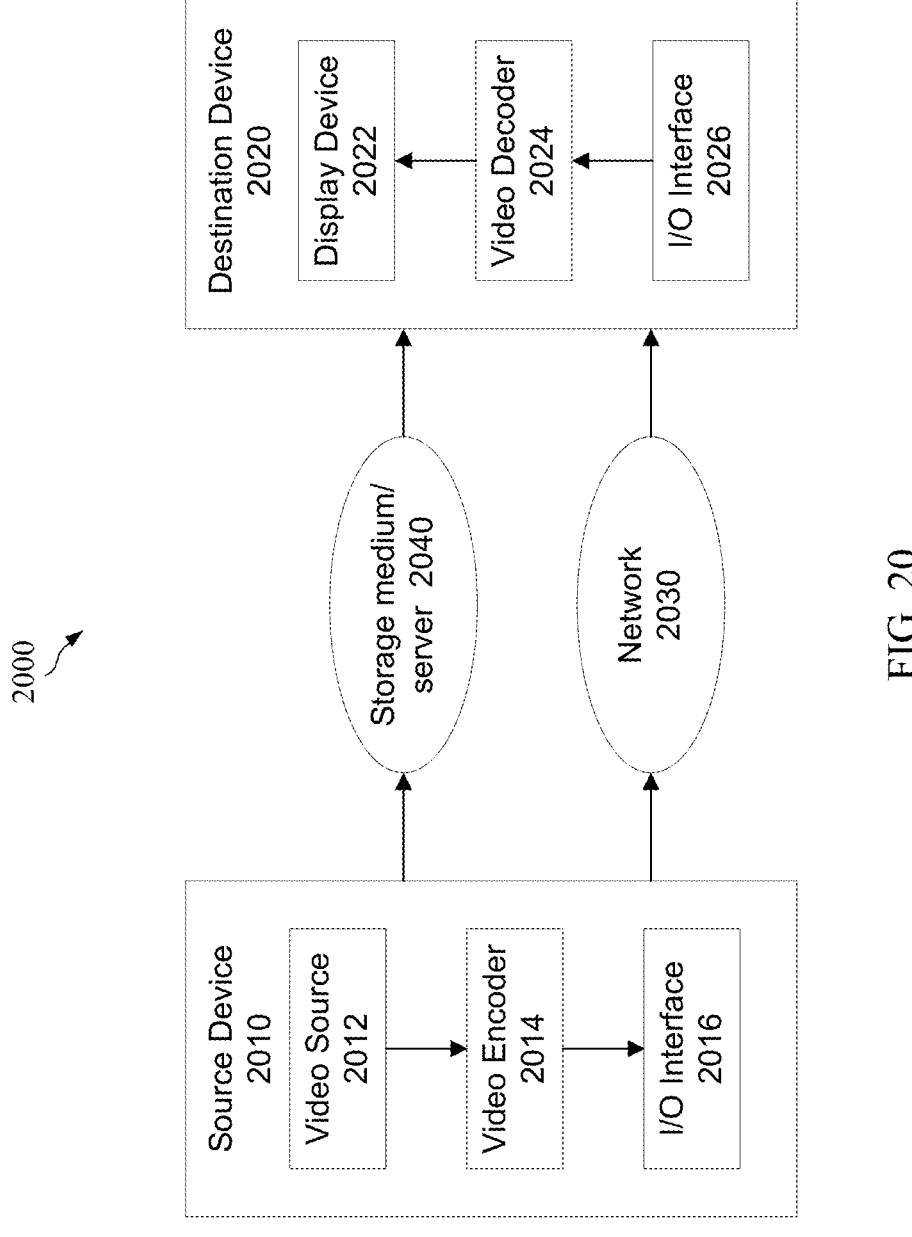
FIG. 20 is a block diagram that illustrates an example video coding system.

FIG. 20 is a block diagram that illustrates an example video coding system 2000 that may utilize the embodiments of this disclosure. As shown in FIG. 20, the video coding system 2000 may include a source device 2010 and a destination device 2020. Source device 2010 generates encoded video data which may be referred to as a video encoding device. Destination device 2020 may decode the encoded video data generated by source device 2010 which may be referred to as a video decoding device.

Source device 2010 may include a video source 2012, a video encoder 2014, and an input/output (I/O) interface 2016.

Video source 2012 may include a source such as a video capture device, an interface to receive video data from a video content provider, and/or a computer graphics system for generating video data, or a combination of such sources. The video data may comprise one or more pictures. Video encoder 2014 encodes the video data from video source 2012 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 2016 may include a modulator/demodulator (modem) and/or a transmitter. The encoded video data may be transmitted directly to destination device 2020 via I/O interface 2016 through network 2030. The encoded video data may also be stored onto a storage medium/server 2040 for access by destination device 2020.

Destination device 2020 may include an I/O interface 2026, a video decoder 2024, and a display device 2022.

I/O interface 2026 may include a receiver and/or a modem. I/O interface 2026 may acquire encoded video data from the source device 2010 or the storage medium/server 2040. Video decoder 2024 may decode the encoded video data. Display device 2022 may display the decoded video data to a user. Display device 2022 may be integrated with the destination device 2020, or may be external to destination device 2020 which may be configured to interface with an external display device.

Video encoder 2014 and video decoder 2024 may operate according to a video compression standard, such as the High Efficiency Video Coding (HEVC) standard, Versatile Video Coding (VVC) standard, and other current and/or further standards.

Figure 21:
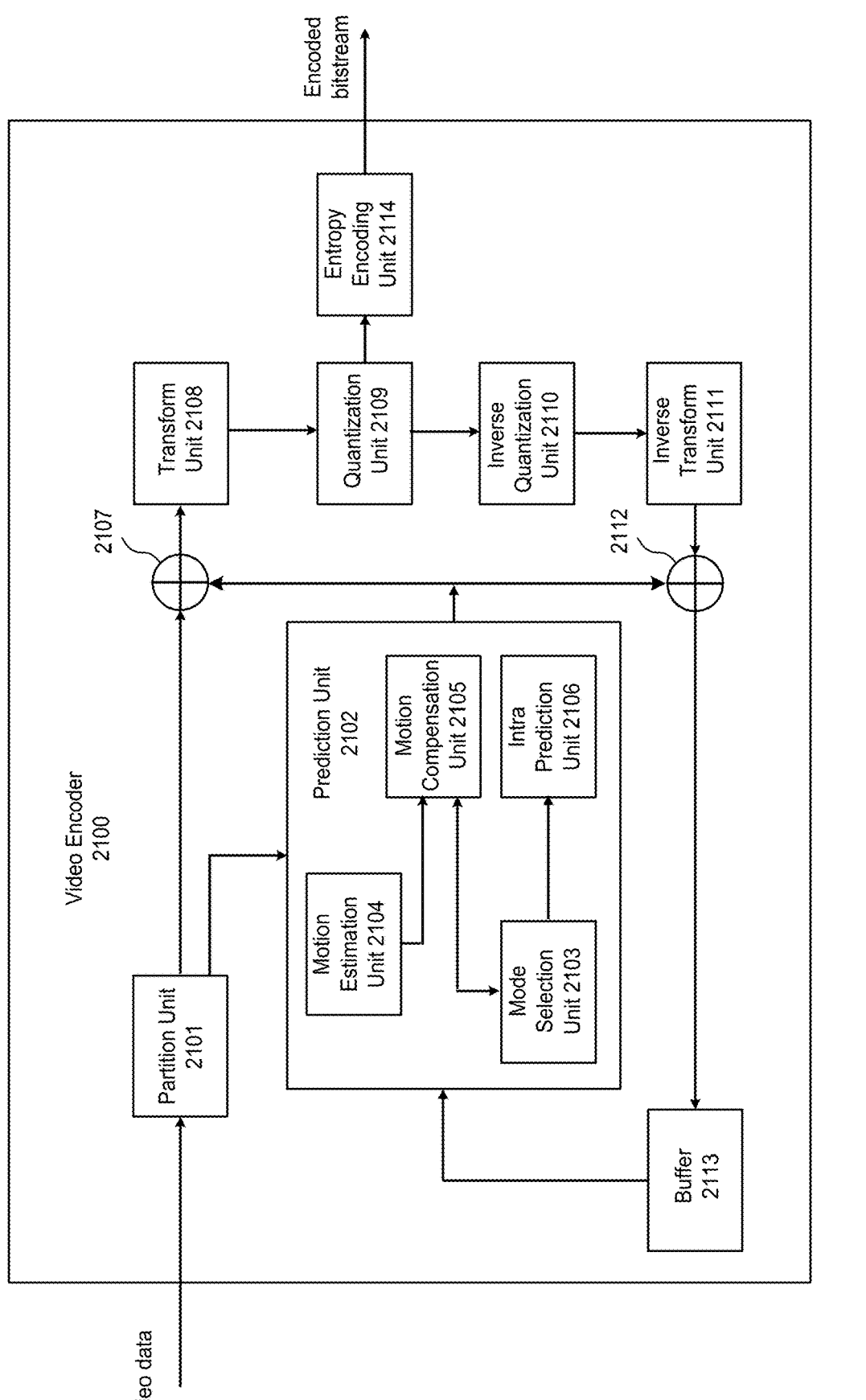
FIG. 21 is a block diagram illustrating an example of video encoder.

FIG. 21 is a block diagram illustrating an example of video encoder 2100, which may be video encoder 2014 in the video coding system 2000 illustrated in FIG. 20.

Video encoder 2100 may be configured to perform any or all of the embodiments of this disclosure. In the example of FIG. 21, video encoder 2100 includes a plurality of functional components. The embodiments described in this disclosure may be shared among the various components of video encoder 2100. In some examples, a processor may be configured to perform any or all of the embodiments described in this disclosure.

The functional components of video encoder 2100 may include a partition unit 2101; a prediction unit 2102, which may include a mode select unit 2103, a motion estimation unit 2104, a motion compensation unit 2105, and an intra prediction unit 2106; a residual generation unit 2107; a transform unit 2108; a quantization unit 2109; an inverse quantization unit 2110; an inverse transform unit 2111; a reconstruction unit 2112; a buffer 2113; and an entropy encoding unit 2114.

In other examples, video encoder 2100 may include more, fewer, or different functional components. In an example, prediction unit 2102 may include an intra block copy (IBC) unit. The IBC unit may perform prediction in an IBC mode in which at least one reference picture is a picture where the current video block is located.

Furthermore, some components, such as motion estimation unit 2104 and motion compensation unit 2105 may be highly integrated, but are represented in the example of FIG. 21 separately for purposes of explanation.

Partition unit 2101 may partition a picture into one or more video blocks. Video encoder 2014 and video decoder 2024 of FIG. 20 may support various video block sizes.

Mode select unit 2103 may select one of the coding modes, intra or inter, e.g., based on error results, and provide the resulting intra- or inter-coded block to a residual generation unit 2107 to generate residual block data and to a reconstruction unit 2112 to reconstruct the encoded block for use as a reference picture. In some examples, mode select unit 2103 may select a combination of intra and inter prediction (CIIP) mode in which the prediction is based on an inter prediction signal and an intra prediction signal. Mode select unit 2103 may also select a resolution for a motion vector (e.g., a sub-pixel or integer pixel precision) for the block in the case of inter-prediction.

To perform inter prediction on a current video block, motion estimation unit 2104 may generate motion information for the current video block by comparing one or more reference frames from buffer 2113 to the current video block. Motion compensation unit 2105 may determine a predicted video block for the current video block based on the motion information and decoded samples of pictures from buffer 2113 other than the picture associated with the current video block.

Motion estimation unit 2104 and motion compensation unit 2105 may perform different operations for a current video block, for example, depending on whether the current video block is in an I slice, a P slice, or a B slice. I-slices (or I-frames) are the least compressible but don't require other video frames to decode. S-slices (or P-frames) can use data from previous frames to decompress and are more compressible than I-frames. B-slices (or B-frames) can use both previous and forward frames for data reference to get the highest amount of data compression.

In some examples, motion estimation unit 2104 may perform uni-directional prediction for the current video block, and motion estimation unit 2104 may search reference pictures of list 0 or list 1 for a reference video block for the current video block. Motion estimation unit 2104 may then generate a reference index that indicates the reference picture in list 0 or list 1 that contains the reference video block and a motion vector that indicates a spatial displacement between the current video block and the reference video block. Motion estimation unit 2104 may output the reference index, a prediction direction indicator, and the motion vector as the motion information of the current video block. Motion compensation unit 2105 may generate the predicted video block of the current block based on the reference video block indicated by the motion information of the current video block.

In other examples, motion estimation unit 2104 may perform bi-directional prediction for the current video block, motion estimation unit 2104 may search the reference pictures in list 0 for a reference video block for the current video block and may also search the reference pictures in list 1 for another reference video block for the current video block. Motion estimation unit 2104 may then generate reference indexes that indicate the reference pictures in list 0 and list 1 containing the reference video blocks and motion vectors that indicate spatial displacements between the reference video blocks and the current video block. Motion estimation unit 2104 may output the reference indexes and the motion vectors of the current video block as the motion information of the current video block. Motion compensation unit 2105 may generate the predicted video block of the current video block based on the reference video blocks indicated by the motion information of the current video block.

In some examples, motion estimation unit 2104 may output a full set of motion information for decoding processing of a decoder.

In some examples, motion estimation unit 2104 may not output a full set of motion information for the current video. Rather, motion estimation unit 2104 may signal the motion information of the current video block with reference to the motion information of another video block. For example, motion estimation unit 2104 may determine that the motion information of the current video block is sufficiently similar to the motion information of a neighboring video block.

In one example, motion estimation unit 2104 may indicate, in a syntax structure associated with the current video block, a value that indicates to the video decoder 2024 that the current video block has the same motion information as another video block.

In another example, motion estimation unit 2104 may identify, in a syntax structure associated with the current video block, another video block and a motion vector difference (MVD). The motion vector difference indicates a difference between the motion vector of the current video block and the motion vector of the indicated video block. The video decoder 2024 may use the motion vector of the indicated video block and the motion vector difference to determine the motion vector of the current video block.

As discussed above, video encoder 2014 may predictively signal the motion vector. Two examples of predictive signaling techniques that may be implemented by video encoder 2014 include advanced motion vector prediction (AMVP) and merge mode signaling.

Intra prediction unit 2106 may perform intra prediction on the current video block. When intra prediction unit 2106 performs intra prediction on the current video block, intra prediction unit 2106 may generate prediction data for the current video block based on decoded samples of other video blocks in the same picture. The prediction data for the current video block may include a predicted video block and various syntax elements.

Residual generation unit 2107 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block, for example in a skip mode, and residual generation unit 2107 may not perform the subtracting operation.

Transform unit 2108 may generate one or more transform coefficient video blocks for the current video block by applying one or more transforms to a residual video block associated with the current video block.

After transform unit 2108 generates a transform coefficient video block associated with the current video block, quantization unit 2109 may quantize the transform coefficient video block associated with the current video block based on one or more quantization parameter (QP) values associated with the current video block.

Inverse quantization unit 2110 and inverse transform unit 2111 may apply inverse quantization and inverse transforms to the transform coefficient video block, respectively, to reconstruct a residual video block from the transform coefficient video block. Reconstruction unit 2112 may add the reconstructed residual video block to corresponding samples from one or more predicted video blocks generated by the prediction unit 2102 to produce a reconstructed video block associated with the current block for storage in the buffer 2113.

After reconstruction unit 2112 reconstructs the video block, loop filtering operation may be performed to reduce video blocking artifacts in the video block.

Entropy encoding unit 2114 may receive data from other functional components of the video encoder 2100. When entropy encoding unit 2114 receives the data, entropy encoding unit 2114 may perform one or more entropy encoding operations to generate entropy encoded data and output a bitstream that includes the entropy encoded data.

Figure 22:
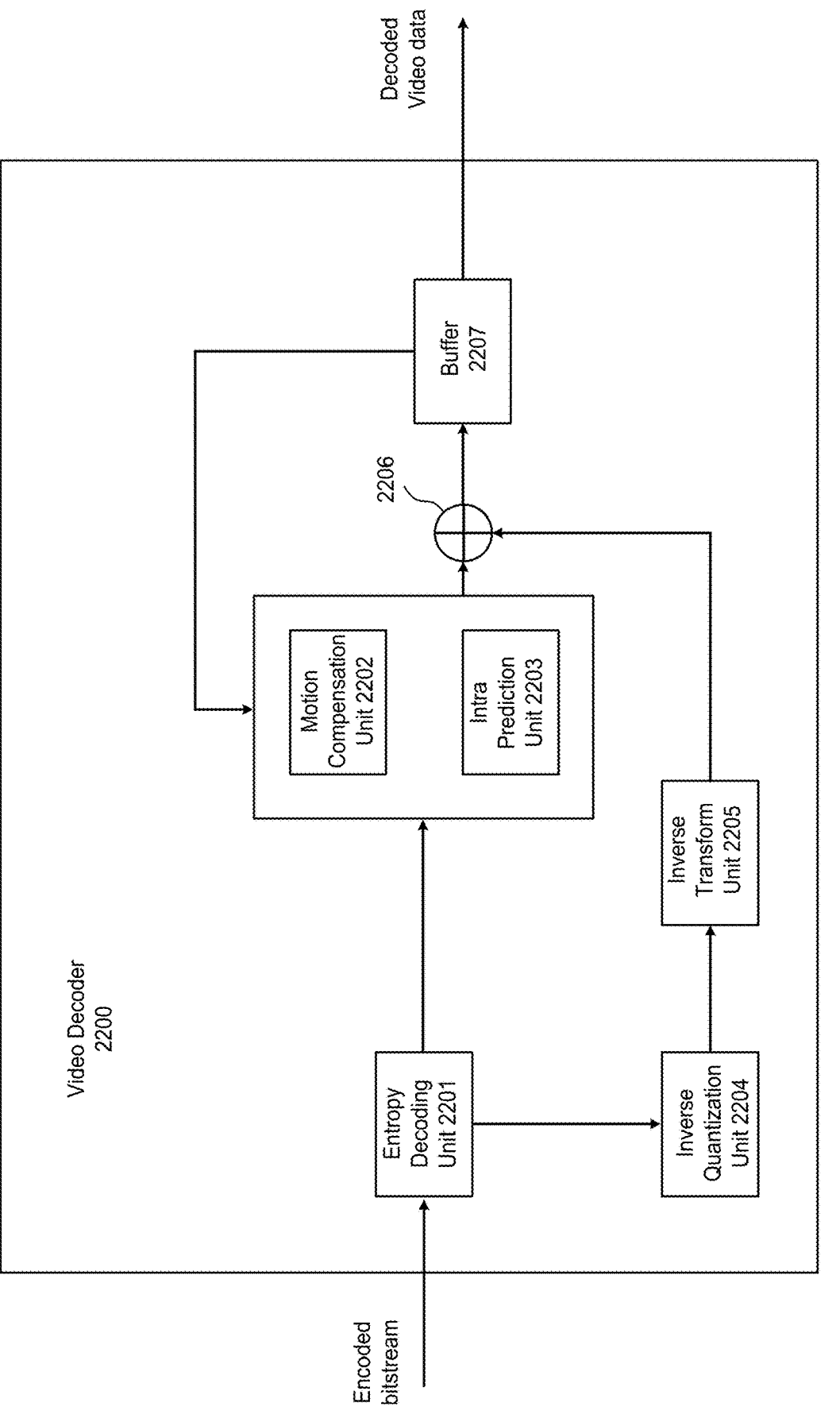
FIG. 22 is a block diagram illustrating an example of video decoder.

FIG. 22 is a block diagram illustrating an example of video decoder 2200, which may be video decoder 2024 in the video coding system 2000 illustrated in FIG. 20.

The video decoder 2200 may be configured to perform any or all of the embodiments of this disclosure. In the example of FIG. 22, the video decoder 2200 includes a plurality of functional components. The embodiments described in this disclosure may be shared among the various components of the video decoder 2200. In some examples, a processor may be configured to perform any or all of the embodiments described in this disclosure.

In the example of FIG. 22, video decoder 2200 includes an entropy decoding unit 2201, a motion compensation unit 2202, an intra prediction unit 2203, an inverse quantization unit 2204, an inverse transformation unit 2205, and a reconstruction unit 2206 and a buffer 2207. Video decoder 2200 may, in some examples, perform a decoding pass generally reciprocal to the encoding pass described with respect to video encoder 2014 (FIG. 20).

Entropy decoding unit 2201 may retrieve an encoded bitstream. The encoded bitstream may include entropy coded video data (e.g., encoded blocks of video data). Entropy decoding unit 2201 may decode the entropy coded video data, and from the entropy decoded video data, motion compensation unit 2202 may determine motion information including motion vectors, motion vector precision, reference picture list indexes, and other motion information. Motion compensation unit 2202 may, for example, determine such information by performing the AMVP and merge mode signaling.

Motion compensation unit 2202 may produce motion compensated blocks, possibly performing interpolation based on interpolation filters. Identifiers for interpolation filters to be used with sub-pixel precision may be included in the syntax elements.

Motion compensation unit 2202 may use interpolation filters as used by video encoder 2014 during encoding of the video block to calculate interpolated values for sub-integer pixels of a reference block. Motion compensation unit 2202 may determine the interpolation filters used by video encoder 2014 according to received syntax information and use the interpolation filters to produce predictive blocks.

Motion compensation unit 2202 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 2203 may use intra prediction modes for example received in the bitstream to form a prediction block from spatially adjacent blocks. Inverse quantization unit 2204 inverse quantizes, i.e., de-quantizes, the quantized video block coefficients provided in the bitstream and decoded by entropy decoding unit 2201. Inverse transform unit 2205 applies an inverse transform.

Reconstruction unit 2206 may sum the residual blocks with the corresponding prediction blocks generated by motion compensation unit 2202 or intra-prediction unit 2203 to form decoded blocks. If desired, a deblocking filter may also be applied to filter the decoded blocks in order to remove blockiness artifacts. The decoded video blocks are then stored in buffer 2207, which provides reference blocks for subsequent motion compensation/intra prediction and also produces decoded video for presentation on a display device.

Figure 23:
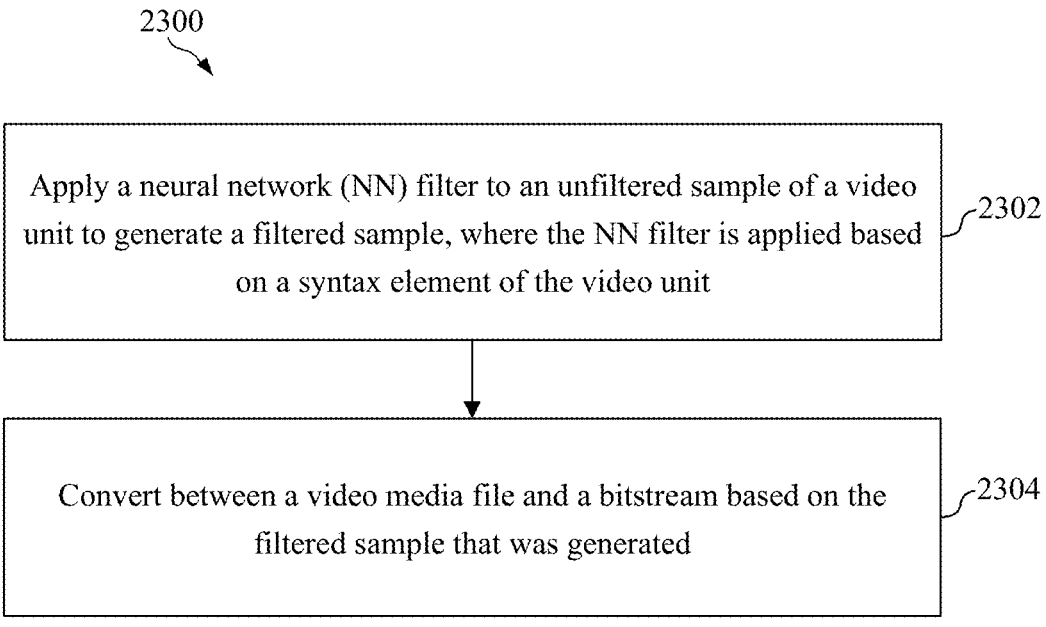
FIG. 23 is a method for coding video data according to an embodiment of the disclosure.

FIG. 23 is a method 2300 for coding video data according to an embodiment of the disclosure. The method 2300 may be performed by a coding apparatus (e.g., an encoder) having a processor and a memory. The method 2300 may be implemented to control the presence of (e.g., application of) NN filter models through syntax elements at various levels. For example, the syntax element(s) that indicate whether to apply a NN filter may be at a first level (e.g., in a sequence parameter set (SPS) and/or a sequence header of a video unit). Syntax element(s) that indicate whether to apply a NN filter may also be at a second level (e.g., a picture header, a picture parameter set (PPS), and/or a slice header of the video unit). Still further, syntax element(s) that indicate whether to apply a NN filter may be at a third level (e.g., the syntax element is indicated for a patch of the video unit, a CTU of the video unit, a CTB of the video unit, a block of the video unit, a subpicture of the video unit, a tile of the video unit, or a region of the video unit.

In block 2302, the coding apparatus applies a neural network (NN) filter to an unfiltered sample of a video unit to generate a filtered sample. The NN filter is applied based on a syntax element of the video unit. In an embodiment, an unfiltered sample is a sample (or pixel) that has not yet been subjected to any filtering process, or has not yet been sufficiently filtered. For example, the unfiltered sample has not been subjected to any NN filter. As another example, the unfiltered sample has not been subjected to an NN filter, an adaptive loop filter (ALF), a deblocking filter (DF), a sample adaptive offset (SAO) filter, or combinations thereof.

In block 2304, the coding apparatus converts between a video media file and a bitstream based on the filtered sample that was generated.

When implemented in an encoder, converting includes receiving a media file (e.g., a video unit) and encoding a filtered sample into a bitstream. When implemented in a decoder, converting includes receiving a bitstream including a filtered sample, and decoding the bitstream to obtain the filtered sample.

In an embodiment, the method 2300 may utilize or incorporate one or more of the features or processes of the other methods disclosed herein.

In one example, a non-transitory computer readable medium stores a bitstream of a video that is generated by a method, such as all or part of the method 2300, performed by a video processing apparatus (e.g., video processing apparatus 1900, described above). For example, the bitstream may be generated by applying a NN filter to an unfiltered sample of a video unit to generate a filtered sample. As described above, the NN filter applied based on a syntax element of the video unit, and the bitstream is generated based on the filtered sample.

A listing of solutions preferred by some embodiments is provided next.

The following solutions show examples of embodiments discussed in the present disclosure (e.g., Example 1).

1. A method of video processing, comprising: determining, for a conversion between a video unit of a video and a bitstream of the video, a parameter of an in-loop filter applied to the video unit according to a rule; and performing the conversion based on the determining, wherein the determining is based on a quality-level indicator (QI) input.

2. The method of solution 1, wherein the QI of the video unit is a quantization parameter of the video unit.

3. The method of solution 1, wherein the QI of the video unit is a quantization parameter value for the video.

4. The method of solution 1, wherein the QI of the video unit is a quantization step applied to the video unit.

5. The method of solution 1, wherein the conversion is performed by tiling the QI indicator input into a two-dimensional array of same size as the video unit and used as an input plane for the determining.

6. The method of any of solutions 1-5, wherein the QI indicator input is indicated in the bitstream.

7. The method of solution 1, wherein the determining uses a function of the QI indicator.

The following solutions show examples of embodiments discussed in the present disclosure (e.g., Example 2).

8. A method of video processing, comprising: constructing, for a conversion between a video unit of a video and a bitstream of the video, a list of filtering candidates applicable to in-loop filtering of the video units according to a rule; and performing the conversion based on the determining; wherein the rule specifies that at least one entry in the list is based on a computational neural network (CNN) model.

9. The method of solution 8, wherein the list is constructed responsive to a coding statistics of the video unit.

10. The method of solution 9, wherein the coding statistics includes a ratio of a first group video samples related to the video unit that are coded using a predetermined video coding tool and samples of the video unit, called tool X.

11. The method of solution 10, wherein tool X includes intra prediction, palette prediction or intra-block copy prediction mode.

12. The method of any of solutions 8-11, wherein the rule is further responsive to a coding condition of the video unit.

13. The method of solution 12, wherein the coding condition is that the video unit belongs to luma component of the video.

14. The method of solution 12, wherein the coding condition is that the video unit belongs to a certain temporal layer of the video.

15. The method of solution 10, wherein the first group of video samples is in in a picture that includes the video unit.

16. The method of solution 10, wherein the first group of video samples is in in one or more pictures that are different from a picture that includes the video unit.

The following solutions show examples of embodiments discussed in the present disclosure (e.g., Example 3).

17. A method of video processing, comprising: determining, for a conversion between a video unit of a video and a bitstream of the video, whether or how a neural network (NN) based filter is enabled for the video unit according to a rule; and performing the conversion based on the determining; wherein the rule is dependent on whether a non-deep learning-based filtering (NDLF) is enabled for the video unit.

18. The method of solution 17, wherein the NDLF filtering includes deblocking filtering or sample adaptive offset filtering or cross-component sample adaptive offset or adaptive loop filtering or cross-component adaptive loop filtering or luma mapping with chroma scaling or bilateral filter or transform domain filtering.

19. The method of any of solutions 17-18, wherein the rule specifies one or more of the NDLF filter types that are mutually exclusively enabled with the NN filter.

20. The method of solution 17, wherein the rule specifies one or more of the NDLF filter types that are permitted to be enabled with the NN filter.

21. The method of any of solutions 17-20, wherein the rule is dependent on a color format of the video or a profile or a tier or a level of the video.

22. The method of any of solutions 1-21, wherein the video unit comprises a coding unit, a transform unit, a prediction unit, a slice or a subpicture.

23. The method of any of solutions 1-21, wherein the video unit is a coding block or a video slice or a video picture or a video tile or a video subpicture.

24. The method of any of solutions 1-23, wherein the conversion comprises generating the video from the bitstream or generating the bitstream from the video.

25. A video decoding apparatus comprising a processor configured to implement a method recited in one or more of solutions 1-14.

26. A video encoding apparatus comprising a processor configured to implement a method recited in one or more of solutions 1-24.

27. A computer program product having computer code stored thereon, the code, when executed by a processor, causes the processor to implement a method recited in any of solutions 1-24.

28. A method, apparatus or system described in the present document.

The following documents are incorporated by reference in their entirety:

Johannes Balle, Valero Laparra, and Eero P Simoncelli, "End-to-end optimization of nonlinear transform codes for perceptual quality," PCS IEEE (2016), 1-5.

Lucas Theis, Wenzhe Shi, Andrew Cunningham, and Ferenc Huszar, "Lossy image compression with compressive autoencoders," arXiv preprint arXiv: 1703.00395 (2017).

Jiahao Li, Bin Li, Jizheng Xu, Ruiqin Xiong, and Wen Gao, "Fully Connected Network-Based Intra Prediction for Image Coding, "IEEE Transactions on Image Processing" 27, 7 (2018), 3236-3247.

Yuanying Dai, Dong Liu, and Feng Wu, "A convolutional neural network approach for post-processing in HEVC intra coding," MMM. Springer, 28-39.

Rui Song, Dong Liu, Houqiang Li, and Feng Wu, "Neural network-based arithmetic coding of intra prediction modes in HEVC," VCIP IEEE (2017), 1-4.

J. Pfaff, P. Helle, D. Maniry, S. Kaltenstadler, W. Samek, H. Schwarz, D. Marpe, and T. Wiegand, "Neural network based intra prediction for video coding," Applications of Digital Image Processing XLI, Vol. 10752. International Society for Optics and Photonics, 1075213 (2018).

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disk read-only memory (CD ROM) and digital versatile disc-read only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method implemented by a video coding apparatus, comprising:

applying a neural network (NN) filter to an unfiltered sample of a video unit to generate a filtered sample, wherein the NN filter is applied based on a syntax element of the video unit; and converting between a video media file and a bitstream based on the filtered sample that was generated, wherein the syntax element indicates at least one selected from the group consisting of: whether to enable the NN filter, a number of NN filters to be applied, and a type of NN filter to be applied, wherein a first level comprises a sequence level, and a second level comprises a picture level, and wherein the syntax element is a first syntax element at the first level that indicates whether a NN filter can be adaptively selected at the second level to be applied to a picture or a slice of the video unit.

2. The method of claim 1, wherein:

a syntax element indicated in the first level is indicated in a sequence parameter set (SPS) and/or a sequence header of the video unit;

a syntax element indicated in the second level is indicated in a picture header, a picture parameter set (PPS), and/or a slice header of the video unit; and a third level comprises a subpicture level a syntax element indicated in the third level is indicated for a patch of the video unit, a coding tree unit (CTU) of the video unit, a coding tree block (CTB) of the video unit, a block of the video unit, a subpicture of the video unit, a tile of the video unit, a slice of the video unit, or a region of the video unit.

3. The method of claim 2, wherein the syntax element is the first syntax element further at the second level that is conditionally applied based on a second syntax element at the first level, wherein the NN filter is applied at the second level based on the first syntax element based on the second syntax element being a flag that is true, and wherein the NN filter is not applied based on the second syntax element being false.

4. The method of claim 2, wherein the syntax element is the first syntax element further at the second level that indicates whether a NN filter can be adaptively selected at the third level to be applied to a subpicture of the video unit, or that indicates whether usage of the NN filter can be controlled at the third level.

5. The method of claim 2, wherein the syntax element is the first syntax element further at the second level that indicates whether a NN filter can be adaptively selected at the second level, used at the second level, or applied on the second level; and wherein the first syntax element is signaled based on an indication that the NN filter can be adaptively selected at the second level or an indication that a number of NN filters is greater than one.

6. The method of claim 2, wherein the syntax element is the first syntax element further at the third level that is conditionally applied based on a second syntax element at the first level and/or a third syntax at the second level, wherein the first syntax element is coded using context, wherein the NN filter is applied at the third level based on the first syntax element based on one of the second syntax element and the third syntax element being a flag that is true, and wherein the NN filter is not applied based on one of the second syntax element and the third syntax element being false.

7. The method of claim 2, wherein the syntax element is the first syntax element further at the third level that is signaled based on an indication that the NN filter can be adaptively selected at the third level or an indication that a number of NN filters is greater than one.

8. The method of claim 2, wherein the syntax element is signaled responsive to the NN filter being enabled for a picture or a slice of the video unit, and wherein the NN filter is one of a plurality (T) of NN filters, and wherein the syntax element includes an index (k).

9. The method of claim 8, further comprising applying the $k^{th}$ NN filter at the second level of the video unit based on the index k>=0 and k<T.

10. The method of claim 8, further comprising adaptively selecting a NN filter at the third level based on the index k>=T.

11. The method of claim 8, wherein the index k is restricted to be in a range from 0 to (T−1).

12. The method of claim 2, wherein the syntax element is coded based on a context model that is selected based on a number of allowed NN filters, wherein a filter model index for a color component of the video unit is configured to specify one of K context models, and wherein the one of the K context models is specified as a minimum of K−1 and binIdx, wherein binIdx is an index of a bin to be coded.

13. The method of claim 12, wherein a filter model index for first and second color components of the video unit is coded with a same set of contexts.

14. The method of claim 12, wherein the filter model index for a first color component of the video unit is coded with a different set of contexts than the filter model index for a second color component of the video unit.

15. The method of claim 1, wherein the syntax element is signaled using context coding or bypass coding, or is binarized using fixed-length coding, unary coding, truncated unary coding, signaled unary coding, signed truncated unary coding, truncated binary coding, or exponential Golomb coding.

16. The method of claim 1, wherein the conversion comprises generating the bitstream according to the video media file.

17. The method of claim 1, wherein the conversion comprises parsing the bitstream to obtain the video media file.

18. An apparatus for coding video data comprising a processor and a non-transitory memory with instructions thereon, wherein the instructions upon execution by the processor cause the processor to:

apply a neural network (NN) filter to an unfiltered sample of a video unit to generate a filtered sample, wherein the NN filter is applied based on a syntax element of the video unit; and convert between a video media file and a bitstream based on the filtered sample that was generated, wherein the syntax element indicates at least one selected from the group consisting of: whether to enable the NN filter, a number of NN filters to be applied, and a type of NN filter to be applied, wherein a first level comprises a sequence level, and a second level comprises a picture level, and wherein the syntax element is a first syntax element at the first level that indicates whether a NN filter can be adaptively selected at the second level to be applied to a picture or a slice of the video unit.

19. A non-transitory computer readable medium storing a bitstream of a video that is generated by a method performed by a video processing apparatus, wherein the method comprises:

applying a neural network (NN) filter to an unfiltered sample of a video unit to generate a filtered sample, wherein the NN filter is applied based on a syntax element of the video unit; and generating the bitstream based on the filtered sample that was generated, wherein the syntax element indicates at least one selected from the group consisting of: whether to enable the NN filter, a number of NN filters to be applied, and a type of NN filter to be applied, wherein a first level comprises a sequence level, and a second level comprises a picture level, and wherein the syntax element is a first syntax element at the first level that indicates whether a NN filter can be adaptively selected at the second level to be applied to a picture or a slice of the video unit.

* * * * *